US012746927B1

(12) United States Patent
Smith et al.

(10) Patent No.: US 12,746,927 B1
(45) Date of Patent: Sep. 29, 2026

(54) MILITARY VEHICLE ACCESSORY SYSTEMS AND METHOD

(71) Applicant: Oshkosh Defense, LLC, Oshkosh, WI (US)

(72) Inventors: Chad Smith, Omro, WI (US); Nader Nasr, Neenah, WI (US); Rachell Harsh, Oshkosh, WI (US); Mike J. Bolton, Oshkosh, WI (US); Bradon Zeitler, Oshkosh, WI (US); Ryan Crabtree, Oskosh, WI (US); Erik S. Ellifson, Oshkosh, WI (US); Martin J. Schimke, Redgranite, WI (US); Micah Richmond, Omro, WI (US); Andrew Kotloski, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 1000 days.

(21) Appl. No.: 17/887,321

(22) Filed: Aug. 12, 2022

Related U.S. Application Data

(60) Provisional application No. 63/344,239, filed on May 20, 2022, provisional application No. 63/233,008, filed on Aug. 13, 2021.

(51) Int. Cl.

| | |
|---|---|
| ***B60G 17/0165*** | (2006.01) |
| ***B60K 20/02*** | (2006.01) |
| ***B60W 30/182*** | (2020.01) |

(52) U.S. Cl.
CPC ....... *B60W 30/182* (2013.01); *B60G 17/0165* (2013.01); *B60K 20/02* (2013.01); *B60G 2500/30* (2013.01)

(58) Field of Classification Search
CPC ............. B60W 30/182; B60G 17/0165; B60G 2500/30; B60K 20/02
See application file for complete search history.

(56) References Cited

U.S. PATENT DOCUMENTS

| | | | |
|---|---|---|---|
| 1,763 | A | 9/1840 | Grimes |
| 13,952 | A | 12/1855 | Nichols et al. |

(Continued)

FOREIGN PATENT DOCUMENTS

| | | |
|---|---|---|
| CN | 102490584 A | 6/2012 |
| CN | 102849062 A | 1/2013 |

(Continued)

OTHER PUBLICATIONS

Slip Compensated Odometry (Genki) (Year: 2017).*
Subaru X-Mode (Thom) (Year: 2021).*
Zero Radius Turning Vehicle (Mahantesh) (Year: 2016).*

*Primary Examiner* — Minnah L Seoh
*Assistant Examiner* — Al-Birr Rahman Chowdhury
(74) *Attorney, Agent, or Firm* — Foley & Lardner LLP

(57) ABSTRACT

A military vehicle includes a tractive assembly, and a controller. A first axle assembly includes a first tractive element. A first motor is coupled to the first tractive element across a first gear ratio. A second axle assembly includes a second tractive element. A second motor is coupled to the second tractive element across a second gear ratio. The controller is operably coupled to the tractive assembly and configured to shift the tractive assembly between a first mode and a second mode in response to a speed of the military vehicle exceeding a speed threshold. The controller is configured to engage the first motor in the first mode and thereafter engage the second motor in the second mode such that the tractive assembly is configured to drive the military vehicle in one of the first gear ratio and the second gear ratio based on the speed of the military vehicle.

18 Claims, 58 Drawing Sheets

(56) References Cited

U.S. PATENT DOCUMENTS

| | | | |
|---|---|---|---|
| 16,774 | A | 3/1857 | Holmes |
| 29,361 | A | 7/1860 | Covel |
| 47,430 | A | 4/1865 | Kolb |
| 48,292 | A | 6/1865 | Leonard |
| 51,775 | A | 12/1865 | Brown |
| 51,776 | A | 12/1865 | Buckley |
| 52,626 | A | 2/1866 | Tyler |
| 97,675 | A | 12/1869 | Morris |
| 99,256 | A | 1/1870 | Squires et al. |
| 112,496 | A | 3/1871 | Robbins |
| 139,955 | A | 6/1873 | Hall |
| 158,756 | A | 1/1875 | Tibbals |
| 162,200 | A | 4/1875 | Sisum |
| 183,431 | A | 10/1876 | Steckler, Jr. |
| 193,992 | A | 8/1877 | Patterson |
| 200,315 | A | 2/1878 | Lewis |
| 230,192 | A | 7/1880 | Olmstead |
| 294,505 | A | 3/1884 | Robinson |
| 297,417 | A | 4/1884 | Keuffel |
| 304,091 | A | 8/1884 | Foley |
| 307,084 | A | 10/1884 | Bissell |
| 319,389 | A | 6/1885 | Button |
| 334,160 | A | 1/1886 | Berger |
| 360,678 | A | 4/1887 | Gaskin, Sr. |
| 2,612,964 | A | 10/1952 | Hobbs |
| 4,093,034 | A | 6/1978 | Curley et al. |
| 4,533,011 | A | 8/1985 | Heidemeyer et al. |
| 4,998,745 | A | 3/1991 | David |
| 5,081,365 | A | 1/1992 | Field et al. |
| 5,139,123 | A | 8/1992 | Rutke |
| 5,281,190 | A | 1/1994 | Koivunen |
| 5,343,970 | A | 9/1994 | Severinsky |
| 5,559,420 | A | 9/1996 | Kohchi |
| 5,713,424 | A | 2/1998 | Christenson |
| 5,720,589 | A | 2/1998 | Christenson et al. |
| 5,725,350 | A | 3/1998 | Christenson |
| 5,769,055 | A | 6/1998 | Motose et al. |
| 5,769,592 | A | 6/1998 | Christenson |
| 5,775,867 | A | 7/1998 | Christenson |
| 5,785,486 | A | 7/1998 | Mcneilus et al. |
| 5,785,487 | A | 7/1998 | Mcneilus et al. |
| 5,820,150 | A | 10/1998 | Archer et al. |
| 5,833,429 | A | 11/1998 | Mcneilus et al. |
| 5,851,100 | A | 12/1998 | Brandt |
| 5,857,822 | A | 1/1999 | Christenson |
| 5,863,086 | A | 1/1999 | Christenson |
| 5,868,543 | A | 2/1999 | Mcneilus et al. |
| 5,885,049 | A | 3/1999 | Mcneilus et al. |
| 5,897,123 | A | 4/1999 | Cherney et al. |
| 6,083,138 | A | 7/2000 | Aoyama et al. |
| 6,086,074 | A | 7/2000 | Braun |
| 6,123,347 | A | 9/2000 | Christenson |
| 6,155,126 | A | 12/2000 | Vogt et al. |
| 6,164,400 | A | 12/2000 | Jankovic et al. |
| 6,209,672 | B1 | 4/2001 | Severinsky |
| 6,371,227 | B2 | 4/2002 | Bartlett |
| 6,372,378 | B1 | 4/2002 | Warner et al. |
| 6,516,914 | B1 | 2/2003 | Andersen et al. |
| 6,534,705 | B2 | 3/2003 | Berrios et al. |
| 6,561,718 | B1 | 5/2003 | Archer et al. |
| 6,672,415 | B1 | 1/2004 | Tabata |
| 6,764,085 | B1 | 7/2004 | Anderson |
| 6,779,806 | B1 | 8/2004 | Breitbach et al. |
| 6,832,148 | B1 | 12/2004 | Bennett et al. |
| 6,883,815 | B2 | 4/2005 | Archer |
| 6,976,688 | B2 | 12/2005 | Archer et al. |
| 7,073,620 | B2 | 7/2006 | Braun et al. |
| 7,207,582 | B2 | 4/2007 | Siebers et al. |
| 7,222,004 | B2 | 5/2007 | Anderson |
| 7,231,994 | B2 | 6/2007 | Buglione et al. |
| 7,258,194 | B2 | 8/2007 | Braun et al. |
| 7,277,782 | B2 | 10/2007 | Yakes et al. |
| 7,302,320 | B2 | 11/2007 | Nasr et al. |
| 7,331,586 | B2 | 2/2008 | Trinkner et al. |
| 7,357,203 | B2 | 4/2008 | Morrow et al. |
| 7,379,797 | B2 | 5/2008 | Nasr et al. |
| 7,439,711 | B2 | 10/2008 | Bolton |
| 7,472,914 | B2 | 1/2009 | Anderson et al. |
| 7,497,285 | B1 | 3/2009 | Radev |
| 7,521,814 | B2 | 4/2009 | Nasr |
| 7,770,506 | B2 | 8/2010 | Johnson et al. |
| 7,848,857 | B2 | 12/2010 | Nasr et al. |
| 7,878,750 | B2 | 2/2011 | Zhou et al. |
| 7,905,540 | B2 | 3/2011 | Kiley et al. |
| 7,937,194 | B2 | 5/2011 | Nasr et al. |
| 8,000,850 | B2 | 8/2011 | Nasr et al. |
| 8,005,587 | B2 | 8/2011 | Tamor et al. |
| 8,201,656 | B2 | 6/2012 | Archer et al. |
| 8,286,743 | B2 | 10/2012 | Rawlinson |
| 8,307,924 | B2 | 11/2012 | Wang et al. |
| 8,333,390 | B2 | 12/2012 | Linsmeier et al. |
| 8,337,352 | B2 | 12/2012 | Morrow et al. |
| 8,376,077 | B2 | 2/2013 | Venton-Walters |
| 8,459,619 | B2 | 6/2013 | Trinh et al. |
| 8,465,025 | B2 | 6/2013 | Venton-Walters et al. |
| 8,561,735 | B2 | 10/2013 | Morrow et al. |
| 8,565,990 | B2 | 10/2013 | Ortmann et al. |
| 8,566,013 | B2 | 10/2013 | Davis et al. |
| 8,596,648 | B2 | 12/2013 | Venton-Walters et al. |
| 8,764,029 | B2 | 7/2014 | Venton-Walters et al. |
| 8,801,017 | B2 | 8/2014 | Ellifson et al. |
| 8,801,393 | B2 | 8/2014 | Crabtree et al. |
| 8,833,324 | B2 | 9/2014 | O'Brien et al. |
| 8,834,319 | B2 | 9/2014 | Nefcy |
| 8,839,902 | B1 | 9/2014 | Archer et al. |
| 8,864,613 | B2 | 10/2014 | Morrow et al. |
| 8,876,133 | B2 | 11/2014 | Ellifson |
| 8,955,859 | B1 | 2/2015 | Richmond et al. |
| 8,955,880 | B2 | 2/2015 | Malcolm et al. |
| 8,991,834 | B2 | 3/2015 | Venton-Walters et al. |
| 8,991,840 | B2 | 3/2015 | Zuleger et al. |
| 9,007,020 | B2 | 4/2015 | Prosser et al. |
| 9,016,703 | B2 | 4/2015 | Rowe et al. |
| 9,045,014 | B1 | 6/2015 | Verhoff et al. |
| 9,054,402 | B1 | 6/2015 | Rawlinson |
| 9,074,656 | B2 | 7/2015 | Benz et al. |
| 9,114,804 | B1 | 8/2015 | Shukla et al. |
| 9,126,587 | B2 | 9/2015 | Yamazaki et al. |
| 9,127,738 | B2 | 9/2015 | Ellifson et al. |
| 9,132,736 | B1 | 9/2015 | Shukla et al. |
| 9,174,520 | B2 | 11/2015 | Katayama et al. |
| 9,174,686 | B1 | 11/2015 | Messina et al. |
| 9,227,582 | B2 | 1/2016 | Katayama et al. |
| 9,254,740 | B2 | 2/2016 | Lamperth |
| 9,291,230 | B2 | 3/2016 | Ellifson et al. |
| 9,302,129 | B1 | 4/2016 | Betz et al. |
| 9,303,715 | B2 | 4/2016 | Dillman et al. |
| 9,318,751 | B2 | 4/2016 | Chorian et al. |
| 9,327,576 | B2 | 5/2016 | Ellifson |
| 9,328,986 | B1 | 5/2016 | Pennau et al. |
| 9,329,000 | B1 | 5/2016 | Richmond et al. |
| 9,376,102 | B1 | 6/2016 | Shukla et al. |
| 9,410,823 | B2 | 8/2016 | Widmer et al. |
| 9,415,697 | B2 | 8/2016 | Asai |
| 9,423,069 | B2 | 8/2016 | Shimmel et al. |
| 9,428,042 | B2 | 8/2016 | Morrow et al. |
| 9,434,321 | B2 | 9/2016 | Perron et al. |
| 9,440,523 | B2 | 9/2016 | Decker |
| 9,452,750 | B2 | 9/2016 | Shukla et al. |
| 9,472,971 | B2 | 10/2016 | Soar |
| 9,492,695 | B2 | 11/2016 | Betz et al. |
| 9,533,631 | B2 | 1/2017 | Kamimura et al. |
| 9,580,960 | B2 | 2/2017 | Aiken et al. |
| 9,580,962 | B2 | 2/2017 | Betz et al. |
| 9,650,032 | B2 | 5/2017 | Kotloski et al. |
| 9,651,120 | B2 | 5/2017 | Morrow et al. |
| 9,656,640 | B1 | 5/2017 | Verhoff et al. |
| 9,656,659 | B2 | 5/2017 | Shukla et al. |
| 9,669,679 | B2 | 6/2017 | Zuleger et al. |
| 9,677,334 | B2 | 6/2017 | Aiken et al. |
| 9,688,112 | B2 | 6/2017 | Venton-Walters et al. |
| 9,707,869 | B1 | 7/2017 | Messina et al. |
| 9,732,846 | B2 | 8/2017 | Li et al. |
| 9,751,540 | B2 | 9/2017 | Cook |

(56) References Cited

U.S. PATENT DOCUMENTS

| | | | |
|---|---|---|---|
| 9,764,613 B2 | 9/2017 | Rowe et al. | |
| 9,765,841 B2 | 9/2017 | Ellifson et al. | |
| 9,806,306 B2 | 10/2017 | Tsutsui et al. | |
| 9,809,080 B2 | 11/2017 | Ellifson et al. | |
| 9,821,789 B2 | 11/2017 | Shukla et al. | |
| 9,849,871 B2 | 12/2017 | Dunlap et al. | |
| 9,890,024 B2 | 2/2018 | Hao et al. | |
| 9,908,520 B2 | 3/2018 | Shukla et al. | |
| 9,944,145 B2 | 4/2018 | Dillman et al. | |
| 9,944,186 B1 | 4/2018 | Rehberger | |
| 9,970,515 B2 | 5/2018 | Morrow et al. | |
| 10,029,555 B2 | 7/2018 | Kotloski et al. | |
| 10,029,556 B2 | 7/2018 | Morrow et al. | |
| 10,030,737 B2 | 7/2018 | Dillman et al. | |
| 10,144,389 B2 | 12/2018 | Archer et al. | |
| 10,160,438 B2 | 12/2018 | Shukla et al. | |
| 10,167,027 B2 | 1/2019 | Perron et al. | |
| 10,221,055 B2 | 3/2019 | Hao et al. | |
| 10,224,745 B2 | 3/2019 | Easton et al. | |
| 10,267,390 B2 | 4/2019 | Morrow et al. | |
| 10,272,909 B1 | 4/2019 | Melatti et al. | |
| 10,315,643 B2 | 6/2019 | Shukla et al. | |
| 10,350,956 B2 | 7/2019 | Dillman et al. | |
| 10,369,860 B2 | 8/2019 | Ellifson et al. | |
| 10,384,668 B2 | 8/2019 | Hilliard et al. | |
| 10,392,000 B2 | 8/2019 | Shukla et al. | |
| 10,392,056 B2 | 8/2019 | Perron et al. | |
| 10,407,288 B2 | 9/2019 | Hao et al. | |
| 10,421,332 B2 | 9/2019 | Venton-Walters et al. | |
| 10,422,403 B2 | 9/2019 | Ellifson et al. | |
| 10,434,894 B2 | 10/2019 | Li et al. | |
| 10,434,995 B2 | 10/2019 | Verhoff et al. | |
| 10,435,026 B2 | 10/2019 | Shively et al. | |
| 10,457,134 B2 | 10/2019 | Morrow et al. | |
| 10,458,182 B1 | 10/2019 | Betz et al. | |
| 10,463,900 B1 | 11/2019 | Betz et al. | |
| 10,464,389 B2 | 11/2019 | Zuleger et al. | |
| 10,486,689 B2 | 11/2019 | Farrell et al. | |
| D869,332 S | 12/2019 | Gander et al. | |
| 10,532,722 B1 | 1/2020 | Betz et al. | |
| 10,556,622 B1 * | 2/2020 | Calliari | B62D 21/02 |
| 10,611,203 B1 | 4/2020 | Rositch et al. | |
| 10,611,204 B1 | 4/2020 | Zhang et al. | |
| 10,619,696 B2 | 4/2020 | Dillman et al. | |
| 10,632,805 B1 | 4/2020 | Rositch et al. | |
| 10,676,079 B1 | 6/2020 | Bucknor et al. | |
| 10,723,282 B2 | 7/2020 | Perron et al. | |
| 10,724,616 B2 | 7/2020 | Katsura et al. | |
| 10,734,693 B2 | 8/2020 | Staudenmaier | |
| 10,752,075 B1 | 8/2020 | Shukla et al. | |
| 10,759,251 B1 | 9/2020 | Zuleger | |
| 10,836,375 B2 | 11/2020 | Kaufman et al. | |
| 10,843,549 B2 | 11/2020 | Morrow et al. | |
| 10,858,231 B2 | 12/2020 | Holmes et al. | |
| 10,875,521 B2 | 12/2020 | Pettersson | |
| 10,934,145 B2 | 3/2021 | Hao et al. | |
| 10,940,728 B2 | 3/2021 | Rositch et al. | |
| 10,953,939 B2 | 3/2021 | Zuleger et al. | |
| 10,960,248 B2 | 3/2021 | Betz et al. | |
| 10,967,728 B2 | 4/2021 | Kotloski et al. | |
| 10,974,561 B2 | 4/2021 | Dillman et al. | |
| 10,974,713 B2 | 4/2021 | Shukla et al. | |
| 10,974,724 B1 | 4/2021 | Shively et al. | |
| 10,981,538 B2 | 4/2021 | Archer et al. | |
| 10,982,736 B2 | 4/2021 | Steinberger et al. | |
| 10,988,132 B2 | 4/2021 | Ayesh et al. | |
| 10,989,279 B2 | 4/2021 | Morrow et al. | |
| 11,001,135 B2 | 5/2021 | Yakes et al. | |
| 11,007,863 B2 | 5/2021 | Yakes et al. | |
| 11,027,606 B2 | 6/2021 | Wildgrube et al. | |
| 11,034,206 B2 | 6/2021 | Zuleger | |
| 11,034,227 B2 | 6/2021 | Spielvogel et al. | |
| 11,046,142 B2 | 6/2021 | Zhang et al. | |
| 11,052,899 B2 | 7/2021 | Shukla et al. | |
| 11,097,617 B2 | 8/2021 | Rocholl et al. | |
| 11,110,977 B2 | 9/2021 | Smith et al. | |
| 11,111,120 B2 | 9/2021 | Hao et al. | |
| 11,135,890 B2 | 10/2021 | Ellifson et al. | |
| 11,136,187 B1 | 10/2021 | Koga et al. | |
| 11,137,053 B2 | 10/2021 | Steinberger et al. | |
| 11,142,058 B2 | 10/2021 | Marquez Duran et al. | |
| 11,148,550 B2 | 10/2021 | Rocholl et al. | |
| 11,161,403 B2 | 11/2021 | Lo et al. | |
| 11,161,415 B1 | 11/2021 | Koga et al. | |
| 11,161,483 B2 | 11/2021 | Betz et al. | |
| 11,167,919 B1 | 11/2021 | Koga et al. | |
| 11,199,239 B2 | 12/2021 | Dumitru et al. | |
| 11,209,067 B2 | 12/2021 | Ellifson et al. | |
| 11,225,240 B2 | 1/2022 | Dalum | |
| 11,230,278 B2 | 1/2022 | Linsmeier et al. | |
| 11,299,139 B2 | 4/2022 | Shukla et al. | |
| 11,358,431 B2 | 6/2022 | Hall et al. | |
| 11,376,943 B1 | 7/2022 | Smith et al. | |
| 11,376,958 B1 | 7/2022 | Smith et al. | |
| 11,376,990 B1 | 7/2022 | Smith et al. | |
| 11,377,089 B1 | 7/2022 | Smith et al. | |
| 11,383,694 B1 | 7/2022 | Smith et al. | |
| 11,420,522 B1 | 8/2022 | Bernatchez | |
| 11,420,695 B2 | 8/2022 | Viele et al. | |
| 11,498,409 B1 | 11/2022 | Smith et al. | |
| 11,498,426 B1 | 11/2022 | Bernatchez | |
| 11,505,062 B1 | 11/2022 | Smith et al. | |
| 11,597,399 B1 | 3/2023 | Smith et al. | |
| 11,608,050 B1 | 3/2023 | Smith et al. | |
| 11,712,977 B2 | 8/2023 | Bucknor et al. | |
| 11,964,587 B2 | 4/2024 | Yukawa | |
| 11,967,727 B2 | 4/2024 | Poloczek et al. | |
| 12,100,966 B2 | 9/2024 | Lethellier et al. | |
| 12,278,354 B2 | 4/2025 | Teshima et al. | |
| 2003/0183431 A1 | 10/2003 | Cikanek et al. | |
| 2005/0080523 A1 | 4/2005 | Bennett et al. | |
| 2005/0109550 A1 | 5/2005 | Buglione et al. | |
| 2005/0113996 A1 | 5/2005 | Pillar et al. | |
| 2005/0209747 A1 | 9/2005 | Yakes et al. | |
| 2005/0251299 A1 | 11/2005 | Donnelly et al. | |
| 2005/0256631 A1 | 11/2005 | Cawthorne et al. | |
| 2006/0173593 A1 | 8/2006 | Anderson | |
| 2007/0021879 A1 | 1/2007 | Delnero et al. | |
| 2007/0112496 A1 | 5/2007 | Ji | |
| 2007/0124037 A1 | 5/2007 | Moran | |
| 2007/0162200 A1 | 7/2007 | Zillmer et al. | |
| 2007/0164552 A1 | 7/2007 | Bauer et al. | |
| 2007/0186896 A1 | 8/2007 | Carroll et al. | |
| 2007/0278856 A1 | 12/2007 | Craig et al. | |
| 2008/0017426 A1 | 1/2008 | Walters et al. | |
| 2008/0020875 A1 | 1/2008 | Serrels et al. | |
| 2008/0029361 A1 | 2/2008 | Deroo et al. | |
| 2008/0093139 A1 | 4/2008 | Dobereiner et al. | |
| 2008/0099256 A1 | 5/2008 | Holmes et al. | |
| 2008/0149405 A1 | 6/2008 | Hladun et al. | |
| 2008/0150350 A1 | 6/2008 | Morrow et al. | |
| 2008/0234096 A1 | 9/2008 | Joshi et al. | |
| 2008/0284118 A1 | 11/2008 | Venton-Walters et al. | |
| 2009/0013952 A1 | 1/2009 | Deniston et al. | |
| 2009/0062320 A1 | 3/2009 | Guagnano et al. | |
| 2009/0098976 A1 | 4/2009 | Usoro et al. | |
| 2009/0174158 A1 | 7/2009 | Anderson et al. | |
| 2009/0192660 A1 | 7/2009 | Tamor et al. | |
| 2009/0287366 A1 | 11/2009 | Davis et al. | |
| 2009/0298646 A1 | 12/2009 | Parsons | |
| 2009/0326750 A1 | 12/2009 | Ang | |
| 2010/0019538 A1 | 1/2010 | Kiley et al. | |
| 2010/0049389 A1 | 2/2010 | Ando | |
| 2010/0065001 A1 | 3/2010 | Spicer et al. | |
| 2010/0138089 A1 | 6/2010 | James | |
| 2010/0145562 A1 | 6/2010 | Moran | |
| 2010/0219007 A1 | 9/2010 | Dalum et al. | |
| 2010/0230192 A1 | 9/2010 | Riley | |
| 2011/0079978 A1 | 4/2011 | Schreiner et al. | |
| 2011/0162901 A1 | 7/2011 | Lucas et al. | |
| 2011/0297469 A1 | 12/2011 | Usami et al. | |
| 2012/0225751 A1 | 9/2012 | Andreae et al. | |
| 2012/0227394 A1 | 9/2012 | Schweiher et al. | |
| 2012/0244979 A1 | 9/2012 | Kruger | |

(56) References Cited

U.S. PATENT DOCUMENTS

2012/0266701 A1 10/2012 Yamada et al.
2012/0299544 A1 11/2012 Prosser et al.
2012/0328454 A1 12/2012 Roby
2012/0329593 A1 12/2012 Larrabee et al.
2013/0126254 A1 5/2013 Lee et al.
2013/0158756 A1 6/2013 Yamazaki et al.
2013/0218386 A1 8/2013 Fisker et al.
2013/0234864 A1 9/2013 Herman
2014/0046592 A1 2/2014 Christ et al.
2014/0207346 A1 7/2014 Filla et al.
2014/0228168 A1 8/2014 Kaufman et al.
2014/0315064 A1 10/2014 Katayama et al.
2015/0038290 A1 2/2015 Bichler et al.
2015/0051775 A1 2/2015 Gotoh et al.
2015/0051776 A1 2/2015 Gotoh et al.
2015/0188104 A1 7/2015 Templeman et al.
2015/0247559 A1 9/2015 Graves
2015/0307084 A1 10/2015 Bureau et al.
2015/0336568 A1 11/2015 Porras et al.
2015/0360678 A1 12/2015 Le Roy et al.
2016/0001763 A1 1/2016 Ehrlich et al.
2016/0052382 A1 2/2016 Clark et al.
2016/0052420 A1 2/2016 Kim
2016/0082951 A1 3/2016 Ohn et al.
2016/0152129 A1 6/2016 West et al.
2016/0185207 A1 6/2016 Gerschutz et al.
2016/0193992 A1 7/2016 Hancock et al.
2016/0200315 A1 7/2016 Fracchia et al.
2016/0297417 A1 10/2016 Shukla et al.
2016/0304091 A1 10/2016 Remes
2016/0355202 A1* 12/2016 Nitti .......................... B61C 9/14
2017/0023947 A1 1/2017 Mcmillion
2017/0028912 A1 2/2017 Yang et al.
2017/0028978 A1 2/2017 Dunlap et al.
2017/0066431 A1 3/2017 Kim et al.
2017/0120890 A1 5/2017 Payne
2017/0120899 A1 5/2017 Sugimoto et al.
2017/0129475 A1 5/2017 Prakah-Asante et al.
2017/0282737 A1 10/2017 Miller et al.
2017/0291609 A1 10/2017 Reich et al.
2017/0297425 A1 10/2017 Wildgrube et al.
2017/0355259 A1 12/2017 Borud et al.
2017/0355373 A1 12/2017 Dalum
2018/0001839 A1 1/2018 Perron et al.
2018/0009431 A1 1/2018 Akuzawa
2018/0031085 A1* 2/2018 Steinberger ............ B60K 6/365
2018/0050685 A1 2/2018 Atluri et al.
2018/0050686 A1 2/2018 Atluri et al.
2018/0154754 A1 6/2018 Rowley et al.
2018/0162371 A1 6/2018 Colavincenzo et al.
2018/0170349 A1 6/2018 Jobson et al.
2018/0265001 A1 9/2018 Bean et al.
2018/0281772 A1 10/2018 Hilliard et al.
2018/0304882 A1 10/2018 Koh et al.
2018/0319389 A1 11/2018 Felsch et al.
2018/0334160 A1 11/2018 Kava et al.
2018/0345805 A1 12/2018 Hernandez Lopez et al.
2018/0370373 A1 12/2018 Hooper et al.
2019/0039407 A1 2/2019 Smith
2019/0084395 A1 3/2019 Toyota et al.
2019/0126759 A1 5/2019 Miller et al.
2019/0129416 A1 5/2019 Upmanue et al.
2019/0135107 A1 5/2019 Fortune et al.
2019/0143957 A1 5/2019 Dalum et al.
2019/0178350 A1 6/2019 Steinberger et al.
2019/0202286 A1 7/2019 Natsume et al.
2019/0233034 A1 8/2019 Viele et al.
2019/0248361 A1 8/2019 Farrell et al.
2019/0270387 A1 9/2019 Dudar et al.
2019/0276001 A1 9/2019 Kava et al.
2019/0291711 A1 9/2019 Shukla et al.
2019/0308669 A1 10/2019 Aitharaju et al.
2019/0316650 A1 10/2019 Dillman et al.
2019/0344838 A1 11/2019 Perron et al.
2019/0359198 A1 11/2019 Velderman et al.
2019/0381900 A1 12/2019 Ito et al.
2020/0001698 A1 1/2020 Jang et al.
2020/0047740 A1 2/2020 Hoesl
2020/0056426 A1 2/2020 Betz et al.
2020/0062071 A1 2/2020 Zuleger et al.
2020/0108709 A1 4/2020 Kohler et al.
2020/0117204 A1 4/2020 Lindemann et al.
2020/0139955 A1 5/2020 Park
2020/0164760 A1 5/2020 Sohmshetty et al.
2020/0171907 A1 6/2020 Hall et al.
2020/0180440 A1 6/2020 Uchimura et al.
2020/0223276 A1 7/2020 Rositch et al.
2020/0232533 A1 7/2020 Dillman et al.
2020/0247388 A1 8/2020 Johri et al.
2020/0316816 A1 10/2020 Messina et al.
2020/0317083 A1 10/2020 Messina et al.
2020/0346547 A1 11/2020 Rocholl et al.
2020/0346556 A1 11/2020 Rocholl et al.
2020/0384823 A1 12/2020 Shukla et al.
2020/0384977 A1 12/2020 Higuchi et al.
2020/0385977 A1 12/2020 Cooper et al.
2020/0386135 A1 12/2020 Kobayashi et al.
2021/0016774 A1 1/2021 Cho et al.
2021/0031612 A1 2/2021 Yakes et al.
2021/0031649 A1 2/2021 Messina et al.
2021/0031837 A1 2/2021 Schmidt
2021/0070371 A1 3/2021 Ebisumoto et al.
2021/0070375 A1 3/2021 Ebisumoto et al.
2021/0070388 A1 3/2021 Matsuda
2021/0107361 A1 4/2021 Linsmeier et al.
2021/0122205 A1 4/2021 Shukla et al.
2021/0129757 A1 5/2021 Uken
2021/0135177 A1 5/2021 Kalra et al.
2021/0140517 A1 5/2021 Steinberger et al.
2021/0143663 A1 5/2021 Bolton
2021/0155063 A1 5/2021 Rositch et al.
2021/0155218 A1 5/2021 Higuchi et al.
2021/0171137 A1 6/2021 Zuleger et al.
2021/0173411 A1 6/2021 Rao et al.
2021/0178890 A1 6/2021 Steinberger et al.
2021/0188069 A1 6/2021 Friedman
2021/0188076 A1 6/2021 Morrow et al.
2021/0200243 A1 7/2021 Chen et al.
2021/0213822 A1 7/2021 Ripley et al.
2021/0213934 A1 7/2021 Higuchi et al.
2021/0215493 A1 7/2021 Kapadia et al.
2021/0221190 A1 7/2021 Rowe
2021/0221216 A1 7/2021 Yakes et al.
2021/0231411 A1 7/2021 Grate et al.
2021/0276450 A1 9/2021 Eshleman et al.
2021/0276643 A1 9/2021 Ellifson et al.
2021/0313647 A1 10/2021 Itai et al.
2021/0316588 A1 10/2021 Zhang et al.
2021/0318696 A1 10/2021 Koch
2021/0323436 A1 10/2021 Rocholl et al.
2021/0323437 A1 10/2021 Rocholl et al.
2021/0323438 A1 10/2021 Rocholl et al.
2021/0327170 A1 10/2021 Rocholl et al.
2021/0327237 A1 10/2021 Rocholl et al.
2021/0339632 A1 11/2021 Rocholl et al.
2021/0339648 A1 11/2021 Koga et al.
2021/0354684 A1 11/2021 Healy et al.
2021/0369515 A1 12/2021 Malcolm et al.
2021/0380179 A1 12/2021 Smith et al.
2021/0396293 A1 12/2021 Ellifson et al.
2022/0001734 A1 1/2022 Tanaka et al.
2022/0049647 A1 2/2022 Papaioannou et al.
2022/0063660 A1 3/2022 Poulet et al.
2022/0097675 A1 3/2022 Bryan et al.
2022/0118845 A1 4/2022 Mu
2022/0126878 A1 4/2022 Moustafa et al.
2022/0176965 A1 6/2022 Gesang et al.
2022/0268202 A1 8/2022 Pennazza et al.
2022/0273975 A1 9/2022 Svensson
2022/0344964 A1 10/2022 Duarte
2022/0355678 A1 11/2022 Seo
2022/0371456 A1 11/2022 Borud et al.
2022/0379730 A1 12/2022 Bernatchez
2023/0047110 A1 2/2023 Smith et al.

(56) References Cited

U.S. PATENT DOCUMENTS

| | | | |
|---|---|---|---|
| 2023/0057525 | A1 | 2/2023 | Smith et al. |
| 2023/0070769 | A1 | 3/2023 | Wheeler et al. |
| 2023/0173902 | A1 | 6/2023 | Ruiz et al. |
| 2023/0200296 | A1 | 6/2023 | Zeiler et al. |
| 2023/0231245 | A1 | 7/2023 | Gauthier |
| 2023/0318131 | A1 | 10/2023 | Kellner et al. |
| 2023/0415555 | A1 | 12/2023 | Murphy et al. |
| 2024/0063470 | A1 | 2/2024 | Linsmeier et al. |
| 2024/0101098 | A1 | 3/2024 | Salter et al. |
| 2024/0149657 | A1 | 5/2024 | Coupal-Sikes et al. |
| 2024/0149965 | A1 | 5/2024 | Archer et al. |
| 2024/0153674 | A1 | 5/2024 | Archer et al. |
| 2024/0243387 | A1 | 7/2024 | Naruke |
| 2025/0087807 | A1 | 3/2025 | Burgess et al. |
| 2025/0269972 | A1 | 8/2025 | Peck |
| 2025/0329845 | A1 | 10/2025 | Bloder |

FOREIGN PATENT DOCUMENTS

| | | | |
|---|---|---|---|
| CN | 202965960 | U | 6/2013 |
| CN | 119369961 | A | 1/2025 |
| DE | 10 2005 047 940 | A1 | 7/2007 |
| DE | 10 2014 201 355 | A1 | 7/2015 |
| DE | 10 2016 204 936 | A1 | 9/2017 |
| DE | 10 2017 214 229 | A1 | 2/2018 |
| DE | 10 2018 002 650 | A1 | 10/2019 |
| DE | 10 2018 129 759 | A1 | 5/2020 |
| DE | 10 2021 100 131 | A1 | 7/2021 |
| DE | 10 2021 118 072 | A1 | 2/2022 |
| EP | 1 995 482 | A1 | 11/2008 |
| EP | 3 678 074 | A1 | 7/2020 |
| ES | 2897461 | T3 | 3/2022 |
| FR | 2932556 | A1 | 12/2009 |
| FR | 3082298 | A1 | 12/2019 |
| JP | H11-266507 | A | 9/1999 |
| JP | 2000-224710 | A | 8/2000 |
| JP | 2007-022309 | A | 2/2007 |
| JP | 2012-065521 | A | 3/2012 |
| JP | 2012-232714 | A | 11/2012 |
| JP | 2015-071413 | A | 4/2015 |
| JP | 2020-055417 | A | 4/2020 |
| KR | 20090062320 | A | 6/2009 |
| WO | WO-2005/071819 | A1 | 4/2004 |
| WO | WO-2012/139224 | A1 | 10/2012 |
| WO | WO-2019/116589 | A1 | 6/2019 |
| WO | WO-2020/097885 | A1 | 5/2020 |
| WO | WO-2022/132807 | A1 | 6/2022 |

* cited by examiner

MILITARY VEHICLE ACCESSORY SYSTEMS AND METHOD

CROSS-REFERENCE TO RELATED PATENT APPLICATIONS

This application claims the benefit of and priority to (a) U.S. Provisional Patent Application No. 63/233,008, filed Aug. 13, 2021, and (b) U.S. Provisional Patent Application No. 63/344,239, filed May 20, 2022, both of which are incorporated herein by reference in their entireties.

BACKGROUND

Traditionally, military vehicles have been powered by internal combustion engines. However, such internal combustion engines and related systems can produce a significant amount of noise. Under certain circumstances, such as when in enemy territory and trying to remain discreet and unidentified, it may be advantageous to drive military vehicles and their associated subsystems with the engine off to mitigate the amount of noise being produced by the military vehicles, something that current military vehicles cannot provide.

SUMMARY

One embodiment relates to a military vehicle including a frame, a tractive assembly, and a controller. The tractive assembly is coupled to the frame and includes a first axle assembly, a first motor, a second axle assembly, and a second motor. The first axle assembly includes a first tractive element. The first motor is coupled to the first tractive element across a first gear ratio. The second axle assembly includes a second tractive element. The second motor is coupled to the second tractive element across a second gear ratio. The controller is operably coupled to the tractive assembly and configured to shift the tractive assembly between a first mode and a second mode in response to a speed of the military vehicle exceeding a speed threshold. The controller is configured to engage the first motor in the first mode and thereafter engage the second motor in the second mode such that the tractive assembly is configured to drive the military vehicle in one of the first gear ratio and the second gear ratio based on the speed of the military vehicle.

Another embodiment relates to a military vehicle including a frame, a suspension system, and a controller. The suspension system is coupled to the frame and includes a damper having a damper height repositionable along a vertical direction, the damper is adjustable between a first configuration and a second configuration. The controller is operably coupled to the suspension system and configure to change the damper height in response to receive a terrain data from a terrain sensor. The controller is configured to send a command to the suspension system to increase the damping height and position the damper in the first configuration in response to a data from a terrain sensor indicating that the military vehicle is in a first mode. The controller is configured to send a command to the suspension system to decrease the damping height and position the damper in the second configuration in response to the data from the terrain sensor indicating that the military vehicle is in a second mode.

Another embodiment relates to a military vehicle including a frame, a battery module, and a body. The battery module is coupled to the frame and supplies power to the military vehicle. The body is coupled to the frame and includes a plurality of sidewalls extending vertically from the frame, a plurality of seats, and a floor assembly. The plurality of seats are coupled to the plurality of sidewalls and face a center of the body. The plurality of seats are arranged in a first row and a second row. The floor assembly extends along the frame and includes a first floor portion, a second floor portion, a third floor portion, and a fourth floor portion. The first floor portion is defined below a first seat of the first row, the first seat of the first row coupled to the first floor portion. The second floor portion is defined below a first seat of the second row, the first seat of the second row coupled to the second floor portion. The third floor portion is defined between adjacent seats in the first row. The fourth floor portion is defined between the first seat of the first row and the first seat of the second row. The first floor portion, the second floor portion, the third floor portion, and the fourth floor portion are provided coplanar to one another such that the floor assembly of the military vehicle defines a tunnel-less construction.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
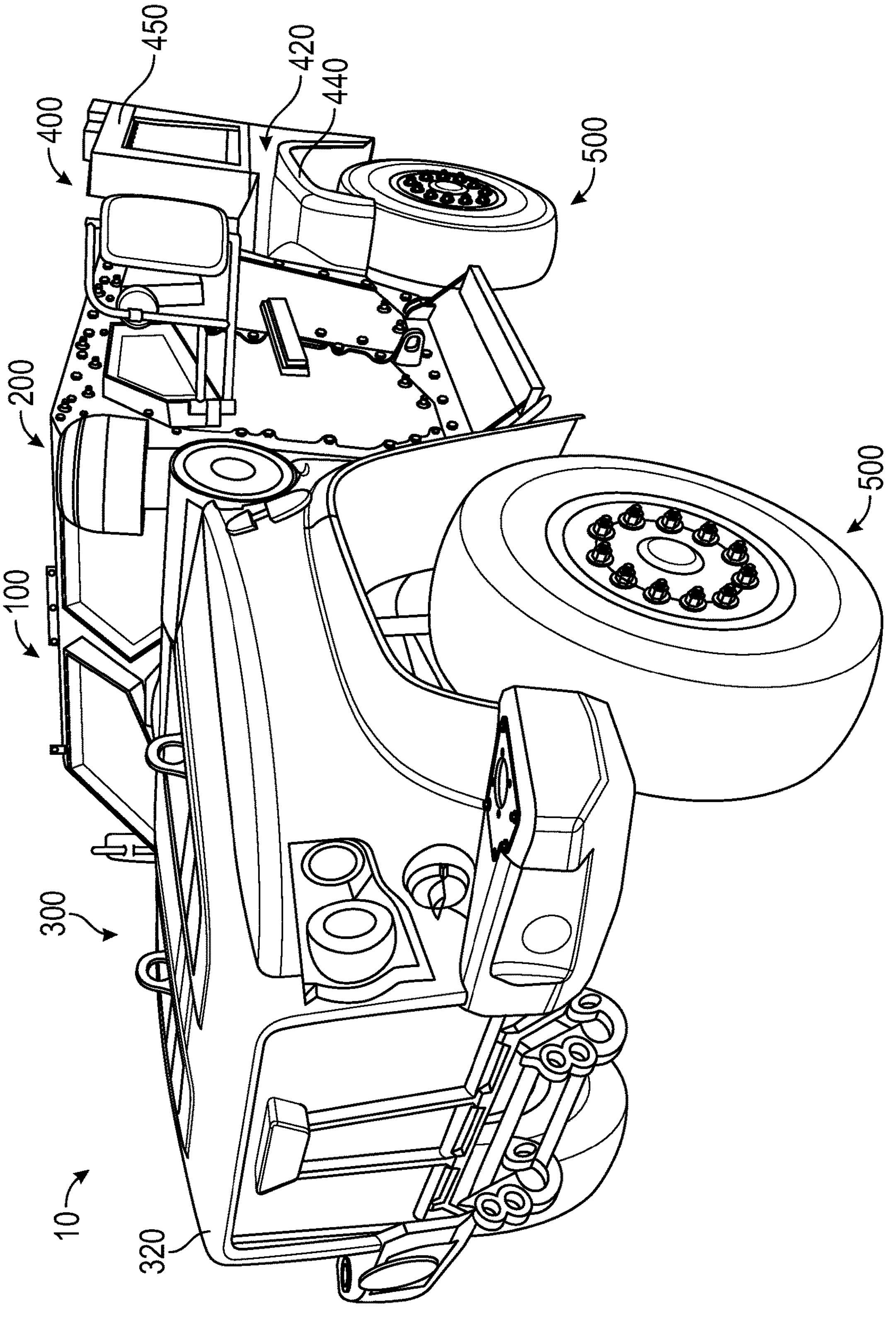
FIG. 1 is a front perspective view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle of the present disclosure (e.g., a military vehicle, etc.) includes an electrified driveline. Specifically, the vehicle includes (i) a first driver including an internal combustion engine and (ii) a second driver including a motor/generator and a clutch. The clutch is positioned between the engine and the motor/generator. The engine can drive the driveline independently, the motor/generator can drive the driveline independently, and/or both the engine and the motor/generator can drive the driveline together. Such an electrified driveline arrangement facilitates operating the vehicle in variety of ways that current military vehicles are incapable of.

According to an exemplary embodiment, the vehicle of the present disclosure includes an engine and a FEAD. The FEAD can include a first belt and a second belt that are coupled with each other through a sprag clutch. The first belt is coupled with multiple accessories, which may include, but is not limited to, a fan, an air compressor, and an electric motor/generator. The second belt is coupled with an output of the engine and the sprag clutch. The sprag clutch is coupled with an additional accessory (e.g., a hydraulic pump). The FEAD is operable between an engine-driven mode and an electric-driven mode (e.g., an electrified mode). When the FEAD is operated in the engine-driven mode, the engine drives the second belt and the first belt (e.g., through the sprag clutch) and the accessories that are coupled with the sprag clutch and the first belt. When the FEAD is operated in the engine-driven mode, the electric motor/generator may be driven to generate electrical energy that can be stored in a battery or consumed by electric accessories of the vehicle. When the FEAD is operated in the electric-driven mode, the electric motor/generator drives the first belt and the accessories coupled with the first belt, and the additional accessory (e.g., the hydraulic pump) coupled with the sprag clutch. In the electric-driven mode, the electric motor/generator consumes electrical energy from the battery, and operates independently of operation of the engine.

In alternative embodiments, the FEAD does not include the electric motor/generator. In one such embodiment, the FEAD may instead be driven solely by the engine and the FEAD only operates according to an engine-driven mode. In another such embodiment, a PTO is positioned at an output of an IMG or a transmission of a driveline of the vehicle, and the PTO can be engaged while the IMG or the transmission drives the PTO. The PTO may transfer torque to the FEAD belt in place of the electric motor/generator to thereby drive the FEAD using an electrically-driven source. In still another such embodiment, one or more accessories, or all of the accessories, of the FEAD include a corresponding electric motor so that each of the accessories of the FEAD having the corresponding electric motor can be independently operated relative to operation of the engine (if included), and relative to operation of each other.

According to an exemplary embodiment, the vehicle of the present disclosure includes an ESS with a large battery capable of providing electric vehicle propulsion. The ESS can be stored behind a cab within a bed cavity, behind a cab outside the bed cavity, above the rear wheel wells, between a floor and a belly deflector, above a floor within the cab, and/or below a false floor above the floor.

According to an exemplary embodiment, the vehicle of the present disclosure includes a control system. The control system includes a controller configured to operate the vehicle according to different modes. The modes include an engine mode, a dual-drive mode, an EV/silent mode, and/or an ultrasilent mode. In the engine mode, an engine of the vehicle drives the FEAD and tractive elements of the vehicle for transportation. In the dual-drive mode, both the engine and an IMG of the vehicle drive the tractive elements of the vehicle for transportation. In the EV/silent mode, the IMG drives the tractive elements of the vehicle for transportation with the engine shut off and an electric motor of the FEAD drives the FEAD. In the ultrasilent mode, the IMG drives the tractive elements of the vehicle for transportation with the engine shut off, the electric motor drives the FEAD, and a fan of the FEAD is disengaged to further reduce sound output of the vehicle during operation.

According to an exemplary embodiment, the vehicle of the present disclosure includes a driveline assembly that can be configured to operate in an (i) engine-only travel mode, (ii) an electric-motor-only travel mode, and/or (iii) a hybrid or dual-drive travel mode where each of the engine and an electric motor can be used to drive the vehicle. The vehicle includes an onboard energy storage system (e.g., a battery) that is configured to supply the electric drive motor with power to drive the vehicle for an extended period of time (e.g., 30 minutes) within the electric-motor-only mode or a "silent mode" or a "stealth mode." The driveline assembly is arranged so that the electric drive motor of the vehicle can be selectively clutched into one or more of a transaxle drive shaft, a transmission shaft, or a transaxle to supply torque to each of a front axle assembly and a rear axle assembly to drive the vehicle. During the silent or stealth mode, the engine can be decoupled from the transmission or the transaxle drive shaft, which allows the vehicle to drive entirely independent of the engine for a period of time. This type of operation can permit the vehicle to perform tasks discretely, which provides a significant advantage to military vehicles that may wish to travel undetected through enemy territory, for example.

Overall Vehicle

Figure 2:
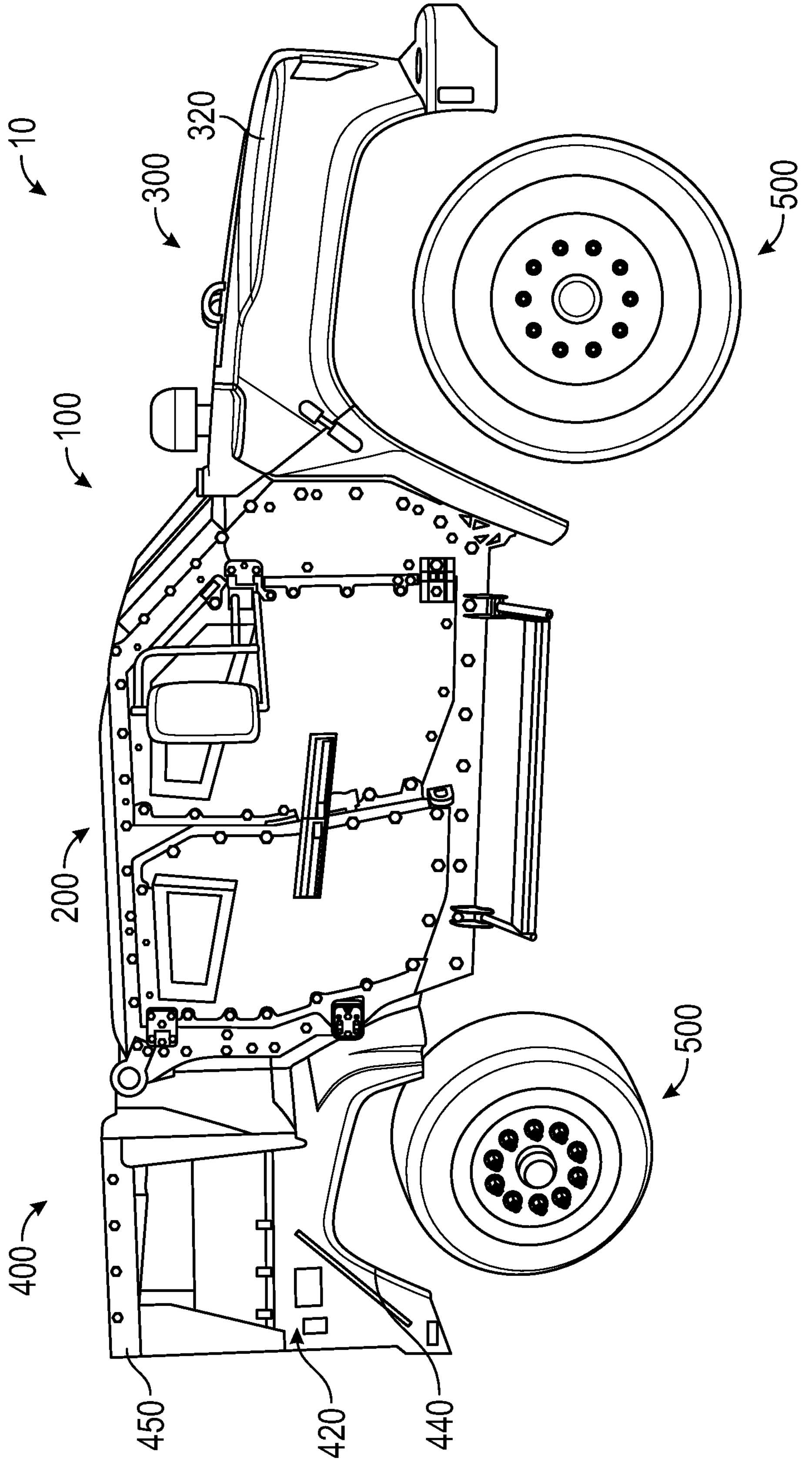
FIG. 2 is a side view of the vehicle of FIG. 1, according to an exemplary embodiment.
Figure 3:
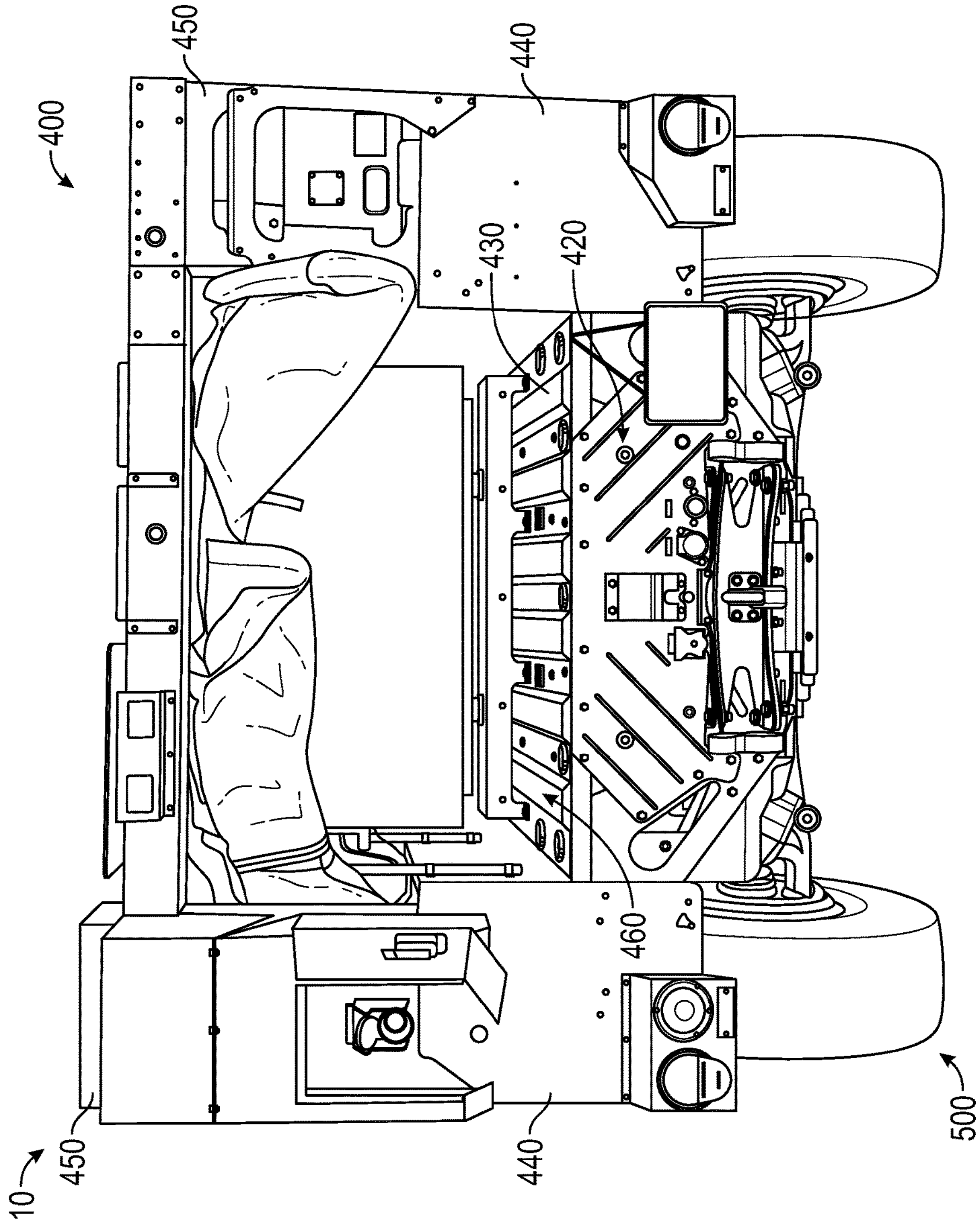
FIG. 3 is a rear view of the vehicle of FIG. 1, according to an exemplary embodiment.

According to the exemplary embodiment shown in FIGS. 1-3, a machine, shown vehicle 10, is configured as a military vehicle. In the embodiment shown, the military vehicle is a joint light tactical vehicle ("JLTV"). In other embodiments, the military vehicle is another type of military vehicle (e.g., a medium tactical vehicle, a heavy tactical vehicle, etc.). In an alternative embodiment, the vehicle 10 is another type of vehicle other than a military vehicle. For example, the vehicle 10 may be a fire apparatus (e.g., a pumper fire truck, a rear-mount aerial ladder truck, a mid-mount aerial ladder truck, a quint fire truck, a tiller fire truck, an airport rescue fire fighting ("ARFF") truck, etc.), a refuse truck, a concrete mixer truck, a tow truck, an ambulance, a farming machine or vehicle, a construction machine or vehicle, and/or still another vehicle.

As shown in FIGS. 1-14, the vehicle 10 includes a chassis assembly, shown as hull and frame assembly 100, including a passenger cabin, shown as passenger capsule 200, a first module, shown as front module 300, a second module, shown as rear module 400; a plurality of axle assemblies (e.g., including axles, differentials, wheels, brakes, suspension components, etc.), shown as axle assemblies 500, coupled to the front module 300 and the rear module 400; and a first electrified driveline arrangement (e.g., a powertrain, a drivetrain, including an accessory drive, etc.), shown as driveline 600.

According to an exemplary embodiment, the passenger capsule 200 provides a robust and consistent level of protection by using overlaps to provide further protection at the door interfaces, component integration seams, and panel joints. The passenger capsule 200 may be manufactured from high hardness steel, commercially available aluminum alloys, ceramic-based SMART armor, and/or other suitable materials to provide a 360-degree modular protection system with two levels of underbody mine/improvised explosive device ("IED") protection. The modular protection system provides protection against kinetic energy projectiles and fragmentation produced by IEDs and overhead artillery fire. The two levels of underbody protection may be made of an aluminum alloy configured to provide an optimum combination of yield strength and material elongation. Each protection level uses an optimized thickness of this aluminum alloy to defeat underbody mine and IED threats.

According to an exemplary embodiment, the passenger capsule 200 is a structural shell that forms a monocoque hull structure. Monocoque refers to a form of vehicle construction in which the vehicle body and chassis form a single unit. In some embodiments, the passenger capsule 200 includes a plurality of integrated armor mounting points configured to engage a supplemental armor kit (e.g., a "B-Kit," etc.). According to the exemplary embodiment shown in FIGS. 1, 2, 4, 5, 9, and 10, the passenger capsule 200 accommodates four passengers in a two-by-two seating arrangement and has four doors mounted thereto. According to the alternative embodiment shown in FIG. 8, the passenger capsule 200 accommodates two passengers and has two doors mounted thereto.

Figure 4:
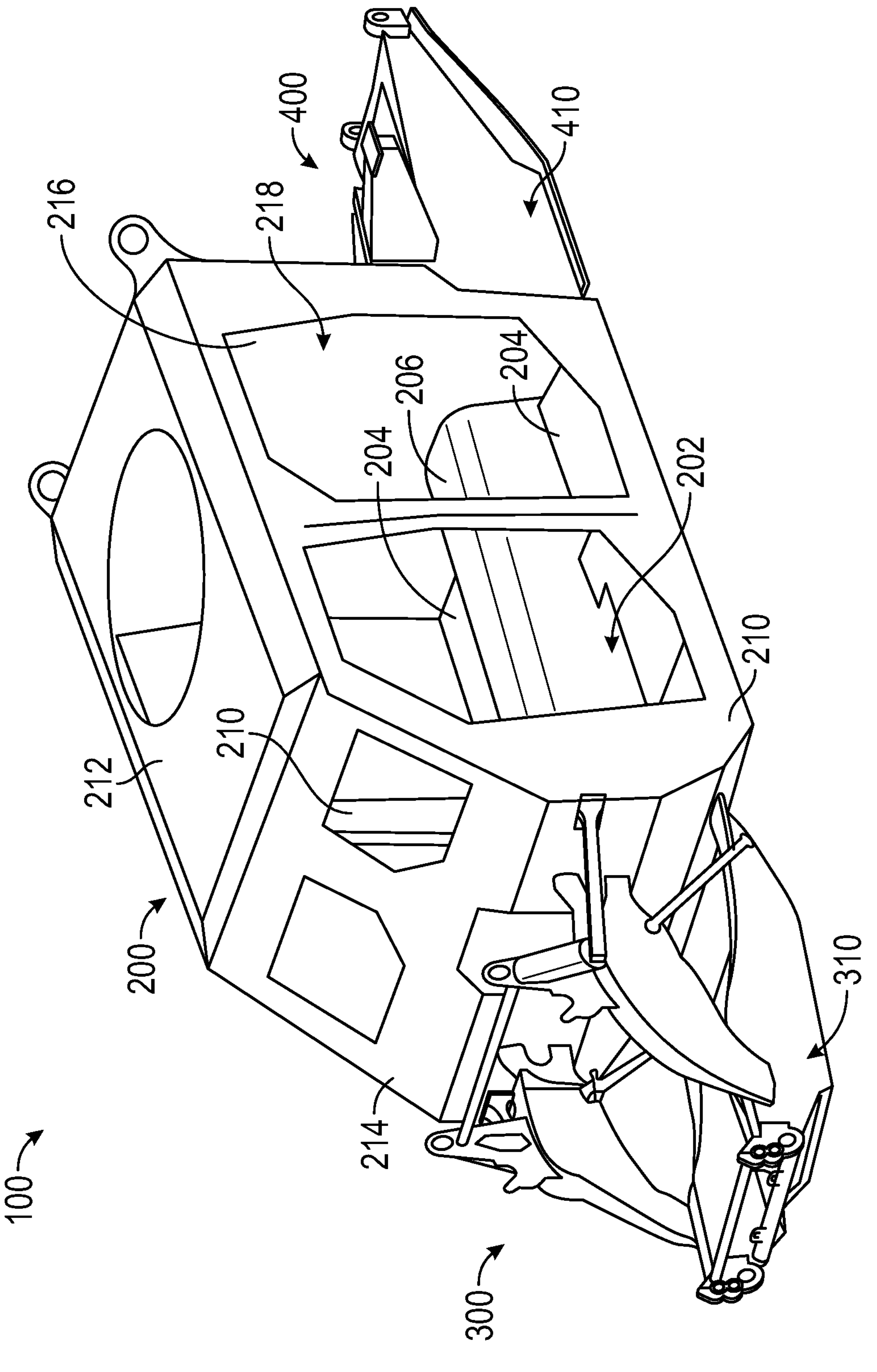
FIG. 4 is a perspective view of a chassis assembly of the vehicle of FIG. 1 including a passenger capsule, a front module, and a rear module, according to an exemplary embodiment.
Figure 5:
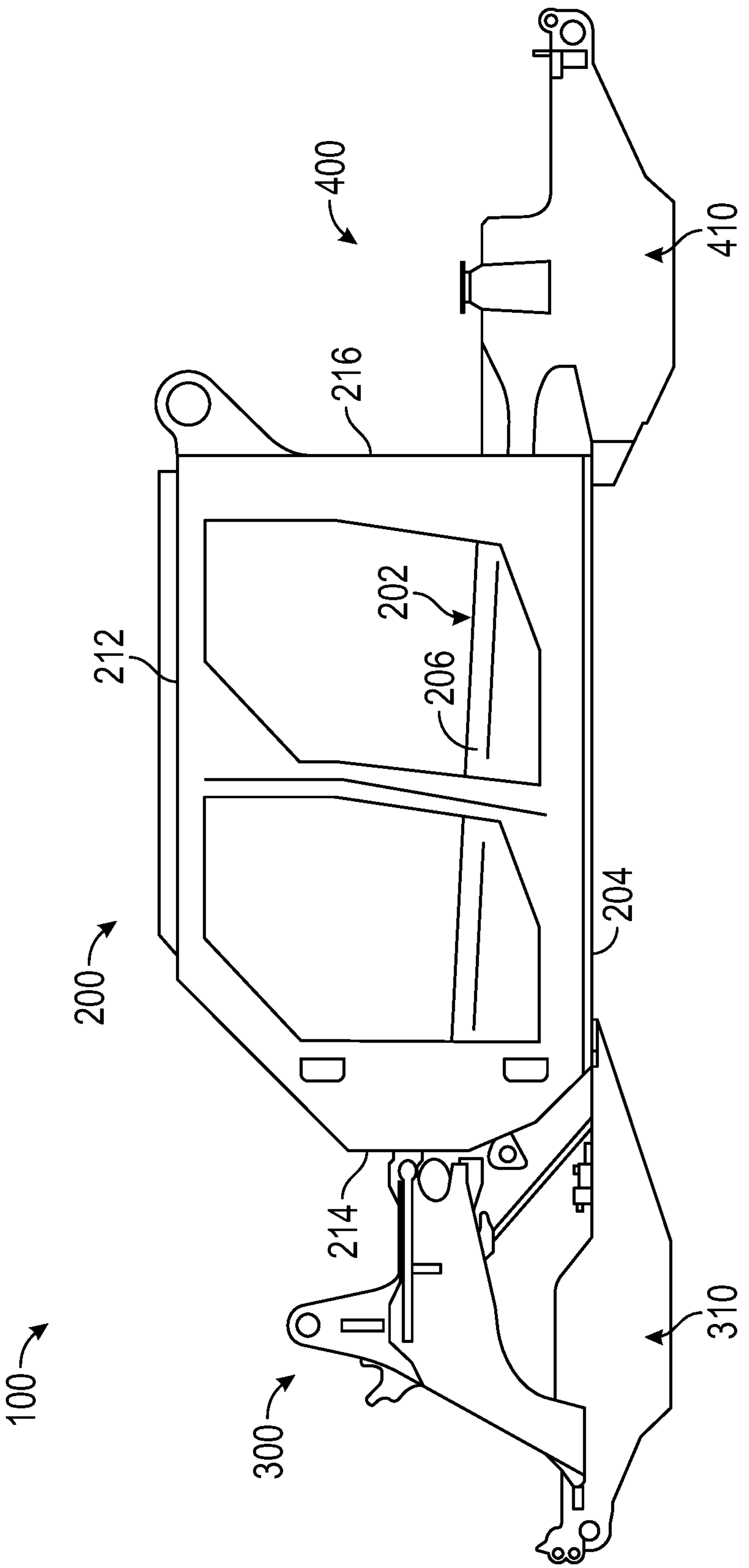
FIG. 5 is a side view of the chassis assembly of FIG. 4, according to an exemplary embodiment.
Figure 6:
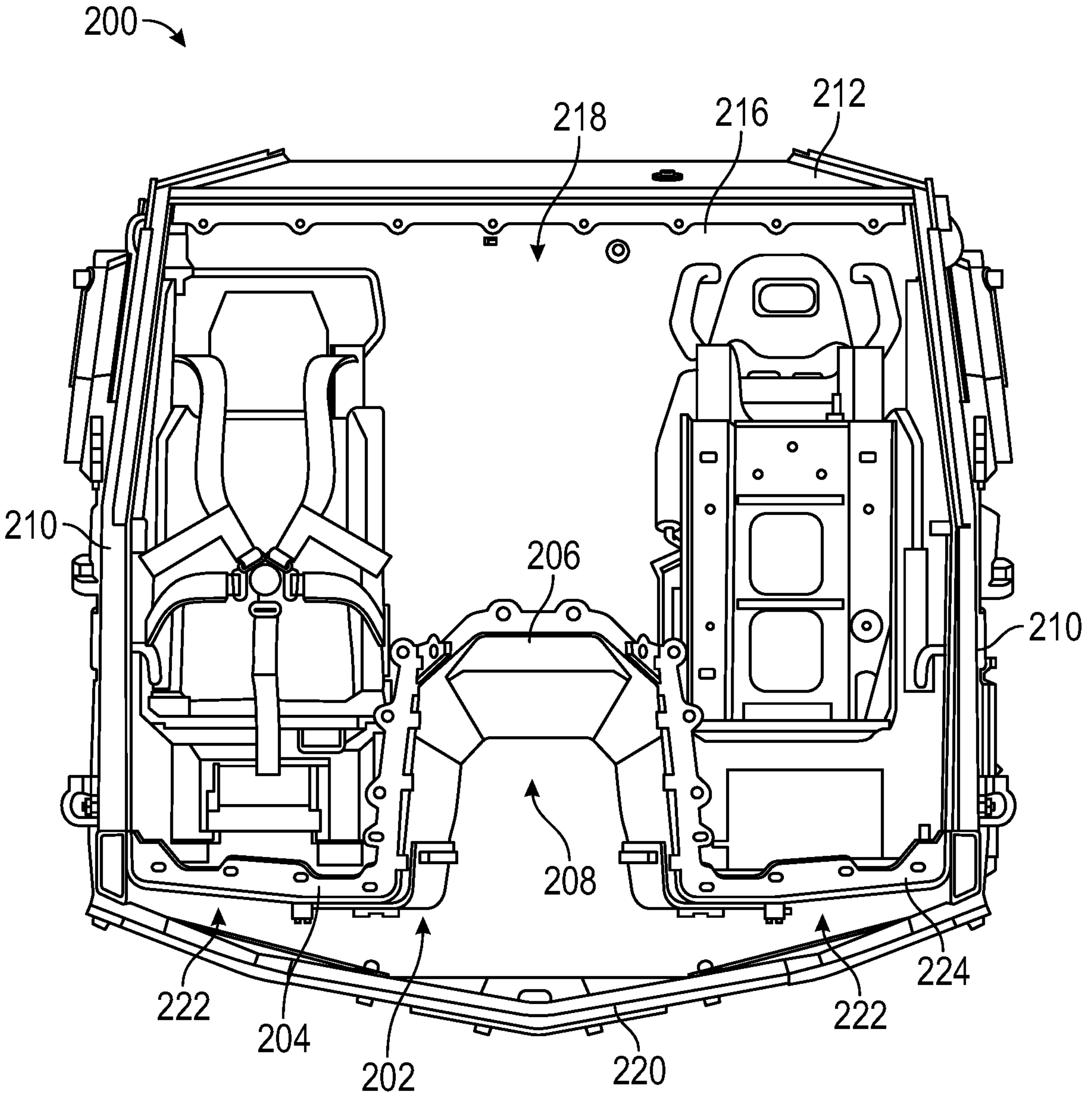
FIG. 6 is a cross-sectional view of the passenger capsule of FIG. 4, according to an exemplary embodiment.

As shown in FIGS. 4-6, the passenger capsule 200 includes a floor assembly, shown as floor assembly 202, having a pair of floor portions, shown as floor portions 204, laterally spaced apart and separated by a central tunnel, shown as structural tunnel 206, extending longitudinally along a centerline of the passenger capsule 200. According to an exemplary embodiment, for load purposes, the structural tunnel 206 replaces a frame or rail traditionally used in vehicle chassis. As shown in FIG. 6, the structural tunnel 206 (*i*) has an arcuately shaped cross-section that extends upward into an interior, shown as passenger compartment 218, of the passenger capsule 200 and (ii) defines a cavity or recessed space, shown as tunnel slot 208. The configuration of the structural tunnel 206 increases the distance between the ground and the passenger compartment 218 of the passenger capsule 200. Accordingly, the structural tunnel 206 may provide greater blast protection from IEDs located on the ground (e.g., because the IED has to travel a greater distance in order to penetrate the structural tunnel 206).

As shown in FIGS. 4-6, the passenger capsule 200 additionally includes a pair of side panels, shown as sidewalls 210, coupled to opposing lateral sides of the floor assembly 202; a top panel, shown as roof 212, coupled to the sidewalls 210 opposite the floor assembly 202; a front panel, shown as front wall 214, coupled to front ends of the floor assembly 202, the sidewalls 210, and the roof 212; and a rear panel, shown as rear wall 216, coupled to rear ends of the floor assembly 202, the sidewalls 210, and the roof 212. As shown in FIGS. 4 and 6, the floor assembly 202, the sidewalls 210, the roof 212, the front wall 214, and the rear wall 216 cooperatively define the passenger compartment 218.

As shown in FIG. 6, the passenger capsule 200 includes a belly deflector, shown as v-shaped belly deflector 220, coupled to bottom ends of the sidewalls 210 and across the bottom of the passenger capsule 200 beneath the floor assembly 202. According to an exemplary embodiment, the v-shaped belly deflector 220 is configured to mitigate and spread blast forces along the belly of the vehicle 10. As shown in FIG. 6, the v-shaped belly deflector 220 is spaced from the floor assembly 202 such that a space, shown as air gap 222, is formed between the floor portions 204 of the floor assembly 202 and the v-shaped belly deflector 220.

In some embodiments, the floor assembly 202, the sidewalls 210, the roof 212, the front wall 214, the rear wall 216, and the v-shaped belly deflector 220 are fabricated subassemblies that are bolted together to provide the passenger capsule 200. Such a modular approach to the passenger capsule 200 provides increased protection with the application of perimeter, roof, and underbody add on panels. The components of the passenger capsule 200 mitigate and attenuate blast effects, allow for upgrades, and facilitate maintenance and replacements.

As shown in FIGS. 4, 5, 7, 8, and 10, the front module 300 includes a first subframe assembly, shown as front subframe 310, and the rear module 400 includes a second subframe assembly, shown as rear subframe 410. The front subframe 310 includes a first plurality of frame members coupled to the floor assembly 202 and the front wall 214 of the passenger capsule 200 at a first plurality of interfaces. The rear subframe 410 includes a second plurality of frame members coupled to the floor assembly 202 and the rear wall 216 of the passenger capsule 200 at a second plurality of interfaces. Such interfaces may include, for example, a plurality of fasteners (e.g., bolts, rivets, etc.) extending through corresponding pads coupled to the front subframe 310, the rear subframe 410, and the passenger capsule 200. According to an exemplary embodiment, a front axle assembly of the axle assemblies 500 is coupled to the front subframe 310 and a rear axle assembly of the axle assemblies 500 is coupled to the rear subframe 410.

The front subframe 310 and the rear subframe 410 may be manufactured from high strength steels, high strength aluminum, or another suitable material. According to an exemplary embodiment, the front subframe 310 and the rear subframe 410 feature a tabbed, laser cut, bent, and welded design. In other embodiments, the front subframe 310 and the rear subframe 410 are manufactured from tubular members to form a space frame. The front subframe 310 and the rear subframe 410 may also include forged frame sections, rather than fabricated or cast frame sections, to mitigate the stress, strains, and impact loading imparted during operation of the vehicle 10. Aluminum castings may be used for various cross member components where the loading is compatible with such material properties.

The passenger capsule 200, the front subframe 310, and the rear subframe 410 are integrated into the hull and frame assembly 100 to efficiently carry chassis loading imparted during operation of the vehicle 10, during a lift event, during a blast event, or under still other conditions. During a blast event, conventional frame rails can capture the blast force, transferring the blast force into the vehicle 10 and the occupants thereof. The vehicle 10 replaces conventional frame rails and instead includes the passenger capsule 200, the front module 300, and the rear module 400. According to an exemplary embodiment, the passenger capsule 200, the front module 300, and the rear module 400 vent blast gases (e.g., traveling upward after a tire triggers an IED), thereby reducing the blast force on the passenger capsule 200 and the occupants within passenger capsule 200. Traditional frame rails may also directly impact (e.g., contact, engage, hit, etc.) the floor of traditional military vehicles. The hull and frame assembly 100 does not include traditional frame rails extending along a length of the vehicle 10, thereby eliminating the ability for such frame rails to impact the floor assembly 202 of the passenger capsule 200.

Figure 9:
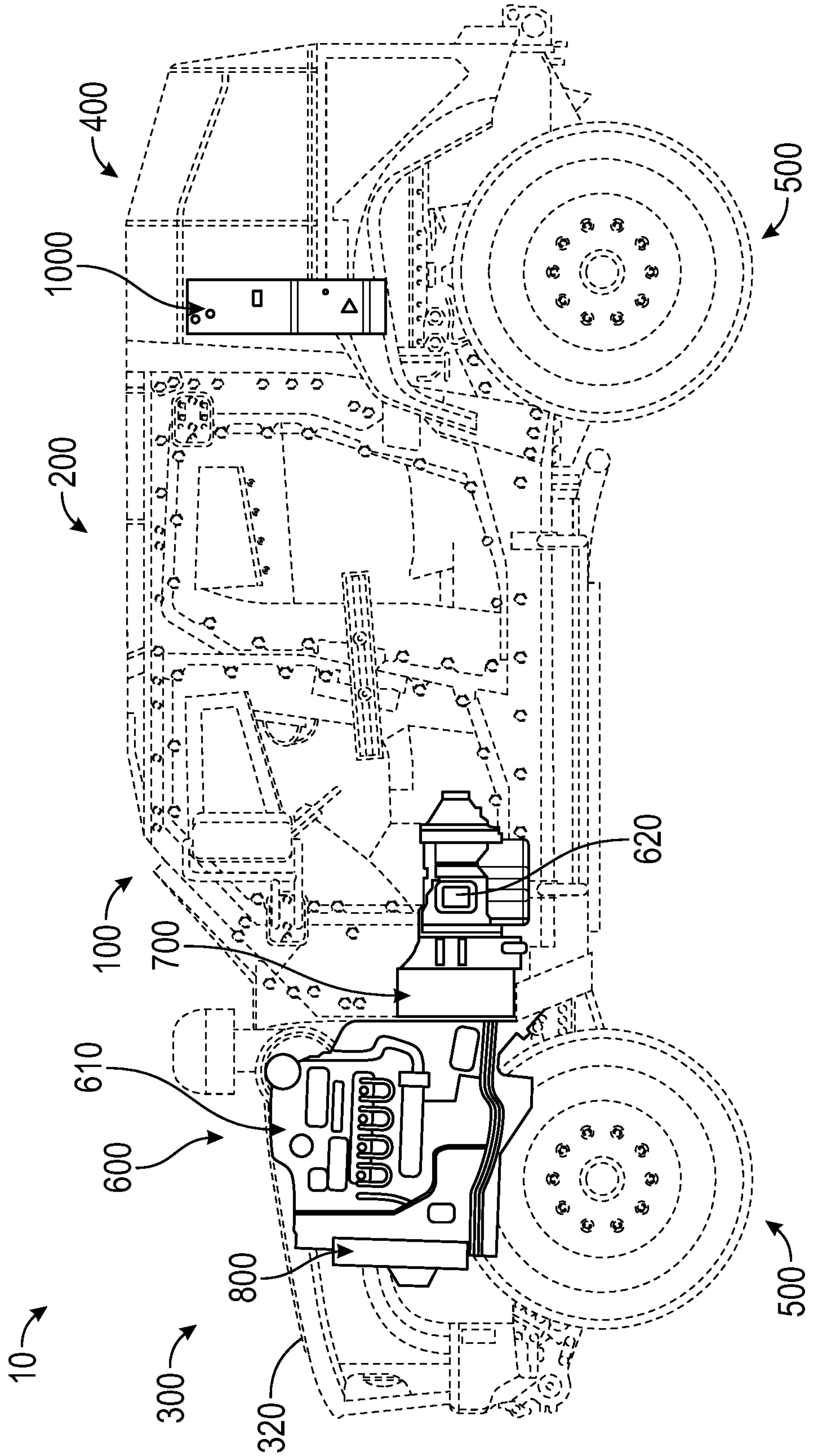
FIG. 9 is a partially transparent side view of the vehicle of FIG. 1 having a driveline including an engine, an integrated motor/generator ("IMG"), a transmission, an energy storage system ("ESS"), and a front-end accessory drive ("FEAD"), according to an exemplary embodiment.

As shown in FIGS. 1, 2, and 9, the front module 300 includes a body panel, shown as hood 320, supported by the front subframe 310. As shown in FIG. 9, the hood 320 partially surrounds components of the driveline 600 (e.g., an engine, a FEAD, radiators, etc.) of the vehicle 10. The hood 320 may be manufactured from a composite material (e.g., carbon fiber, fiberglass, a combination of fiberglass and carbon fiber, etc.) or a metal material (e.g., steel, aluminum, etc.). The hood 320 may be configured (e.g., shaped, etc.) to maximize vision while clearing under-hood components.

As shown in FIGS. 1-3, the rear module 400 includes a body assembly, shown as cargo body assembly 420, supported by the rear subframe 410. The cargo body assembly 420 includes a deck, shown as bed 430; a pair of wheel wells, shown as wheel wells 440, positioned along opposing lateral sides of the bed 430 and over the wheels of the rear axle assembly of the axle assemblies 500; and a pair of storage compartments, shown as stowage boxes 450, positioned along and on top of the wheel wells 440. As shown in FIG. 3, the bed 430, the wheel wells 440, and the stowage boxes 450 cooperatively define a compartment, shown as bed cavity 460.

Figure 7:
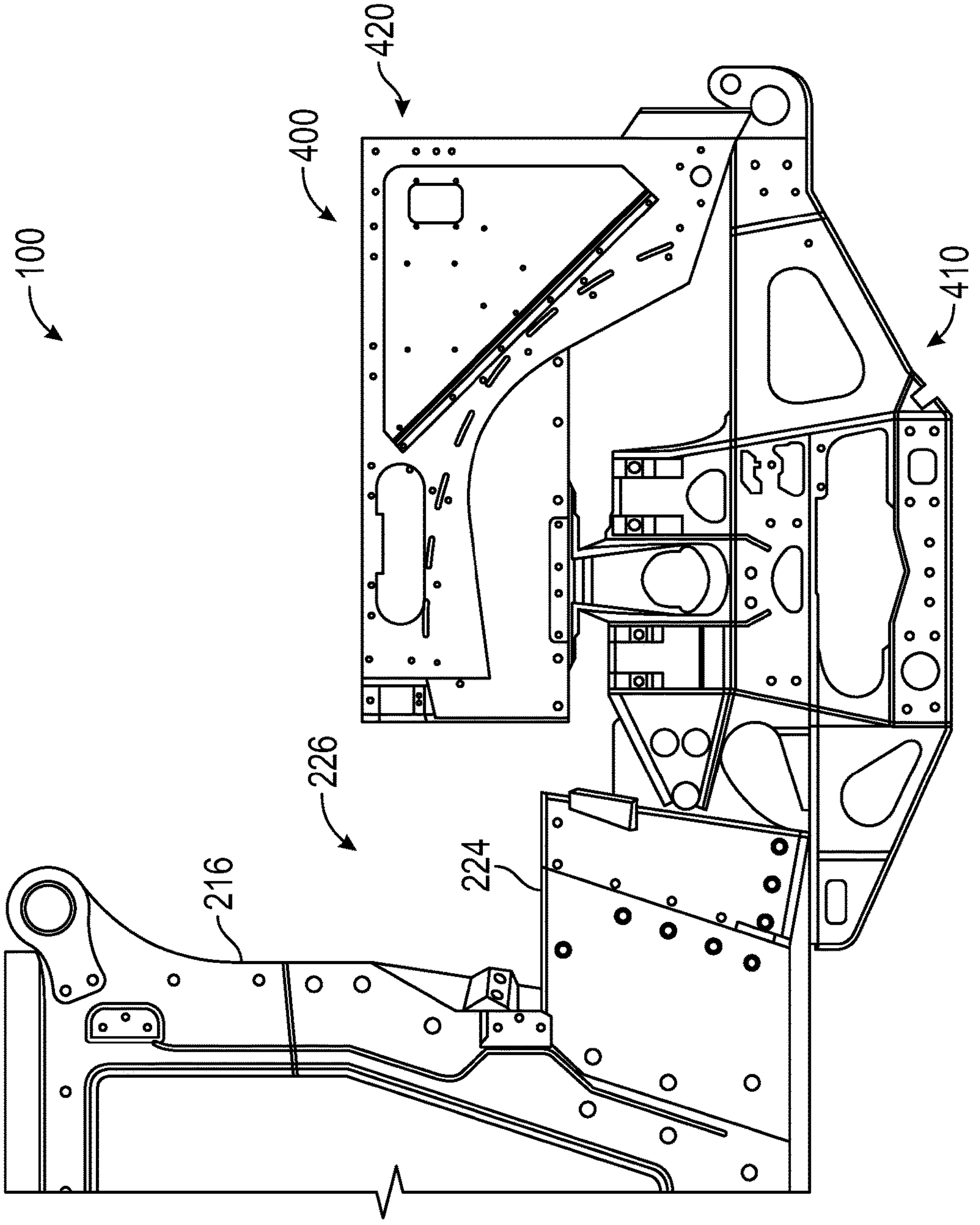
FIG. 7 is a detailed side view of a chassis assembly of the vehicle of FIG. 1, according to another exemplary embodiment.
Figure 8:
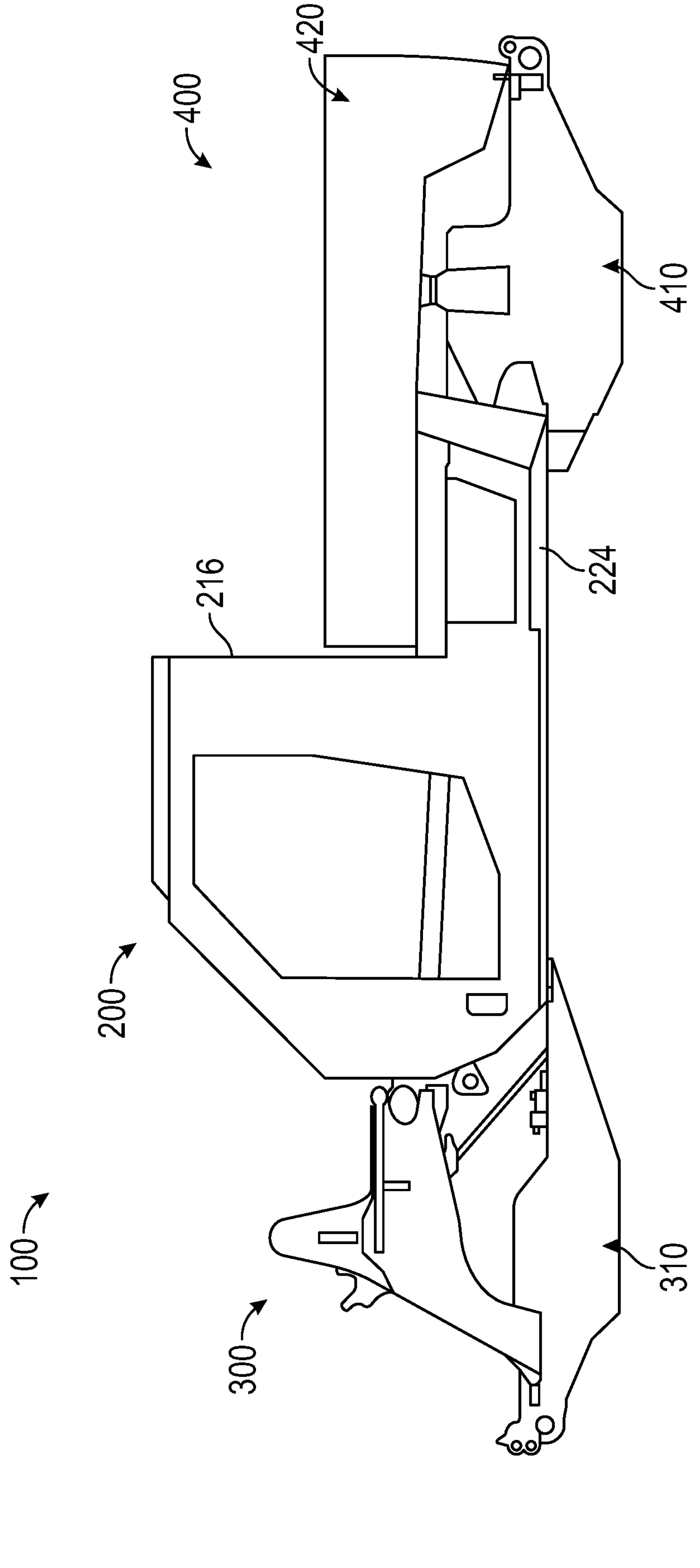
FIG. 8 is a side view of a chassis assembly of the vehicle of FIG. 1, according to another exemplary embodiment.

In some embodiment, as shown in FIG. 7, the passenger capsule 200 includes a protrusion, shown as capsule extension 224, extending from a bottom portion of the rear wall 216 of the passenger capsule 200. According to an exemplary embodiment, the capsule extension 224 provides an extended wheelbase for the vehicle 10, which facilitates providing a cavity, shown as gap 226, between the rear wall 216 and the cargo body assembly 420 of the rear module 400. In some embodiments, as shown in FIG. 8, the capsule extension 224 replaces a rear portion (e.g., back seats, etc.) of the passenger capsule 200 and supports an extended cargo body assembly 420 (e.g., eliminating the gap 226 of FIG. 7 or maintaining the gap 226 of FIG. 7).

Driveline

As shown in FIGS. 9-36, the driveline 600 includes a first driver, shown as engine 610; a transmission device, shown as transmission 620; a first drive shaft, shown transaxle drive shaft 630, coupled to the transmission 620; a power splitter, shown as transaxle 640, coupled to the transaxle drive shaft 630 and the rear axle assembly 500; a second drive shaft, shown as front axle drive shaft 650, extending between the transaxle 640 and the front axle assembly 500 (e.g., a front differential thereof); a second driver, shown as IMG 700, positioned between the engine 610 and the transmission 620; an accessory drive assembly, shown as FEAD 800, positioned in front of the engine 610; and an on-board ESS, shown as ESS 1000.

Figure 10:
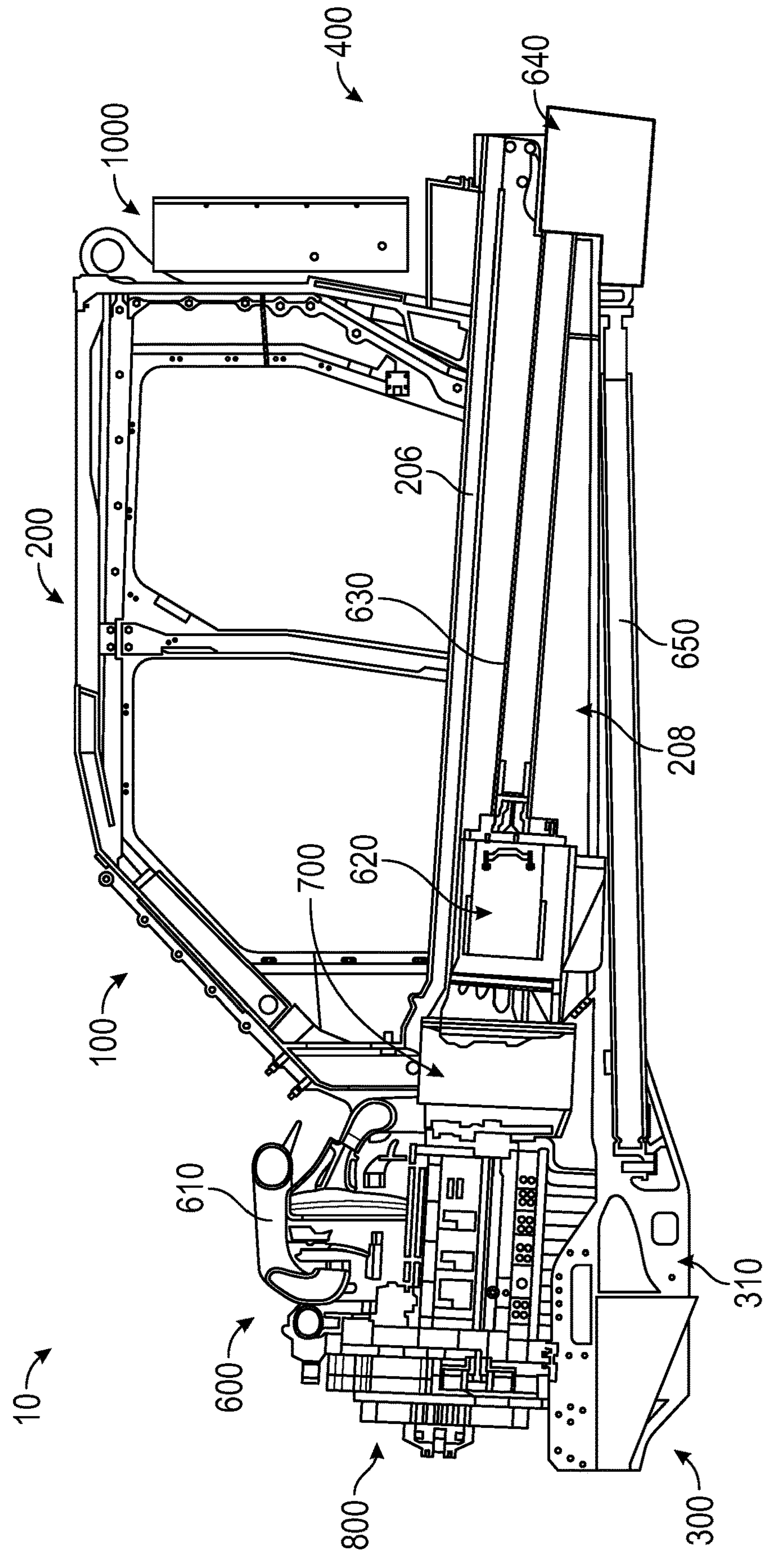
FIG. 10 is a cross-sectional side view of the driveline of FIG. 9 including the engine, the IMG, the transmission, the ESS, the FEAD, and a transaxle, according to an exemplary embodiment.
Figure 11:
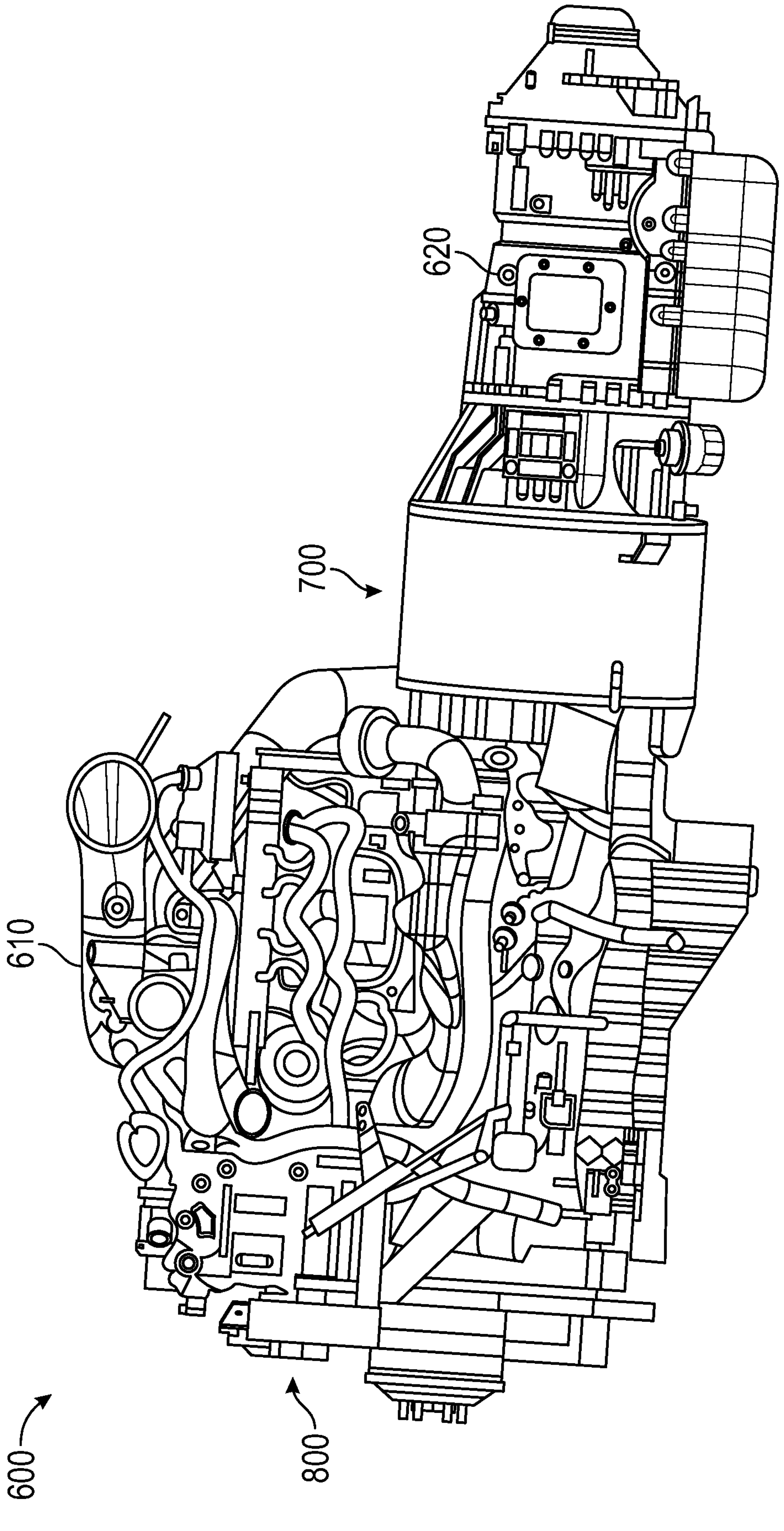
FIG. 11 is a detailed side view of the engine, the IMG, the transmission, and the FEAD of the driveline of FIG. 9, according to an exemplary embodiment.

As shown in FIGS. 9 and 10, the engine 610 and the FEAD 800 are positioned within the front module 300 and supported by the front subframe 310. The FEAD 800 may include an independent FEAD motor (e.g., motor/generator 822) and various belt driven-accessories and/or electrically-operated accessories (e.g., a fan, a hydraulic pump, an air compressor, an air conditioning ("A/C") compressor, etc.). As shown in FIG. 10, the IMG 700 and the transmission 620 are positioned beneath the passenger capsule 200 within the tunnel slot 208 of the structural tunnel 206. The transaxle drive shaft 630 extends from the transmission 620 longitudinally along the structural tunnel 206 and within tunnel slot 208 to the transaxle 640. According to an exemplary embodiment, the transaxle 640 is positioned within the rear module 400 and supported by the rear subframe 410. As shown in FIG. 10, the front axle drive shaft 650 is positioned beneath the transaxle drive shaft 630 and outside of the tunnel slot 208 (e.g., between the transaxle drive shaft 630 and the v-shaped belly deflector 220).

According to various embodiments, the engine 610 is individually, the IMG 700 is individually, or both the engine 610 and the IMG 700 are cooperatively configured to provide power to the transmission 620 to drive the transmission 620 and, thereby, drive the transaxle drive shaft 630, the transaxle 640, the rear axle assembly 500, the front axle drive shaft 650, and the front axle assembly 500 to drive the vehicle 10. According to various embodiments, the FEAD 800 is configured to be selectively driven by the engine 610, by the FEAD motor, by the IMG 700, and/or electrically-operated. According to an exemplary embodiment, the ESS 1000 is configured to power various high-voltage components and low-voltage components of the vehicle 10 (e.g., the IMG 700, the FEAD motor, electrified FEAD accessories, cab displays, cab gauges, cab lights, external lights, etc.). According to various embodiments, except for electrical wiring, the components of the ESS 1000 (e.g., battery packs, inverters, power distribution components, power conversion hardware, etc.) are variously positioned about the vehicle 10 (e.g., within the rear module 400, under the passenger capsule 200, etc.), except proximate the engine 610 or within the tunnel slot 208 of the structural tunnel 206. Such positioning facilitates maintaining the components of the ESS 1000 at proper operating temperatures and away from high temperature zones proximate the engine 610 and/or within the tunnel slot 208 of the structural tunnel 206. In some embodiments (e.g., when the FEAD 800 includes the FEAD motor, when the engine 610 drives the FEAD, etc.), the FEAD motor and the IMG 700 are configured to selectively operate as generators to facilitate charging the ESS 1000 using power provided by the engine 610 while the vehicle 10 is stationary or moving.

Engine, Transmission, and Transaxle

According to an exemplary embodiment, the engine 610 is a compression-ignition internal combustion engine that utilizes diesel fuel. In other embodiments, the engine 610 is a spark-ignition engine that utilizes one of a variety of fuel types (e.g., gasoline, compressed natural gas, propane, etc.). The transmission may be a commercially available transmission. The transmission 620 may include a torque converter configured to improve efficiency and decrease heat loads. Lower transmission gear ratios combined with a low range of an integrated rear differential/transfer case provide optimal speed for slower speeds, while higher transmission gear ratios deliver convoy-speed fuel economy and speed on grade. According to an exemplary embodiment, the transmission 620 includes a driver selectable range selection.

The transaxle 640 is designed to reduce the weight of the vehicle 10. The weight of the transaxle 640 is minimized by integrating a transfercase and a rear differential into a single unit, selecting an optimized gear configuration, and/or utilizing high strength structural aluminum housings. By integrating the transfercase and the rear differential into the transaxle 640 (thereby forming a singular unit), the connecting drive shaft and end yokes traditionally utilized to connect the transfercase and the rear differential have been eliminated. An integral neutral and front axle disconnect allows the vehicle 10 to be flat towed or front/rear lift and towed with minimal preparation (i.e., without removing the transaxle drive shaft 630 or the front axle drive shaft 650). Specifically, the transaxle 640 includes an internal mechanical disconnect capability that allows the front axle assembly 500 and/or the rear axle assembly 500 to turn without rotating the transaxle 640 and the transmission 620. A mechanical air solenoid over-ride is easily accessible from the interior and/or exterior of the vehicle 10. Once actuated, no further vehicle preparation is needed. After the recovery operation is complete, the driveline 600 can be re-engaged by returning the air solenoid mechanical over-ride to the original position.

IMG

According to an exemplary embodiment, the IMG 700 is electrically coupled to the ESS 1000, selectively mechanically coupled to the engine 610, and mechanically coupled to the transmission 620. The IMG 700 is configured to be mechanically driven by the engine 610 to selectively generate electricity for storage in the ESS 1000 and/or to power electrical components of the vehicle 10. The IMG 700 is configured to receive electrical power from the ESS 1000 to facilitate driving the transmission 620 and, therefore, the axle assemblies 500 of the vehicle 10. In some embodiments, the IMG 700 is configured to receive electrical power from the ESS 1000 to function as a starter for the engine 610. Such starting capability can be performed while the vehicle 10 is stationary or while the vehicle 10 is moving. In some embodiments, the driveline 600 additionally or alternatively includes a backup or dedicated engine starter.

Figure 12:
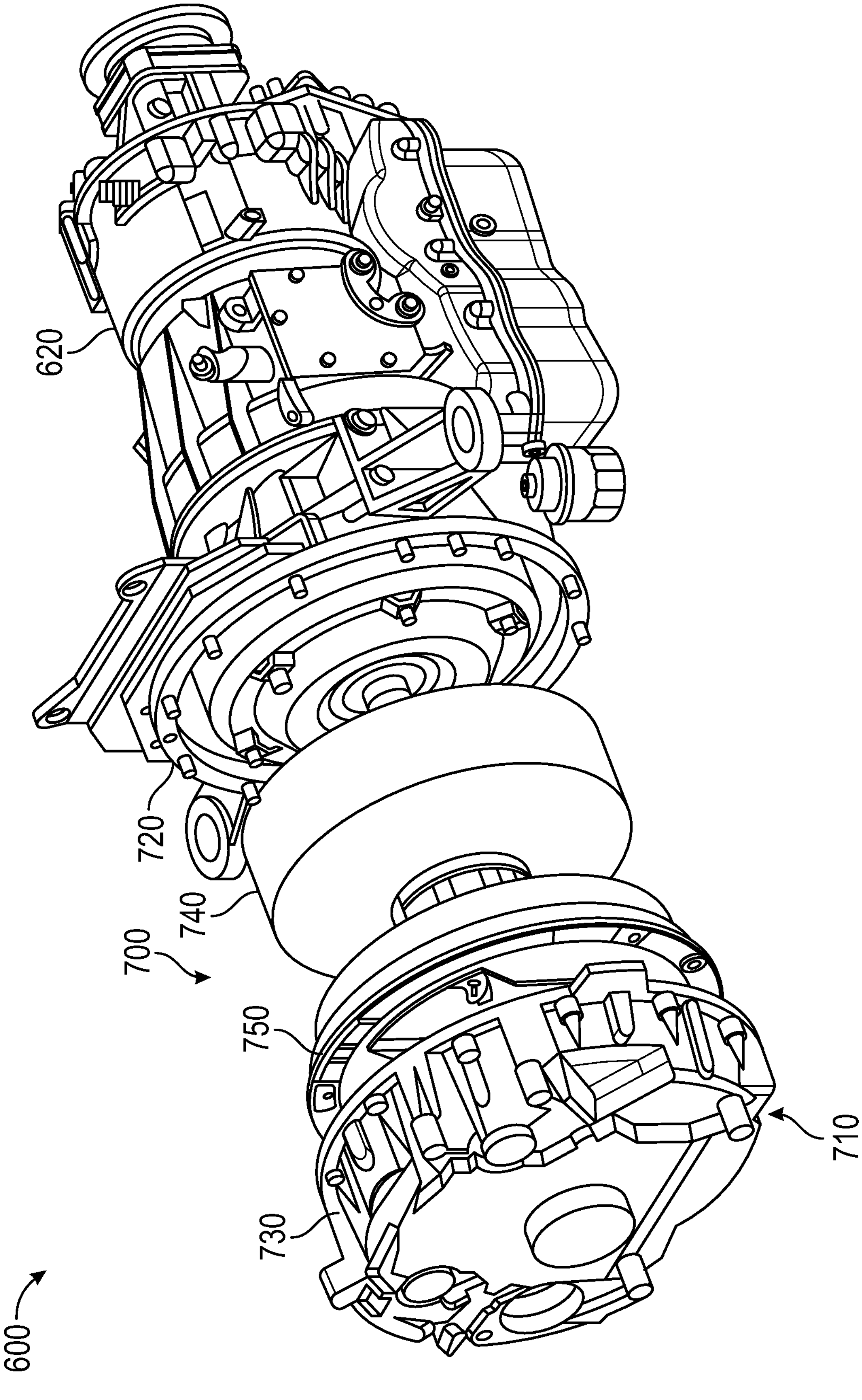
FIG. 12 is an exploded view the IMG and the transmission of the driveline of FIG. 9, according to an exemplary embodiment.
Figure 13:
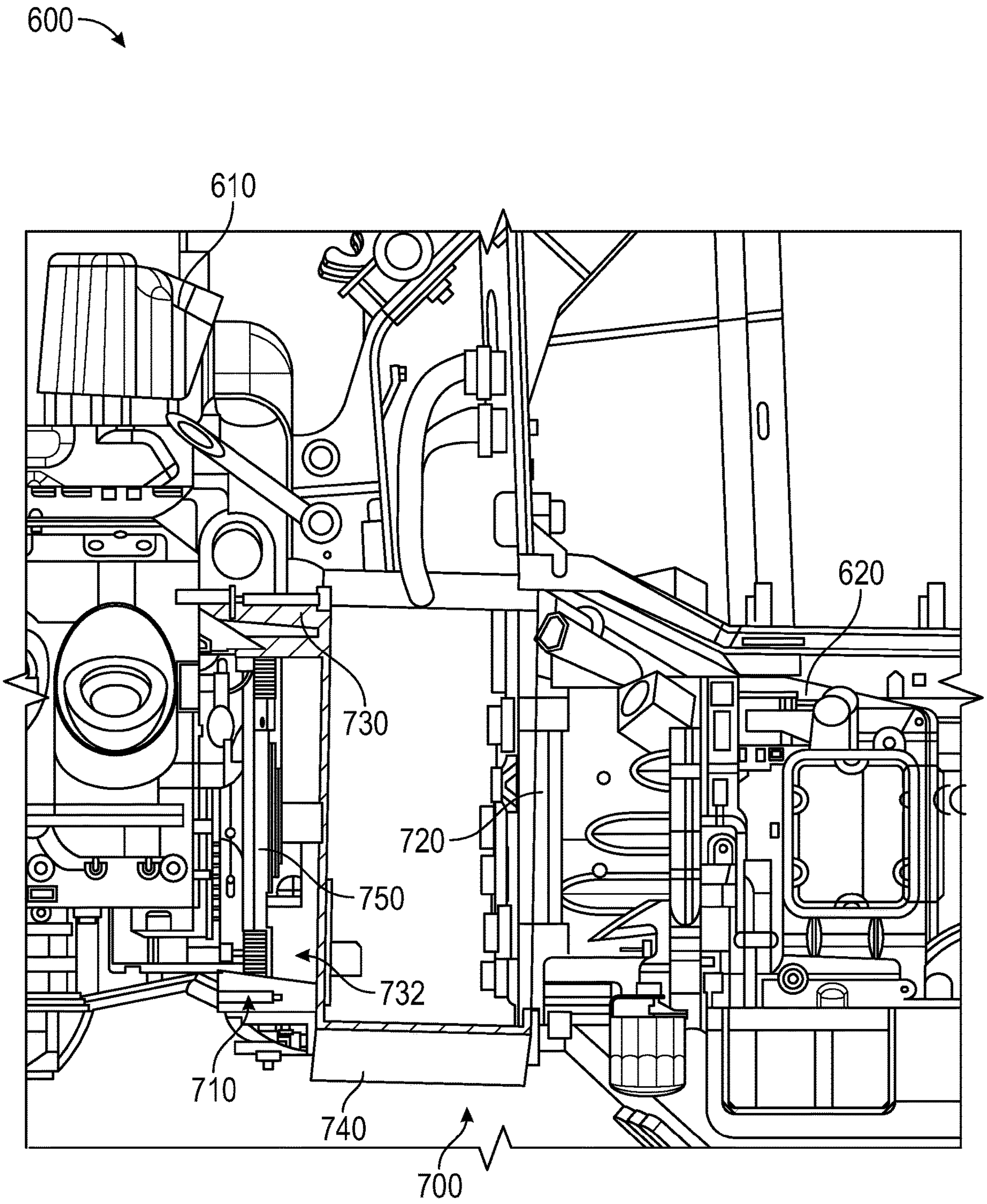
FIG. 13 is a detailed cross-sectional side view of the IMG of the driveline of FIG. 9, according to an exemplary embodiment.
Figure 14:
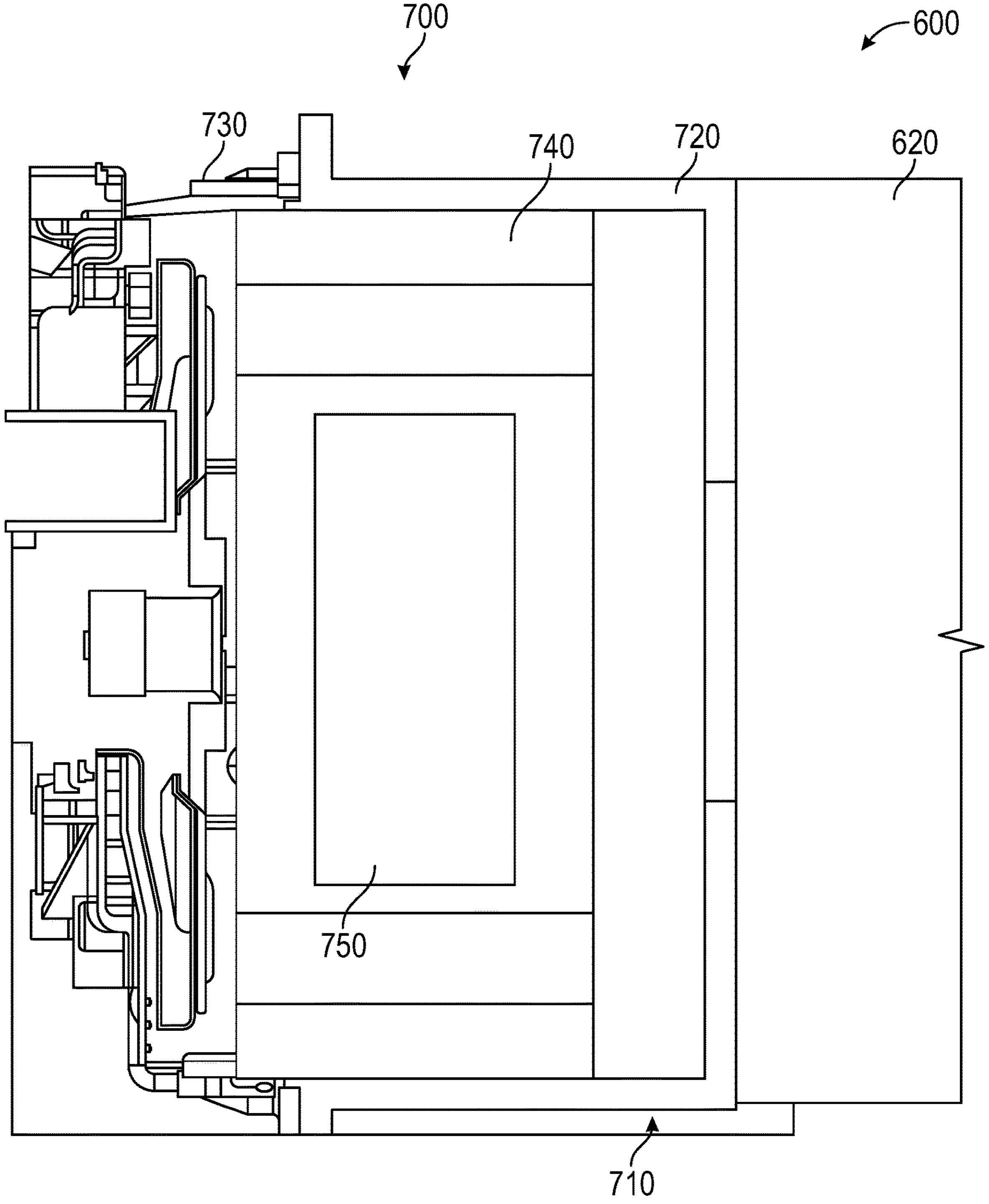
FIG. 14 is a detailed cross-sectional side view of the IMG of the driveline of FIG. 9, according to another exemplary embodiment.

As shown in FIGS. 12-14, the IMG 700 includes a housing, shown as IMG housing 710, including a first portion, shown as backing plate 720, coupled to the transmission 620, and a second portion, shown as engine mount 730, coupled to the engine 610. The IMG 700 further includes an electromagnetic device, shown as motor/generator 740, coupled to the backing plate 720, and a clutch mechanism, shown as engine clutch 750, coupled to the motor/generator 740 and selectively couplable to the engine 610. The motor/generator 740 and the engine clutch 750 are, therefore, positioned between the backing plate 720 and the engine mount 730 and enclosed within the IMG housing 710 (e.g., a single unit).

According to an exemplary embodiment, the engine clutch 750 is controllable (e.g., disengaged, engaged, etc.) to facilitate (i) selectively mechanically coupling the engine 610 and the motor/generator 740 (e.g., to start the engine 610 with the motor/generator 740, to drive the motor/generator 740 with the engine 610 to produce electricity, to drive the motor/generator 740 with the engine 610 to drive the transmission 620, etc.) and (ii) selectively mechanically decoupling the engine 610 and the motor/generator 740 (e.g., to drive the motor/generator 740 with power from the ESS 1000 to drive the transmission 620, the FEAD 800, etc.). In an alternative embodiment, the IMG 700 does not include the engine clutch 750 such that the engine 610 is directly coupled to the motor/generator 740.

As shown in FIGS. 12 and 13, the motor/generator 740 and the engine clutch 750 are arranged in a stacked arrangement with the engine clutch 750 positioned within an interior chamber, shown as cavity 732, of the engine mount 730. As shown in FIG. 14, the motor/generator 740 and the engine clutch 750 are arranged in an integrated arrangement with the engine clutch 750 positioned within an interior chamber, shown as cavity 752, of the motor/generator 740. The integrated arrangement of the motor/generator 740 and the engine clutch 750 facilitates reducing the packaging size of the IMG 700, which facilitates reducing the overall length of the driveline 600.

According to an exemplary embodiment, the engine clutch 750 is a pneumatically-operated clutch that is (i) spring-biased towards engagement with the engine 610 to couple the engine 610 to the other components of the driveline 600 (e.g., the motor/generator 740, the transmission 620, etc.) and (ii) selectively disengaged using compressed air provided from an air compressor (e.g., included in the FEAD 800, air compressor 808, etc.) to decouple the engine 610 from the other components of the driveline 600. Such a spring-biased and air-disengaged clutch ensures that the driveline 600 of the vehicle 10 is operational in the event of damage to the ESS 1000 or if a state-of-charge ("SoC") of the ESS 1000 falls below a minimum SoC threshold (e.g., 20% SoC). As an example, if the engine clutch 750 is disengaged and the motor/generator 740 is driving the vehicle 10, the engine clutch 750 will auto-engage (i) if electrical power is lost due to the ESS 1000 being damaged or the FEAD motor is damaged (which will cause the air compressor of the FEAD 800 to stop providing compressed air to the engine clutch 750) or (ii) if switching to an engine drive mode, which may include stopping the FEAD motor (e.g., in response to the SoC of the ESS 1000 falling below the minimum SoC threshold, which causes the air compressor of the FEAD 800 to stop providing compressed air to the engine clutch 750). In the event of auto-engagement of the engine clutch 750, the engine 610 (if already off) will be started by the inertial forces of the vehicle 10 (if moving), can be started by the motor/generator 740, or can be started by the dedicated engine starter. Such auto-engagement, therefore, ensures that engine 610 is connected to the remainder of the driveline 600 to drive the vehicle 10 in the event of some malfunction in the electrical system or when transitioning from electric drive to engine drive. According to an exemplary embodiment, the components of the driveline 600 do not need to be stopped nor do component speeds need to be matched to switch between engine drive and electric drive.

FEAD

According to an exemplary embodiment, the FEAD 800 is configured to drive (e.g., provide mechanical energy to, provide torque to, provide rotational inertia to, etc.) various accessories of the vehicle 10. As shown in FIGS. 15-17, 19, 22, and 23, the various accessories include a first accessory, shown as air compressor 808, a second accessory, shown as fan 810, a third accessory, shown as motor/generator 822, a fourth accessory, shown as hydraulic pump 832, and a fifth accessory, shown as air conditioning ("A/C") compressor 848. In other embodiments, the FEAD 800 includes additional, fewer, or different accessories. According to an exemplary embodiment, the FEAD 800 is selectively transitionable between different configurations, modes, or states to change a drive source (e.g., to change which of multiple available primary movers, engines, internal combustion engines, electric motors, etc. drive various accessories of the vehicle 10).

E-FEAD

According to the exemplary embodiment shown in FIGS. 15-19, the FEAD 800 is configured as an electrified FEAD ("E-FEAD") having a dual-belt drive arrangement. The FEAD 800 can be selectively driven by either the engine 610 (e.g., in a first mode or state) or the motor/generator 822 (e.g., in a second mode or state). Accordingly, the FEAD 800 and, therefore, the driving of the accessories can be transitioned between an electrified state or mode and an engine-driven state or mode. When the FEAD 800 is in the electrified state or mode, the FEAD 800 can operate independently of operation of the engine 610. For example, when the FEAD 800 is in the electrified state, the FEAD 800 and accessories thereof can operate even when the engine 610 is off or in-operational, thereby operating independently of the engine 610. In another example, when the FEAD 800 is in the electrified state, the FEAD 800 can operate to drive the accessories of the vehicle 10 while the engine 610 operates to drive other driveable elements or systems of the vehicle 10 such as the wheels of the axle assemblies 500, thereby operating independently and simultaneously with operation of the engine 610.

Figure 15:
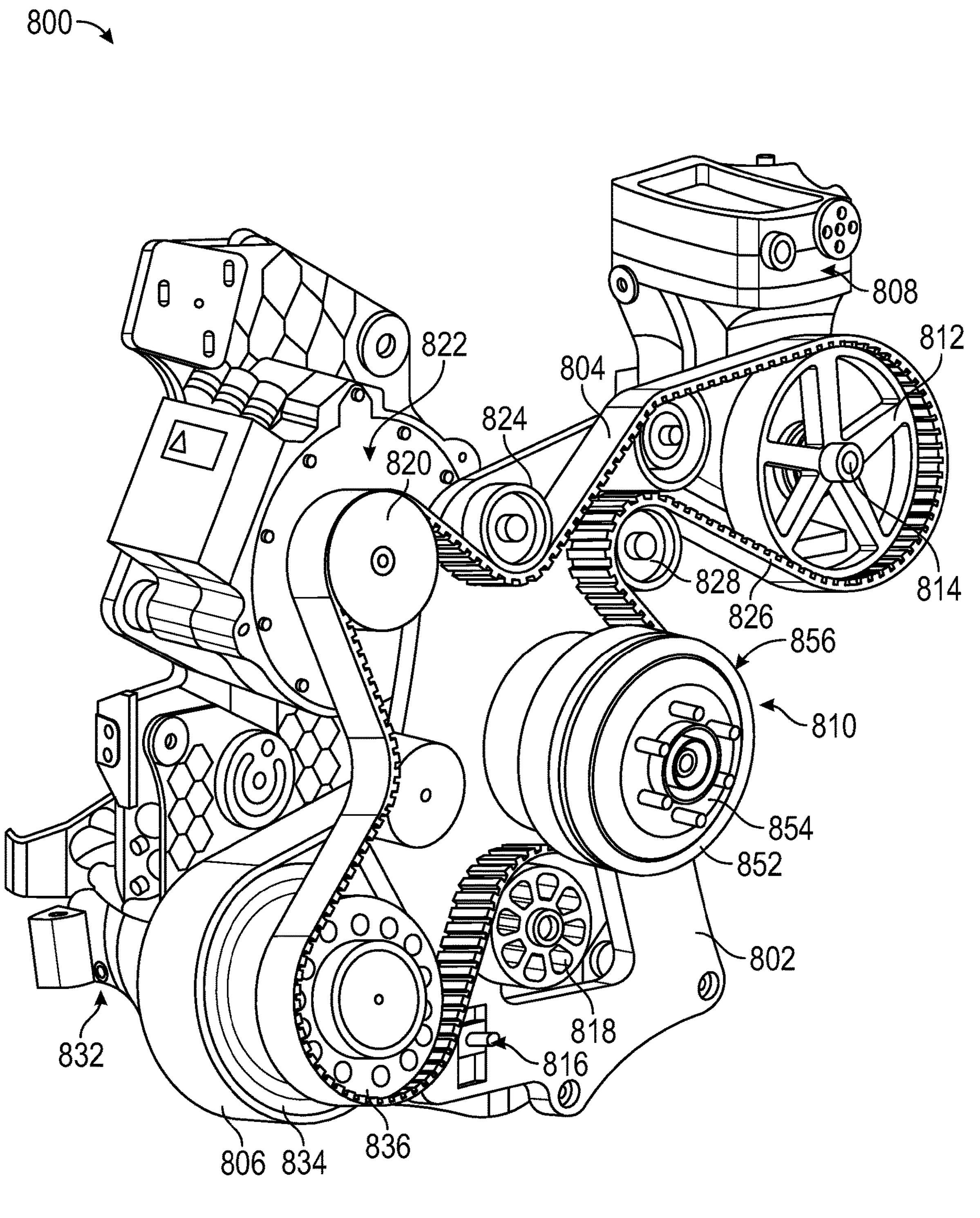
FIG. 15 is a front perspective view of the FEAD of FIG. 9, according to an exemplary embodiment.
Figure 16:
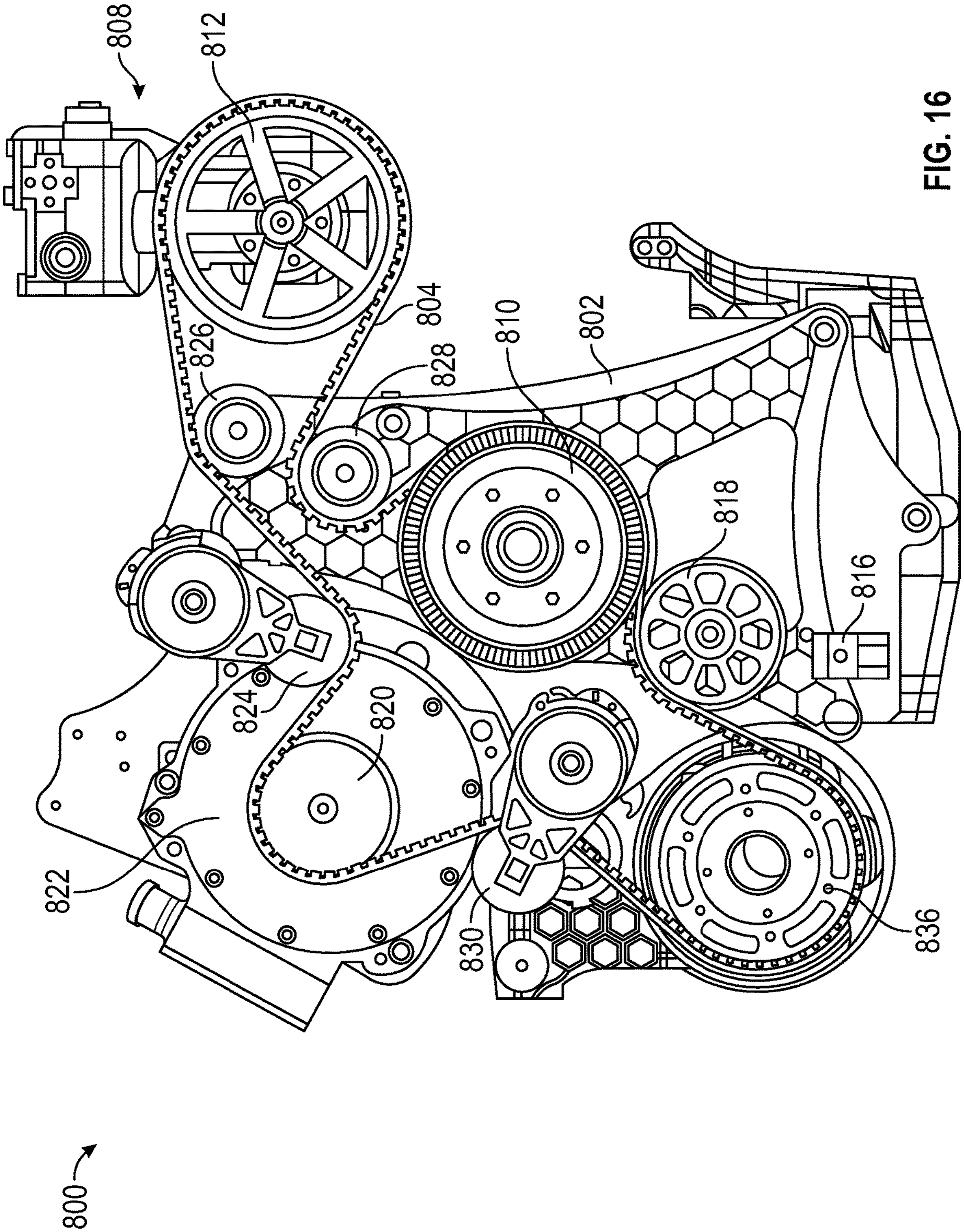
FIG. 16 is a front view of the FEAD of FIG. 15, according to an exemplary embodiment.
Figure 17:
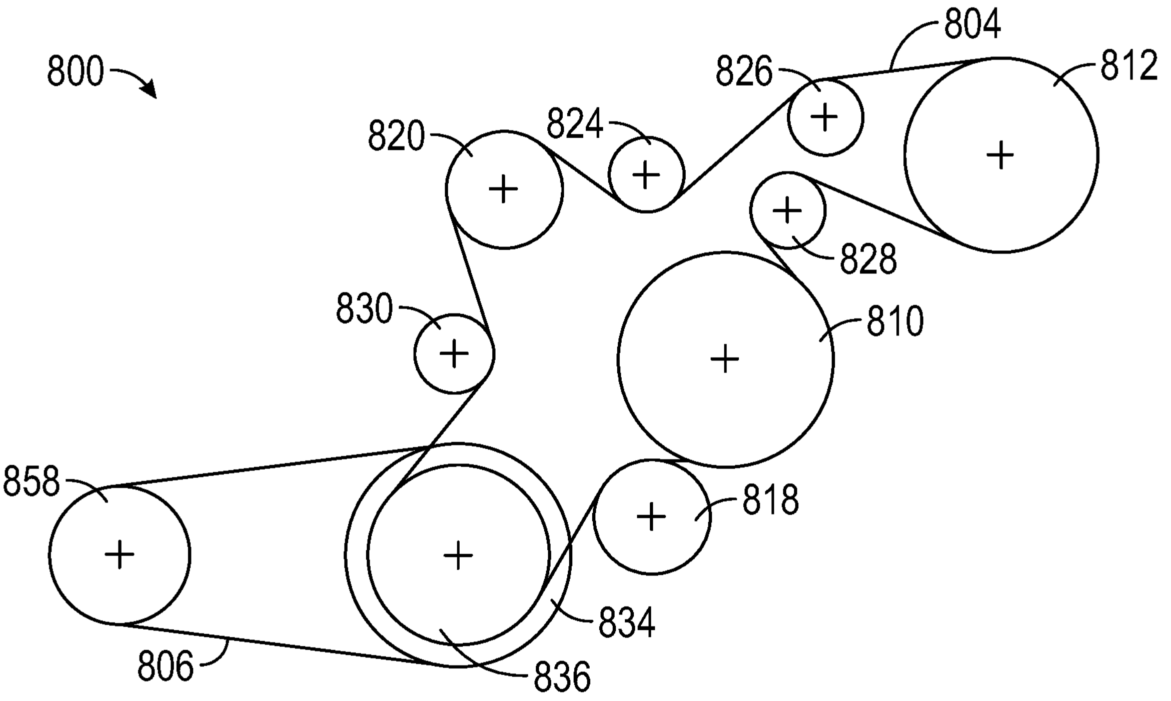
FIG. 17 is a schematic diagram of the FEAD of FIG. 15, according to an exemplary embodiment.

As shown in FIGS. 15-17, the FEAD 800 includes a first belt (e.g., tensile member, chain, power transmitting band, pulley, etc.), shown as FEAD belt 804, and a second belt (e.g., tensile member, chain, power transmitting band, pulley, etc.), shown as engine belt 806. The engine belt 806 is coupled between an output shaft 858 of the engine 610 (e.g., at a front end of the engine 610) and a one-way bearing or clutch, shown as sprag clutch 834. The FEAD belt 804 is coupled with, and defines a power band circuit between, a shaft 820 of the motor/generator 822, a drive member 812 of the air compressor 808 (e.g., an air compressor pulley or sheave), an outer race 852 of a fan clutch 856 of the fan 810, a tensioning pulley 818, a pulley 836 of the sprag clutch 834, a first roller 824, a second roller 826, a third roller 828, and a fourth roller 830 (e.g., roller pulleys). The FEAD belt 804 and the engine belt 806 can be V-belts or synchronous belts and are configured to drive or be driven by any of the coupled components, clutches, shafts, pulleys, rollers, gears, rotatable members, etc. of the FEAD 800 as described in detail herein.

Figure 18:
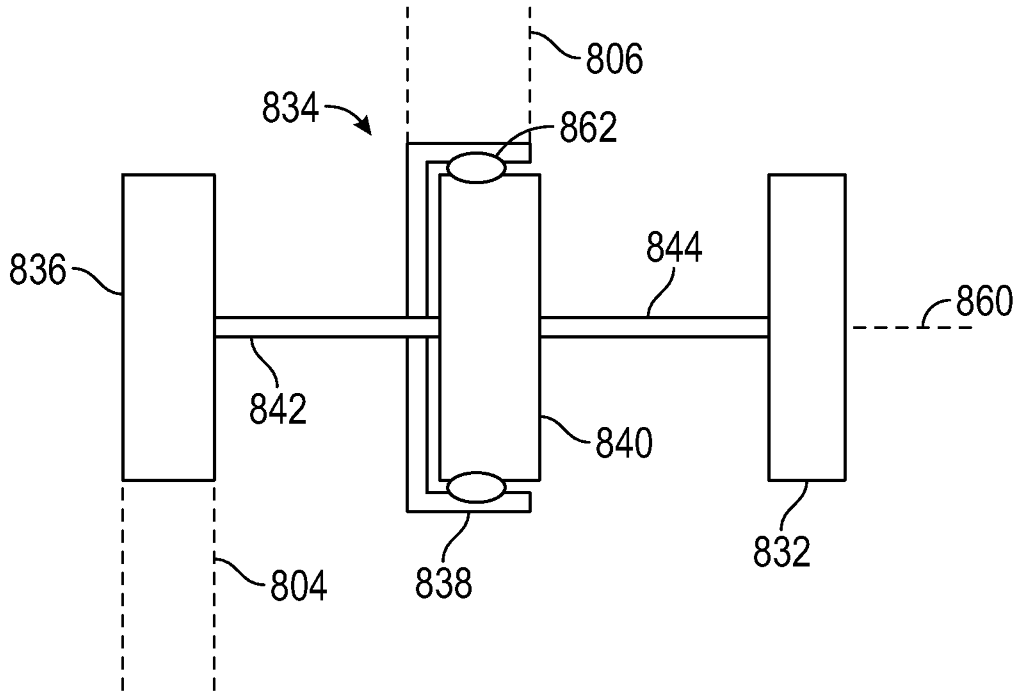
FIG. 18 is a schematic diagram of a sprag clutch of the FEAD of FIG. 15, according to an exemplary embodiment.

The hydraulic pump 832 is configured to be driven (e.g., by providing a torque input at an input shaft 844 of the hydraulic pump 832 as shown in FIG. 18) to pressurize a hydraulic fluid, according to an exemplary embodiment. The hydraulic fluid may be stored in a reservoir or tank, pressurized by the hydraulic pump 832, and provided to different hydraulically driven accessories, accessory systems, hydraulic motors, hydraulic actuators, power steering systems, suspension systems, etc. of the vehicle 10. The hydraulic pump 832 may be a component of a hydraulic circuit of the vehicle 10 that is used for different body operations or body systems of the vehicle 10, or different chassis systems of the vehicle 10 that use hydraulic primary movers (e.g., hydraulic motors, hydraulic linear actuators, etc.). The hydraulic pump 832 can be any of a gear pump, a piston pump, a vane pump, a clutch pump, a dump pump, a refuse pump, etc. or any other hydraulic pump (e.g., clutched) that receives an input torque and pressurizes or drives a hydraulic fluid. In an exemplary embodiment, the hydraulic pump 832 pressurizes the hydraulic fluid for a power steering system and a suspension system of the vehicle 10.

The air compressor 808 is configured to be driven (e.g., by providing a torque input at an input shaft 814 of the air compressor 808 such as by driving, with the FEAD belt 804, the drive member 812 that is fixedly coupled with the input shaft 814) to pressurize air or any other gas, according to an exemplary embodiment. The air may be pressurized and stored in an air tank (e.g., a tank, a reservoir, a pressure vessel, etc.) that is fluidly coupled with the air compressor 808. For example, the air compressor 808 can be configured to operate to maintain a required pressure in the air tank for different chassis operations or systems such as brakes. In an exemplary embodiment, the air compressor 808 is configured to pressurize air for air brakes of the vehicle 10 (e.g., drum brakes that include a brake chamber that is fluidly coupled with the air tank). The air compressor 808 is a component of a fluid circuit for providing pressurized air to different accessories or systems of the vehicle 10, including but not limited to, air brakes of the axle assemblies 500. In some embodiments, the air compressor 808 is configured to pressurize air for other chassis or body operations of the vehicle 10 (e.g., suspension components, etc.).

The fan 810 is configured to be driven (e.g., by providing a torque input, with the FEAD belt 804, through the fan clutch 856 of the fan 810 when the fan clutch 856 is in an engaged state) to drive a rotor or impeller component of the fan 810. The fan 810 is configured to drive an airflow through cooling components (e.g., an engine radiator, a transmission cooler, heat exchangers, a hydraulic cooler, an A/C condenser, a battery cooler, etc.) of the vehicle 10 to provide cooling for the engine 610 and various other systems (e.g., a hydraulic circuit, the transmission 620, the ESS 1000, etc.) of the vehicle 10. The impeller component or assembly can be selectively engaged with the FEAD belt 804 through the fan clutch 856. The fan clutch 856 may be an electric clutch that is selectively engaged or disengaged to thereby couple or decouple the impeller component or assembly of the fan 810 with the FEAD belt 804. The FEAD belt 804 couples with the outer race 852 of the fan clutch 856, and the impeller assembly of the fan 810 is fixedly coupled with an inner race 854 of the fan clutch 856. Engaging or disengaging the fan clutch 856 couples or decouples the inner race 854 with the outer race 852 of the fan clutch 856. The fan clutch 856 can be transitioned between the engaged state and the disengaged state automatically based on a temperature of the engine 610 or other vehicle components, in response to a user input, in response to a control mode, etc.

As shown in FIGS. 15 and 16, the tensioning pulley 818 is positioned along the FEAD belt 804 between the pulley 836 of the sprag clutch 834 and the fan 810. In other embodiments, the tensioning pulley 818 is otherwise positioned along the FEAD belt 804. The tensioning pulley 818 is adjustable (e.g., physically moveable, translatable, etc.) to increase or decrease a tension of the FEAD belt 804. The tensioning pulley 818 can be adjusted by providing an input to an adjustment member 816 (e.g., lever, knob, etc.) to reposition (e.g., translate, etc.) the tensioning pulley 818.

According to an exemplary embodiment, the motor/generator 822 is configured to function both as a motor and as a generator in different modes of the FEAD 800. When the motor/generator 822 functions as a motor, the motor/generator 822 is configured to consume electrical energy from the ESS 1000 of the vehicle 10 and output a torque to the FEAD belt 804 through the shaft 820 of the motor/generator 822. The FEAD belt 804 transfers the torque or mechanical energy to each of the fan 810, the air compressor 808, and the hydraulic pump 832 so that the motor/generator 822 functions as the primary mover of the FEAD 800 when activated, thereby electrifying the FEAD 800 and facilitating independent operation the FEAD 800 (i.e., operating independently of operation of the engine 610). The FEAD belt 804 can be configured to drive the hydraulic pump 832 through the sprag clutch 834, as described in greater detail below with reference to FIG. 18.

The motor/generator 822 is also configured to function as a generator and be driven by the FEAD belt 804 when the engine 610 operates as the primary mover of the FEAD 800. The engine 610 is configured to drive the sprag clutch 834 through the engine belt 806, which thereby drives (i) the hydraulic pump 832 through the sprag clutch 834 and (ii) the FEAD belt 804 through the sprag clutch 834, and thereby the fan 810, the air compressor 808, and the motor/generator 822 through the pulley 836 of the sprag clutch 834. In some embodiments, the FEAD 800 can be transitioned between the engine-driven mode and the electrified mode by (i) selectively configuring the engine 610 to drive the engine belt 806 (e.g., by engaging a clutch of the engine 610 so that the engine outputs torque to the sprag clutch 834 via the engine belt 806, or by starting or stopping the engine 610) or (ii) activating the motor/generator 822 to drive the FEAD belt 804 (e.g., by providing electrical power to the motor/generator 822 to thereby cause the motor/generator 822 to function as an electric motor and drive the FEAD belt 804). When the engine 610 drives the FEAD 800 through the engine belt 806, the sprag clutch 834, and the FEAD belt 804, the motor/generator 822 may be driven through the shaft 820 and function as a generator (as necessary or continuously) to generate electrical energy based on the driving of the shaft 820 (e.g., now functioning as an input shaft) and provide the electrical energy to various electrical components of the vehicle 10 and/or to the ESS 1000 for storage.

As shown in FIGS. 15 and 16, the FEAD 800 includes a structural member, shown as frame 802, with which each of the motor/generator 822, the air compressor 808, the tensioning pulley 818, the hydraulic pump 832, the sprag clutch 834, the fan 810, and the roller pulleys 824-830 are coupled (e.g., translationally fixedly coupled). According to an exemplary embodiment, the frame 802 is coupled (e.g., mounted, secured, fixedly coupled, fastened, attached, etc.) to a front of the engine 610. In other embodiments, the frame 802 is coupled to the hull and frame assembly 100 (e.g., a portion of the front module 300).

As shown in FIG. 18, the sprag clutch 834 includes a first portion, shown as outer race 838, a second portion, shown as inner race 840, and one-way rotational elements, shown as sprags 862, positioned between the inner race 840 and the outer race 838. The sprags 862 are configured to (i) permit free rotation between the inner race 840 and the outer race 838 when the inner race 840 is rotated relative to the outer race 838 about a central axis 860 thereof (e.g., when the pulley 836, and therefore, the inner race 840 is driven by the motor/generator 822) and (ii) limit or jam when the outer race 838 is rotated relative to the inner race 840 about the central axis 860 (e.g., when the outer race 838 is driven by the engine 610 through the engine belt 806).

As shown in FIGS. 15 and 17, the engine belt 806 is coupled with the outer race 838 of the sprag clutch 834 so that when the engine 610 drives the engine belt 806, the outer race 838 locks with the inner race 840 and both the outer race 838 and the inner race 840 rotate in unison (e.g., due to the sprags 862 locking the inner race 840 with the outer race 838 or limiting relative rotation between the inner race 840 and the outer race 838). The pulley 836 of the sprag clutch 834 is fixedly coupled with the inner race 840 of the sprag clutch 834 (e.g., via a shaft 842) so that rotation of the inner race 840 drives the pulley 836 and the FEAD belt 804. The input shaft 844 of the hydraulic pump 832 is coupled (e.g., rotatably) with the inner race 840 of the sprag clutch 834 such that rotation of the inner race 840 (e.g., in unison with rotation of the outer race 838 when the engine 610 drives the outer race 838 and the inner race 840 in unison through the engine belt 806) also drives the hydraulic pump 832.

As shown in FIG. 18, the pulley 836 and, therefore, the FEAD belt 804 are coupled with the inner race 840 of the sprag clutch 834. When the motor/generator 822 of the FEAD 800 operates as the primary mover of the FEAD 800, the motor/generator 822 drives the FEAD belt 804 (thereby driving the air compressor 808 and/or the fan 810), which drives the pulley 836 and the inner race 840 to rotate relative to the outer race 838 of the sprag clutch 834, thereby also driving the hydraulic pump 832 without driving the outer race 838 and the engine belt 806. In this way, the sprag clutch 834 can function to facilitate driving the FEAD 800 with either the engine 610 or the motor/generator 822. When the motor/generator 822 drives the FEAD 800 and accessories thereof, the inner race 840 of the sprag clutch 834 rotates freely relative to the outer race 838. When the engine 610 drives the FEAD 800 and accessories thereof, the inner race 840 and the outer race 838 of the sprag clutch 834 have limited relative rotation to thereby transfer the torque from the engine 610 and the engine belt 806 to the FEAD 800 and accessories thereof.

It should be understood that while FIG. 18 shows the engine belt 806 being coupled with the outer race 838 of the sprag clutch 834, and the hydraulic pump 832 and the FEAD belt 804 being coupled with the inner race 840 of the sprag clutch 834, in other embodiments, the engine belt 806 is coupled with the inner race 840 of the sprag clutch 834 and the hydraulic pump 832 and the FEAD belt 804 are coupled with the outer race 838 of the sprag clutch 834.

Figure 19:
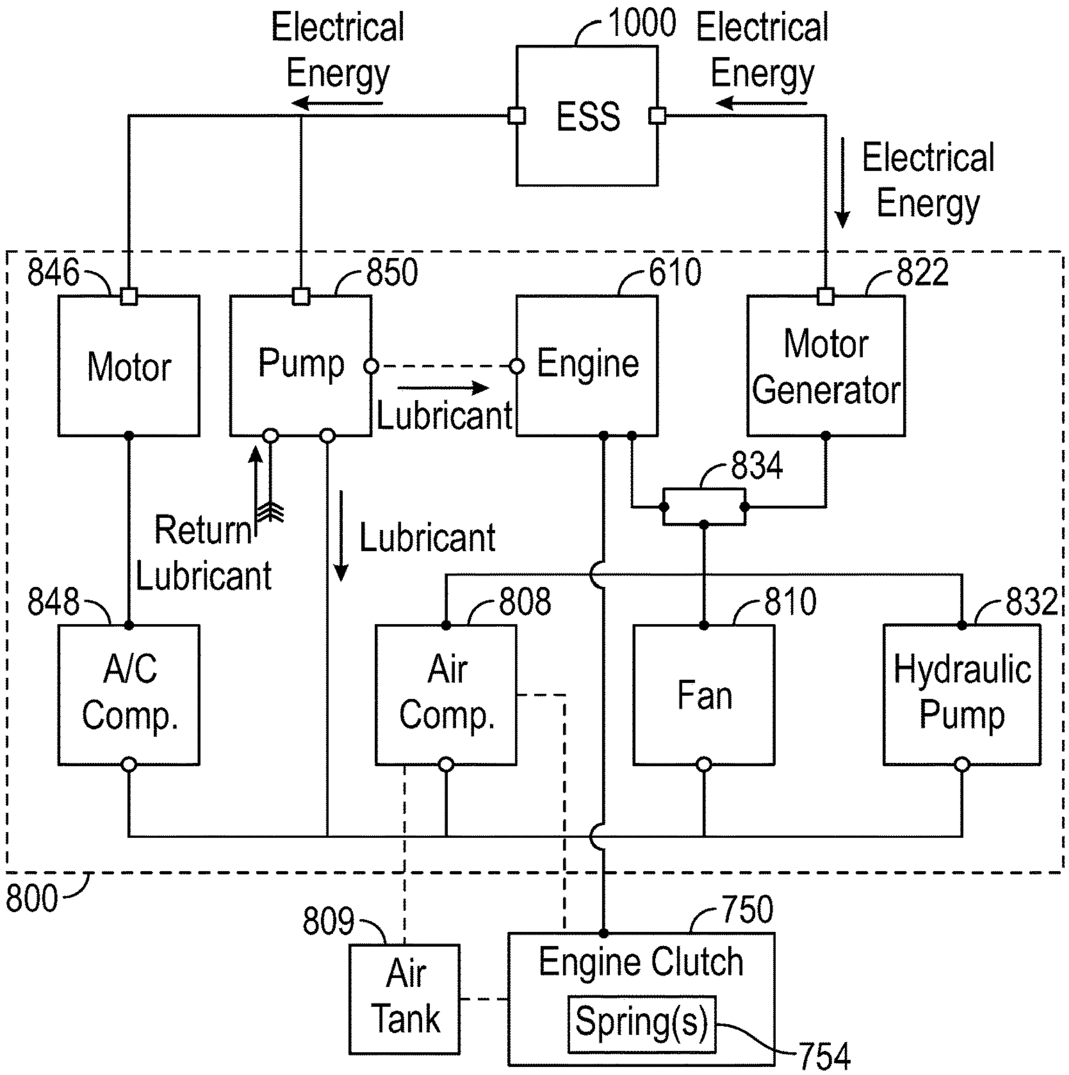
FIG. 19 is a schematic block diagram of the FEAD of FIG. 15 operably coupled with the ESS of FIGS. 9 and 10, according to an exemplary embodiment.

As shown in FIG. 19, the FEAD 800 is operably or electrically coupled with the ESS 1000 so that the ESS 1000 can exchange electrical energy with electrical components of the FEAD 800. The FEAD 800 also includes the A/C compressor 848 and an electric motor 846 that is configured to drive the A/C compressor 848. The A/C compressor 848 and the electric motor 846 can operate independently of the engine 610 and the motor/generator 822 so that the A/C compressor 848 does not depend on operation, drive speed, or on/off status of the engine 610 or the motor/generator 822. The engine 610 or the motor/generator 822 are selectively configured to provide mechanical energy to drive the air compressor 808, the fan 810, or the hydraulic pump 832. When the engine 610 drives the air compressor 808, the fan 810, and the hydraulic pump 832, the engine 610 may also drive the motor/generator 822 so that the motor/generator 822 generates electrical energy. The motor/generator 822 is electrically coupled (e.g., via electrical wiring) with the ESS 1000 and provides generated electrical energy to the ESS 1000 for storage and discharge to other electrical components of the vehicle 10. When the motor/generator 822 operates to drives the FEAD 800 (e.g., in the electrified mode), the motor/generator 822 consumes electrical energy provided by the ESS 1000 (or more specifically batteries thereof) and uses the electrical energy to drive the accessories of the FEAD 800.

As shown in FIG. 19, the FEAD 800 includes a pump (e.g., an oil pump, a lubrication pump, etc.), shown as lubricant pump 850, that is configured to provide lubricant to the A/C compressor 848, the air compressor 808, the fan 810, and/or the hydraulic pump 832. In some embodiments, the lubricant pump 850 is a component in a fluid lubricant circuit that includes a reservoir for the lubricant, one or more filters to filter the lubricant, etc. In some embodiments, the lubricant pump 850 is configured to provide lubricant to the engine 610. The lubricant pump 850 may be selectively fluidly coupled with the accessories of the FEAD 800 (e.g., the A/C compressor 848, the air compressor 808, the fan 810, the hydraulic pump 832, etc.) or lubricant inlets (e.g., grease fittings) of the accessories of the FEAD 800 to provide lubricant (e.g., grease, liquid lubricant, oil-based lubricant, etc.) to reduce friction and reduce wear of the accessories of the FEAD 800. The lubricant fluid circuit including the lubricant pump 850 can include a valve and a branch (e.g., a tee) to selectively direct lubricant to the accessories of the FEAD 800 or moving parts of the accessories of the FEAD 800 as required, automatically, or in response to a user input. The lubricant pump 850 can include an electric motor that consumes electrical energy provided by the ESS 1000 to operate independently of operation of the engine 610 and/or the motor/generator 822 (e.g., operates when the engine 610 and/or the motor/generator 822 are in an off state, not operating to provide torque or generate electrical energy, etc.). The lubricant pump 850 is configured to receive return lubricant from any of the A/C compressor 848, the air compressor 808, the fan 810, the hydraulic pump 832, or the engine 610, and recirculate the return lubricant.

The A/C compressor 848 and the electric motor 846 are configured to operate independently of the engine 610 and the motor/generator 822 to provide A/C for occupants of the vehicle 10. The electric motor 846 operates by consuming electrical power provided by the ESS 1000 (or other batteries of the vehicle 10) and driving the A/C compressor 848. The A/C compressor 848 is configured to compress a refrigerant to pass the refrigerant through a heat exchanger for A/C. Advantageously, the A/C compressor 848 can be operated regardless of the mode of the FEAD 800 (e.g., if the FEAD 800 is being driven by the engine 610, if the FEAD 800 is being driven by the motor/generator 822, if the FEAD 800 is not being driven).

Engine-Only-Driven FEAD

Figure 20:
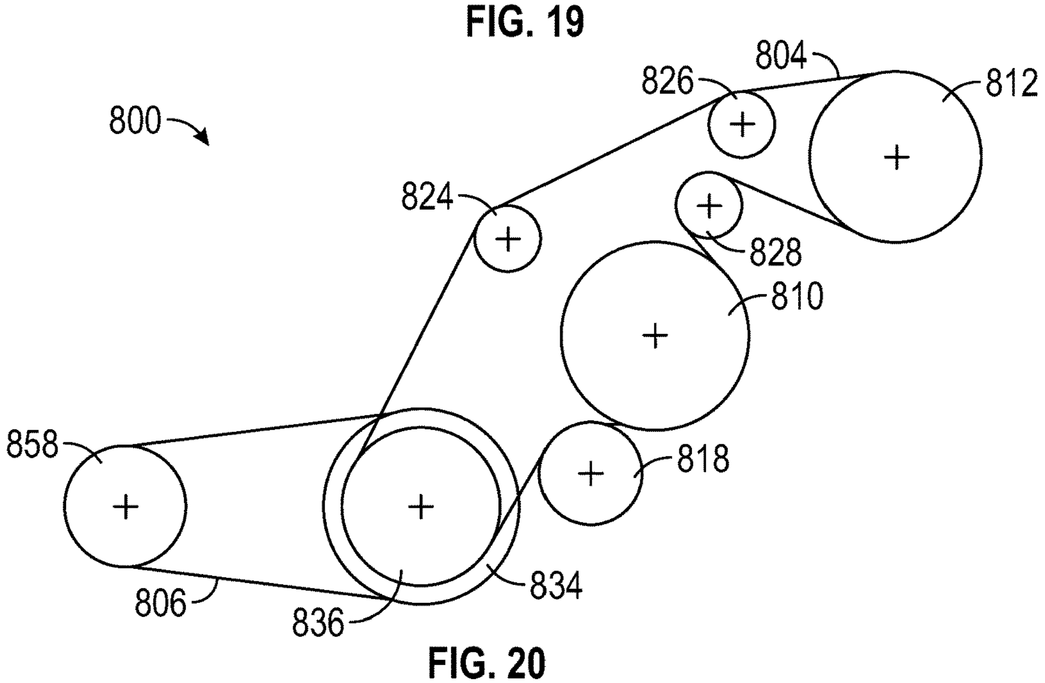
FIG. 20 is a schematic diagram of the FEAD of FIG. 9 without an electric motor/generator, according to another exemplary embodiment.

According to the alternative embodiment shown in FIG. 20, the FEAD 800 does not include the motor/generator 822 and is instead driven solely by the engine 610 through the output shaft 858 of the engine 610 that is coupled with the engine belt 806, thereby driving the FEAD belt 804 through the sprag clutch 834. In such an embodiment, the FEAD 800 may not include the sprag clutch 834. The accessories of the FEAD 800 may, therefore, be direcly coupled to the engine belt 806 or the sprag clutch 834 is replaced by two pulleys coupled together (e.g., the pulley 836 and a second pulley that replaces the outer race 838 and the inner race 840 of the sprag clutch 834).

IMG-Driven FEAD

Figure 21:
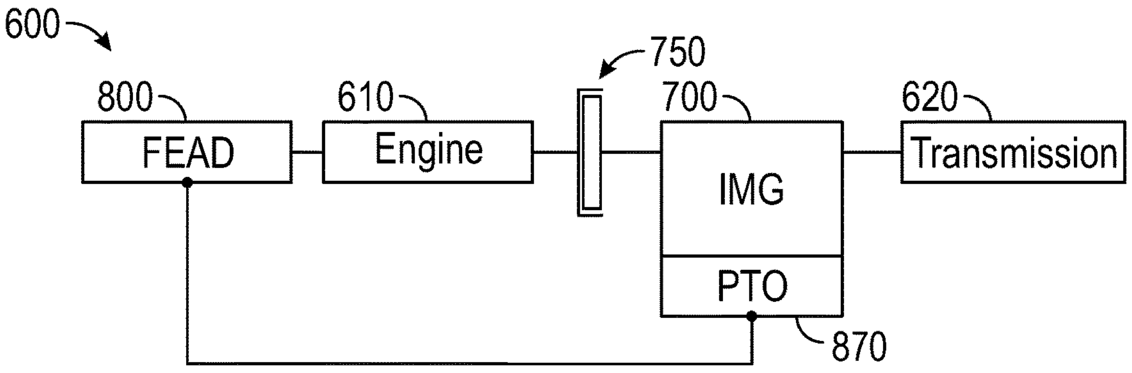
FIG. 21 is a schematic block diagram of the driveline of FIG. 9 including a power take-off ("PTO") that is driven by the IMG and coupled to the FEAD, according to another exemplary embodiment.
Figure 22:
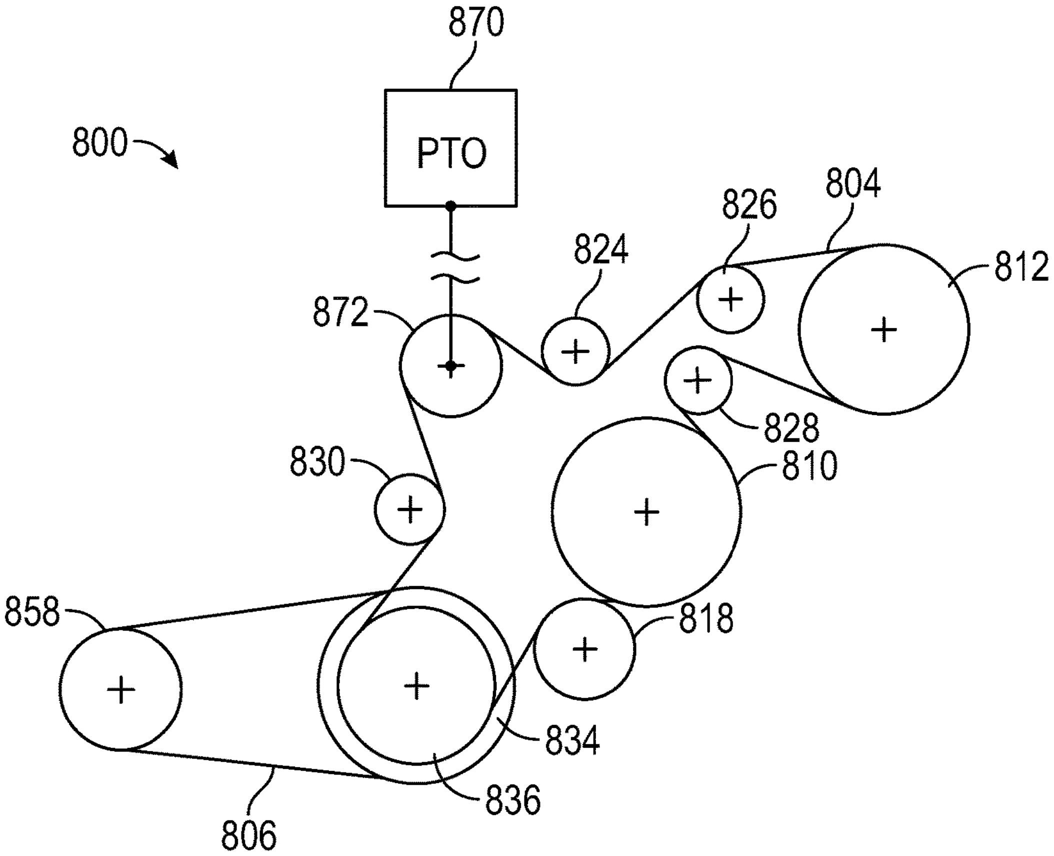
FIG. 22 is a schematic diagram of the FEAD coupled to the PTO of the driveline of FIG. 21, according to an exemplary embodiment.

According to the exemplary embodiment FIGS. 21 and 22, the FEAD 800 or accessories thereof can be driven by the IMG 700 of the driveline 600. As shown in FIG. 21, the driveline 600 includes the engine 610, the engine clutch 750, the IMG 700, and the transmission 620 where the IMG 700 includes a PTO, shown as PTO 870, configured to be driven by an output (e.g., a secondary output, etc.) of the IMG 700. The PTO 870 can be transitionable between an engaged state and a disengaged state. When the PTO 870 is in the engaged state, the PTO 870 can receive output torque from the IMG 700 and transfer the torque to an input pulley 872 of the FEAD 800 for driving the FEAD belt 804. Accordingly, the input pulley 872 may replace the motor/generator 822 of the FEAD 800. The engine 610 may still be configured to drive the FEAD 800 and accessories of the FEAD 800 through the sprag clutch 834 and the engine belt 806 when the FEAD 800 is in the engine-driven mode. When the FEAD 800 is transitioned into the motor/driven or electrified mode, the IMG 700 can consume electrical energy (e.g., from the ESS 1000) and output torque to the PTO 870. The PTO 870 can be transitioned into the engaged state so that the PTO 870 receives the output torque from the IMG 700 and transfers the output torque to the input pulley 872 of the FEAD 800. The input pulley 872 can be configured to drive the FEAD belt 804 similarly to the motor/generator 822 as described in greater detail above with reference to FIGS. 15-19.

Accordingly, the FEAD 800 shown in FIGS. 21 and 22 is transitionable between (i) an engine-driven mode where the FEAD 800 and accessories of the FEAD 800 are driven by the engine 610 and (ii) a motor/driven or electrified mode where the FEAD 800 and accessories of the FEAD 800 are driven by the IMG 700 of the driveline 600 (e.g., through the PTO 870). Transitioning between the engine-driven mode and the motor/driven mode can include (i) transitioning the PTO 870 between the engaged state and the disengaged state and/or (ii) transitioning the IMG 700 between operating as a motor and operating as a generator. Advantageously, driving the FEAD 800 in the motor/driven mode with the IMG 700 reduces the need for an additional motor/generator at the FEAD 800 (e.g., the motor/generator 822). When the FEAD 800 is driven by the IMG 700 through the PTO 870, the engine clutch 750 may be decoupled from the engine 610 so that the IMG 700 operates independently of operation of the engine 610. In another embodiment, the PTO 870 is coupled to an output (e.g., a secondary output) of the transmission 620 and driven by the IMG 700 and/or the engine 610 to drive the FEAD 800.

Electrified Accessories

Figure 23:
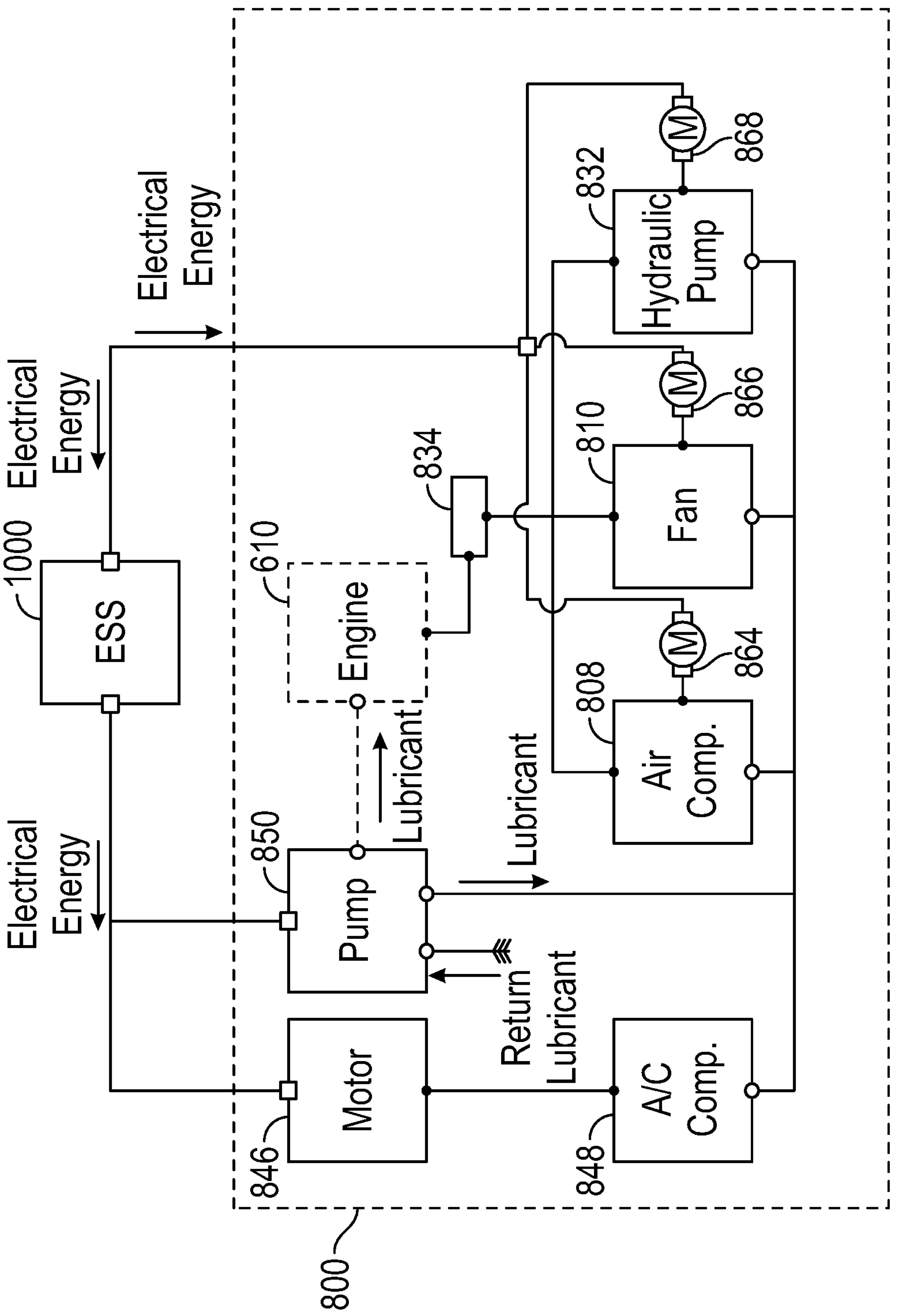
FIG. 23 is a schematic block diagram of the FEAD of FIG. 9 including an electric motor for each of the accessories thereof, according to another exemplary embodiment.

According to the exemplary embodiment shown in FIG. 23, each of the accessories of the FEAD 800 can be individually electrified. As shown in FIG. 23, the FEAD 800 additionally includes an electric motor 864 configured to drive the air compressor 808, an electric motor 866 configured to drive the fan 810, and an electric motor 868 configured to drive the hydraulic pump 832. Each of the electric motor 864, the electric motor 866, the electric motor 868, and the electric motor 846 is configured to consume electrical energy provided by the ESS 1000 to drive their corresponding accessories. Each of the electric motor 864, the electric motor 866, the electric motor 868, and the electric motor 846 can therefore be operated independently of each other and/or independently of the engine 610.

In the embodiment shown in FIG. 23 where each of the accessories is electrified, the engine 610 may be optional as a primary mover for the FEAD 800. If the engine 610 is not used by the FEAD 800 in such an embodiment, the engine 610 may still be provided as a component of the driveline 600 but is not used to provide a torque input to the FEAD 800. If the engine 610 is not used to provide a torque input to the FEAD 800, the engine belt 806, the FEAD belt 804, and the sprag clutch 834 are not used since each of the accessories are independently operated by their corresponding electric motors.

If the engine 610 is used to provide a torque input to the FEAD 800, the electric motor 864, the electric motor 866, and the electric motor 868 can function as motor/generators, and can be driven by the engine 610 to generate electrical energy and provide the electrical energy to the ESS 1000. In some embodiments, one or more of the air compressor 808, the fan 810, and the hydraulic pump 832 are not electrified, while one or more others of the air compressor 808, the fan 810, and the hydraulic pump 832 are electrified. For example, the hydraulic pump 832 and the air compressor 808 can both be electrified and independently operational (e.g., through operation of the electric motor 868 and the electric motor 864) while the fan 810 may be coupled with the engine 610 through the FEAD belt 804 or the engine belt 806 to be driven by the engine 610. Advantageously, providing the electric motors 864-868 facilitates independent operation of each of the air compressor 808, the fan 810, and the hydraulic pump 832 relative to operation of the engine 610, and also relative to operation of each other. For example, the air compressor 808 can be operated independently, regardless of operation of any of the A/C compressor 848, the engine 610, the fan 810, or the hydraulic pump 832. Further, electrification of the accessories may facilitate distributing the accessories variously about the vehicle 10, providing improved component packaging.

Energy Storage System

Capacity, Operating Range, and Charging

Figure 24:
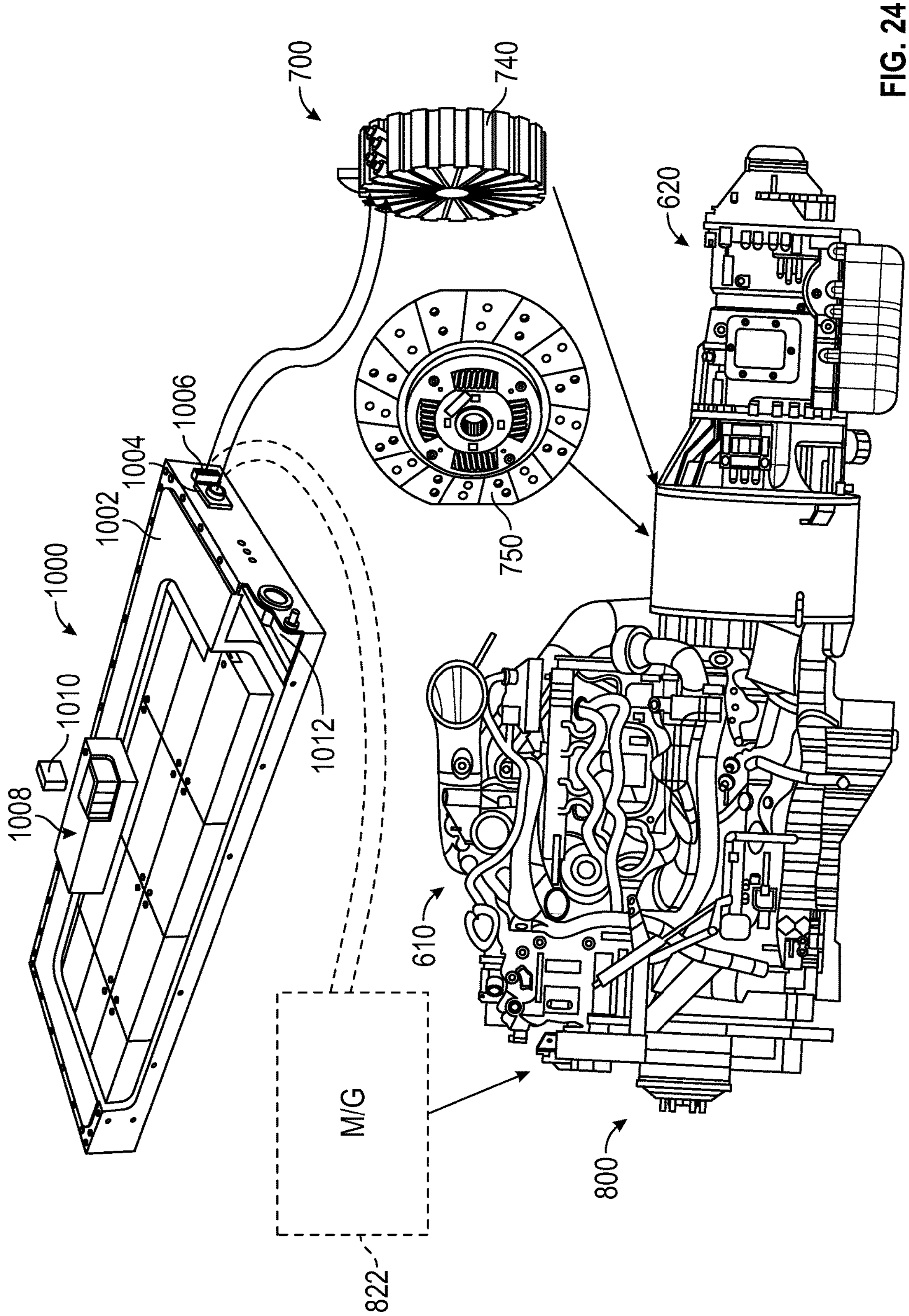
FIG. 24 is a schematic diagram of the ESS of FIG. 9, according to an exemplary embodiment.

As shown in FIG. 24, the ESS 1000 is electrically coupled to the IMG 700. In some embodiments (e.g., embodiments where the FEAD 800 includes the motor/generator 822), the ESS 1000 is also electrically coupled to the motor/generator 822 of the FEAD 800. In an electric drive mode of operation, the ESS 1000 provides power to the IMG 700 to drive the transmission 620 and/or other components/systems of the vehicle 10 (e.g., to the motor/generator 822 to drive the FEAD 800). In a charge mode of operation (e.g., during the engine mode), (i) the IMG 700 is driven by the engine 610 via the engine clutch 750 and electrical power may generated and provided to the ESS 1000 and/or (ii) the motor/generator 822 may be driven by the engine 610 and electrical power may be generated and provided to the ESS 1000.

As shown in FIG. 24, the ESS 1000 includes a battery storage housing 1002, a power connector 1004 supported by the battery storage housing 1002, and a data connector 1006 supported by the battery storage housing 1002. The power connector 1004 provides power communication between the ESS 1000, the IMG 700, and/or the motor/generator 822. The data connector 1006 provides data communication between the ESS 1000, the IMG 700, and/or the motor/generator 822. The ESS 1000 includes a number of batteries 1008, each including a number of cells 1010. The batteries 1008 are coupled together to provide an energy storage capacity of the ESS 1000.

In some embodiments, the batteries 1008 are configured (e.g., structured, designed, etc.) to operate at 700 volts ("V"). In some embodiments, the batteries 1008 are configured to operate at 24 V. In some embodiments, the batteries 1008 are configured to operate at a voltage between 700 V and 24 V. In an exemplary embodiment, the batteries 1008 are configured to operate at 666 V nominal voltage with a 406 kW discharge power. In some embodiments, the ESS 1000 has an energy storage capacity of 30.6 kWh. In some embodiments, the ESS 1000 is configured to operate at ambient temperatures between −40 degrees Celsius and 80 degrees Celsius.

In some embodiments, the energy storage capacity is defined for a target load. The target load is defined by the vehicle 10 (e.g., weight, transmission design, suspension dynamics, etc.) and can be expressed as an average load in kilowatts ("kW"). In some embodiments, the target load is defined by a specific vehicle and a specific use case. In some embodiments, the vehicle 10 is structured to provide a silent mobility mode where the systems and components the vehicle 10 are operated using energy from the ESS 1000 and the engine 610 is inactive. The silent mobility mode can define the energy storage capacity in part. In some embodiments, the target load is defined at the gross-vehicle-weight-rating ("GVWR") of the vehicle 10. Table 1, reproduced below, depicts six use cases and associated target loads during the silent mobility mode.

In use case "Vehicle 1," the target load is 68 kW average load and results in 22 minutes of run time and 13.5 miles of distance traveled. The energy storage capacity of "Vehicle 1" can be defined as 22 minutes of run time and/or 13.5 miles of distance traveled. In some embodiments, the target load of "Vehicle 1" is at least sixty-five kilowatts (65 kW). In some embodiments, the energy storage capacity of "Vehicle 1" can be defined as at least 20 minutes of run time and/or at least 13 miles of distance traveled.

In use case "Vehicle 2," the target load is 53 kW average load and results in 29 minutes of run time and 6 miles of distance traveled. The energy storage capacity of "Vehicle 2" can be defined as 29 minutes of run time and/or 6 miles of distance traveled. In some embodiments, the target load of "Vehicle 2" is at least fifty kilowatts (50 kW). In some embodiments, the energy storage capacity of "Vehicle 2" can be defined as at least 29 minutes of run time and/or at least 6 miles of distance traveled.

In use case "Vehicle 3," the target load is 40 KW average load and results in 38 minutes of run time and 14.5 miles of distance traveled. The energy storage capacity of "Vehicle 3" can be defined as 38 minutes of run time and/or 14.5 miles of distance traveled. In some embodiments, the target load of "Vehicle 3" is at least forty kilowatts (40 kW). In some embodiments, the energy storage capacity of "Vehicle 3" can be defined as at least 35 minutes of run time and/or at least 14 miles of distance traveled.

In use case "Idle," the goal is to idle the vehicle 10 using the ESS 1000 without requiring activation of the engine 610 (e.g., operate all loads of the vehicle 10 using the ESS 1000). The target load of the "Idle" use case is 17 kW average load and results in 90 minutes of run time. The energy storage capacity of "Idle" can be defined as 90 minutes of run time and/or 0 miles of distance traveled.

In use case "Fuel_Econ," the goal is to maximize the distance traveled by the vehicle 10. The target load is 40 kW average load and results in 22 miles of distance traveled. The energy storage capacity of "Fuel_Econ" can be defined 22 miles of distance traveled.

In use case "25 mph," the goal is to maximize a time of operation while moving the vehicle 10 at 25 mph over ground. The target load is 34 kW average load and results in 44 minutes of run time. The energy storage capacity of "25 mph" can be defined as 44 minutes of run time.

TABLE 1

| Use Case | Vehicle 1 | | Vehicle 2 | | Vehicle 3 | | Idle | Fuel_Econ | 25 mph |
|---|---|---|---|---|---|---|---|---|---|
| Target Load | 68 kW | | 53 kW | | 40 kW | | 17 kW | 40 kW | 34 kW |
| Criteria | Minutes | Miles | Minutes | Miles | Minutes | Miles | Minutes | Miles | Minutes |
| Result | 22 | 13.5 | 29 | 6 | 38 | 14.5 | 90 | 22 | 44 |

In one example, the ESS 1000 includes batteries 1008 that provide 30.6 kWh of energy storage capacity and are capable of providing enough energy for a minimum pure electric vehicle (EV) drive operation (e.g., silent mobility mode) of at least 30 minutes at 25 mph (e.g., 30-35 min at 45 mph).

The battery storage housing 1002 and the batteries 1008 may have a weight of about 818.4 pounds. In some embodiments, the battery storage housing 1002 and batteries 1008 may have a weight of between about 600 pounds and about 1000 pounds. The battery storage housing 1002 may have dimensions of about 60.8 inches wide, about 29.5 inches tall, and about 8.5 inches thick. In some embodiments, the battery storage housing 1002 is shaped differently and defines different dimensions (e.g., dependent upon the positioning on the vehicle 10, the desired battery capacity, weight loading requirements, etc.). For example, the battery storage housing 1002 may be between 40 and 80 inches wide, between 10 and 40 inches tall, and between 4 and 12 inches thick. In some embodiments, the battery storage housing 1002 is not structured as a single housing containing multiple batteries. In some embodiments, each battery 1008 or a subset of batteries 1008 may include battery storage housings 1002 that may be collocated on the vehicle 10 or distributed in multiple positions about the vehicle 10.

The batteries 1008 are configured to be maintained at between a lower SoC limit and an upper SoC limit. In one embodiment, the lower SoC limit is 20% of the maximum SoC and the upper SoC limit is 93% of the maximum SoC. In some embodiments, the lower SoC limit is greater than or less than 20% (e.g., 5%, 10%, 15%, 25%, etc.). In some embodiments, the upper SoC limit may be greater than or less than 93% (e.g., 88%, 90%, 95%, etc.).

The ESS 1000 can include a charge controller 1012 structured to control the flow of electrical energy into the batteries 1008 using a charge profile. The charge profile instituted by the charge controller 1012 may be dependent on the battery 1008 chemistry and other considerations. In some embodiments, the energy storage capacity may be defined as the amount of energy available between the lower SoC limit and the upper SoC limit.

Figure 25:
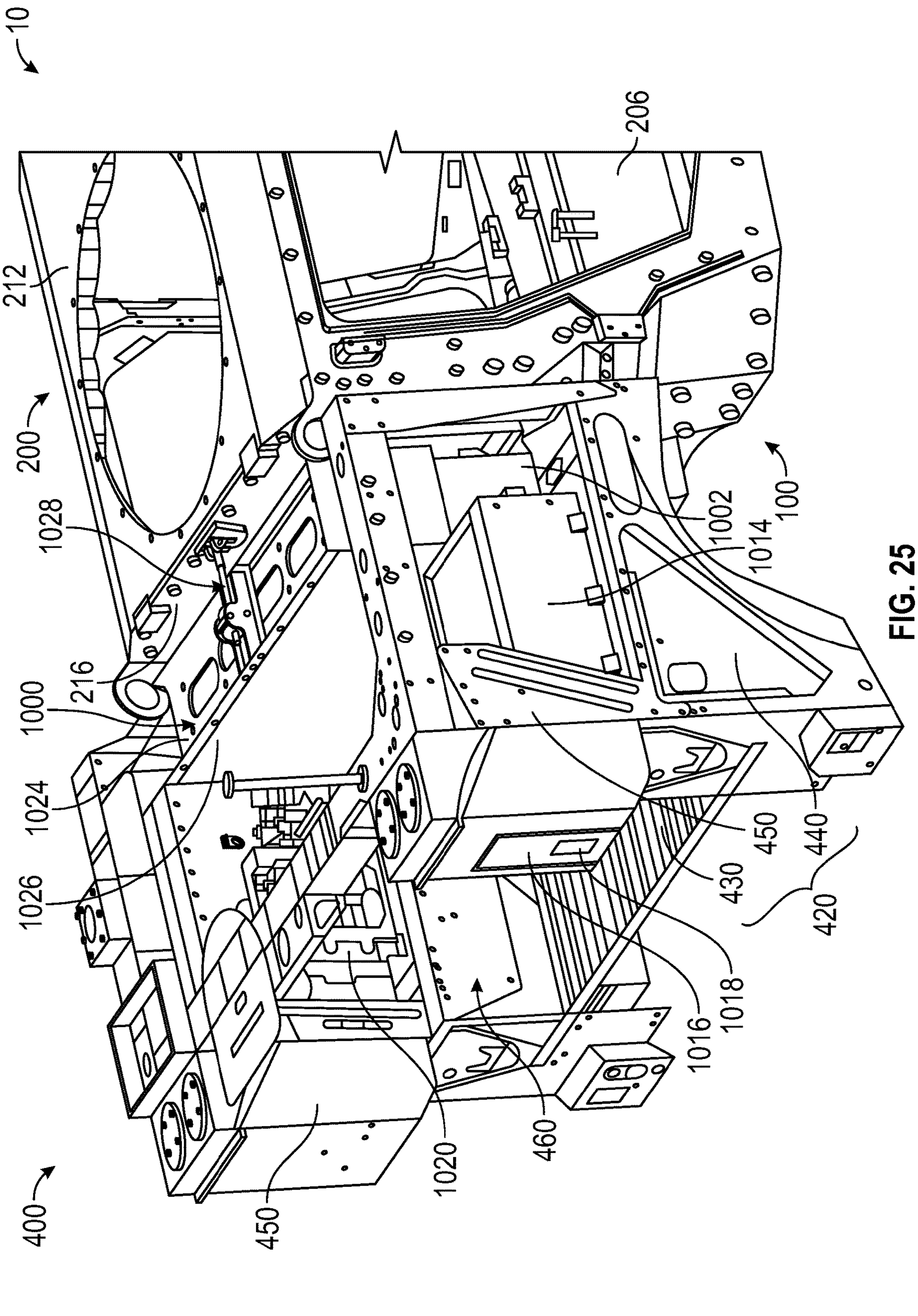
FIG. 25 is a rear perspective view of the vehicle of FIG. 1 including the ESS of FIG. 24, according to an exemplary embodiment.
Figure 26:
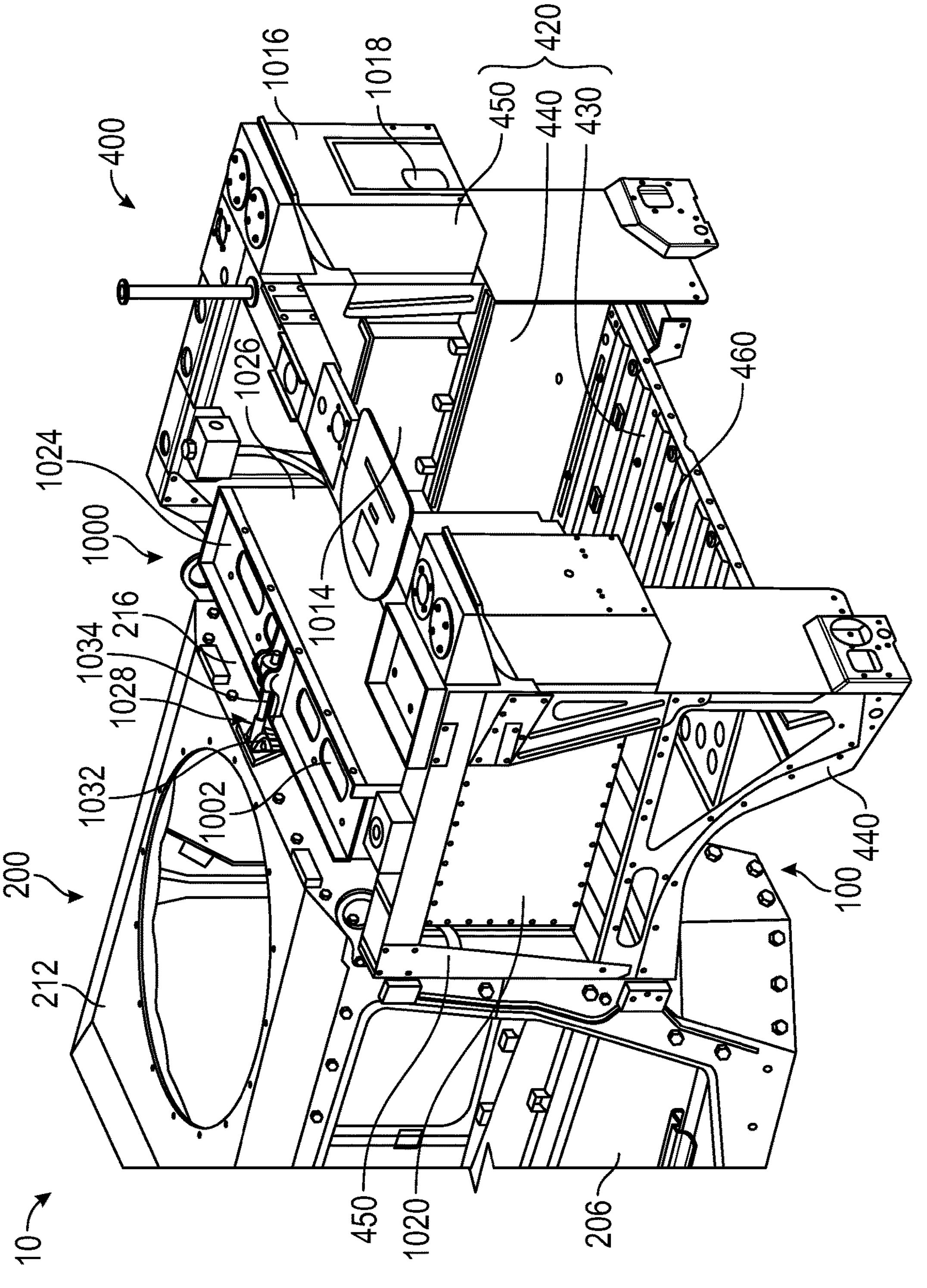
FIG. 26 is another rear perspective view of the vehicle of FIG. 25, according to an exemplary embodiment.

As shown in FIG. 25, power conversion hardware 1014 (e.g., a DC/DC converter) is coupled to the rear module 400 and structured to convert DC power received from either the IMG 700, the motor/generator 822, and/or the ESS 1000 and convert the DC power to power usable by the vehicle systems (e.g., 12 V, 24 V, and/or 48 V). A power panel 1016 is also coupled to the rear module 400 and provides a charging plug 1018 that can be used for plugging the ESS 1000 into an external power station for charging. Additionally, the power panel 1016 can include external power output that receive cords, plugs, or other power connections configured to provide power to external components and systems. An AC power system 1020 includes inverters that convert (i) available DC power from the IMG 700, the motor/generator 822, and/or the ESS 1000 into AC power for consumption by components of the vehicle 10 and/or external systems and/or (ii) AC power from the IMG 700 and/or the motor/generator 82 into DC power for consumption by components of the vehicle 10 and/or external systems. In some embodiments, the charging plug 1018 is an external plug positioned above the rear, driver side wheel well of the rear module 400.

The engine 610, the IMG 700, the motor/generator 822, the charge controller 1012, and the batteries 1008 are sized such that electrical power generation through engine drive of the IMG 700 and/or the motor/generator 822 of the FEAD 800 is greater than the power depletion through operation of the vehicle 10 in the silent mobility mode. In other words, the charge time through engine 610 generation of electrical power via the IMG 700 and/or the motor/generator 822 of the FEAD 800 is less than the depletion time in an electric vehicle drive mode (i.e., takes less time to charge than to deplete). The batteries 1008 can be charged in a first time by the motor generator (e.g., the motor generator 822 and/or the IMG 700). The batteries 1008 are depleted in the silent mobility mode in a second time. The first time is less than the second time. In some embodiments, the vehicle 10 is structured to operate in any combination of engine 610 powered, IMG 700 powered, motor/generator 822 powered, engine 610 charging the ESS 1000, etc. For example, a blended power mode can include propulsion of the vehicle 10 via both electrical power and engine generated power. The engine 610 can charge the ESS 1000 while the vehicle 10 is driving or stationary.

Between-the-Wheels Configuration

As shown in FIGS. 25-30, the ESS 1000 is mounted in the bed cavity 460 of the rear module 400 adjacent the rear wall 216 of the passenger capsule 200 in between the wheel wells 440. A bracket 1024 supports the ESS 1000 in position and includes a protective plate 1026 that shields the ESS 1000 from impact. The protective plate 1026 may surround the ESS 1000 to provide protection from vulnerable directions. The bracket 1024 may include a vibration damping material disposed between the bracket 1024, the protective plate 1026, and the ESS 1000 to inhibit vibrational transfer between the hull and frame assembly 100 and the ESS 1000. In some embodiments, the protective plate 1026 is formed from similar materials to the body or frame of the vehicle 10 to inhibit the intrusion of hostile fragments, blasts, or projectiles.

The bracket 1024 is mounted to the vehicle 10 with an upper isolator mount 1028 that is connected between the bracket 1024 and the passenger capsule 200. In some embodiments, the upper isolator mount 1028 is generally centered on the bracket 1024 and connected to the rear wall 216 of the passenger capsule 200. The upper isolator mount 1028 provides front-to-back vibration isolation relative to the passenger capsule 200. In some embodiments, the upper isolator mount 1028 includes a spring damper shock system coupled between the bracket 1024 and the passenger capsule 200. In some embodiments, the upper isolator mount 1028 includes a pneumatic damper or a hydraulic fluid damper. In some embodiments, the upper isolator mount 1028 is coupled between the bracket 1024 and another portion of the vehicle 10 and/or the hull and frame assembly 100. In some embodiments, the upper isolator mount 1028 includes a plate 1032 rigidly coupled to the passenger capsule 200 (e.g., by welding, fastening, etc.) and a rod 1034 coupled to the plate 1032 with a spherical rod end. The rod 1034 is fastened to the bracket 1024 using a nut, a weld, or a captured end. In some embodiments, the ESS 1000 includes a plurality of the upper isolator mounts 1028.

Figure 27:
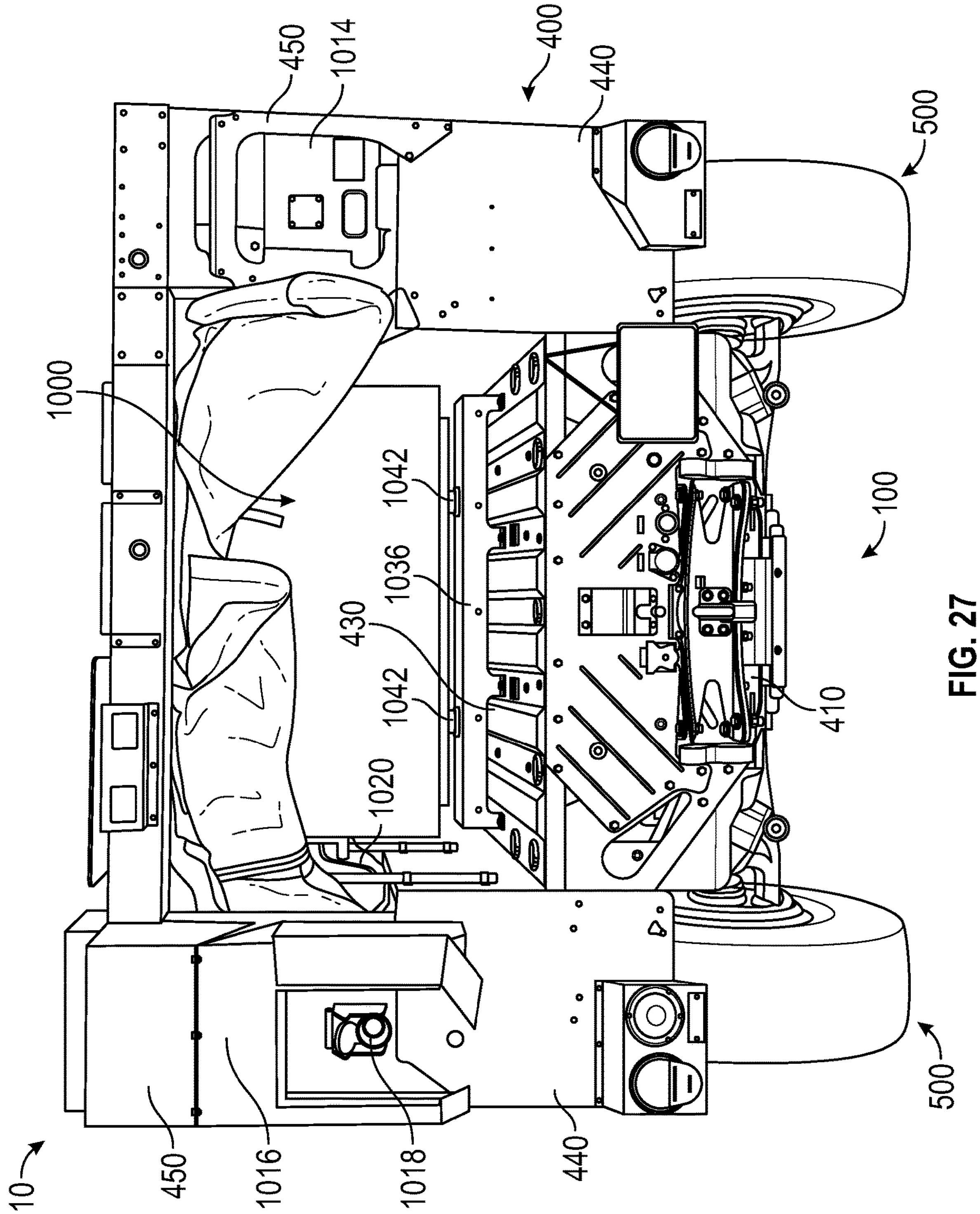
FIG. 27 is a rear view of the vehicle of FIG. 25 having a bed cavity, according to an exemplary embodiment.
Figure 28:
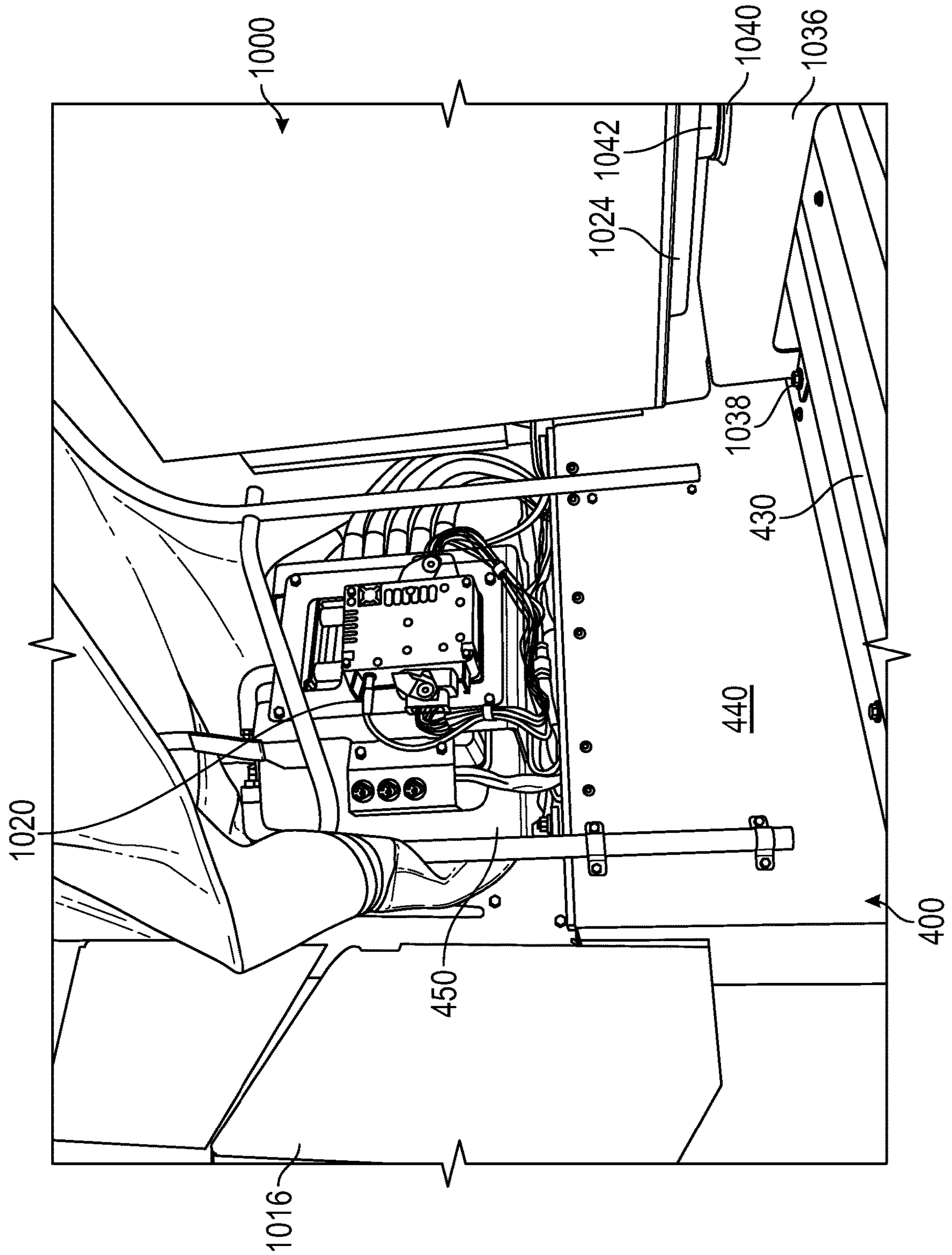
FIG. 28 is a detailed perspective view of the bed cavity of FIG. 27, according to an exemplary embodiment.
Figure 29:
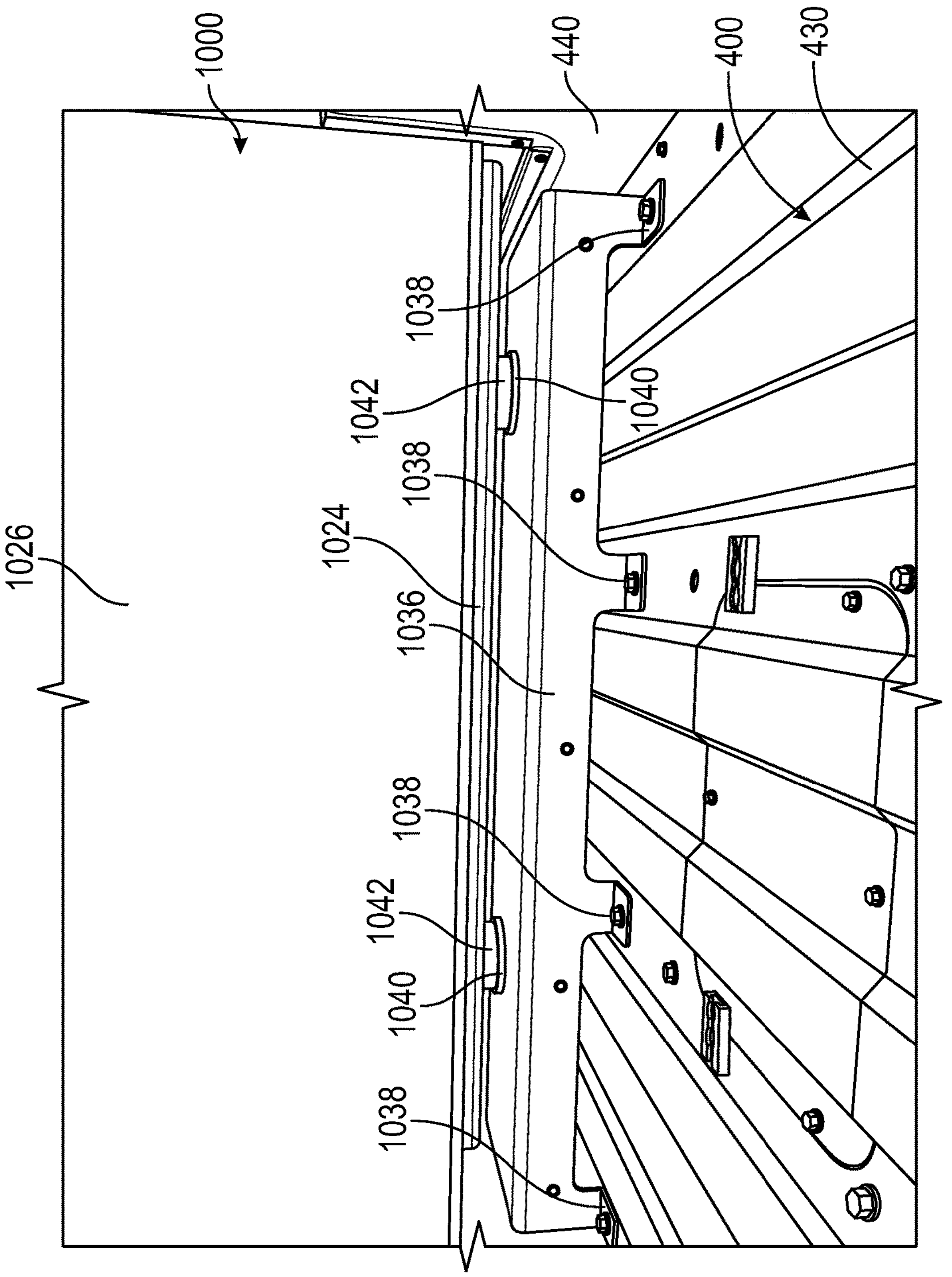
FIG. 29 is another detailed perspective view of the bed cavity of FIG. 27, according to an exemplary embodiment.
Figure 30:
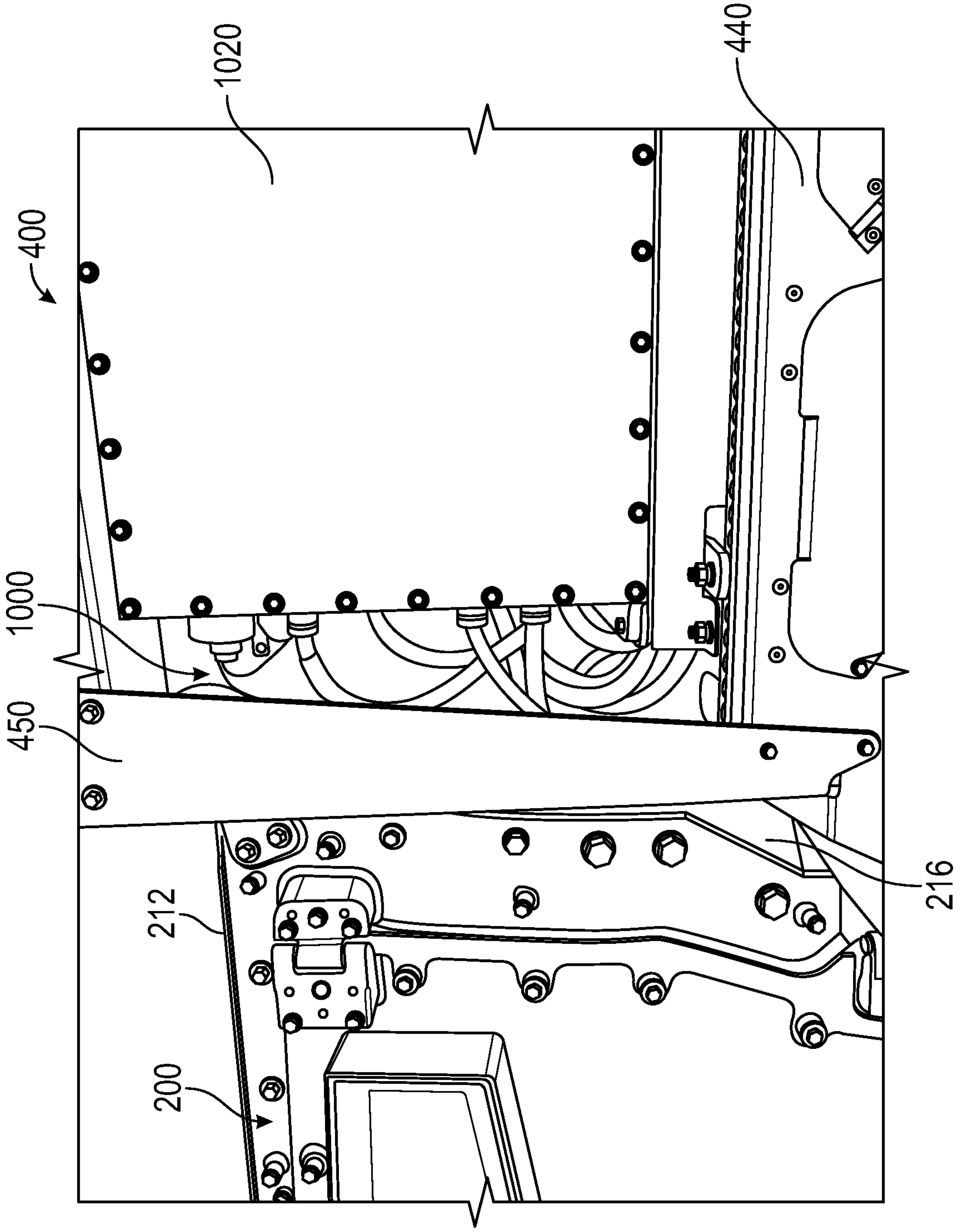
FIG. 30 is a detailed perspective view of a rear portion of the vehicle of FIG. 25, according to an exemplary embodiment.

As shown in FIGS. 27-29, a lower support 1036 is coupled to the bed 430. For example, four legs 1038 are coupled to the bed 430 using fasteners. In some embodiments, more than four or less than four legs 1038 are included. In some embodiments, the lower support 1036 is welded to the bed 430 or formed as a part of the bed 430. The lower support 1036 includes ESS mount structures in the form of recesses 1040 sized to receive lower isolator mounts 1042. In some embodiments, the recesses 1040 are circular and the lower isolator mounts 1042 are secured using adhesive. In some embodiments, the recesses are square, rectangular, oval, or another shape. In some embodiments, the lower isolator mounts 1042 are fastened to the recesses 1040, captured within the recesses 1040, or otherwise held in place between the bracket 1024 and the lower support 1036. As shown in FIG. 29, two lower isolator mounts 1042 are used to support the bracket 1024 on the lower support 1036. In some embodiments, more than two or less than two lower isolator mounts 1042 are included. In some embodiments, the lower isolator mounts 1042 are rubber or another vibration attenuating material. In some embodiments, the bracket 1024 is adhered, fastened to, captured by, or otherwise directly coupled to the lower isolator mounts 1042.

The upper isolator mount 1028 and the lower isolator mounts 1042 maintain the bracket 1024, and thereby the ESS 1000, in position relative to the passenger capsule 200 and the rear module 400 during use of the vehicle 10. The ESS 1000 is positioned within the rear module 400. The weight of the ESS 1000 is supported by the rear subframe 410. The ESS 1000 is centered between the wheel wells 440 within the bed cavity 460 and supported on top of the bed 430.

In some embodiments, the AC power system 1020 (e.g., a high voltage inverter) and power distribution components are positioned in or above driver side stowage box 450 above the rear, driver side wheel well 440 with cables running to through the tunnel slot 208 of the structural tunnel 206 to the IMG 700, the motor/generator 822 of the FEAD 800, and other high voltage components. The power conversion hardware 1014 (700V to 24V) is positioned in or above the passenger side stowage box 450 above the rear, passenger side wheel well 440 and cables run therefrom to low voltage components (e.g., cab electronics, etc.).

Over-the-Wheels Configuration

Figure 32:
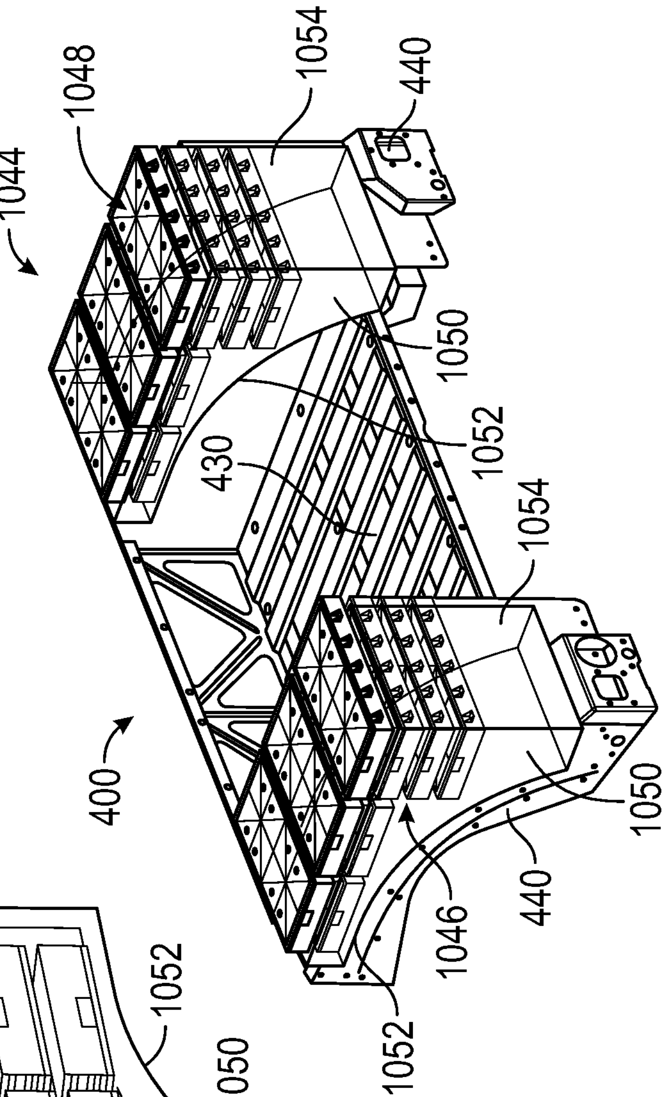
FIGS. 31 and 32 are various views of a portion of the vehicle of FIG. 1 including the ESS of FIG. 24, according to another exemplary embodiment.
Figure 31:
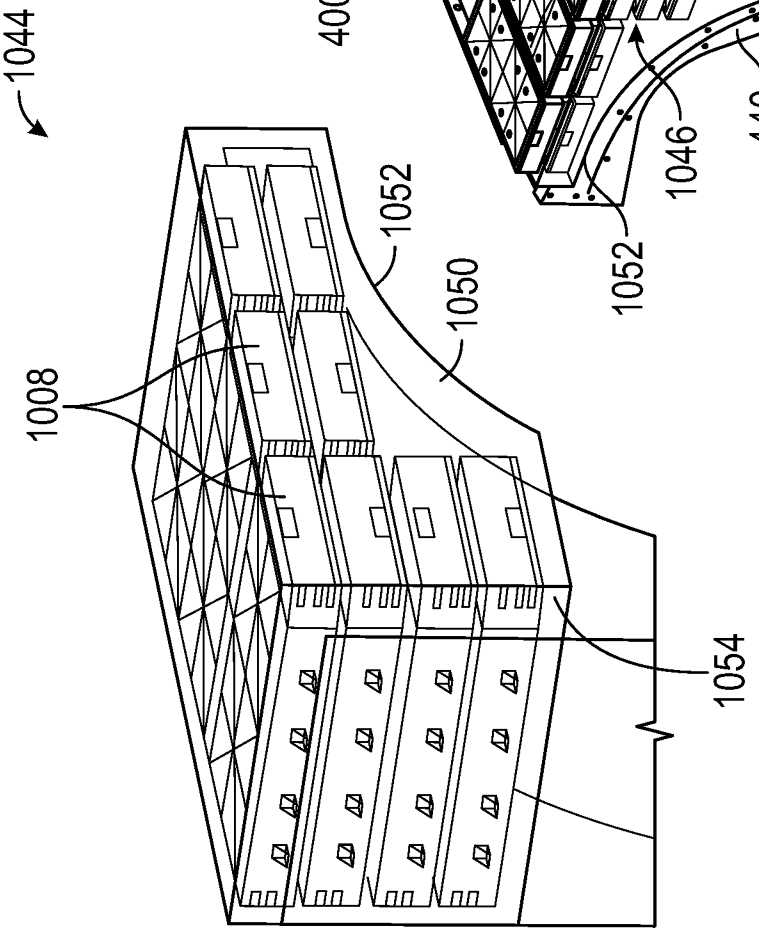

As shown in FIGS. 31 and 32, an ESS 1044 is structured to be supported above the wheel wells 440 of the rear module 400. In some embodiments, the ESS 1044 includes a first battery set 1046 positioned above a driver side wheel well 440 and/or a second battery set 1048 positioned above the passenger side wheel well 440. Each of the first battery set 1046 and the second battery set 1048 can include multiple batteries 1008 or multiple battery cells and be sized as discussed above in the cumulative (i.e., both battery sets) to provide the desired energy storage capacity.

The weight of the ESS 1044 is supported by the rear subframe 410. In some embodiments, the battery sets 1046, 1048 do not occupy space directly above the bed 430 or within the bed cavity 460. In some embodiments, the first battery set 1046 and/or the second battery set 1048 are additionally or alternatively positioned within the stowage boxes 450 above the wheel wells 440.

In some embodiments, the first battery set 1046 and the second battery set 1048 each include a housing 1050 having a curved surface 1052 shaped to conform to the wheel wells 440. The housing 1050 defines an internal volume sized to receive the batteries 1008. In some embodiments, the housing 1050 defines a rear portion 1054 with a substantially rectangular cross-section that is sized to accommodate one or more batteries 1008. In other words, the rear portion 1054 is positioned aft of the wheel well 440 and defines an area at least as big as a single battery 1008.

In some embodiments, the first battery set 1046 and the second battery set 1048 are fastened to the wheel wells 440. In some embodiments, the first battery set 1046 and the second battery set 1048 are formed as a part of the wheel wells 440 or the rear module 400 (e.g., the housing 1050 is formed as a part of the rear module 400). In some embodiments, the first battery set 1046 and the second battery set 1048 are held to the rear module 400 using brackets, welds, isolator mounts, vibrational dampers, or other rigid connections.

Under Cab Configuration

Figure 33:
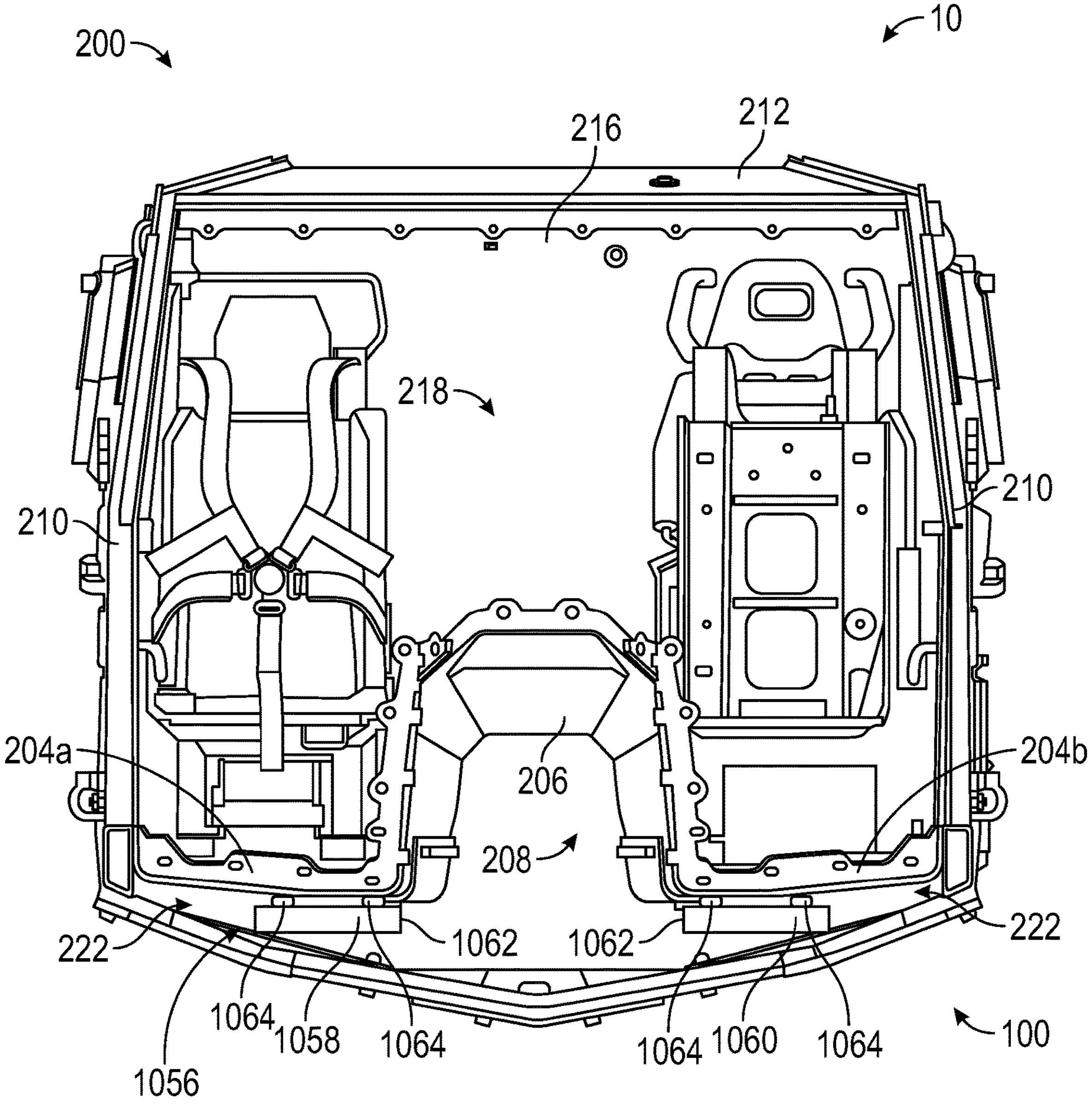
FIG. 33 is a section view of the vehicle of FIG. 1 including the ESS of FIG. 24, according to another exemplary embodiment.

As shown in FIG. 33, an ESS 1056 includes a first battery set 1058 and/or a second battery set 1060 coupled to the floor portions 204 of the passenger capsule 200 and positioned laterally outside of the structural tunnel 206 and spaced above the v-shaped belly deflector 220 within the air gap 222. Each of the first battery set 1058 and the second battery set 1060 includes a housing 1062 coupled to the floor portion 204 with isolator mounts 1064. In some embodiments, the housings 1062 are coupled to the v-shaped belly deflector 220 via isolator mounts in addition to, or as a replacement for, the isolator mounts 1064. In some embodiments, the housing 1062 includes a resilient bottom material to inhibit damage from impacts from below. For example, if the v-shaped belly deflector 220 is damaged, the housing 1062 can be structured to protect the ESS 1056 from damage. In some embodiments, the housing 1062 is formed from the same material as the v-shaped belly deflector 220. In some embodiments, the housing 1062 has a shape corresponding to the air gap 222 to substantially fill the air gap 222 and maximize the amount of battery capacity of the ESS 1056 within the air gap 222.

The weight of the ESS 1056 is carried by the hull and frame assembly 100 and/or the passenger capsule 200. In some embodiments, the weight of the ESS 1056 is supported by the floor portion 204 of the passenger capsule 200. Each of the first battery set 1058 and the second battery set 1060 can include multiple batteries 1008 or multiple battery cells and be sized as discussed above in the cumulative (i.e., both battery sets) to provide the desired energy storage capacity.

The position of the ESS 1056 below the floor portion 204 provides a low center of gravity. In some embodiments, the weight of the ESS 1056 is substantially all below the natural center of gravity of the vehicle 10 and the addition of the ESS 1056 lowers the center of gravity of the vehicle 10. In some embodiments, the ESS 1056 extends longitudinally along the length of the passenger capsule 200 and provides fore-aft stability ballast.

Extended Wheelbase Configuration

Figure 34:
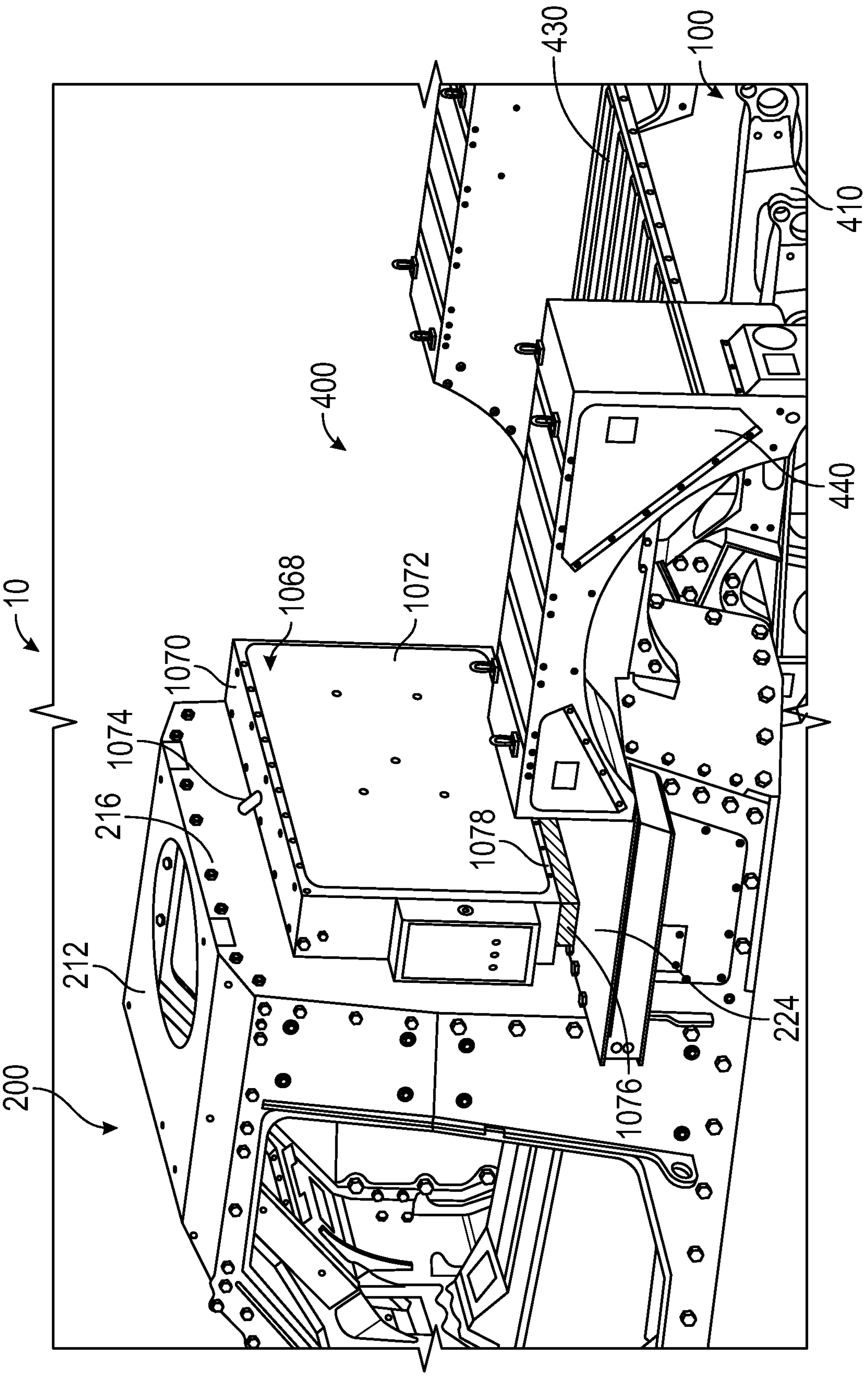
FIG. 34 is a perspective view of the vehicle of FIG. 8 including the ESS of FIG. 24, according to an exemplary embodiment.
Figure 35:
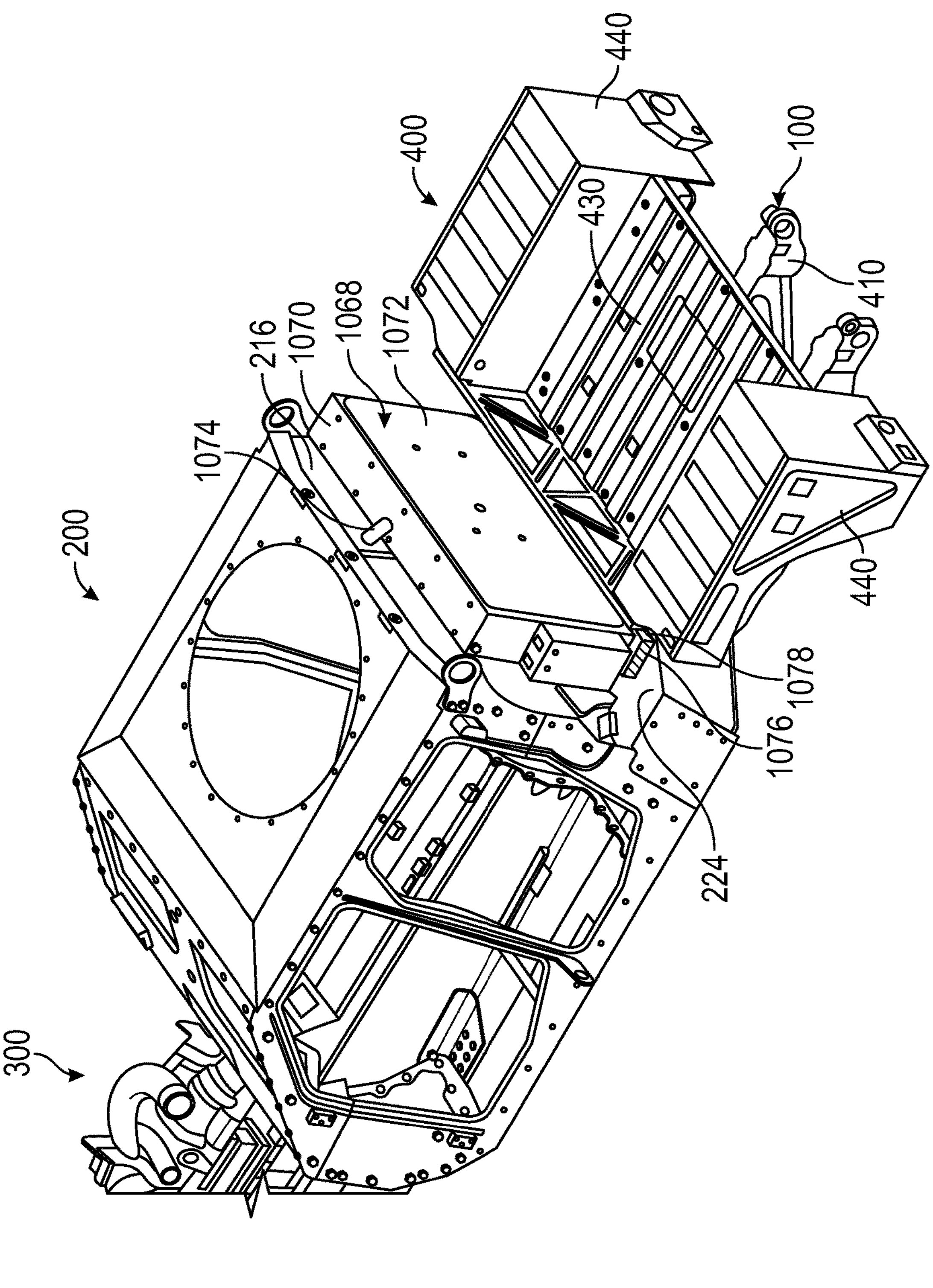
FIG. 35 is a perspective view of the vehicle of FIG. 7 including the ESS of FIG. 24, according to an exemplary embodiment.

As shown in FIGS. 34 and 35, an ESS 1068 is mounted on the capsule extension 224 of the passenger capsule 200 in between the rear wall 216 of the passenger capsule 200 and in front of the cargo body assembly 420. In some embodiments, a bracket 1070 supports the ESS 1068 in position and includes a protective plate 1072 that shields the ESS 1068 from impact. The protective plate 1072 may surround the ESS 1068 to provide protection from vulnerable directions (e.g., the rear and sides). The bracket 1070 may include a vibration damping material disposed between the bracket 1070, the protective plate 1072, and the ESS 1068 to inhibit vibrational transfer between the hull and frame assembly 100 and the ESS 1068. In some embodiments, the protective plate 1072 is formed from, similar materials to the body or frame of the vehicle 10 to inhibit the intrusion of hostile fragments, blasts, or projectiles.

The bracket 1070 is mounted to the vehicle 10 with an upper isolator mount 1074 that is connected between the bracket 1070 and the passenger capsule 200. In some embodiments, the upper isolator mount 1074 is generally centered on the bracket 1070 and connected to the rear wall 216 of the passenger capsule 200. The upper isolator mount 1074 provides front-to-back vibration isolation relative to the passenger capsule 200. In some embodiments, the upper isolator mount 1074 includes a spring damper shock system coupled between the bracket 1070 and the passenger capsule 200. In some embodiments, the upper isolator mount 1074 includes a pneumatic damper or a hydraulic fluid damper. In some embodiments, the upper isolator mount 1074 is coupled between the bracket 1070 and another portion of the vehicle 10 and/or the hull and frame assembly 100. In some embodiments, the upper isolator mount 1074 includes a plate rigidly coupled to the passenger capsule 200 (e.g., by welding, fastening, etc.) and a rod coupled to the plate with a spherical rod end. The rod is fastened to the bracket 1070 using a nut, a weld, or a captured end. In some embodiments, the ESS 1068 includes a plurality of the upper isolator mounts 1074.

A lower support 1076 is coupled to the capsule extension 224. For example, four legs are coupled to the capsule extension 224 using fasteners. In some embodiments, more than four or less than four legs are included. In some embodiments, the lower support 1076 is welded to the capsule extension 224 or formed as a part of the capsule extension 224. The lower support 1076 includes ESS mount structures in the form of recesses sized to receive lower isolator mounts 1078. In some embodiments, the recesses are circular and the lower isolator mounts 1078 are secured therein using adhesive. In some embodiments, the recesses are square, rectangular, oval, or another shape. In some embodiments, the lower isolator mounts 1078 are fastened to the recesses, captured within the recesses, or otherwise held in place between the bracket 1070 and the lower support 1076. In some embodiments, two lower isolator mounts 1078 are used to support the bracket 1070 on the lower support 1076. In some embodiments, more than two or less than two lower isolator mounts 1078 are included. In some embodiments, the lower isolator mounts 1078 are rubber or another vibration attenuating material. In some embodiments, the bracket 1070 is adhered, fastened to, captured by, or otherwise directly coupled to the lower isolator mounts 1078.

The upper isolator mount 1074 and the lower isolator mounts 1078 maintain the bracket 1070, and thereby the ESS 1068, in position relative to the passenger capsule 200 and the rear module 400, and on the capsule extension 224 during use of the vehicle 10. The ESS 1068 is positioned outside the rear module 400 (and the bed cavity 460 thereof) and is supported by the passenger capsule 200 and the hull and frame assembly 100. The weight of the ESS 1068 is supported by the capsule extension 224. The ESS 1068 may be centered between the wheel wells 440 or extend beyond the wheel wells 440.

In some embodiments, the extended wheel base utilizing the capsule extension 224 provides a fifteen inch gap between rear wall 216 and the rear module 400. In other words, the capsule extension 224 has a longitudinal length of at least fifteen inches. In some embodiments, the longitudinal length of the capsule extension 224 is less than or greater than fifteen inches. The longitudinal length of the capsule extension 224 accommodates the ESS 1068. In other words, the thickness of the ESS 1068 is equal to or less than the longitudinal length of the capsule extension 224.

The position of the ESS 1068 on the capsule extension 224 forward of the rear module 400 moves the center of gravity of the vehicle 10 toward to true center of the vehicle 10 and can improve handling characteristics of the vehicle 10 and overall vehicle stability. Additionally, the ESS 1068 is not positioned within the bed cavity 460 thereby providing a larger storage capacity of the rear module 400.

False Floor Configuration

Figure 36:
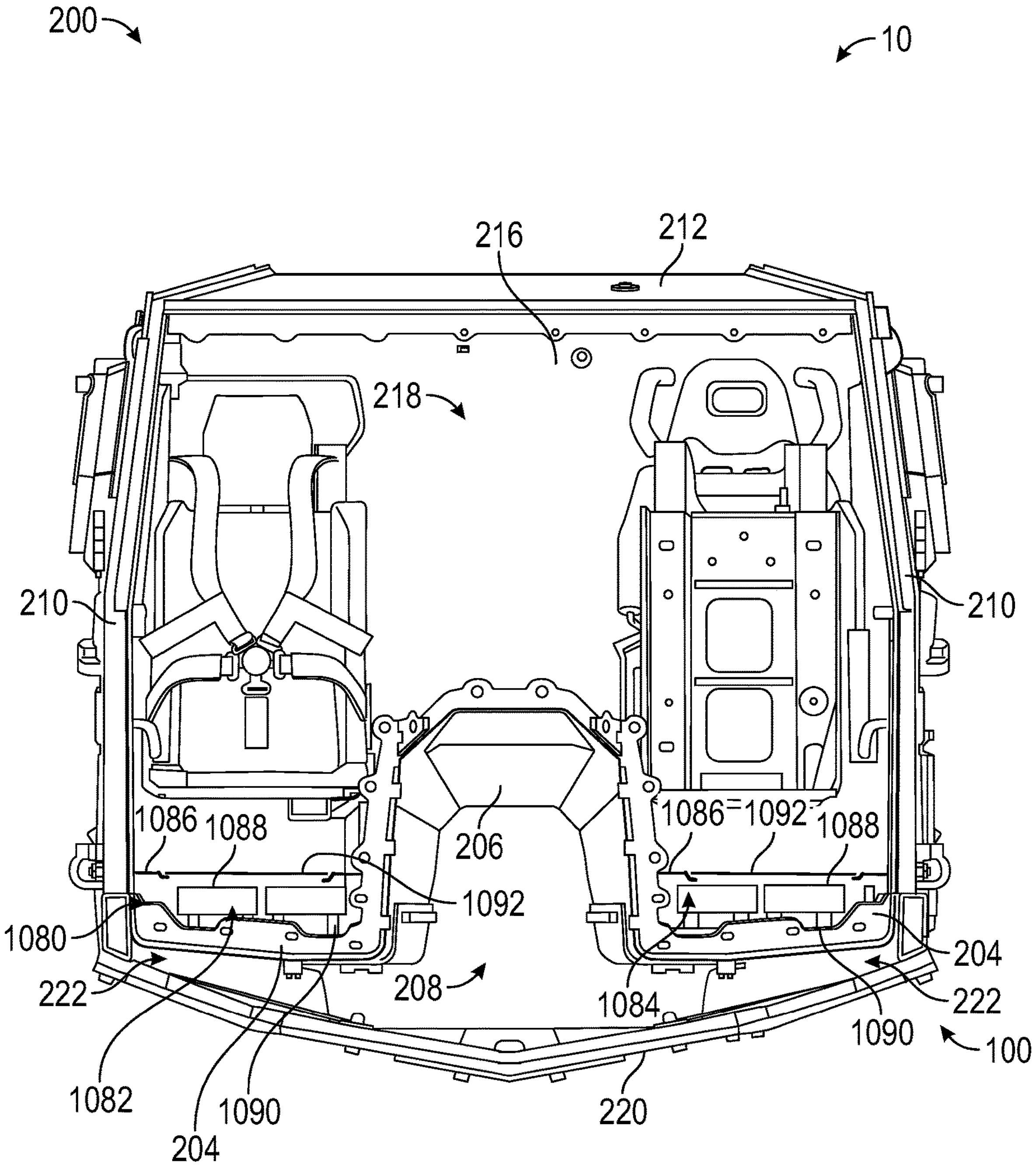
FIG. 36 is a section view of the vehicle of FIG. 1 including the ESS of FIG. 24, according to another exemplary embodiment.

As shown in FIG. 36, an ESS 1080 includes a first battery set 1082 and/or a second battery set 1084 coupled to the floor portions 204 of the passenger capsule 200 laterally outside of the structural tunnel 206 and spaced above the floor portions 204 and under a false floor 1086. Each of the first battery set 1082 and the second battery set 1084 includes a housing 1088 coupled top the floor portion 204 with isolator mounts 1090. In some embodiments, the housings 1088 are coupled to the false floor 1086 via isolator mounts in addition to, or as a replacement for, the isolator mounts 1090. In some embodiments, the housing 1088 is formed from the same material as the v-shaped belly deflector 220 and/or the floor portion 204.

The false floor 1086 includes a door or removable panel 1092 that provides access to the ESS 1080 from within the passenger compartment 218 of the passenger capsule 200. In some embodiments, the removable panel 1092 is a plate that is fastened in place. In some embodiments, the removable panel 1092 is hingedly coupled to the false floor 1086. In some embodiments, the removable panel 1092 is locked in place with a key.

The weight of the ESS 1080 is carried by the hull and frame assembly 100 and/or the passenger capsule 200. In some embodiments, the weight of the ESS 1080 is supported by the floor portion 204 of the passenger capsule 200. Each of the first battery set 1082 and the second battery set 1084 can include multiple batteries 1008 or multiple battery cells and be sized as discussed above in the cumulative (i.e., both battery sets) to provide the desired energy storage capacity.

The position of the ESS 1080 adjacent the floor portion 204 provides a low center of gravity. In some embodiments, the weight of the ESS 1080 is substantially all below the natural center of gravity of the vehicle 10 and the addition of the ESS 1080 lowers the center of gravity of the vehicle 10. In some embodiments, the ESS 1080 extends longitudinally along the length of the passenger capsule 200 and provides fore-aft stability ballast.

In some embodiments, the ESS 1000, the ESS 1044, the ESS 1056, the ESS 1068, and/or the ESS 1080 are used in combination.

Controls

Figure 37:
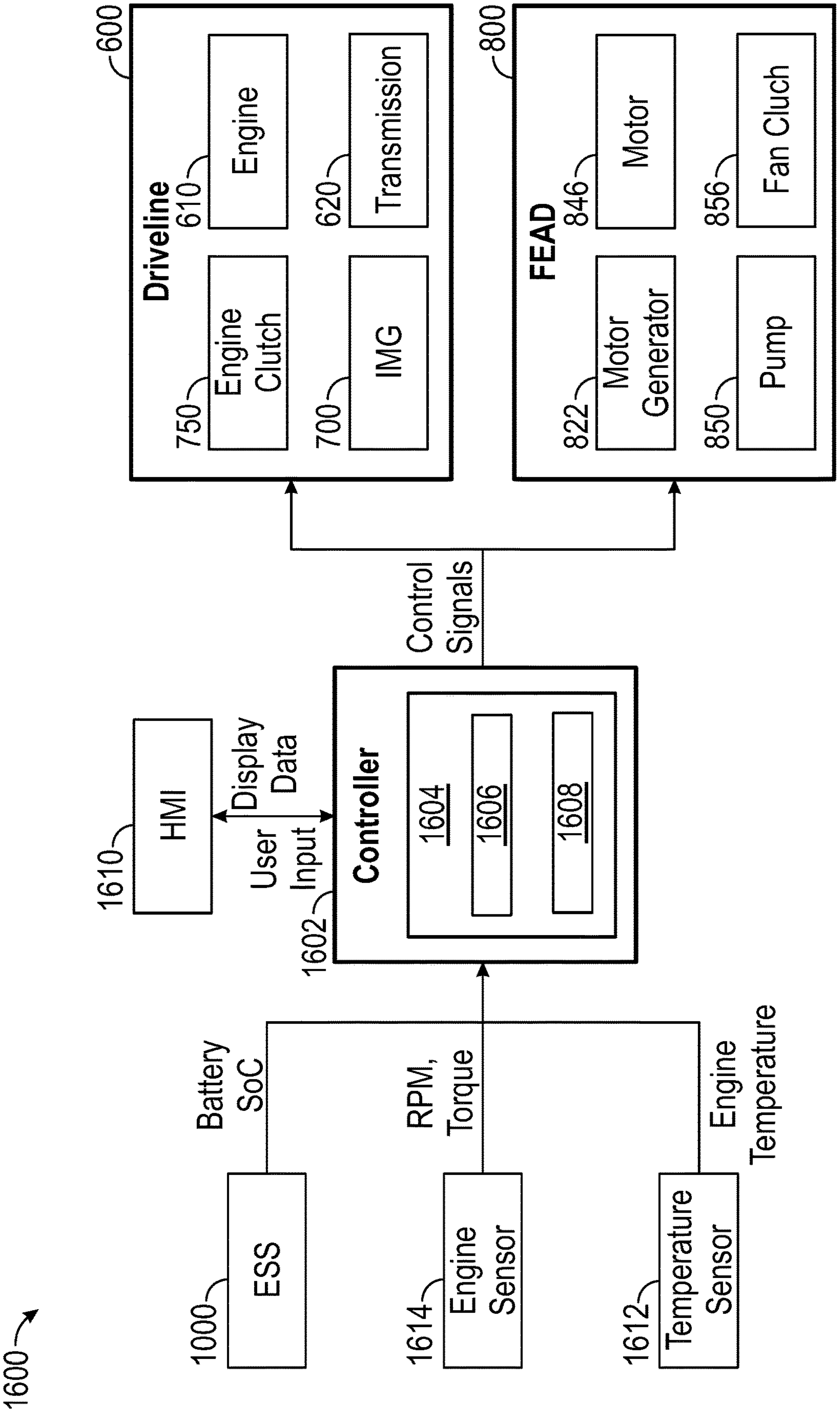
FIG. 37 is a block diagram of a control system for the vehicle of FIG. 1, according to an exemplary embodiment.
Figure 38:
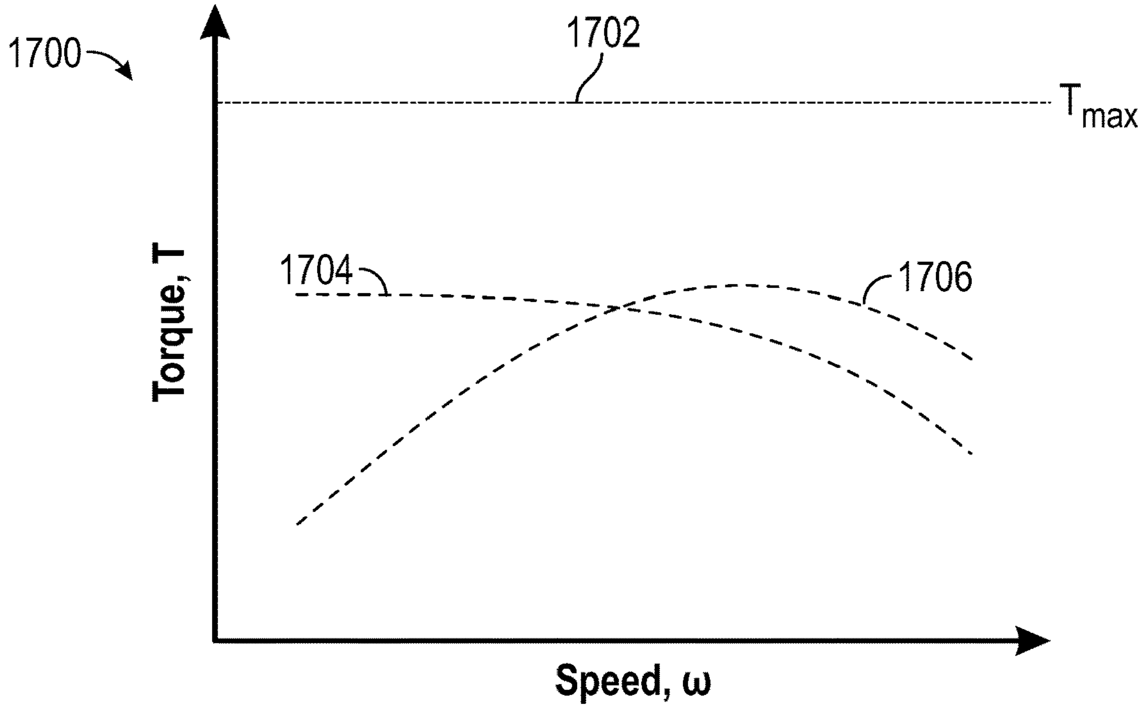
FIG. 38 is a graph showing torque versus speed for an internal combustion engine and an electric motor, the graph including a maximum torque as defined by a transmission of the driveline of FIG. 9, according to an exemplary embodiment.
Figure 39:
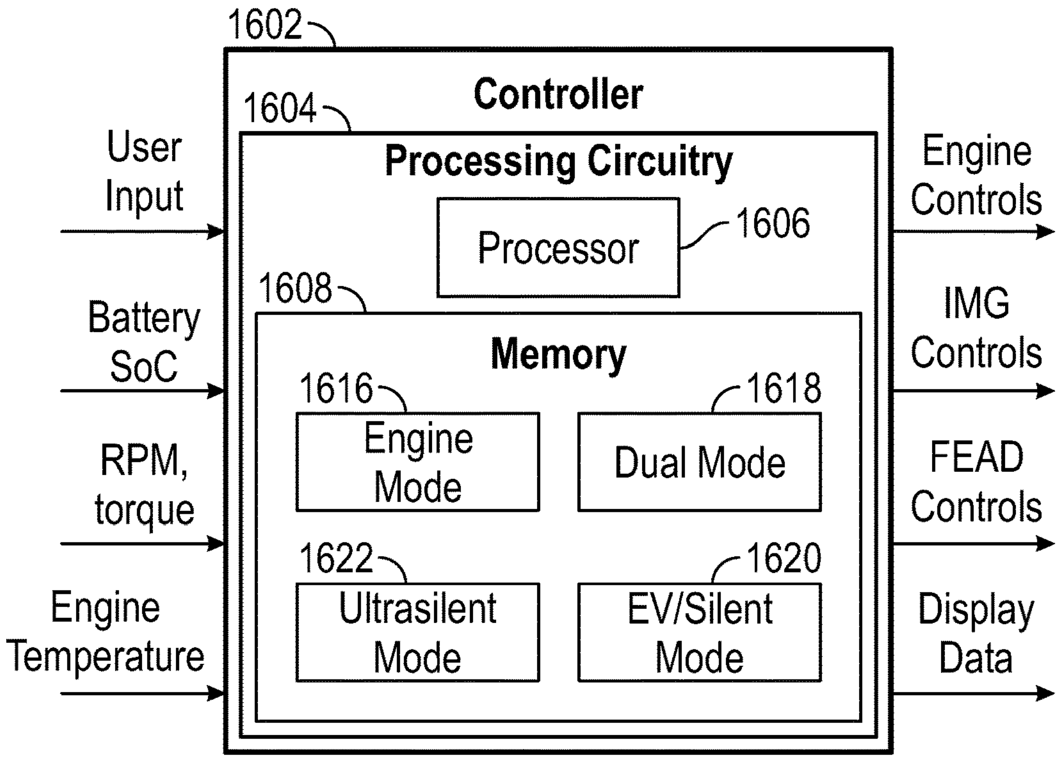
FIG. 39 is a block diagram of a controller of the control system of FIG. 37, according to an exemplary embodiment.

Referring to FIGS. 37-39, the vehicle 10 can include a control system 1600 for controlling the vehicle 10 or systems of the vehicle 10 between and according to different modes of operation. In some embodiments, the vehicle 10 is operable in an engine mode, a dual-drive mode, an EV/silent mode, and/or an ultrasilent mode. The control system 1600 includes a controller 1602 configured to transition the vehicle 10 between the different modes. According to exemplary embodiment, the control system 1600 is configured to provide control signals to the driveline 600 (e.g., the engine 610, the transmission 620, the IMG 700, the FEAD 800, etc.) to transition the driveline 600 and the FEAD 800 between the different modes.

As shown in FIG. 37, the control system 1600 includes the controller 1602, an operator interface, shown as human machine interface ("HMI") 1610, the ESS 1000 (and/or sensors or controllers of the ESS 1000), a temperature sensor 1612, and an engine sensor 1614. The ESS 1000 is configured to provide detected battery SoC of batteries or energy storage devices of the ESS 1000 to the controller 1602. The engine sensor 1614 can be a sensor of the engine 610, feedback from a controller of the engine 610, etc. to provide current speed w of the engine 610 (e.g., revolutions per minute "RPM") and/or current torque t of the engine 610. The temperature sensor 1612 is configured to provide a detected, measured, or sensed temperature of the engine 610 and/or of other components of the vehicle 10 (e.g., the ESS 1000, the transmission 620, etc.) to the controller 1602. The HMI 1610 is configured to receive a user input and provide the user input to the controller 1602 (e.g., a selection of a specific mode). The controller 1602 is configured to use any of the battery SoC, the current speed w of the engine 610, the current torque t of the engine 610, the temperature of the engine 610 (or other components), and/or the user input to transition the vehicle 10 (e.g., the driveline 600 and the FEAD 800) between the different modes, and to operate the vehicle 10 (e.g., the driveline 600 and the FEAD 800) according to the different modes. The HMI 1610 can be positioned within the passenger compartment 218 of the passenger capsule 200 of the vehicle 10.

As shown in FIGS. 37 and 39, the controller 1602 includes a processing circuit 1604 including a processor 1606 and memory 1608. The processing circuit 1604 can be communicably connected to a communications interface such that the processing circuit 1604 and the various components thereof can send and receive data via the communications interface. The processor 1606 can be implemented as a general purpose processor, an application specific integrated circuit ("ASIC"), one or more field programmable gate arrays ("FPGAs"), a group of processing components, or other suitable electronic processing components.

The memory 1608 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 1608 can be or include volatile memory or non-volatile memory. The memory 1608 can include database components, object code components, script components, or any other type of information structure for supporting the various activities and information structures described in the present application. According to some embodiments, the memory 1608 is communicably connected to the processor 1606 via the processing circuit 1604 and includes computer code for executing (e.g., by the processing circuit 1604 and/or the processor 1606) one or more processes described herein.

As shown in FIG. 39, the memory 1608 includes an engine mode 1616, a dual-drive mode 1618, an EV/silent mode 1620, and an ultrasilent mode 1622, according to an exemplary embodiment. The processing circuit 1604 is configured to transition between the different modes and operate the vehicle 10 according to an active one of the engine mode 1616, the dual-drive mode 1618, the EV/silent mode 1620, or the ultrasilent mode 1622. The controller 1602 may transition between the modes in response to a user input, or at least partially automatically (e.g., based on sensor data). The controller 1602 generates engine control signals for the engine 610, the engine clutch 750, and/or the transmission 620, IMG control signals for the IMG 700, FEAD control signals for the FEAD 800 or controllable components thereof, and display data for the HMI 1610 according to the active one of the modes 1616-1622. The HMI 1610 can be or include any of a display screen, a touch screen, input buttons, levers, a steering wheel, a joystick, alert lights, alert speakers, etc., or any other component configured to facilitate input of data from the user to the controller 1602 or output of data from the controller 1602 to the HMI 1610.

Engine Mode

According to an exemplary embodiment, the control system 1600 is configured to operate the vehicle 10 according to the engine mode 1616. In some embodiments, the controller 1602 transitions the vehicle 10 into the engine mode 1616 when a user input is received from the HMI 1610 to operate the vehicle 10 according to the engine mode 1616. In some embodiments, the engine mode 1616 is a default mode of operation of the vehicle 10.

When the vehicle 10 is operated by the controller 1602 according to the engine mode 1616, control signals are generated by the controller 1602 and provided to the driveline 600 so that the engine 610 operates to drive the driveline 600 through the IMG 700 and the transmission 620. The controller 1602 can also provide control signals to the IMG 700 so that the IMG 700 functions as a generator, is driven by the engine 610, and generates electrical energy that is provided to the ESS 1000 for storage, and/or provided to electrical components of the vehicle 10 for consumption. The engine 610 also drives the FEAD 800 in the engine mode 1616, according to some embodiments. In some embodiments, in the engine mode 1616, the controller 1602 is configured to provide control signals to the motor/generator 822 of the FEAD 800 such that the motor/generator 822 functions as a generator and is driven by the engine 610. The motor/generator 822 of the FEAD 800 generates electrical energy when driven by the engine 610 and provides the electrical energy to the ESS 1000 for storage and later use, and/or provides the electrical energy to electrical components of the vehicle 10 for consumption. In the engine mode 1616, the engine 610 may therefore drive the IMG 700, the FEAD 800, and/or the transmission 620. The engine 610 drives the axle assemblies 500 or tractive elements thereof by driving the transmission 620.

The engine 610 drives the FEAD 800 and the accessories of the FEAD 800 (e.g., the hydraulic pump 832, the air compressor 808, the fan 810, the motor/generator 822). The engine 610 may also selectively drive the fan 810 through selective engagement of the fan clutch 856. In some embodiments, the controller 1602 is configured to use the engine temperature from the temperature sensor 1612 to transition the fan clutch 856 between an engaged state and a disengaged state. For example, when the engine temperature exceeds a predetermined value, the controller 1602 may transition the fan clutch 856 into the engaged state so that the fan 810 is driven by the engine 610 to cool the engine 610 (and/or other components of the vehicle 10). When the engine temperature decreases below another predetermined temperature, the controller 1602 can generate control signals for the fan clutch 856 to transition the fan clutch 856 into the disengaged state. In some embodiments, the controller 1602 is configured to operate the HMI 1610 to provide an alert or display to the user that the fan clutch 856 is about to be actuated to the engaged state. In some embodiments, the controller 1602 operates the HMI 1610 to display a current status of the fan clutch 856.

Dual-Drive Mode

According to an exemplary embodiment, the controller 1602 is configured to transition the vehicle 10 into the dual-drive mode 1618 and operate the vehicle 10 according to the dual-drive mode 1618. In another embodiment, the controller 1602 does not include the dual-drive mode 1618. In the dual-drive mode 1618, both the engine 610 and the IMG 700 operate to provide torque to tractive elements of the vehicle 10 through the transmission 620. The engine 610 and the IMG 700 can both operate to provide a maximum torque to the transmission 620 as defined by specifications or ratings of the transmission 620. In the dual-drive mode 1618, the IMG 700 and the engine 610 cooperatively operate to drive the driveline 600.

As shown in FIG. 38, a graph 1700 illustrates a maximum allowable torque 1702, an electric motor torque speed curve 1704, and an engine torque speed curve 1706. The maximum allowable torque 1702 is defined by a rating or capability of the transmission 620. When the vehicle 10 is in the dual-drive mode 1618, the controller 1602 is configured to (i) monitor torque and speed of the engine 610 (e.g., as provided by the engine sensor 1614, a defined by a predetermined torque-speed curve for the engine 610, etc.) and (ii) determine, based on the maximum allowable torque 1702 (e.g., based on a comparison between the current torque of the engine 610 and the maximum allowable torque 1702), an additional amount of torque that can be supported by the transmission 620. If the transmission 620 can support additional torque, the controller 1602 is configured to operate the IMG 700 (e.g., by generating and providing control signals to the IMG 700) to provide additional torque to the transmission 620. In some embodiments, the controller 1602 is configured to operate the IMG 700 to provide additional torque so that a combined torque output by the IMG 700 and the engine 610 is equal to or less than the maximum allowable torque 1702 supported by the transmission 620.

The dual-drive mode 1618 can be similar to the engine mode 1616 but with the additional torque provided to the transmission 620 by the IMG 700 (e.g., with the IMG 700 operating as an electric motor). In some embodiments, the IMG 700 and the engine 610 both operate to provide combined torque to the transmission 620 at a same speed. In some embodiments, the speeds of the IMG 700 and the engine 610 are different.

Advantageously, the dual-drive mode 1618 can be used when the vehicle 10 climbs a hill, when the vehicle 10 is under enemy fire, etc. to provide enhanced acceleration and gradeability. In some embodiments, the dual-drive mode 1618 includes operating the engine 610 and the IMG 700 cooperatively to consistently (e.g., over time, or when the dual-drive mode 1618 is active) provide the maximum allowable torque 1702 to the transmission 620. In some embodiments, the controller 1602 is configured to transition the vehicle 10, or more specifically the driveline 600, into the dual-drive mode 1618 in response to a user input received via the HMI 1610. In some embodiments, the controller 1602 is configured to automatically transition the driveline 600 into the dual-drive mode 1618 in response to sensor data indicating a slope, tilt, roll, or angle of the vehicle 10 (e.g., to detect when the vehicle 10 is climbing a hill and additional or assisting torque from the IMG 700 may be advantageous).

Silent Mode

According to an exemplary embodiment, the controller 1602 includes the EV/silent mode 1620 and is configured to operate the driveline 600 according to the EV/silent mode 1620 in response to receiving a user input from the HMI 1610 to operate according to the EV/silent mode 1620. In the EV/silent mode 1620, the controller 1602 is configured to generate control signals for the engine 610 and provide the control signals to the engine 610 to shut off the engine 610. Advantageously, shutting off the engine 610 reduces a sound output of the vehicle 10 to facilitate substantially quieter operation of the vehicle 10. When the engine 610 is shut off, the driveline 600 (e.g., tractive elements of the axle assemblies 500) is driven by the IMG 700. The IMG 700 can function as an electric motor, consuming electrical energy from the ESS 1000 to drive the vehicle 10 (e.g., for transportation of the vehicle 10). Advantageously, shutting off the engine 610 also reduces a thermal signature of the vehicle 10 to facilitate concealment or harder thermal detection of the vehicle 10.

In the EV/silent mode 1620, the FEAD 800 is driven by the motor/generator 822 as described in greater detail above with reference to FIGS. 15-19. Shutting off the engine 610, driving the transmission 620 with the IMG 700, and driving the FEAD 800 with the motor/generator 822 can reduce an operational sound level of the vehicle 10 (relative to the engine mode 1616) by a significant amount. By way of example, Applicant performed a drive-by test in the engine mode and the silent mode, which resulted in about a 25 decibels (dB) reduction in sound when switching from the engine mode to the silent mode. The fan 810 and fan clutch 856 can be operated based on the temperature received from the temperature sensor 1612 as described in greater detail above with reference to the engine mode 1616. In some embodiments, the controller 1602 is configured to monitor the battery SoC of the ESS 1000 to determine an amount of energy remaining and an estimated remaining runtime of the vehicle 10 in the EV/silent mode 1620. In some embodiments, when the SoC of the ESS 1000 reduces to or below a first threshold, the controller 1602 operates the HMI 1610 to provide a warning to the user regarding the SoC of the ESS 1000. In some embodiments, the controller 1602 is configured to monitor electrical energy consumption or a rate of energy consumption of the ESS 1000 during the EV/silent mode 1620 to determine an estimated amount of runtime remaining for the vehicle 10 in the EV/silent mode 1620. In some embodiments, when the SoC of the ESS 1000 reduces to a minimum allowable level (e.g., 20% SoC), the controller 1602 is configured to automatically transition the vehicle 10 into the engine mode 1616 (e.g., starting the engine 610 by engaging the engine clutch 750). In some embodiments, the controller 1602 is configured to operate the HMI 1610 to notify the user prior to transitioning into the engine mode 1616. In some embodiments, the user can provide an input to override the automatic transition into the engine mode 1616, or to transition the vehicle 10 into the ultrasilent mode 1622.

When the vehicle 10 is operated according to the EV/silent mode 1620, the vehicle 10 may be configured to operate for at least 30 minutes at a speed of at least 25 mph (e.g., 30-35 minutes at 45 mph). In some embodiments, when in the EV/silent mode 1620, the FEAD 800 and, therefore, the fan 810 are driven by the motor/generator 822, independently of a speed of the IMG 700 that is used to drive the vehicle 10 for transportation (e.g., the transmission 620). In some embodiments, operating the fan 810 independently of operation of the IMG 700 facilitates operating the fan 810 at a constant speed (e.g., 1400 RPM) regardless of a speed of the IMG 700 (which prevents sound fluctuations that would otherwise occur due to increasing and decreasing the fan speed). However, when the vehicle 10 is operated in the engine mode 1616 and the engine 610 drives the FEAD 800, the speed of the fan 810 may vary based on variations of the speed of the engine 610.

Ultra-Silent Mode

According to an exemplary embodiment, the controller 1602 includes the ultrasilent mode 1622 and is configured to operate the vehicle 10 according to the ultrasilent mode 1622. In another embodiment, the controller 1602 does not include the ultrasilent mode 1622. When the vehicle 10 is operated according to the ultrasilent mode 1622, the controller 1602 is configured to maintain or transition the engine 610 in an off state (e.g., to reduce sound output) and drive the driveline 600 by operating the IMG 700 (e.g., to provide an output torque to the transmission 620). The ultrasilent mode 1622 can be similar to the EV/silent mode 1620 but with additional operations to further reduce sound output of the vehicle 10.

In some embodiments, the ultrasilent mode 1622 includes shutting off operation of the fan 810 by disengaging the fan clutch 856. Shutting off operation of the fan 810 by disengaging the fan clutch 856 can further reduce sound output of the vehicle 10. In some embodiments, during operation of the vehicle 10 in the ultrasilent mode 1622, automatic transitioning of the vehicle 10 into the engine mode 1616 (or more particularly, starting of the engine 610) is limited. In some embodiments, during operation of the vehicle 10 in the ultrasilent mode 1622, operation of the fan 810 of the FEAD 800, and activation of the engine 610 is limited, regardless of the temperature provided by the temperature sensor 1612, and the SoC of the batteries of the ESS 1000. In this way, the vehicle 10 can be operated in the ultrasilent mode 1622 even to the point of complete depletion of the ESS 1000. In some embodiments, the controller 1602 is configured to provide alerts, notifications, alarms, etc. to the user or operator of the vehicle 10 via the HMI 1610 to notify the operator that the batteries of the ESS 1000 are about to be depleted, that an overheat condition is proximate, etc. The operator may manually transition the vehicle 10 out of the ultrasilent mode 1622 (e.g., to start the engine 610 to charge the batteries of the ESS 1000 and/or to engage the fan 810 of the FEAD 800) as desired. Advantageously, operating the vehicle 10 according to the ultrasilent mode 1622 facilitates improved noise and thermal concealment of the vehicle 10.

Alternative Drivelines

Figure 40:
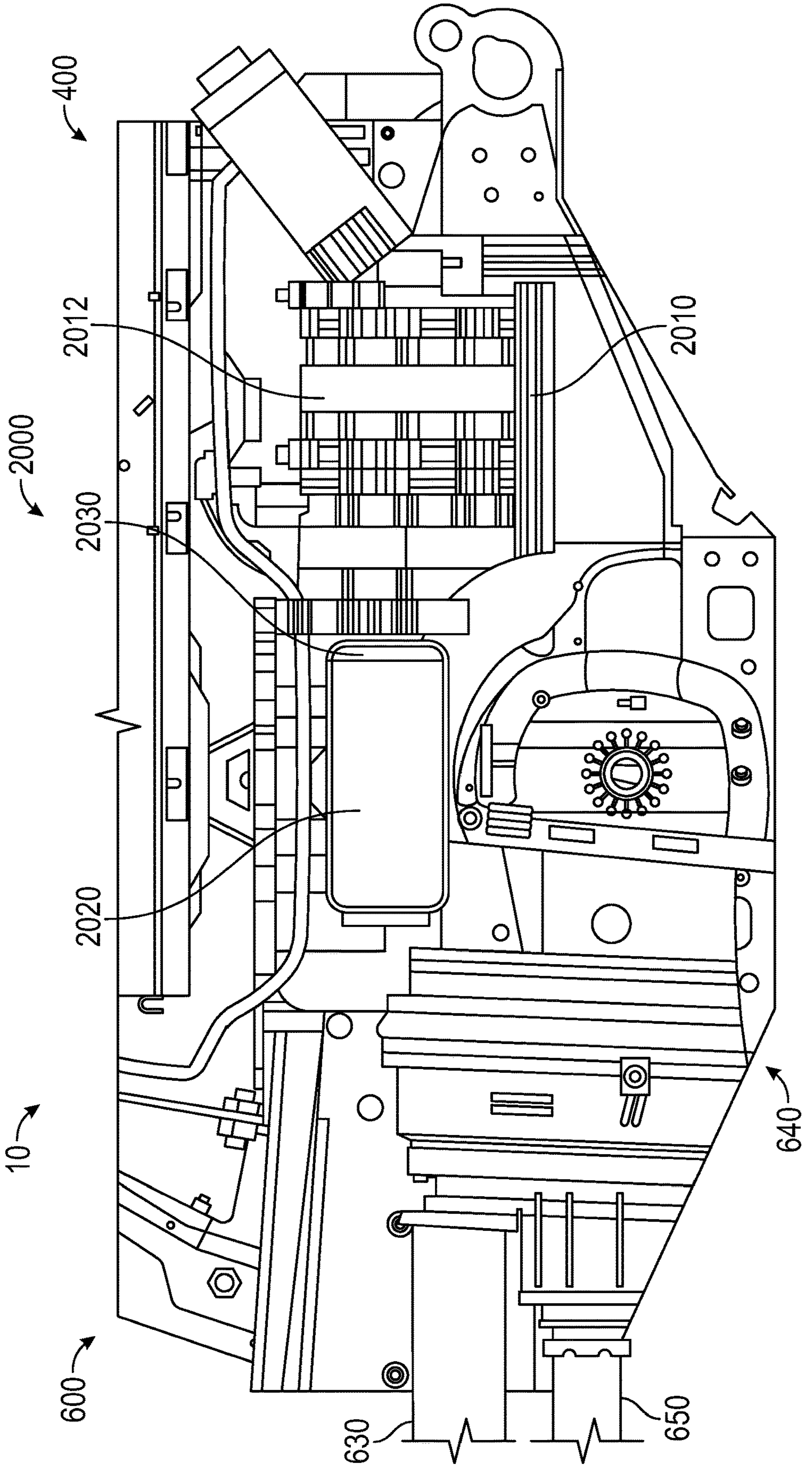
FIG. 40 is a partially transparent side view of the vehicle of FIG. 1 having a driveline including an engine, a transmission, a transaxle drive motor, and a gearbox, according to another exemplary embodiment.
Figure 41:
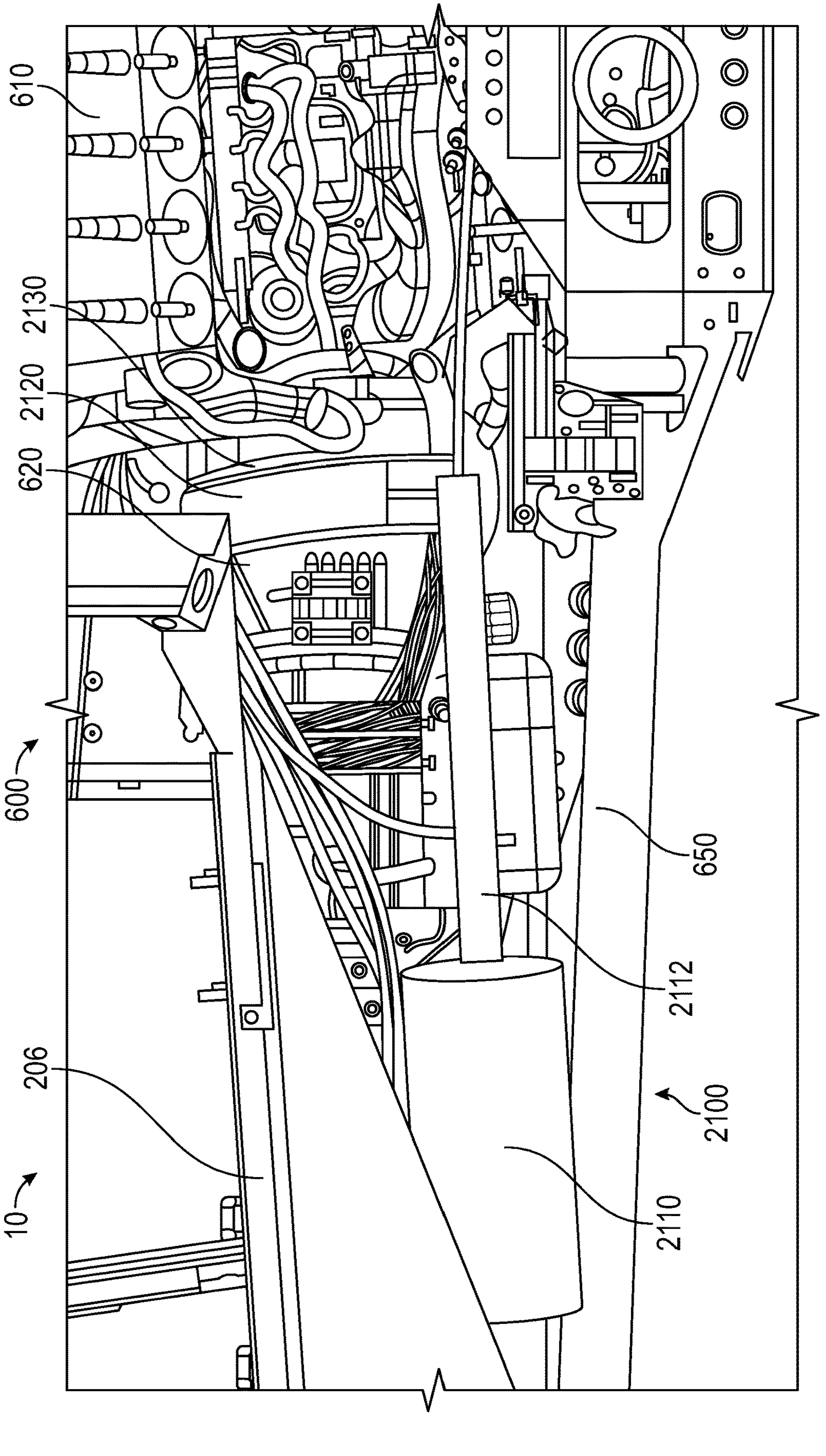
FIG. 41 is a partially transparent side view of the vehicle of FIG. 1 having a driveline including an engine, a transmission, a drive motor, and a gearbox arranged in a rear engine power take-off arrangement, according to another exemplary embodiment.
Figure 42:
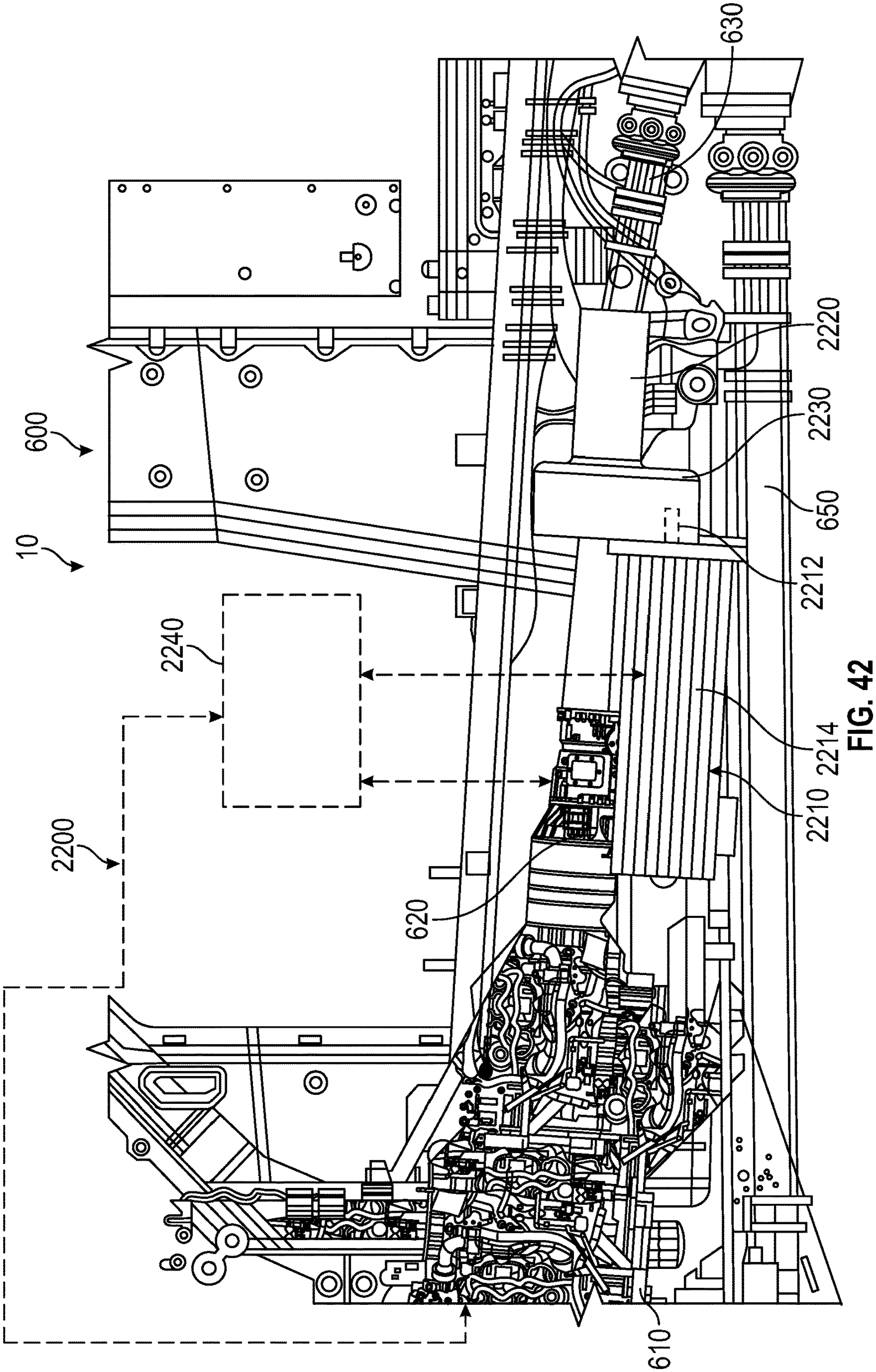
FIG. 42 is a partially transparent side view of the vehicle of FIG. 1 having a driveline including an engine, a drive motor, a transmission, and a gearbox, according to another exemplary embodiment.

According to the various embodiments shown in FIGS. 40-42 various other driveline arrangements for the driveline 600 (e.g., that do not include the IMG 700) can be incorporated into the vehicle 10 to enable multiple modes of vehicle travel. As discussed in detail below, a variety of alternative arrangements can provide the vehicle 10 with one or more of (i) an engine-only travel mode, (ii) an electric-motor only travel mode, and (iii) a hybrid or dual-drive travel mode where each of the engine 610 and an electric motor may variously function, depending on different traveling conditions (e.g., traveling downhill, uphill, below a threshold speed, above a threshold speed, etc.). In some examples, the driveline 600 can be arranged to operate the motor/generator 740 as a booster motor, such that each of the engine 610 and the motor/generator 740 simultaneously drive the transmission 620, and therefore the transaxle drive shaft 630 and the front axle drive shaft 650, providing a maximum output.

Electrified Transaxle

As shown in FIG. 40, the driveline 600 of the vehicle 10 includes a second electrified driveline arrangement replacing the IMG 700 with an electrified transaxle, shown as electrified transaxle assembly 2000. The electrified transaxle assembly 2000 is generally positioned within the rear module 400 (e.g., within the rear subframe 410), and is configured to supply rotational power to each of the rear axle and front axle assemblies 500 to drive the vehicle 10. The electrified transaxle assembly 2000 can be positioned opposite the engine 610 and transmission 620, and can be configured to selectively impart rotational motion to each of the transaxle drive shaft 630 and front axle drive shaft 650 to drive the vehicle 10.

The electrified transaxle assembly 2000 generally includes an electric drive motor 2010 and a gearbox 2020 positioned forward of and coupled to a driveshaft of the electric drive motor 2010. The gearbox 2020 can include one or more gears that engage with the transaxle 640 (e.g., one or more gears thereof), which then imparts rotational motion from the electric drive motor 2010 into each of the rear axle and front axle assemblies 500 to drive the vehicle 10. In some examples, the transaxle 640 further includes a clutch assembly that can selectively decouple or disengage electric drive motor 2010 from the transaxle 640, such that the vehicle 10 can be driven by the engine 610 and independent of the electric drive motor 2010 in certain instances (e.g., to execute an engine drive operation mode). The transmission 620 may be shifted to a neutral gear to decouple the electrified transaxle assembly 2000 from the engine 610 such that the vehicle 10 can be driven by the electric drive motor 2010 and independent of the engine 610 in certain instances (e.g., to execute a silent drive operation mode). In some examples, the electric drive motor 2010 is configured similarly to the motor/generator 740 described above, such that the electric drive motor 2010 can be configured to both draw power from, and generate and provide power to the ESS 1000, depending on the mode the vehicle 10 is in.

Using the vehicle 10 and the electrified transaxle assembly 2000, each of the travel modes described above can be performed by the vehicle 10. For example, in the engine-only travel mode, the engine 610 can once again supply rotational power to the transmission 620, which in turn rotates the transaxle drive shaft 630. The transaxle drive shaft 630 can in turn drive the transaxle 640, which drive the rear axle assembly 500, as well as the front axle drive shaft 650 to drive the front axle assembly 500. In some examples, rotation of the transaxle 640 can be used to drive the electric drive motor 2010 to generate electricity, which can be supplied to the ESS 1000. For example, when the transaxle clutch assembly 2030 is engaged and a gear within the gearbox 2020 engages the transaxle 640, rotation of the transaxle 640 will transmit rotational force through the gearbox 2020 to the driveshaft of the electric drive motor 2010. If the electric drive motor 2010 is configured as a motor/generator 740, as described above, rotation of the drive shaft within an electric drive motor housing 2012 (which includes wound coils) will generate electricity. The electricity generated can then be supplied to or otherwise transferred to the ESS 1000 for subsequent use. In some examples, the electric drive motor 2010 includes a transformer and/or an inverter (or rectifier) that are used to condition and step down or step up the generated electrical power prior to being supplied back to the ESS 1000.

In examples where the electric drive motor 2010 is configured as a motor only (e.g., and is not configured to generate and/or supply electrical power to the ESS 1000), the electric drive motor 2010 can be decoupled from the transaxle 640 using the transaxle clutch assembly 2030. The transaxle clutch assembly 2030 can decouple or disengage one or more of the gears within the gearbox 2020 from the transaxle 640, which then allows the transaxle 640 to rotate without transmitting rotational power through the gearbox 2020 and/or to the electric drive motor 2010. In some examples, the gears within the gearbox 2020 remain in contact with the transaxle 640, but are disengaged with a gearbox shaft or countershaft so that the gears freely spin and do not transmit torque. Accordingly, in this arrangement, the engine 610 and transmission 620 power each of the transaxle drive shaft 630 and the front axle drive shaft 650 while the electric drive motor 2010 is inactive (e.g., no or limited power is supplied to the electric drive motor 2010).

If a silent or reduced fuel mode is selected, the driveline 600 of the vehicle 10 is reconfigured. First, the engine 610 can be turned off, which in turn halts the rotation of the transmission 620. In some examples, the engine clutch 750 disengages the transmission 620, such that the transmission 620 is free to rotate independently (or nearly independently) of the drive shaft of the engine 610. Eliminating the rotation of the transmission 620 in turn ceases rotational power transmission from the transmission 620 to the transaxle drive shaft 630, which then stops (or slows) the vehicle 10 from moving.

With the engine 610 and transmission 620 disengaged from the electrified transaxle assembly 2000 of the driveline 600, the electrified transaxle assembly 2000 can be activated. First, the transaxle clutch assembly 2030 can engage the gearbox 2020. The gearbox 2020 then creates a rotational link between the transaxle 640 and the drive shaft of the electric drive motor 2010. With this coupling created, the ESS 1000 can supply electrical power to the electric drive motor 2010. In some examples, the ESS 1000 includes an inverter to convert stored DC electric power within the ESS 1000 to AC electric power that can be used by the electric drive motor 2010. Once activated, the electric drive motor 2010 rotates its drive shaft, which in turn imparts a torque to the transaxle 640. Because the transaxle 640 is coupled to the rear axle assembly 500, rotation of the transaxle 640 drives the rear wheels of the vehicle 10. Similarly, the rotation of the transaxle 640 transmits torque to the front axle drive shaft 650, which in turn drives the front axle assembly 500 to provide all-wheel (or four-wheel, in some embodiments) drive to the vehicle 10 in the silent or quieter electric-motor-only travel mode. In some examples, the ESS 1000 and electric drive motor 2010 can allow the vehicle 10 to travel in the silent or electric-motor-only mode for greater than 30 minutes at speeds of 25 miles per hour or higher. To accomplish these tasks, the electric drive motor 2010 can be configured to produce approximately 70 KW of continuous output power, with a peak output rating of 200 kW or more.

Similarly, hybrid modes of travel can be accomplished. For example, in some embodiments, the vehicle 10 operates in the electric-motor-only travel mode until a certain threshold traveling speed (e.g., 25 mph) is reached. When the threshold traveling speed is reached, the engine 610 can be activated and engaged with the transmission 620, while the electric drive motor 2010 can be deactivated and decoupled from the transaxle 640. In some examples, the engine 610 is activated upon the vehicle 10 reaching a first threshold speed (e.g., 25 mph) and the engine clutch 750 and/or transmission 620 are engaged to couple the engine 610 to the driveline 600 upon the vehicle 10 reaching a second threshold speed (e.g., 30 mph). In some examples, the driveline 600 transitions back to an electric-motor-only mode after the vehicle 10 has been traveling below the first threshold speed for a predetermined time period (e.g., 30 seconds, 60 seconds, 120 seconds, etc.). Using the above-described electrified transaxle assembly 2000 with the driveline 600, various different vehicle modes can be executed, including engine-only, electric-motor-only, and hybrid. As described above, different embodiments of the vehicle 10 can include an electric drive motor 2010 having a structure similar to the motor/generator 740, which allows for electricity to be generated and stored within the ESS 1000, for use in driving the electric drive motor 2010 at a later time.

Rear Engine PTO

As shown in FIG. 41, the driveline 600 of the vehicle 10 includes a third electrified driveline arrangement replacing the IMG 700 with a rear engine PTO ("REPTO"), shown as REPTO 2100. The REPTO 2100, like the electrified transaxle assembly 2000, includes an electric drive motor 2110 that can be selectively coupled with the transmission 620 using a gearbox 2120 and a REPTO clutch assembly 2130. The gearbox 2120 and the REPTO clutch assembly 2130 of the REPTO 2100 are positioned between the engine 610 and the transmission 620, and the electric drive motor 2110 is positioned within the tunnel slot 208 of the structural tunnel 206 of the passenger capsule 200. The electric drive motor 2110 is configured to supply rotational power the gearbox 2120 to drive the transmission 620 and, thereby, each of the rear axle and front axle assemblies 500 to drive the vehicle 10. Specifically, the REPTO 2100 can be configured to selectively impart rotational motion to each of the transaxle drive shaft 630 and the front axle drive shaft 650 through the transmission 620 and the transaxle 640 to drive the vehicle 10. Once again, the vehicle 10 can be configured to drive in each of the engine-only mode, the electric drive-motor-only mode, and a hybrid mode. In embodiments where the electric drive motor 2110 is configured like the motor/generator 740, the electric drive motor 2110 can generate and provide electrical power to the ESS 1000 for storage and subsequent use.

The electric drive motor 2110 of the REPTO 2100 is positioned behind the engine 610, and is configured to provide an alternative torque to the transmission 620 to drive the vehicle 10. As shown in FIG. 41, the electric drive motor 2110 includes a drive shaft 2112 that is driven by the electric drive motor 2110. The drive shaft 2112 extends forward, toward the engine 610 and parallel to the transaxle drive shaft 630. The drive shaft 2112 is coupled to (e.g., in a splined or geared engagement) with one or more gears within the gearbox 2120 positioned forward of the transmission 620 and behind the engine 610. The one or more gears within the gearbox 2120 can be selectively engaged with the transmission 620, such that rotation of the drive shaft 2112 rotates and transmits a torque to the transmission 620 and the transaxle drive shaft 630 to drive the vehicle 10. In some examples, the gearbox 2120 includes the REPTO clutch assembly 2130 that is configured to selectively engage the drive shaft 2112 with the transmission 620 to transmit torque from the electric drive motor 2110 through to the axle assemblies 500 to drive the vehicle 10. In other examples, the gearbox 2120 remains engaged with the drive shaft 2112 such that when the electric drive motor 2110 is inactive, torque is transferred from the engine 610, through the gearbox 2120, and to the drive shaft 2112, which rotates to generate electrical power that can be subsequently provided to the ESS 1000.

The REPTO 2100 is configured to provide the same multi-mode functionality as described above. For example, when the engine 610 is operating and the vehicle 10 is traveling at high speeds, the electric drive motor 2110 can be disengaged from the transmission 620 (e.g., through the REPTO clutch assembly 2130 disengagement), which in turn permits the transmission and/or gears within the gearbox 2120 to rotate without imparting a significant torque onto the drive shaft 2112 of the electric drive motor 2110. The torque produced by the engine 610 is supplied to the transmission 620, which then rotates the transaxle drive shaft 630 and transaxle 640. Rotation of the transaxle 640 in turn drives the front axle drive shaft 650, thereby transmitting torque to each of the front axle and rear axle assemblies 500 to drive the vehicle 10. In other examples, the electric drive motor 2110 remains clutched to the gearbox 2120 and the transmission 620, such that rotation of the engine 610 (e.g., the engine output shaft) rotates the drive shaft 2112, which in turn generates electricity within the coils of the electric drive motor 2110.

The REPTO 2100 is also configured to operate in a silent mode. To operate the REPTO 2100 in the silent mode, the engine 610 is decoupled from the transmission 620 (e.g., using a clutch assembly). The gearbox 2120 is then engaged with the transmission 620 (e.g., using the REPTO clutch assembly 2130) to create a mechanical linkage between the electric drive motor 2110 and the transaxle drive shaft 630. Then, the electric drive motor 2110 is activated. As discussed above, rotation of the electric drive motor 2110 rotates the transmission 620 shaft, which in turn rotates the transaxle 640 to drive each of the rear and front axle assemblies 500 using only electric power from the electric drive motor 2110. With the engine 610 deactivated, the vehicle 10 is able to drive in a "stealth mode" that makes the vehicle 10 more difficult to hear and less detectable by enemies. In some examples, the vehicle 10 is configured to transition between the stealth mode and the engine-only mode based upon traveling speed or remaining state of charge of the ESS 1000, for example. As discussed above, various different timing strategies can also be used to transition the vehicle 10 between driving modes during operation.

Motor/Gearbox

As shown in FIG. 42, the driveline 600 of the vehicle 10 includes a fourth electrified driveline arrangement replacing the IMG 700 with a motor and gearbox assembly, shown as an upper motor drive shaft and gearbox assembly 2200. The upper motor drive shaft and gearbox assembly 2200 includes a separate electric drive motor 2210 that can be selectively coupled with the transmission 620 and/or the transaxle drive shaft 630 using a gearbox 2220 and a rear clutch assembly 2230. As shown in FIG. 42, the electric drive motor 2210, the gearbox 2220, and the rear clutch assembly 2230 are each positioned within the tunnel slot 208 of the structural tunnel 206 of the passenger capsule 200 and behind the transmission 620. In some examples, the gearbox 2220 is positioned in-line with the transaxle drive shaft 630, which allows the electric drive motor 2210 to impart torque onto the transaxle drive shaft 630 to drive the vehicle 10 independently of the engine 610.

The electric drive motor 2210 includes a drive shaft 2212 that is engaged with one or more gears within the gearbox 2220. The drive shaft 2212 extends approximately parallel (e.g., +/−10 degrees) to the transaxle drive shaft 630, and is configured to drive each of the transaxle drive shaft 630, the transaxle 640, and the front axle drive shaft 650 when the vehicle 10 is operating in the silent or stealth mode. Like the electric drive motor 2010 and the electric drive motor 2110, the electric drive motor 2210 can be an asynchronous or induction AC electric motor that can be controlled using a variable frequency drive. The electric drive motor 2210 can be supplied with electricity from the ESS 1000, which can include an inverter to convert DC power stored within the ESS 1000 to AC power that can be used by the electric drive motor 2210.

The electric drive motor 2210 can also be configured as a motor/generator. Accordingly, when the vehicle 10 is in an engine-only drive mode, and the transaxle drive shaft 630 is being driven by the engine 610, torque can be transmitted to the drive shaft 2212 of the electric drive motor 2210 through the gearbox 2220. When the drive shaft 2212 is rotated within the housing 2214 of the electric drive motor 2210, AC electricity is generated. The generated electricity can be passed to a rectifier and/or one or more transformers to condition the generated electric power before being supplied back to the ESS 1000. In some examples, the electric drive motor 2210 is decoupled from the transaxle drive shaft 630 when the vehicle 10 is in the engine-only drive mode, such that rotation of the transaxle drive shaft 630 does not transmit a significant amount of torque through the gearbox 2220 and into the drive shaft 2212. The rear clutch assembly 2230 can selectively disengage one or more gears from the gearbox 2220, which in turn decouples the drive shaft 2212 from the transaxle drive shaft 630.

The upper motor drive shaft and gearbox assembly 2200 arrangement can also be used to perform any of the engine-only mode, electric-motor-only (e.g., stealth or silent) mode, or hybrid modes, as discussed above. In the engine-only mode, the electric drive motor 2210 is decoupled from the transaxle drive shaft 630 using the rear clutch assembly 2230. As indicated above, the rear clutch assembly 2230 can disengage one or more gears within the gearbox 2220 from a shaft or countershaft within the gearbox 2220, which allows the gear(s) to freely rotate relative to the shaft and/or the countershaft, such that limited torque is transmitted from the transaxle drive shaft 630 to the drive shaft 2212. Accordingly, the torque within the transaxle drive shaft 630 is transmitted to the transaxle 640 and the front axle drive shaft 650, and not to the drive shaft 2212.

The stealth or silent mode can be engaged by turning off the engine 610 and decoupling the drive shaft from the transmission 620. Then, the electric drive motor 2210 can be linked to the transaxle drive shaft 630 using the rear clutch assembly 2230, which engages one or more gears within the gearbox 2220 to the transaxle drive shaft 630. With the transaxle drive shaft linked to the electric drive motor 2210, the electric drive motor 2210 can be activated. Torque produced by the electric drive motor 2210 can then be transmitted through to the transaxle 640, to drive the rear axle assembly 500, and through to the front axle drive shaft 650, to drive the front axle assembly 500. The vehicle 10 can include a control system or engine control unit (ECU) 2240 that communicates between the various components of the driveline 600 to ensure appropriate timing between the different clutches and the electric drive motor 2210, which allows the vehicle to shift between engine-only and electric-motor-only modes while the vehicle 10 is operating.

Using the various above-described arrangements of the driveline 600, the vehicle 10 can transition between several driving modes, including a silent or "stealth" mode that allows the vehicle 10 to drive while producing a limited amount of noise and a limited thermal signature. A compact motor/generator can be incorporated to charge the ESS 1000, which enables extended electric-motor-only use. Different clutch mechanisms and couplings can be used to allow each of the engine 610 and electric motor (e.g., the IMG 700, the electric drive motor 2010, the electric drive motor 2110, the electric drive motor 2210, etc.) to drive the vehicle 10 independently of one another.

Military Vehicle Accessories

Referring now to FIGS. 43-68, various other accessory systems for the vehicle 10 can be incorporated to permit multiple variations of a vehicle. As discussed in detail below, the vehicle 10 cam include any one of a (i) tunnel-less feature, (ii) exhaustless feature, (iii) space optimization, (iii) weight reduction, (iv) liquid cooled motor, (v) electrified vehicle battery placement, (vi) one or more modular motors, (vii) one or more electric accessories, (viii) shoreline charging, (ix) regeneration system, (x) battery ejection, (xi) autonomous drive system, (xii) one-pedal operation, (xiii) external data port, (xiv) battery heater, (xv) cabin heater for EV mode, (xvi) climate controlled seats, (xvii) elimination of high-voltage, (xviii) waterproof feature, (xix) suspension feature, (xx) wireless charging, and (xxi) integrated motor system. In some examples, the vehicle 10 can include a combination of the features discussed in detail below.

Tunnel-Less Vehicle

Figure 43:
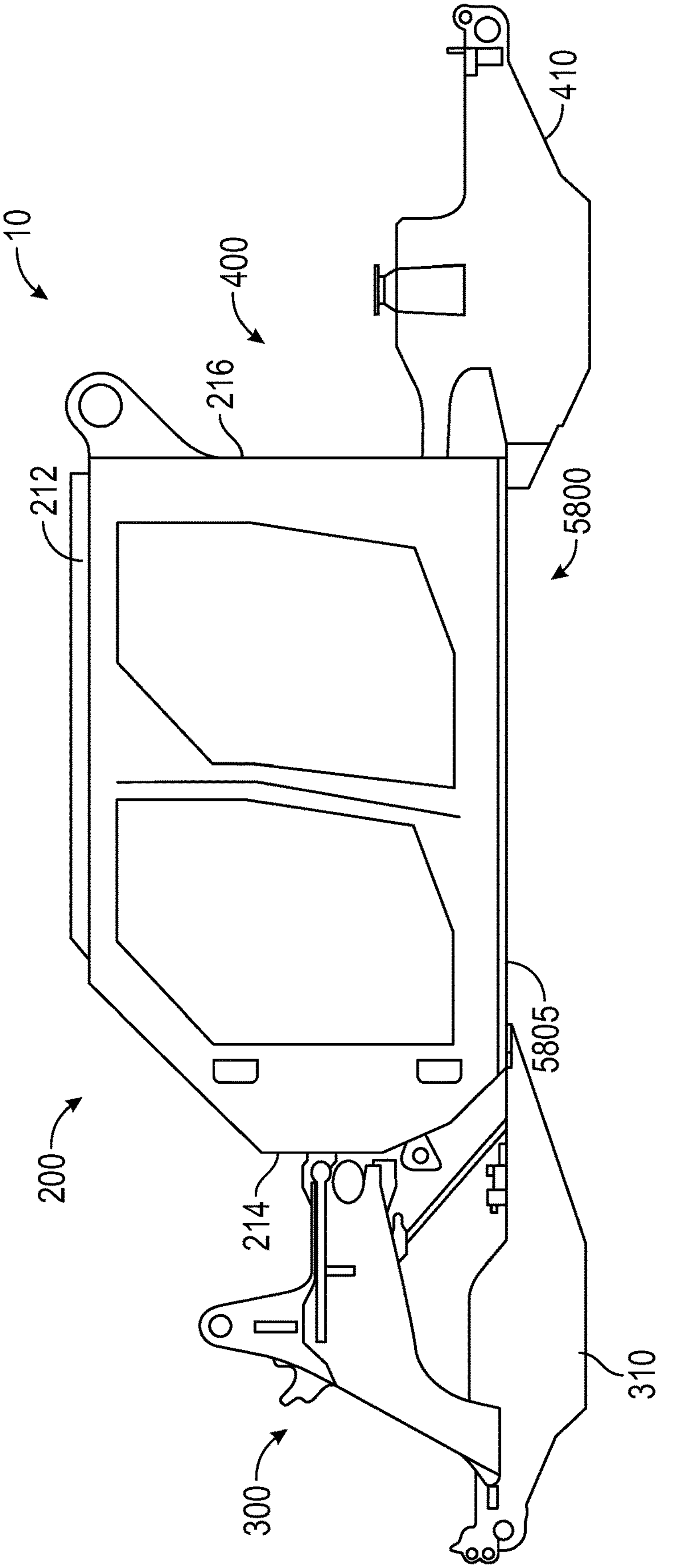
FIG. 43 is side view of a chassis assembly without a tunnel for use in the vehicle of FIG. 1, according to an exemplary embodiment.

Referring now to FIGS. 43, the vehicle 10 is defined as a tunnel-less vehicle. In such an example, the vehicle 10 may include any of the features discussed above in FIG. 5 without the inclusion of a tunnel. The vehicle shown as described herein is substantially similar to the vehicle 10 shown and described above. In some embodiments, the tunnel-less vehicle is a kit that is assembled onto the vehicle 10. The vehicle 10 may include a floor assembly 5800. The floor assembly 5800 may extend at least partially between the front module 300 and the rear module 400. By way of example, the floor assembly 5800 wholly extends between the front module 300 and the rear module 400 and is further provided about an entire surface of which a user is positioned. The floor assembly 5800 is configured to provide support to the vehicle 10 and further provide the users with a ground support to stand, sit, or otherwise provide alternate components onto in transportation uses.

The floor assembly 5800 may include a floor 5805. The floor 5805 is defined as a flat floor, where no structures or modules extend upwards from the floor 5805. As can be appreciated, having the flat floor 5805 creates more space within the vehicle 10. The additional space could be used to transport more people, ammo, cargo, fuel, or other payload. In other embodiments, the flat floor 5805 creates more space to advantageously allow for mobility within the vehicle 10. For example, the users sitting within the vehicle 10 may now be able to freely move within the vehicle 10, where the presence of a tunnel would have otherwise made it more difficult.

Traditionally, the vehicle 10 has included the tunnel for protection in the case of a blast event, where the tunnel would at least absorb or deflect the blast. In order to maintain blast protection, the floor assembly 5800 may include a tapered structure to help deflect the blast outward from the vehicle. For example, in one embodiment, the floor assembly 5800 may include wings that extend outward from a midpoint of the vehicle 10 between the front module 300 and the rear module 400. The wings may extend substantially past the users feet, where a blast event introduced to an underside of the vehicle 10 would help direct the blast outward from the vehicle. As can be appreciated, the wings is structured as such to help mitigate the blast and not include any inherent structures that would otherwise not mitigate the blast. In another embodiment, the floor assembly 5800 may have a flat portion centrally located, where wings extend from the flat portion. In other embodiment, the floor assembly 5800 may include a kit that can be equipped to the vehicle 10 and be configured to help mitigate the blast.

Additionally or alternatively, the vehicle 10 may include one or more seats positioned above the floor assembly 5800 and located within a cab of the vehicle. The seats is positioned as such to permit increased mobility within the cab. For example, in one embodiment, the seats is coupled to the sidewalls of the vehicle, where seated users face towards each other when sitting. By way of example, the vehicle 10 may include 6 seats, where three seats are coupled to a right side of the vehicle 10 and three seats are coupled to a left side of the vehicle 10. In instances where a roof of the vehicle deforms into the vehicle 10, the user's heads may stay clear from the deformation. In another embodiment, the seats is positioned facing toward the front module 300. In still another embodiment, the seats is positioned facing the rear module 400.

The floor assembly 5800 may include one or more floor portions. The one or more floor portions may define an area of the floor assembly at or between one or more seats. The floor portions may include a first floor portion defined beneath a first seat. The first seat may be fixedly coupled to the first floor portion. The floor portions may include a second floor portion defined beneath a second seat. The second seat may be fixedly coupled to the second floor portion and positioned on an opposite side of the vehicle 10 as the first seat. The floor portions may define a third floor portion defined between adjacent seats along a first row of seats. The floor portions may define a fourth floor portion defined between seats on opposing sides of the vehicle 10. The fourth floor portion may expand across a midpoint of the vehicle 10. As can be appreciated, the first floor portion, second floor portion, third floor portion, and fourth floor portion may be provided coplanar to one another to define a tunnel-less construction.

Exhaustless Vehicle

The vehicle 10 is defined as being an electric vehicle. That is, the vehicle 10 may eliminate the need to combust an internal fuel introduced to the system. In such an example, the vehicle 10 prevents a production of exhaust and further eliminates the need for an exhaust system. Traditionally, internal combustion engines have burned fuel and outputted exhaust as a result, keeping the internal system clean. Electrification has since eliminated the need for an exhaust system (e.g., exhaust, air intake, etc.), or the like.

The vehicle 10 can further be at least partially submerged into material, water, or the like, where the operator has less concern for that material to be sucked into the exhaust system. As can be appreciated, the vehicle 10 can permit movement across bodies of water that would otherwise be impossible to cross with an internal combustion engine vehicle or fording kit. For example, if the vehicle 10 wants to cross a river where water would be able to pass into the exhaust system, the vehicle 10 can now travel across without running the risk of damaging internal components from sucking water into the system. In such an example, the vehicle 10 may allow selective replacement of the tractive system into a system that would be allow the vehicle 10 to move across a body of water.

Additionally or alternatively, without the need for an exhaust system, the vehicle 10 may have more space or less weight. The vehicle 10 may include increased storage within the space. The storage could store extra battery modules, payload, gear, or the like. By way of example, the storage could be used up by positioning an increased battery size or additional battery modules within. In other embodiments, the vehicle 10 may include any combination of additional accessory systems within that would take up the space and add more weight to the vehicle.

Space Optimization

As shown in FIG. 25, power conversion hardware 1014 (e.g., a DC/DC converter) is coupled to the rear module 400 and structured to convert DC power received from either the IMG 700, the motor/generator 822, and/or the ESS 1000 and convert the DC power to power usable by the vehicle systems (e.g., 12 V, 24 V, and/or 48 V). Additionally or alternatively, the power conversion hardware 1014 is down-sized to further optimize the layout of the vehicle 10. The power conversion hardware 1014 is configured to operate and output the same as what full size power conversion hardware 1014 would without the increased space usage. In other embodiments, down-sizing the power conversion hardware 1014 may further limit a maximum output. For example, down-sizing the power conversion hardware 1014 may accordingly down-size or eliminate internal components of the power conversion module 1014. In such an example, the power conversion module 1014 is limited on the amount of power converted to power usable by the vehicle systems.

In some embodiments, the ESS 1000 is down-sized. More specifically, internal components of the ESS 1000 (e.g., battery packs, inverters, power distribution components, power conversion hardware, etc.) is down-sized to ultimately decrease the overall size of the ESS 1000. In other embodiments, both the power conversion module 1014 and the ESS 1000 is down-sized to decrease the overall size and permit increased space therewithin.

According to an exemplary embodiment, the ESS 1000 and the power conversion module 1014 are currently positioned over and/or proximate a bumper system. By downsizing at least one of the ESS 100 and the power conversion module 1014, the ESS 1000 and the power conversion module 1014 can further be repositioned to a more ideal position within the vehicle 10. By way of example, at least one of the ESS 1000 and the power conversion module 1014 can be repositioned proximate the batteries 1008. More specifically, at least one of the ESS 1000 and the power conversion module 1014 can be repositioned centrally between the batteries 1008 and the floor assembly 202.

In some embodiments, at least one of the ESS 1000 and the power conversion module 1014 can be repositioned to any position within the vehicle 10 that would be beneficial to the user. For example, if more space is needed proximate the rear bumper system, at least one of the ESS 1000 and the power conversion module 1014 can be repositioned proximate the front bumper system. As can be appreciated, the ESS 1000 or the power conversion module 1014 can be repositioned to any location that would free up or optimize space of the vehicle 10 and further be seen as advantageous to have space available to the user.

Weight Reduction

The vehicle 10 may have systems for reducing the overall weight of the vehicle 10. Traditionally, electrification kits (e.g., battery module, etc.) have increased the overall weight of the vehicle 10, in excess of 1200 pounds, that can break customer requirements of maintaining CVW. As can be appreciated, a drastic increase in weight may increase a size of the vehicle systems (e.g., suspension, tractive elements, body, etc.) such to maintain vehicle operation, thus reducing the overall efficiency of the vehicle 10.

In some embodiments, the vehicle 10 may configured to eliminate the use of some systems that would otherwise be unnecessary to the overall vehicle requirements (e.g., additional battery module, enhanced cooling system, etc.). In other embodiments, the vehicle 10 is manufactured out of high grade aluminum that is lighter than other forms of metal. In such an embodiment, the vehicle 10 may include a blast kit that is coupled to the chassis and configured to mitigate a blast event introduced to the vehicle 10.

In other embodiments, the vehicle 10 may vary the arrangements of the vehicle systems to change an orientation of the weight distribution to better facilitate needs of the vehicle 10. For example, in such an embodiment, each tractive assembly may include a smaller, individual motor that is configured to run at a higher efficiency instead of one large motor that is configured to supply power to all of the tractive assemblies.

Power Electronics Thermal Management

The vehicle 10 may have enhanced systems and methods for cooling power electronics. According to an exemplary embodiment, the vehicle 10 may have an engine intake cooler. The engine intake cooler may be configured to input cool air into the engine to cool off the engine and/or engine accessories. As can be appreciated, some accessory features of the vehicle 10 (e.g., power electronics, etc.) may have a high power output that respectively increases a thermal output of the power electronics.

A new generation of power electronics operate at much higher temperatures, regardless that their size is much less than traditional power electronics. With the decreased room, there is less room for a cooling system or the like. As can be appreciated, the engine intake cooler may be routed to the power electronics, where the engine intake cooler is configured to cool at least one of the power electronics.

According to an exemplary embodiment, the engine intake cooler may be fluidly coupled to the power electronics (e.g., conduit, air lines, etc.). In other embodiments, the engine intake cooler may be routed to a storage, where the power electronics draw cool air from the storage. By way of example, the engine may only be able to create cold air when the engine is in operation. Thus, the engine intake cooler may only be able to provide cold air to the power electronics when the engine is in operation. In other embodiments, the engine intake cooler may provide cold air to the power electronics when the engine is not in operation.

Liquid Cooled Motor

Figure 44:
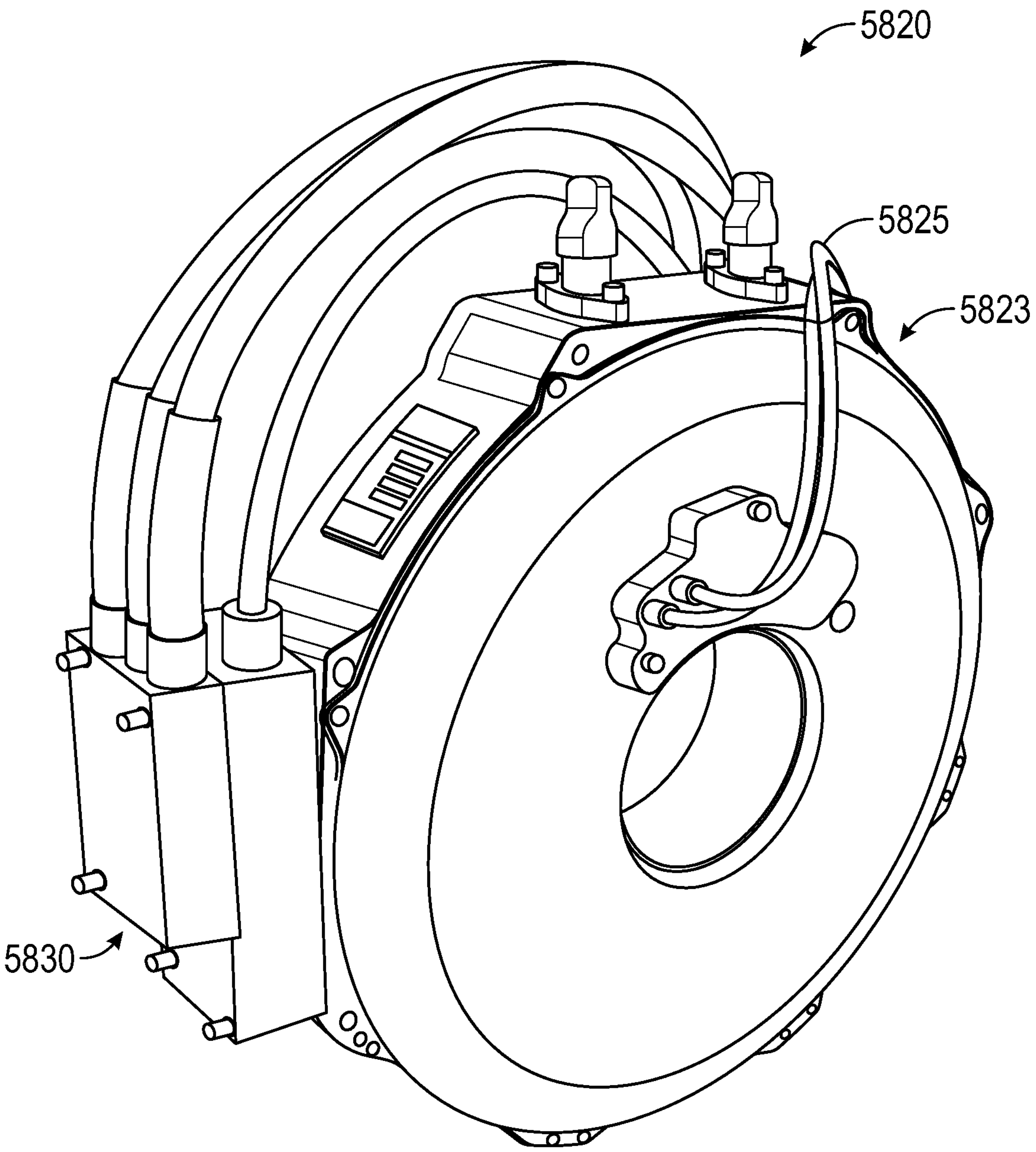
FIG. 44 is a perspective view of a motor including a water cooling system for use in the vehicle of FIG. 1, according to an exemplary embodiment.

Referring now to FIG. 44, the vehicle 10 is equipped with a motor cooling system. Traditionally, motor cooling systems have pushed hydraulic fluid in and/or around the motor to cool the motor upon operation. The enhanced motor cooling system may use water to cool the motor instead of hydraulic fluid. That is, water is provided in and/or around the motor to cool off the motor upon operation. The motor is a yokeless and segmented armature (YASA) motor. In other embodiments, the motor is of another form capable of outputting energy to the vehicle 10.

The motor 5820 may include a cooling system 5823. The cooling system 5823 is configured to cool or maintain a temperature of the motor. The cooling system 5823 may include one or more cooling lines 5825. The cooling lines 5825 is routed into a module of the motor, where the cooling lines 5825 provide water therewithin. In other embodiments, the motor may include one or more channels, paths, etc. that deliver a flow of water around the motor. Although not shown, the cooling lines 5825 are further fluidly coupled to a water source, reservoir, tank, or the like. The reservoir is configured to house an amount of water within, where the water is pumped out of the reservoir into the motor via a pump.

The motor is operably coupled to a control system 5830. The control system 5830 may communicate to the motor, where the control system 5830 sends a command to permit or prevent a flow of water to the motor based on a status of the motor. For example, if the control system 5830 determines that the motor is in operation, the control system 5830 may send a command to permit a flow of water to the motor to cool the motor. Accordingly, if the control system 5830 determines that the motor is not in operation, the control system 5830 may send a command to prevent a flow of water to the motor. In other embodiments, the control system 5830 may determine a temperature of the motor, where the temperature is compared to a temperature threshold. In such an embodiment, if the motor temperature is above the temperature threshold, the control system 5830 may permit a flow of water to the motor to cool the motor.

In some embodiments, a cooling process begins once the vehicle 10 is in operation. For example, the cooling system 5823 may permit a flow of material to the motor upon initial start of the vehicle 10 and continuously provide a flow of water to the vehicle 10 until the vehicle 10 is shut off.

The vehicle 10 may include an accessory drivetrain, shown as front engine accessory drive (FEAD). The FEAD is an alternate drivetrain from the motor and is configured to supply power to accessory components of the motor (e.g., alternator, pump, etc.). Additionally or alternatively, the FEAD is directly coupled to the motor and supply the motor with an amount or energy and/or torque. The FEAD is fluidly coupled to the cooling system 5823, where the cooling system 5823 supplies water to the FEAD to cool off the FEAD. As can be appreciated, the cooling system 5823 includes a separate cooling line that is routed to the FEAD and separately cools the FEAD and the motor. According to an exemplary embodiment, the FEAD is positioned distal the motor, where the FEAD can still provide power to accessory components of the motor. In other embodiments, the FEAD is positioned proximate the motor.

Electrified Vehicle Battery Placement

Figure 45:
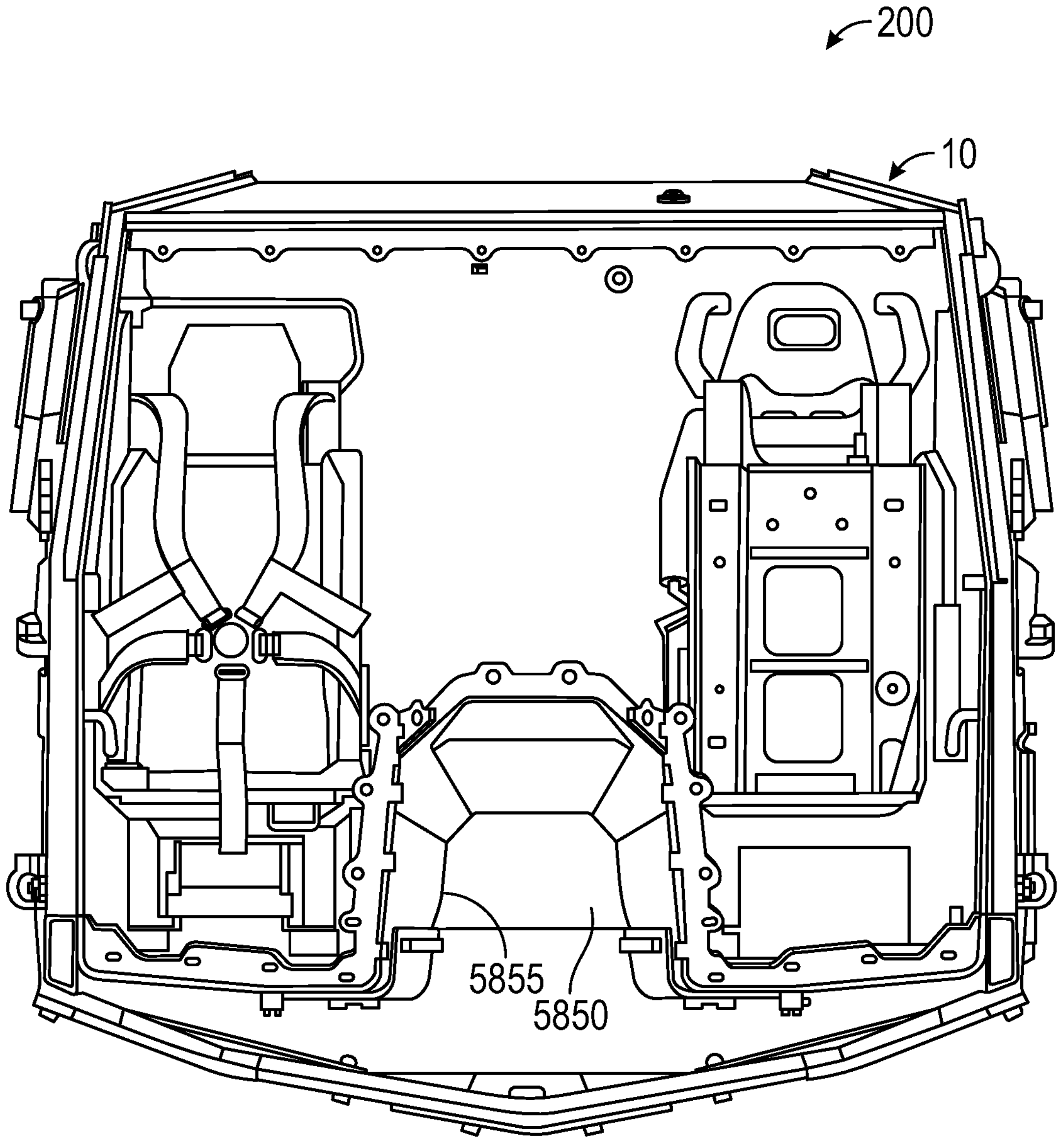
FIG. 45 is a cross-sectional view of a passenger capsule including a battery storage housing for use in the vehicle of FIG. 1, according to an exemplary embodiment.

Referring to FIG. 45, the vehicle 10 may further include enhanced systems and methods for housing a battery or battery modules. In one example, the vehicle 10 may include components positioned or stored within a housing 5855. The housing 5855 may take the place of the tunnel of the vehicle 10, where the housing 5855 may take on a substantially similar geometry to the tunnel. The housing 5855 is positioned proximate a lateral midpoint, where the housing 5855 further extends along the lateral midpoint. As shown in FIG. 45, the housing 5855 protrudes upward from a floor of the vehicle 10, where users is positioned on either end of the vehicle 10. In other embodiments, the housing 5855 may extend downward from the floor, such that the floor is defined as a flat floor. In still other embodiments, the housing 5855 may extend upward from below the floor, such that the floor is defined as a flat floor.

The housing 5855 is configured to hold, secure, or otherwise couple to a battery, battery module, or the like, shown as battery 5850. The battery 5850 is a rigidly held within the housing 5855. As can be appreciated, the battery 5850 may include one or more electrical components electrically coupled to the battery 5850. The electrical components may further be electrically coupled to various systems of the vehicle 10 (e.g., motor, inverter, FEAD, etc.).

In other examples, the battery 5850 positioned within the housing 5855 is an alternate or secondary battery 5850. In such an example, the alternate battery 5850 is suited as a backup or emergency battery 5850 in case the main battery is to have failure. The housing 5855 may further include one secondary battery 5850. In other embodiments, the housing 5855 may include more than one secondary battery 5850.

The battery 5850 may further be configured to mitigate or absorb a blast. The blast introduced to the vehicle 10 is from an underside of the vehicle 10. Alternatively, the blast is introduced to the vehicle from any surrounding area. The battery 5850 may include a casing around cells are positioned within. The casing is manufactured out of a metallic material or the like that is suitable for absorbing at least a portion of a blast. In other embodiments, the casing is manufactured out of plastic that would just create filler material for the blast to have to pass therethrough, overall consuming a portion of the blast energy. In still other embodiments, the battery 5850 is configured to deflect the blast outward or away from the vehicle 10.

Although the housing 5855 is shown as being included in place of the tunnel, the housing 5855 is positioned within an engine bay. In such an example, the battery 5850 is positioned within at least a portion of the engine bay in place of a primary engine (e.g., internal combustion engine, etc.). In other embodiments, the battery 5850 is wholly disposed within the engine bay. Advantageously, some of the vehicle systems (e.g., motor, FEAD, etc.) are positioned within or proximate the engine bay, thus eliminating the need for excessively long electrical connections that extend through the vehicle 10.

Although the housing 5855 is shown as being included in place of the tunnel, the housing 5855 is positioned within proximate where a traditional exhaust system would be positioned. In such an example, one or more batteries 5850 is advantageously positioned proximate a chassis system, where an exhaust system would otherwise be positioned. The vehicle 10 may then include a first battery 5850 proximate a rear of the vehicle 10 and a second battery 5850 proximate a front of the vehicle 10. Although multiple battery locations are possible proximate the chassis system, the batteries 5850 may need to be advantageously positioned to not weigh down a singular location of the vehicle 10. For example, a suspension system of the vehicle 10 may not be able to support more than one battery 5850 positioned proximate a front of the vehicle 10.

Although the housing 5855 is shown as being included in place of the tunnel, the housing 5855 is positioned within one or more doors. In such an example, the doors is configured similar to the housing 5855. As such, one or more batteries 5850 is positioned within or coupled to the doors. The batteries 5850 coupled to the doors is configured to supply power to smaller systems of the vehicle 10. For example, the batteries 5850 is configured to supply power to small power draw accessories instead of routing electrical connections from a main battery 5850 to the smaller systems.

Modular Motors

Figure 46:
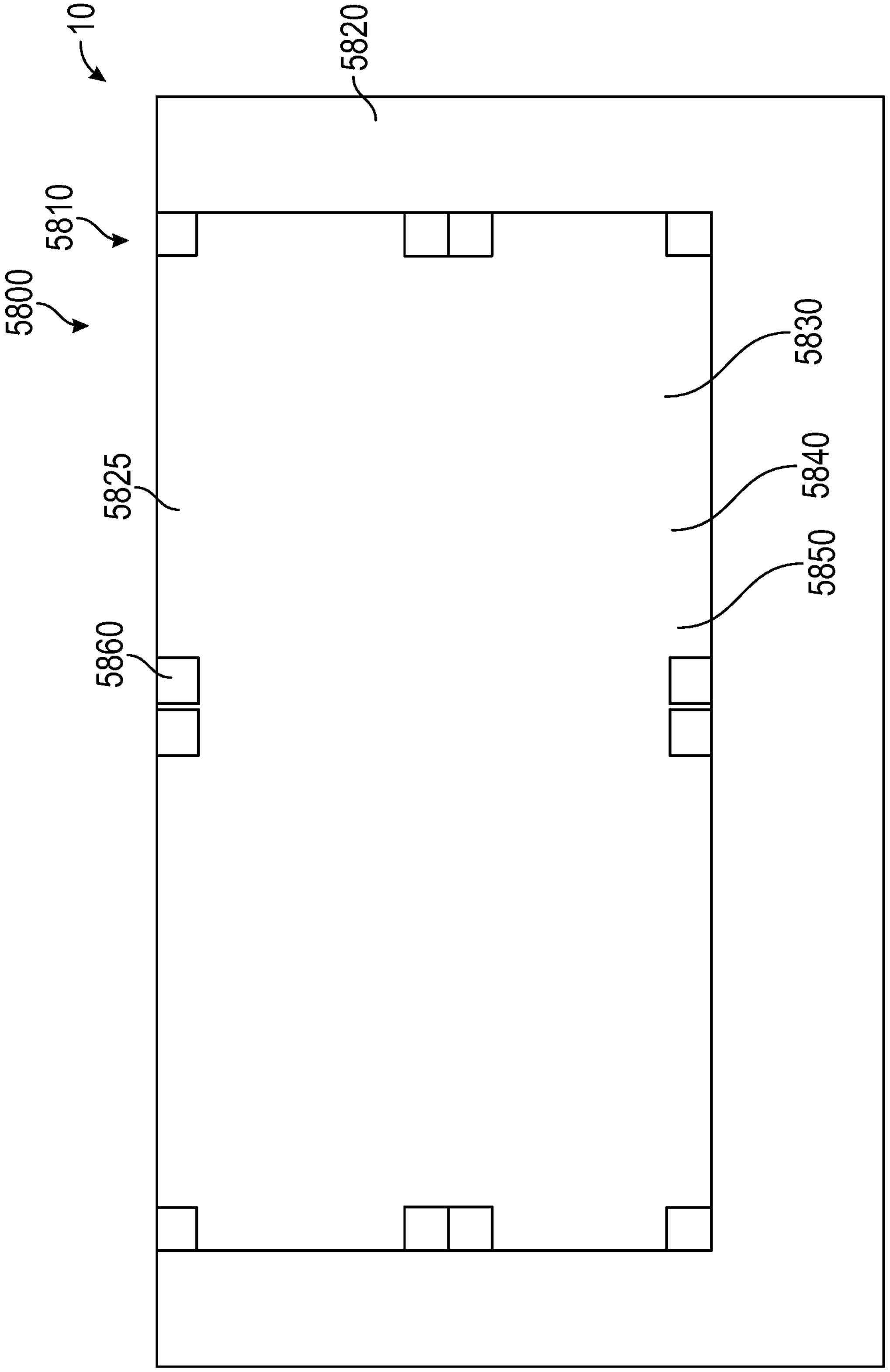
FIG. 46 is a schematic top view of an engine bay for use in the vehicle of FIG. 1, according to an exemplary embodiment.

Referring now to FIG. 46, a module motor system 5800 for vehicle 10 is shown in a schematic top view of an engine bay 5810. The modular motor system 5800 is configured to integrate one or more motors into the engine bay 5810, where otherwise an internal combustion engine (ICE) would be positioned. The modular motor system 5800 includes an accessory system 5820 positioned about a perimeter of the engine bay 5810. The accessory system 5820 may include an inverter, a battery module, one or more electrical connections, or the like.

The modular motor system 5800 includes a space 5825 positioned inward the accessory system 5820, where one or more motors, shown as motors 5830, are positioned. In some embodiments, the space 5825 is large enough to include multiple motors 5830. In other embodiments, the space 5825 is large enough to include only one motor 5830. According to an exemplary embodiment, the space 5825 is large enough to include multiple motors 5830 having different lengths.

The motors 5830 could be at least one of a high speed motor 5840 and a low speed motor 5850. By way of example, the high speed motor 5840 could be any high speed motor 5840 having a varying length and the low speed motor 5850 could be any low speed motor 5850 having a varying length. The modular motor system 5800 includes one or more mounts 5860 that fixedly couple the motors 5830 to the engine bay 5810. The mounts 5860 are defined as universal mounts that are configured to interface with either the high speed motor 5840 and the low speed motor 5850. By way of example, the mounts 5860 are configured to couple to different length motors 5840, 5850 by repositioning within the space 5825 (e.g., telescoping, sliding along rails, etc.).

In one example, the engine bay 5810 includes one high speed motor 5840 having a long length and one low speed motor 5850 having a short length. In such an example, the mounts 5860 are repositionable within the engine bay 5810 to couple to the motors 5840, 5850. The mounts associated with the high speed motor 5840 are positioned at different locations within the engine bay 5810 compared to the mounts for the low speed motor 5850. In other examples, where the engine bay 5810 includes multiple motors 5830 having the same length, the mounts 5860 are positioned substantially proximate one another. In yet other examples, the engine bay 5810 may include any orientation of motors 5830 within the engine bay 5810. For example, a first motor 5830 may be oriented substantially perpendicular to the second motor 5830 in the engine bay 5810.

Although the modular motor system 5800 has been described for use in high speed and low speed motors, the modular motor system 5800 may also be used for high torque and low torque motors.

Electric Accessories

The vehicle 10 is configured to include an accessory system. The accessory system may include at least one of an air compressor, hydraulic system, braking system, suspension system, drivetrain, etc. The accessory system is defined as an electric system, where the air compressor, hydraulic system, braking system, suspension system, drivetrain, etc. are all electrically powered. Although only the air compressor, hydraulic system, braking system, suspension system, and drivetrain are described as being electrified, additional systems of the vehicle 10 may also be electrified.

The accessory system is coupled to a battery module, where the battery module supplies current to the accessory system. In one embodiment, each accessory system may draw current directly from the battery module as needed to operate the system. In such an embodiment, the battery module is one large battery module that is configured to send current to the accessory systems. In other embodiments, the vehicle 10 may include multiple battery modules that are designated to specific accessory systems. In still other embodiments, the vehicle 10 may include a main battery module to supply current to a motor and additional battery modules to supply current to the accessory system. In another embodiment, the accessory system is coupled to a solenoid, valve, or the like, where the solenoid is configured to direct current to the desired accessory system.

Shoreline Charger

Figure 47:
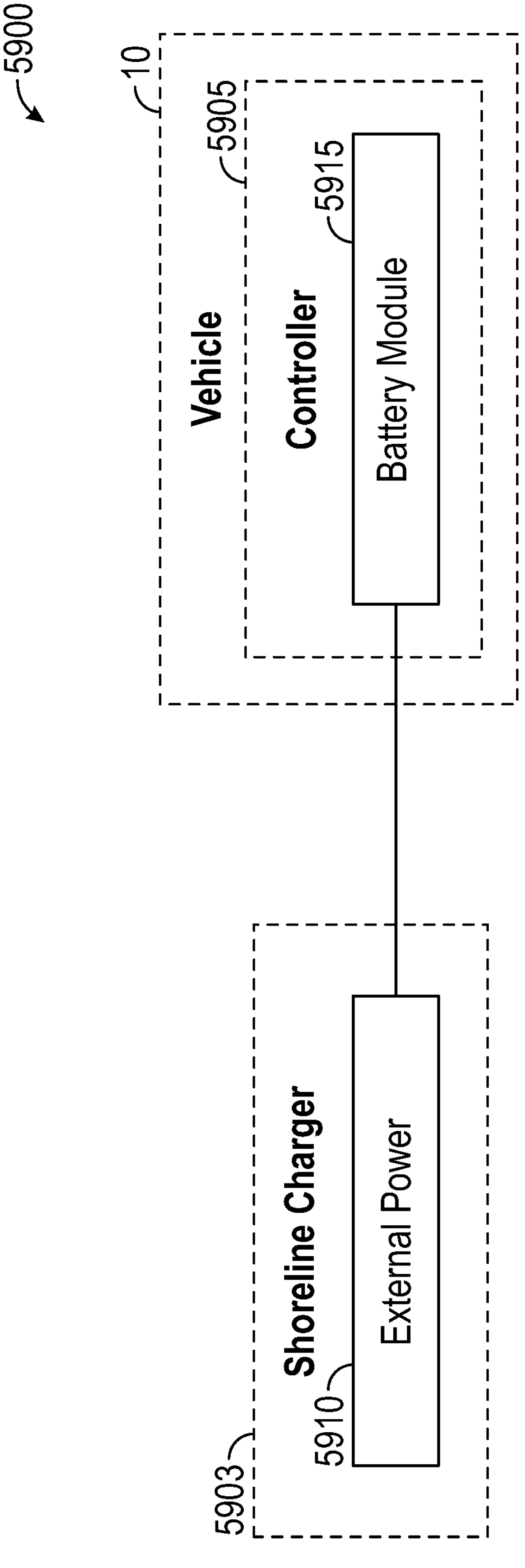
FIG. 47 is a schematic block diagram of a shoreline charger for use in the vehicle of FIG. 1, according to an exemplary embodiment.

Referring now to FIG. 47, the vehicle 10 may include systems necessary to utilize a shoreline charging system, shoreline system, charging system, or the like, shown as charging system 5900. The charging system 5900 is configured to charge a battery, battery module, or the like, shown as battery module 5915, positioned within the vehicle 10. In other embodiments, the charging system 5900 is configured to charge more than one battery module 5915.

The charging system 5900 includes a shoreline charger 5903. The shoreline charger 5903 includes a power supply, shown as external power 5910. The external power 5910 is operably coupled to the shoreline charger 5903 and further separate from the vehicle 10. The vehicle 10 may couple to the external power 5910, where the external power 5910 can then provide a power to the battery module 5915. For example, in some embodiments, the vehicle 10 is coupled to the external power 5910 via one or more electrical connections extending from the vehicle 10. In other embodiments, the vehicle 10 is wirelessly coupled to the external power 5910. In such an embodiment, shoreline charger 5903 may include a charging range, where the external power 5910 provides power to the vehicle 10 when the vehicle 10 is within the charging range.

The vehicle 10 may include a controller 5905. The controller 5905 is operably coupled to the shoreline charger 5903. The controller 5905 is configured to provide a status to the shoreline charger 5903, when the battery module 5915 is coupled to the external power 5910. In some embodiments, the controller 5905 is configured to provide a status to the shoreline charger 5903 when the vehicle 10 is within the charging range. The status is a status of the battery module 5915. In other embodiments, the status is an overall status of the vehicle 10.

In some embodiments, the shoreline charger 5903 is coupled to more than one vehicle 10. In such an embodiment, the shoreline charger 5903 may include more than one external power 5910, where the number of external powers 5910 is substantially similar to an amount of vehicles that the shoreline charger 5903 can support. For example, if the shoreline charger 5903 can support a maximum of four vehicles, the shoreline charger 5903 may include four external powers 5910.

Regeneration System

Figure 48:
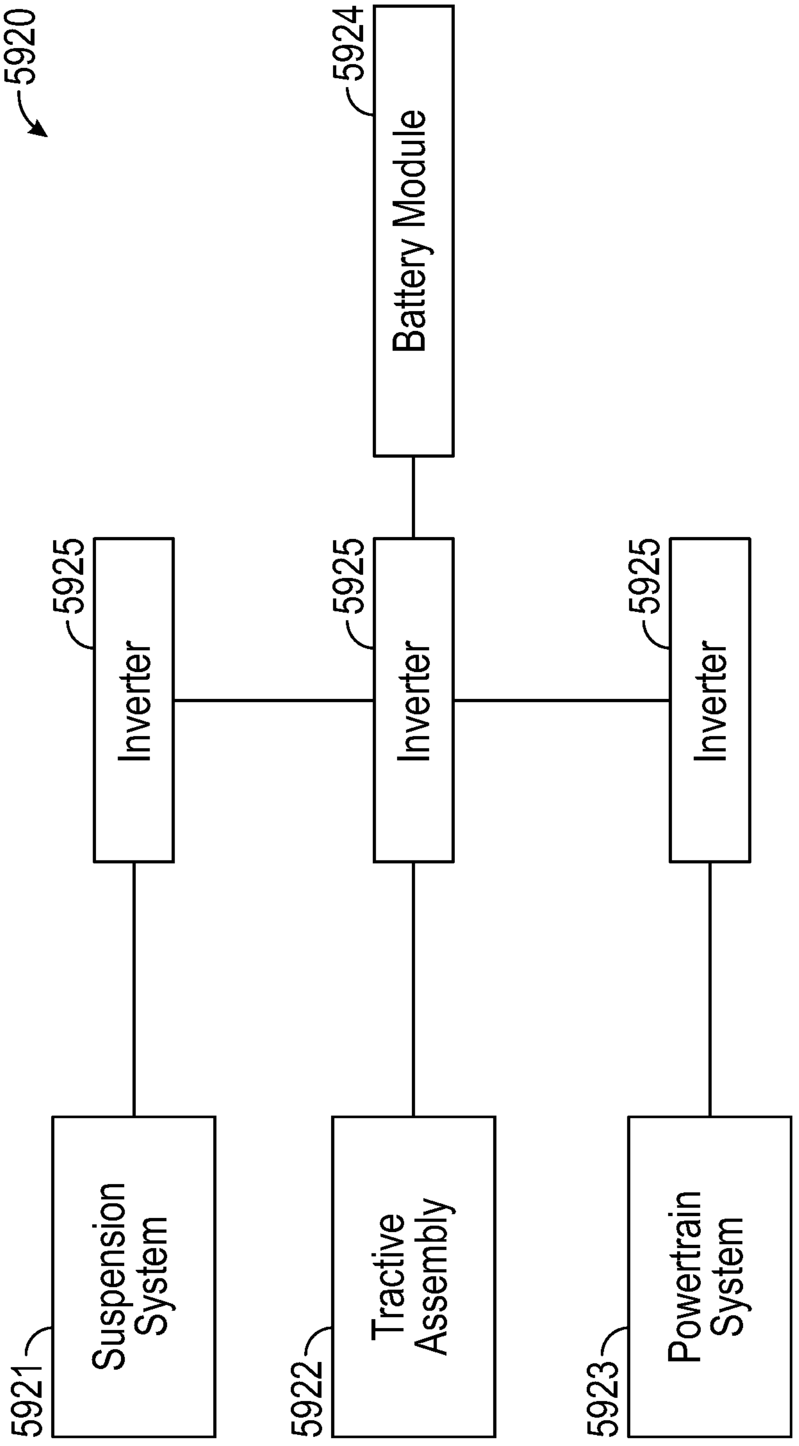
FIG. 48 is a schematic block diagram of a regeneration system for use in the vehicle of FIG. 1, according to an exemplary embodiment.

Referring now to FIGS. 48, a regeneration system 5920 is shown. The regeneration system 5920 is configured to provide a level of charging to a battery module 5924. The regeneration system 5920 may include one or more subsystems that are configured to provide energy to the battery module 5924 when the subsystems are active. The level of charging is dependent upon the subsystems (e.g., output source, output level, drive time, amount of variables active, etc.).

The subsystems may include at least one of a suspension system 5921, tractive assembly 5922, powertrain system 5923, etc. In other embodiments, the subsystems may include an ABS system. In still other embodiments, the subsystems may include other subsystems than what is described herein. The suspension system 5921 is configured to absorb shock introduced to the vehicle 10 from the ground via driving. Additionally or alternatively, the suspension system 5921 is actuated along a vertical direction to change a height of the vehicle 10. A vertical displacement from the suspension system 5921, either via external shock from the ground or actuation, may create a degree of energy. The generated energy from the suspension system 5921 may vary based upon a length of the displacement, a number of displacements, a speed of displacement, etc. As can be appreciated, an increased amount of the variables may generate more energy.

The tractive assembly 5922 is configured to generate directional motion of the vehicle 10. The tractive assembly 5922 may include at least one of a tractive element (e.g., wheel, track, etc.), a rotor, a brake, etc. The tractive assembly 5922 is configured to generate rotational energy from directional motion of the vehicle 10. For example, forward motion of the vehicle 10 may create rotational energy from axles or shafts coupled to the tractive elements. The generated energy from the tractive assembly 5922 may vary based on a drive time, a speed of the vehicle, or the like.

The powertrain system 5923 is configured to generate directional motion of the vehicle 10 through internal systems. The powertrain system 5923 may include a motor, transmission, axle, shaft or the like, where motion and/or actuation of the vehicle 5923 generates energy. For example, the motor may drive rotation of one or more drive shafts, where the drive shafts rotate to generate rotational energy. The generated energy from the powertrain system 5923 may vary based on actuation of the vehicle, motion of the vehicle, speed of the vehicle, drive time of the vehicle, or the like.

The suspension system 5921, tractive assembly 5922, and powertrain system 5923 may all be coupled to an inverter 5925. The inverters is configured to convert alternating current (AC current) produced from the subsystems 5921, 5922, 5923 into direct current (DC current). The inverters 5925 is operably coupled to the battery module 5924 where the generated DC current is supplied to the battery module 5924 for regeneration. Although not shown, the subsystems 5921, 5922, 5923 is coupled to a single inverter. Additionally or alternatively, the inverters 5925 are operably coupled to one another, where if one inverter 5925 fails, the others can actuate in its place.

Although not shown, the regeneration system 5920 is operably coupled to a controller, where the controller monitors a status of the regeneration system 5920. The regeneration system 5920 is operably coupled to the battery module 5924 and configured to monitor a status of the battery module 5924, where the controller may send a command to the regeneration system 5920 to actuate between an on and off positioned based upon the status of the battery module 5924. For example, the controller may send a command to actuate the regeneration system 5920 based on the status of the battery module 5924 being below a threshold (e.g., battery module status below a minimum threshold, etc.).

Battery Ejection

The vehicle 10 may include one or more batteries 1008. The batteries 1008 is positioned at various locations around the vehicle 10. In some embodiments, the batteries 1008 is positioned along an underside of the vehicle 10. The batteries 1008 is coupled to the vehicle 10 via a coupling. The coupling is a quick disconnect coupling, where an impact force introduced to the vehicle disengages the battery 1008 from the vehicle 10. More specifically, the coupling is configured to disconnect from the vehicle 10 when a blast is introduced to the vehicle 10. In other embodiments, the vehicle 10 may include multiple batteries 1008 positioned at various locations around the vehicle 10, where all the batteries 1008 are coupled to the vehicle 10 via the coupling.

As can be appreciated, the batteries 1008 is strategically positioned as such to absorb the blast introduced to the vehicle 10. In one embodiment, the batteries 1008 is positioned underneath the vehicle 10, proximate the chassis. In such an embodiment, the batteries 1008 are configured to absorb the blast introduced from underneath the vehicle 10. Furthermore, when the blast occurs from underneath the vehicle 10, the batteries 1008 may disengage from the vehicle 10 to absorb substantially most of the blast. In some embodiments, the batteries 1008 absorb all of the blast introduced to the vehicle 10. In another embodiment, the batteries 1008 is positioned proximate at least one of a front or a rear of the vehicle 10. In such an embodiment, the batteries 1008 are configured to absorb the blast introduced to the front or rear modules of the vehicle 10. Furthermore, when the blast occurs from underneath the vehicle 10, the batteries 1008 may disengage from the vehicle 10 to absorb substantially most of the blast. In some embodiments, the batteries 1008 absorb all of the blast introduced to the vehicle 10. In yet another embodiment, the batteries 1008 is positioned proximate at least one of a left side or a right side of the vehicle 10. In such an embodiment, the batteries 1008 are configured to absorb the blast introduced to the side of the vehicle 10. Furthermore, when the blast occurs from the side of the vehicle 10, the batteries 1008 may disengage from the vehicle 10 to absorb substantially most of the blast. In some embodiments, the batteries 1008 absorb all of the blast introduced to the vehicle 10.

Autonomous Drive System

Figure 49:
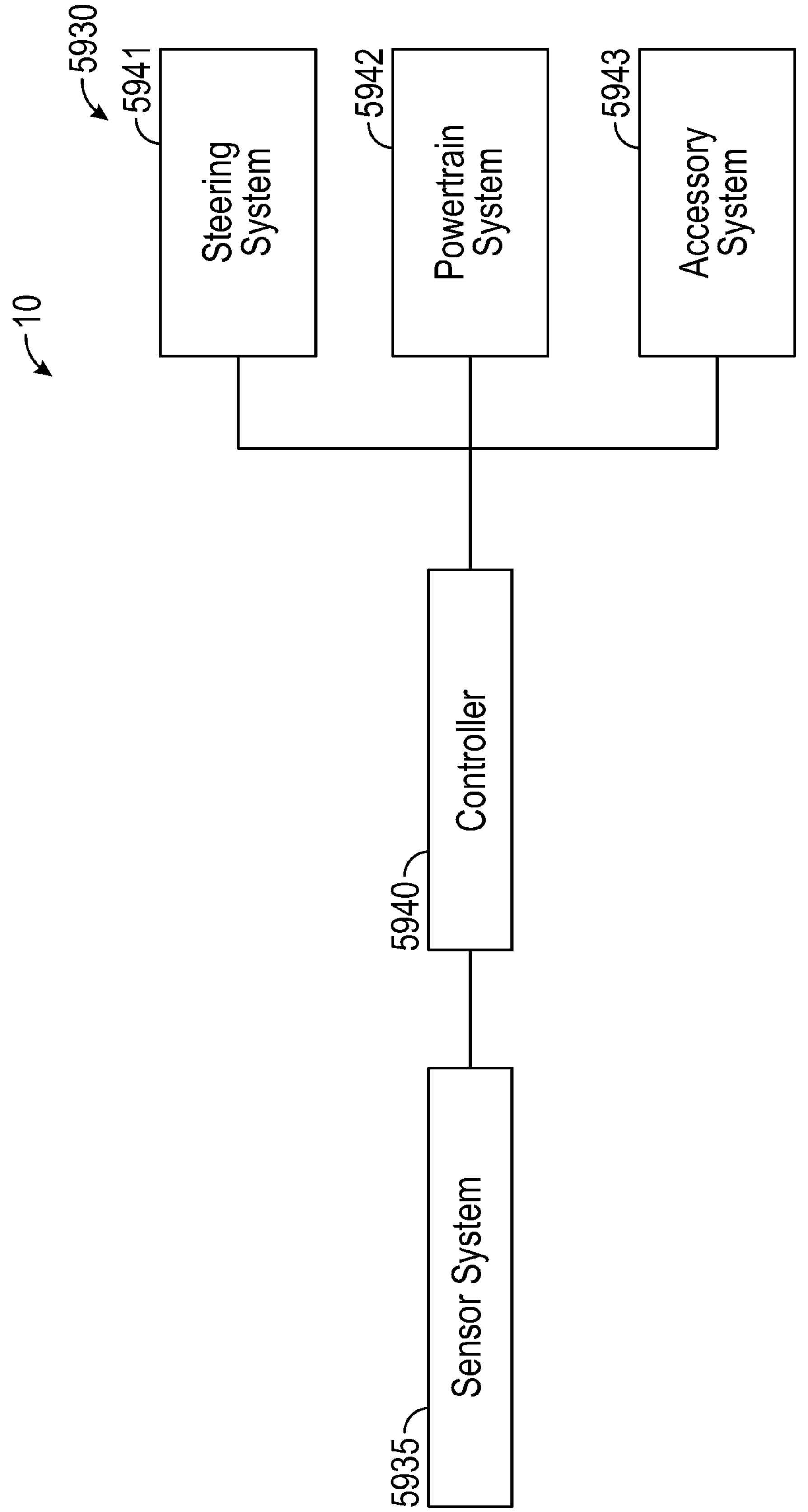
FIG. 49 is a schematic block diagram of an autonomous drive system for use in the vehicle of FIG. 1, according to an exemplary embodiment.

Referring now to FIG. 49, the vehicle 10 may include an autonomous drive system 5930. The autonomous drive system 5930 may include a sensor system 5935 positioned within around at least one of the body of the vehicle 10 or the internal components of the vehicle 10. The sensor system 5935 is configured to send a status to a controller 5940. Additionally or alternatively, the sensor system 5935 may include cameras that display back to the controller 5940. The controller 5940 is configured to control the various systems of the vehicle 10. The controller 5940 is positioned within the vehicle 10. Additionally or alternatively, the controller 5940 is external from the vehicle 10, where the controller 5940 is operably coupled to the vehicle 10. The controller 5940 may include a user interface (e.g., platform, joystick, etc.) where the user can control the vehicle 10 via the controller 5940.

By way of example, the controller 5940 is operably coupled to at least a steering system 5941, a powertrain system 5942, and an accessory systems 5943. The controller 5940 may control the various systems 5941, 5942, 5943 based on feedback from the user. For example, if the user interfaces with the controller 5940 to command the vehicle 10 to drive forward, the controller 5940 may send a command to at least the steering system 5941 and the powertrain system 5942 to drive the vehicle 10.

As can be appreciated, the autonomous drive system 5930 has increased benefits where the presence of a user within the vehicle 10, or driving the vehicle 10, would otherwise be dangerous. For example, in rescue missions where the vehicle 10 would be traveling within a dangerous area. Furthermore, the lack of a user within the vehicle 10 does not produce a heat signature, and, as such, heat locking weaponry is incapable of locking on to the vehicle 10. For example, missile launchers that are guided and/or locked on via heat signatures will now be incapable of doing as such.

One-Pedal Operation

Figure 50:
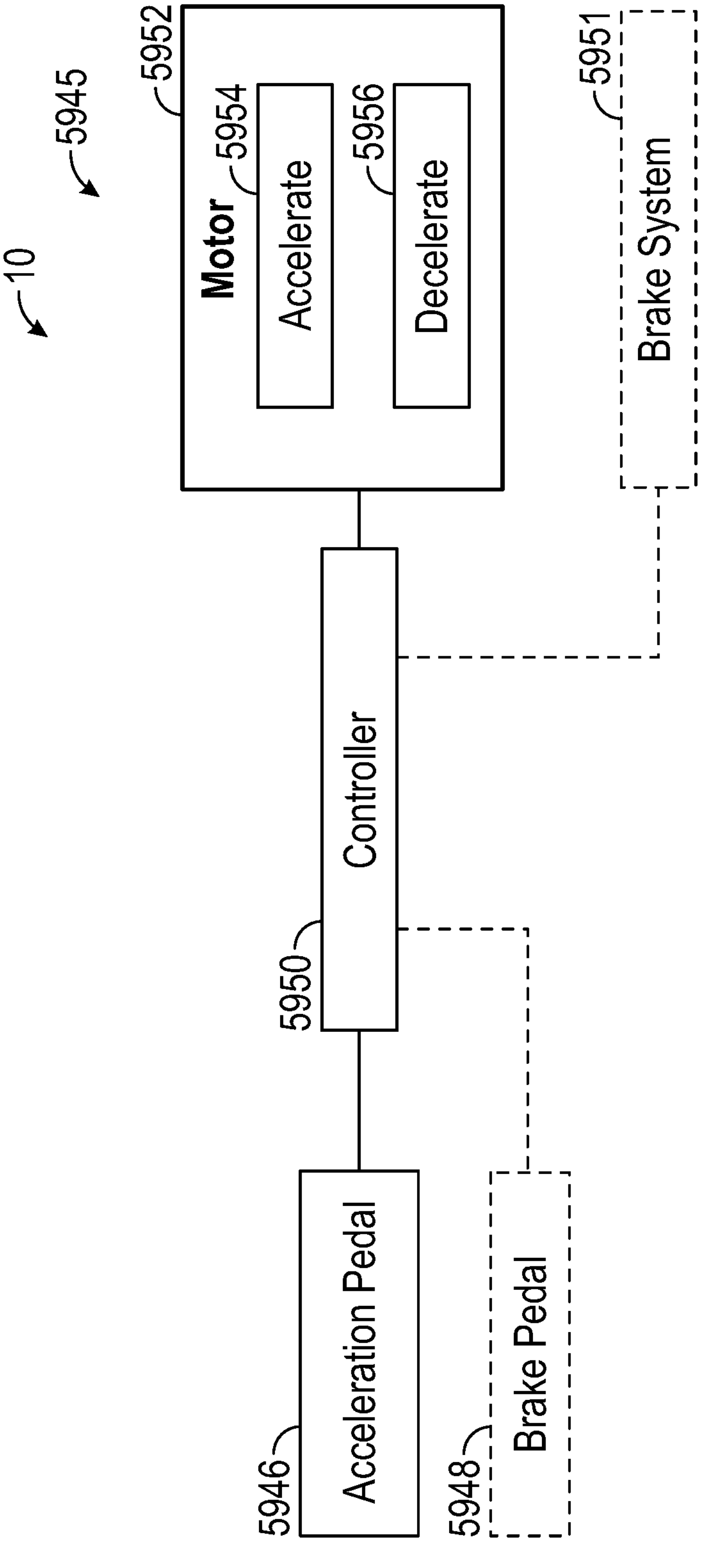
FIG. 50 is a schematic block diagram of a single pedal drive system for use in the vehicle of FIG. 1, according to an exemplary embodiment.

Referring now to FIG. 50, the vehicle 10 may include a one-pedal drive system, shown as drive system 5945. The drive system 5945 is operably coupled to a motor, where interfacing with the drive system 5945 delivers a flow of power to the motor. The drive system 5945 may operate with only one acceleration pedal 5946. In other example, the drive system 5945 may operate with the acceleration pedal and a brake pedal 5948, where the brake pedal 5948 is proximate the acceleration pedal 5946. The acceleration pedal 5946 is naturally positioned proximate a floor of the vehicle 10, where an operator can easily interface with the acceleration pedal 5946. In some embodiments, the acceleration pedal 5946 is embedded into a user interface, where the user interacts with the user interface to operably control the acceleration pedal 5946.

The acceleration pedal 5946 is operably coupled to a controller 5950. The controller 5950 is configured to receive a command (e.g., signal, etc.) from the acceleration pedal 5946. The command is a change in pressure on the acceleration pedal 5946. Additionally or alternatively, the command is a change in displacement on the acceleration pedal 5946. The controller 5950 receives this command, and, in return, determines a frequency of power to provide to the system. That is, the controller 5950 determines a frequency of AC current to provide to a motor 5952 from an inverter. As can be appreciated, a higher frequency of AC current causes the vehicle 10 to accelerate 5954, and thus a lower frequency of AC current causes the vehicle 10 to decelerate 5956.

Electric vehicles are known to deliver an instantaneous amount of torque to the system, where there is no delay in a time between the AC current being delivered and the motor 5952 accelerating or decelerating. As can be appreciated, the user can control the vehicle 10 from only the acceleration pedal 5946, where engaging or disengaging from the acceleration pedal 5946 substantially instantaneously changes the AC current delivered to the motor. In some embodiments, the drive system 5945 may include the brake pedal 5948. The brake pedal 5948 is configured for use in limited situations (e.g., emergency, panic, etc.). In such an embodiment, the brake pedal 5948 may operate substantially similar to the acceleration pedal 5946, where the brake pedal 5948 sends a command to the controller 5950. In response, the controller 5950 determines a frequency of AC current to provide to a brake system 5951 to decelerate the vehicle 10.

External Data Port

Figure 51:
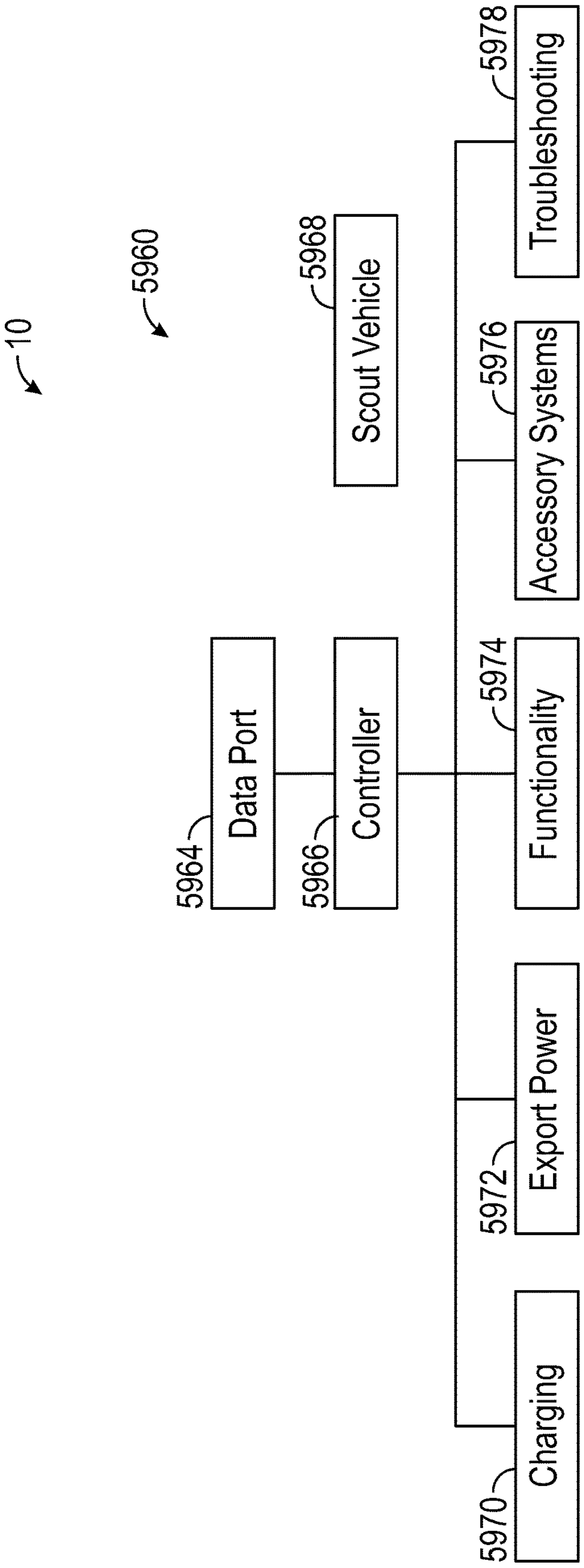
FIG. 51 is a schematic block diagram of an external data port for use in the vehicle of FIG. 1, according to an exemplary embodiment.

Referring now to FIG. 51, a control system 5960 for the vehicle 10 is shown. The control system 5960 is an external data port system capable of controlling one or more vehicles 10. The control system 5960 may include a data port 5964. The data port 5964 is positioned proximate a power connector (e.g., power connector 1004, etc.). The data port 5964 is a controller area network (CAN) port that can be operably coupled to one or more vehicles 10. As discussed in greater detail herein, the data port 5964 is configured to provide selective functionality to various systems of the vehicle 10.

The control system 5960 further includes a controller 5966. The controller 5966 is operably coupled to the data port 5964 and the vehicle subsystems, where the controller 5966 may receive a signal from the data port 5964 to actuate one or more of the vehicle subsystems. The controller 5966 is a tether, where the tether is operably coupled to the vehicle subsystems. Additionally or alternatively, the tether is coupled to a user interface (e.g., mobile device, etc.) where the user can provide commands to the tether from a remote location. The vehicle subsystems may include, but are not limited to, a charger 5970, an export power 5972, functionality 5974, accessory systems 5976, and troubleshooting 5978. The user may provide a command to the tether, where the tether selectively actuates and/or supplies power to the vehicle subsystems 5970, 5972, 5974, 5976, 5978. In other embodiments, the controller 5964 may automatically control functionality of the vehicle subsystems 5970, 5972, 5974, 5976, 5978 in response to receiving a command from the data port 5964.

Additionally or alternatively, the controller 5966 is operably coupled to an additional vehicle, shown as scout vehicle 5968. In such an example, the scout vehicle 5968 may include a control system that is substantially similar to the control system 5960, where the scout vehicle control system performs a command sent by the control system 5960. Thus, the scout vehicle 5968 is a slave vehicle to the vehicle 10. As can be appreciated, the control system 5960 may control functionality of a fleet of vehicles to perform a specific operation, task, or the like. By way of example, the controller 5966 is operably coupled to more than one scout vehicle 5968, where the scout vehicles 5968 can be configured as slave vehicles to the vehicle 10.

Battery Heater

Figure 52:
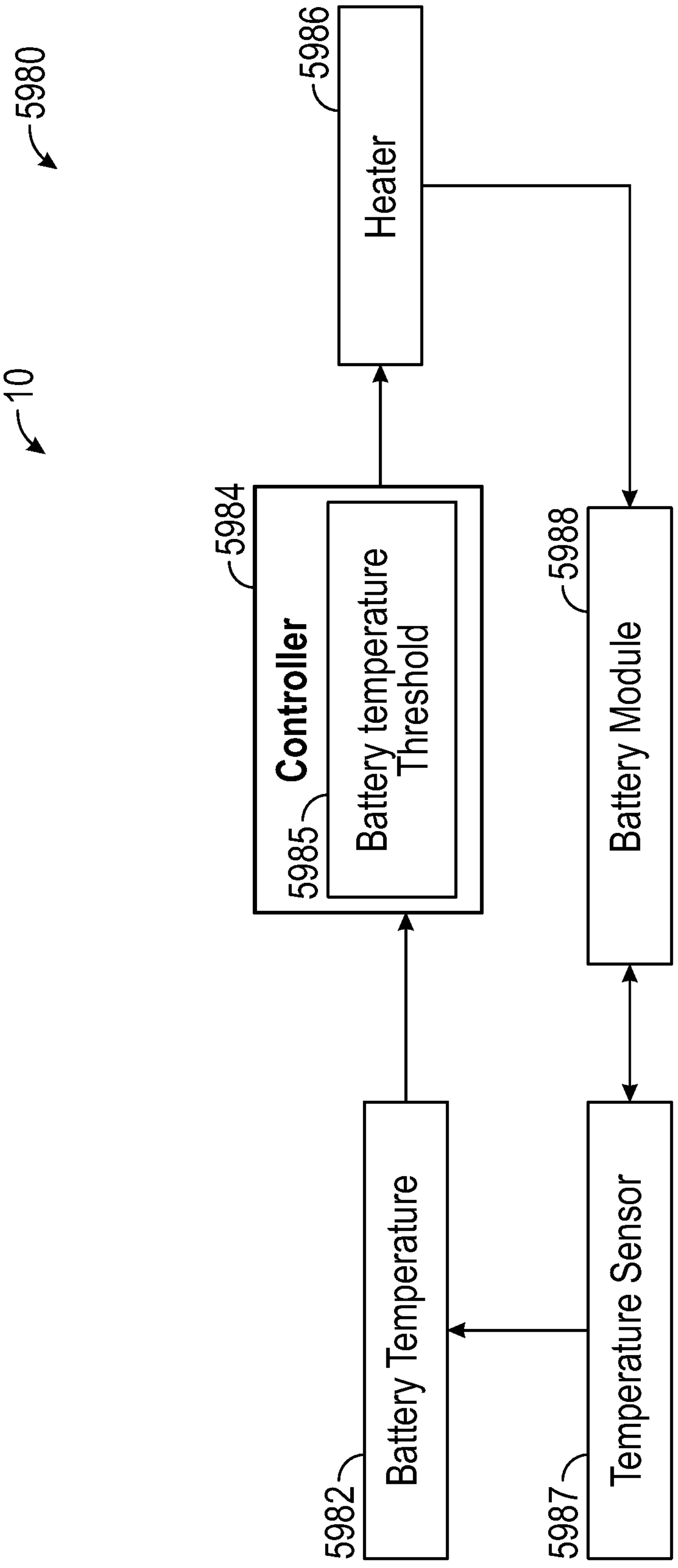
FIG. 52 is a schematic block diagram of a battery heater for use in the vehicle of FIG. 1, according to an exemplary embodiment.

Referring now to FIG. 52, a battery heater system 5980 for a vehicle 10 is shown. The battery heater system 5980 is configured to provide a level of heat to a battery module 5988. As can be appreciated, when the vehicle 10 is in a cold environment, or has not been run in a while, the battery module 5988 gets cold and may have difficulty providing sufficient power to the vehicle 10. The battery heater system 5980 includes a temperature sensor 5987 that is operably coupled to the battery module 5988. The temperature sensor 5987 is configured to determine a battery temperature 5982. The temperature sensor 5987 is configured to determine an overall battery temperature on an outer surface of the battery module 5988. In other embodiments, the temperature sensor 5987 is configured to determine a battery temperature within the battery module 5988 (e.g., battery cell temperature, etc.).

The battery temperature 5982 is operably coupled to a controller 5984, where the controller 5984 is configured to receive the battery temperature 5982. The controller 5984 may include a battery temperature threshold 5985, where the controller 5984 compares the battery temperature 5982 to the battery temperature threshold 5985. The battery temperature threshold 5985 is a minimum temperature threshold. In other embodiments, the battery temperature threshold 5985 is a minimum and maximum temperature threshold. If the battery temperature 5982 is below the battery temperature threshold 5985, the controller 5984 may send a command to actuate a heater 5986. The heater 5986 is configured to provide a level of heat to the battery module 5988 to warm up the battery module 5988. The heater 5986 may draw heat from an engine, motor, or the like. In other embodiments, the heater 5986 is an accessory heater configured to provide heat to the battery module 5988.

The battery heater system 5980 is a continuous system, where the temperature sensors 5987 are constantly monitor the battery module 5988. In some embodiments, the controller 5984 may include a user interface, where the user can monitor a status of the battery module 5988 and manually control vehicle systems to provide heat to the battery module 5988.

Cabin Heater for EV Mode

Figure 53:
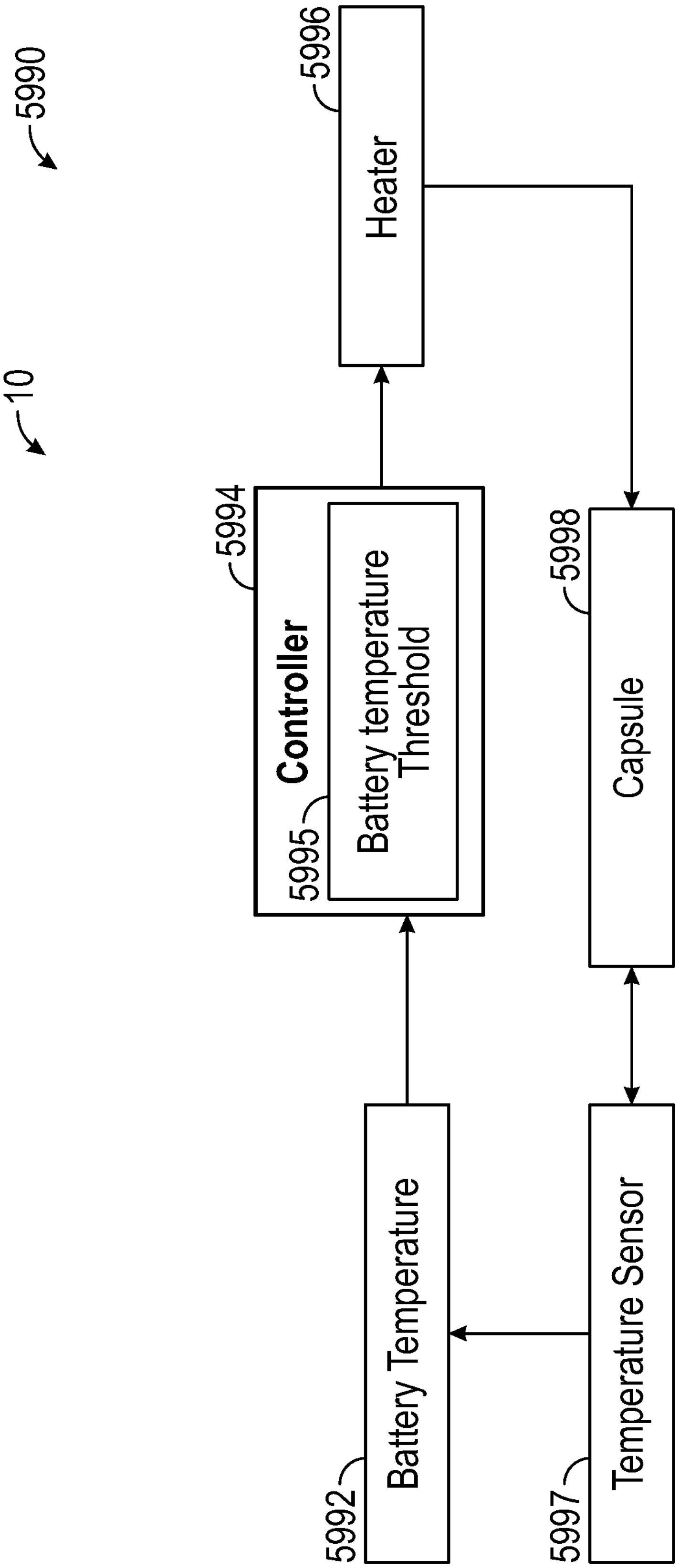
FIG. 53 is a schematic block diagram of a cabin heater for use in the vehicle of FIG. 1, according to an exemplary embodiment.

Referring now to FIG. 53, a capsule heater system 5990 for a vehicle 10 is shown. The capsule heater system 5990 is configured to provide a level of heat to a capsule 5998 when the vehicle 10 is in an electric vehicle (EV) mode. In other embodiments, the capsule heater system 5990 is configured to provide a level of heat to the capsule 5998 when the vehicle 10 is in a mode other than EV mode. The capsule heater system 5990 includes a temperature sensor 5997 that is operably coupled to the capsule 5998. The temperature sensor 5997 is configured to determine a battery temperature 5982. The temperature sensor 5997 is configured to determine an overall battery temperature on an outer surface of the capsule 5998. In other embodiments, the temperature sensor 5997 is configured to determine a battery temperature within the capsule 5998 (e.g., battery cell temperature, etc.).

The capsule temperature 5992 is operably coupled to a controller 5994, where the controller 5994 is configured to receive the capsule temperature 5992. The controller 5994 may include a capsule temperature threshold 5995, where the controller 5994 compares the capsule temperature 5992 to the capsule temperature threshold 5995. The capsule temperature threshold 5995 is a minimum temperature threshold. In other embodiments, the capsule temperature threshold 5995 is a minimum and maximum temperature threshold. If the capsule temperature 5992 is below the capsule temperature threshold 5995, the controller 5994 may send a command to actuate a heater 5996. The heater 5996 is configured to provide a level of heat to the capsule 5998 to warm up the capsule 5998. The heater 5996 is configured to be an electric heater that draws power from a battery module positioned within the vehicle 10.

The capsule heater system 5990 is a continuous system, where the temperature sensors 5987 are constantly monitor the capsule 5998. In some embodiments, the controller 5994 may include a user interface, where the user can monitor a status of the capsule 5998 and manually control vehicle systems to provide heat to the capsule 5998.

Although a continuous capsule heater system 5990 is shown, the capsule heater system 5990 is manually controlled by one or more users positioned within the capsule 5998. In such an embodiment, the users may manually select a desired temperature at which they wish the capsule to be at, and the controller 5994 may output an AC current to the heater to match the desired temperature. For example, if the user wishes the capsule 5998 to be warmer, the controller 5994 may send a command to increase a frequency at which the AC current is delivered to the heater 5996. Accordingly, if the user wishes the capsule 5998 to be cooler, the controller 5994 may send a command to decrease the frequency at which the AC current is delivered to the heater 5996.

Climate Controlled Seats

Figure 54:
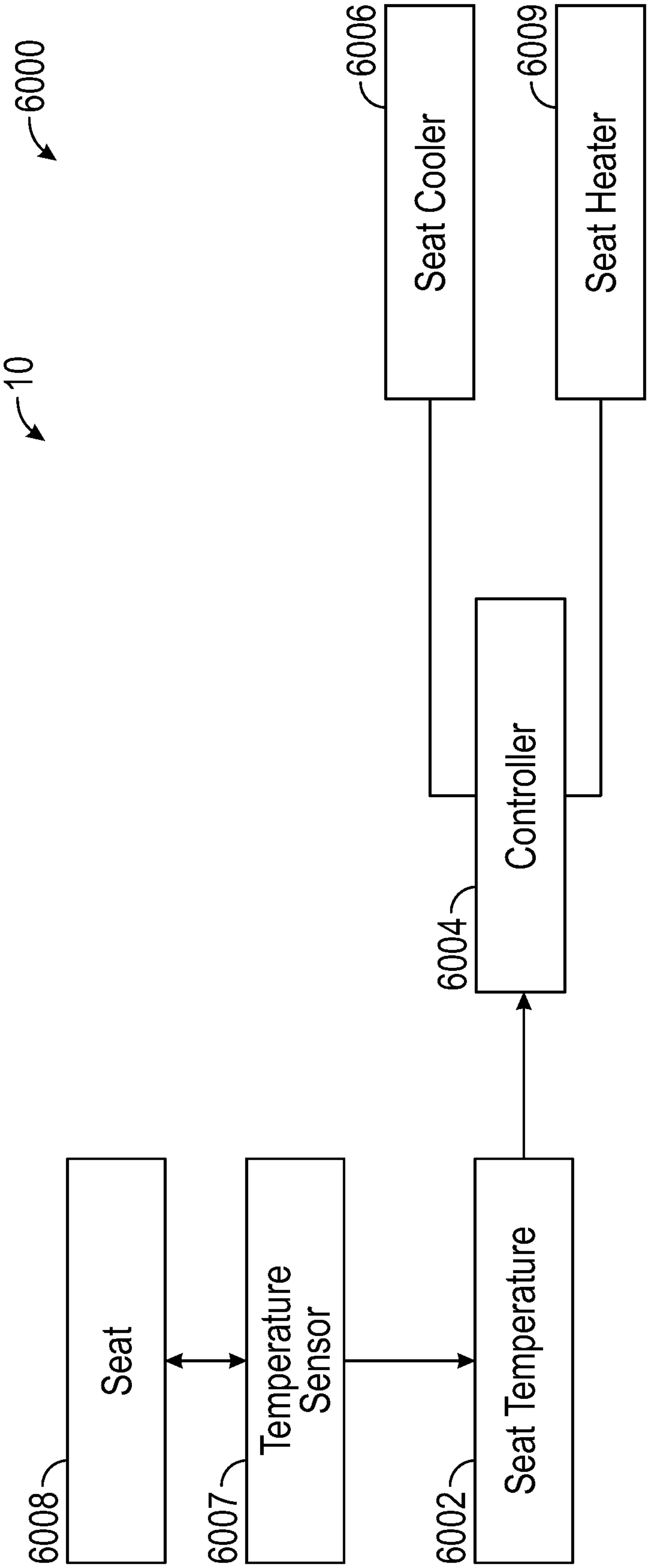
FIG. 54 is a schematic block diagram of temperature controlled seats for use in the vehicle of FIG. 1, according to an exemplary embodiment.

Referring now to FIG. 54, a climate controlled seat system for a vehicle 10, shown as control system 6000, is shown. The control system 6000 is configured to control a temperature of a seat 6008. The seat 6008 is positioned within the vehicle 10 and further be defined as at least one of a front module seats and/or a capsule seats. The control system 6000 includes a temperature sensor 6007 configured to measure a seat temperature 6002. The temperature sensor 6007 may measure the seat temperature 6002 on an outside of the seat 6008. Additionally or alternatively, the temperature sensor 6007 may measure the seat temperature 6002 within the seat 6008.

The control system 6000 may include a controller 6004 configured to receive the seat temperature 6002. The controller 6004 may include a user interface (e.g., buttons, module, etc.) where a user can interact with the user interface. For example, the user may desire a cooler seat, and, as such, interface with the controller 6004 to cool the seat 6008. In another example, the user may desire a warmer seat, and, as such, interface with the controller 6004 to warm the seat 6008. By way of example, the controller 6004 is operably coupled to a heating system and/or a cooling system to heat the seat 6009 and cool the seat 6006. As can be appreciated, the user may also interface with the controller 6004 to turn off the heating system and/or the cooling system.

Vehicle without High-Voltage

Figure 55:
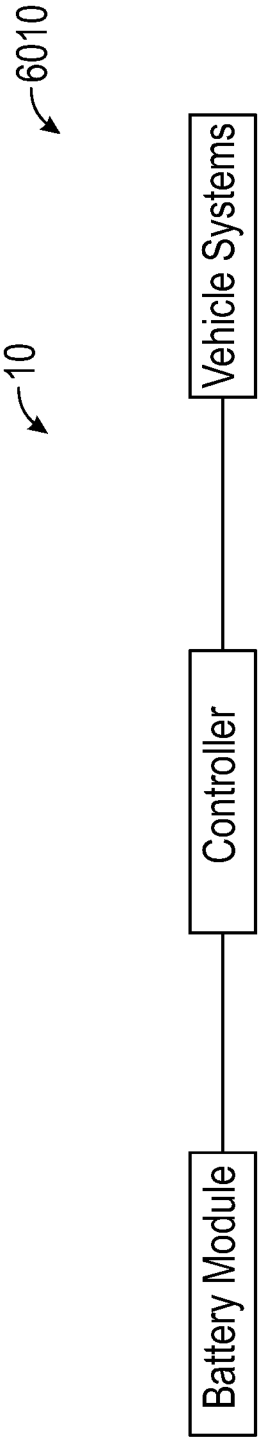
FIG. 55 is a schematic block diagram of a battery system for use in the vehicle of FIG. 1, without a high voltage system, according to an exemplary embodiment.

Referring now to FIG. 55, a battery module system, shown as system 6010 for a vehicle 10 is shown. The system 6010 is a low voltage system, where the vehicle 10 may function from the low voltage system. The vehicle 10 may include a battery module 6012. The battery module 6012 is a low voltage battery module. Traditionally, low voltage battery modules output larger current amounts compared to high voltage battery modules, thus the vehicle 10 may need enhanced systems to manage the higher current output. The battery module 6012 is operably coupled to a controller 6014. The controller 6014 is configured to monitor a current output from the battery module 6012. For example, if the controller 6014 determines that the battery module 6012 is outputting more current than what a vehicle systems 6016 are capable of maintaining, the controller 6014 may send a command to lower a current output from the battery module 6012. Accordingly, if the controller 6014 determines that the battery module 6012 is outputting sufficient current for the vehicle systems 6016, the controller 6014 may permit the flow of current to the vehicle systems 6016.

To manage the increased current output from the battery module 6012, the vehicle 10 may need increased vehicle systems. For example, the vehicle 10 may need a larger inverter to convert the DC current outputted from the battery module 6012 to AC current. For example, in another embodiment, the vehicle 10 may need to increase a size of a motor to handle the increased current load on the motor. Furthermore, the battery module 6012 produces lower voltage but higher current compared to a high voltage battery module, thus maintaining a substantially similar power output for the vehicle. In some embodiments, the battery module 6012 may produce more power than a high voltage system. In other embodiments, the battery module 6012 may produce less power than a high voltage system. Additionally or alternatively, the vehicle systems 6016 is safer to work with, as the vehicle systems 6016 are handling lower voltage instead of higher voltage.

Waterproof Vehicle

The vehicle 10 is defined as having systems capable of prohibiting water from leaking within a passenger capsule of the vehicle 10. The vehicle 10 may include one of more seals positioned around and/or within the passenger capsule of the vehicle 10. The seals is engaged when the doors of the vehicle are in a closed position. In other embodiments, the seals is positioned away from the doors (e.g., waterproof kit, etc.), where the seals are constantly engaged to prohibit water flow into the vehicle 10. Furthermore, the seals is positioned underneath the vehicle 10 to prohibit water from flow up from underneath the vehicle 10. As can be appreciated, the vehicle 10 may include a sealing system between the front module and the passenger capsule to prevent water from flowing into the passenger capsule proximate the front module.

The vehicle 10 may include an oxygen intake system. The oxygen intake system is fluidly coupled to the passenger capsule, where the oxygen intake system may provide a flow of fresh air therethrough. The oxygen intake system may include a valve system configured to reposition between an open position and a closed position. As can be appreciated, the oxygen intake system may prevent a flow of air to the vehicle 10 when the vehicle 10 is not underwater. In one embodiment, the oxygen intake system may include a snorkel. The snorkel is configured to hold an amount of fresh air within, where the snorkel exhausts the fresh air into the passenger capsule when the vehicle 10 is submerged in water. In such an embodiment, the oxygen intake system may include one or more snorkels coupled to the vehicle 10. In another embodiment, the oxygen intake system is one or more oxygen tanks coupled to the vehicle 10. In such an embodiment, a user within the vehicle may actuate the oxygen intake system to permit a flow of air to the passenger capsule. In another embodiment, the oxygen intake system is fixedly coupled to the vehicle 10, where the oxygen intake system extends outward from the vehicle 10. In such an embodiment, the oxygen intake system is an airflow tube that extends through the water and into the air to provide fresh air to the passenger capsule.

Suspension System

Figure 56:
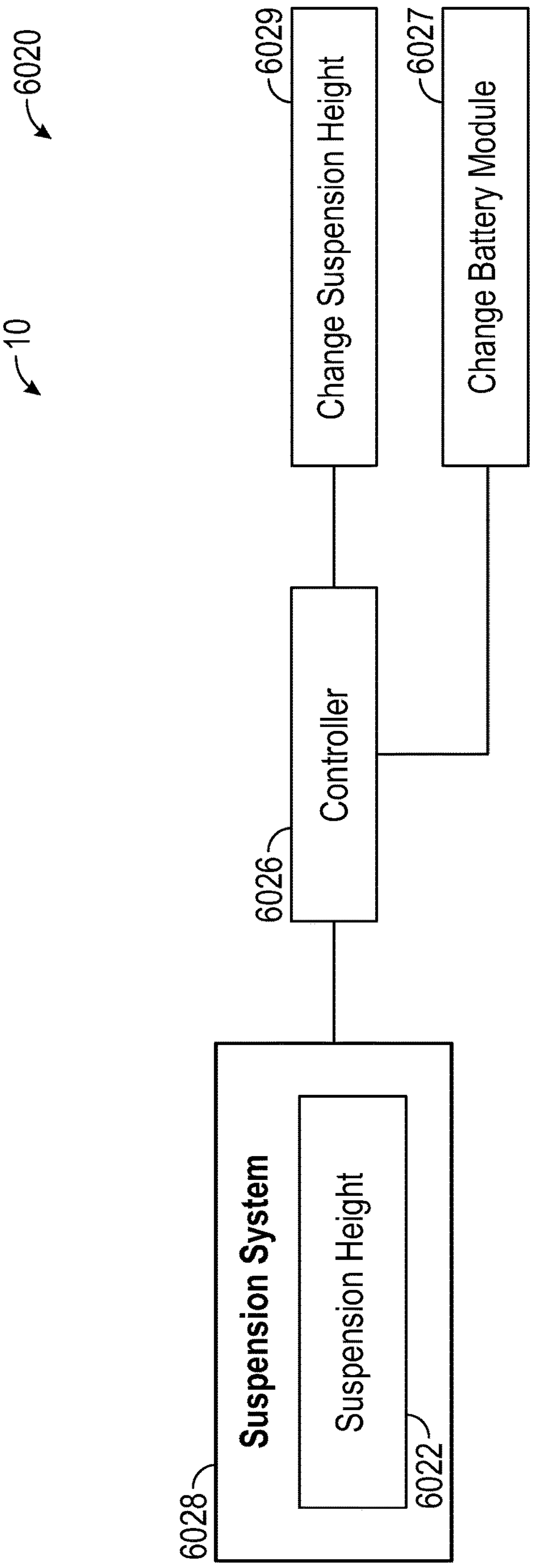
FIG. 56 is a schematic block diagram of a suspension system for use in the vehicle of FIG. 1, according to an exemplary embodiment.

Referring now to FIG. 56, the vehicle 10 may include a suspension control system 6020 configured to control a suspension system 6028. The suspension system 6028 may include a suspension height 6022 (e.g., damper height, etc.). The suspension height 6022 is a height of the suspension system 6028 relative to the ground. In other embodiments, the suspension height 6022 is a relative stoke height of the suspension system 6028. The suspension system 6028 is selectively repositionable between a lowered position, a raised position, and a middle position. The lowered position is where the suspension system 6028 is positioned closest to the ground; the raised position is where the suspension system 6028 is positioned furthest from the ground; and the middle position is any position between the lowered position and the raised position. According to an exemplary embodiment, the suspension system 6028 may replace the current gas springs with magnets, where the magnets output high onboard energy to provide system damping. In other embodiments, the suspension system 6028 is an electric suspension system that is operable via one or more motors. In still other embodiments, the suspension system 6026 could utilize gas springs, where the gas springs include an adjustment for the user to adjust a spring rate. In such an embodiment, the spring rate is adjusted when an armor kit is coupled to the vehicle.

According to an exemplary embodiment, the suspension system 6028 may replace a hydraulic gear pump with an electric gear pump. In such an embodiment, the electric gear pump utilizes mechanical energy to change a height of the suspension system 6028.

The suspension system 6028 is operably coupled to a controller 6026. The controller 6026 is configured to determine the suspension height 6022. The controller 6026 is configured to send a command to actuate the suspension system 6026 between at least the lowered position and the raised position. The actuation of the suspension system 6026 is an automatic actuation. Additionally or alternatively, the controller 6026 is operably coupled to a user interface, where a user can manually select an operation for the suspension system 6028.

In one embodiment, the controller 6026 may detect the presence of increased payload (e.g., weapon system, additional battery module, increased passengers, more ammo, etc.). Specifically, the controller 6026 detects the presence of an e-weapon system. In response to detecting the e-weapon system, the controller 6026 may send a command to change the suspension mode 6024. By way of example, the controller 6026 may change the suspension mode 6024 between a soft mode and a hard mode. The soft mode is a mode where there is increased damping and the hard mode is a mode where there is decreased damping. When the e-weapon system is present, the controller 6026 may change the mode into the soft mode to provide further stabilization to the e-weapon system.

In another embodiment, the controller 6026 may detect the presence of a specific terrain (e.g., hill, flat, highway, sand, etc.). Specifically, the controller 6026 may change the suspension height 6029 based on the terrain. For example, the controller 6026 may detect that the vehicle 10 is in on a highway and automatically raise the suspension height 6022. In another example, the controller 6026 may detect that the vehicle 10 is in the hills and automatically lower the suspension height 6022. In yet another embodiment, the controller 6026 is a torque controller.

In yet another embodiment, the controller 6026 is operably coupled to a battery module. In such an embodiment, the suspension system 6028 is configured to produce energy based on the directional travel from the suspension system 6028 moving up and down. For example, when the vehicle 10 is traveling over bumpy or rocky areas that are constantly causing the suspension height 6022 to change, the suspension system 6028 produces energy from that. This energy can then be utilized to charge or regenerate the battery module 6027. By way of example, the suspension system 6028 may generate more energy the higher or longer that the suspension system 6028 displaces.

According to an exemplary embodiment, the suspension system 6028 may be configured to automatically actuate upon receiving an external blast. That is, the suspension system 6028 may be configured to automatically change the suspension height 6022 when the external blast is introduced to the vehicle 10. When the external blast happens, the vehicle 10 is forced into the air, sometimes having no ground traction. Upon initial external blast, when the vehicle is ascending into the air, the suspension system 6028 changes the suspension height 6022. This may be a preloading state, where the suspension system 6028 is loading for descending. Then, upon descending from the air, the suspension system 6028 may automatically raise the suspension height 6028 (e.g., lower the wheel system) to a lowest possible location. Simultaneously, suspension springs and dampers positioned within the suspension system 6028 may harden and/or stiffen up. As can be appreciated, the faster the wheels make ground contact, in combination with the stiffened suspension system, results in a decreased amount of energy introduced to the user during the blast event (e.g., less time for the user in the air, etc.).

According to another exemplary embodiment, the suspension system 6028 may be repositionable into a direction of motion. When the external blast occurs, the vehicle 10 may begin to roll, thus the suspension system 6028 may be configured to reposition and/or reposition the wheel system to slow down the rotation. That is, the suspension system 6028 and/or wheel system may be repositioned in a direction of the vehicle roll to decrease a rotational velocity and or prevent the roll from happening.

Wireless Charging

Wireless Charging Configuration

Figure 57:
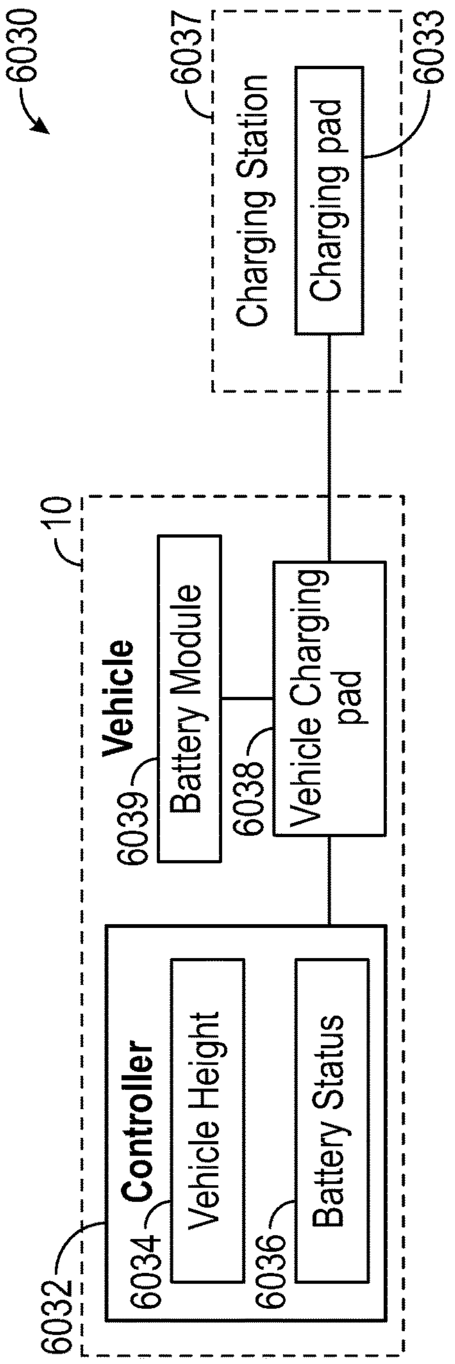
FIG. 57 is a schematic block diagram of a wireless charging system for use in the vehicle of FIG. 1, according to an exemplary embodiment.

Referring now to FIG. 57, a vehicle wireless charging schematic, shown as charging system 6030, is shown. The charging system 6030 may include a vehicle 10 and a charging station 6037. The vehicle 10 is operably coupled to the charging station 6037 where the charging station 6037 provides energy a battery module 6039. By way of example, the vehicle 10 may include a vehicle charging pad 6038 positioned proximate a chassis of the vehicle 10. The vehicle charging pad 6038 is operably coupled to charging station charging pad, shown as charging pad 6033. In other embodiments, the vehicle 10 may include a charging coil positioned underneath the vehicle 10, proximate the chassis.

The charging pad 6033 is configured to supply power to the vehicle charging pad 6038, where the vehicle charging pad 6038 may deliver power directly to the battery module 6039 to charge the battery module 6039. In other embodiments, the charging pad 6033 is directly operably coupled to the battery module 6039, where power is supplied directly to the battery module 6039. The charging pad 6033 is configured to output DC current, where no inverter is needed to convert the current. In other embodiments, the charging pad 6033 may output AC current, thus the vehicle 10 and/or the charging station 6037 may need an inverter to convert the current into DC current. Additionally or alternatively, the vehicle charging pad 6038 is operably coupled to the charging pad 6033 when the vehicle 10 is below a height threshold. For example, if the vehicle 10 is above the height threshold, the vehicle charging pad 6038 is out of range from the charging pad 6033, thus prohibiting a flow of power therebetween.

The vehicle 10 includes a controller 6032. The controller 6032 is operably coupled to the battery module 6039 and a suspension system. More specifically, the controller 6032 is configured to receive a battery status 6036 from the battery module 6039 and a vehicle height data 6034 from the suspension system. In response to receiving the battery status 6036 the controller 6032 may send a command to change the vehicle height 6034. For example, if the battery status 6036 detects that the battery module 6039 is in need of power, the controller 6032 may send a command to lower the vehicle height 6034 such that the vehicle charging pad 6038 may couple to the charging pad 6033. In some embodiments, the controller 6032 is operably coupled to the charging station 6037, where the controller 6032 automatically sends a command to lower the vehicle height 6034 when the vehicle 10 is within a range of the charging station 6037.

In some embodiments, the charging station 6037 may include more than one charging pad 6033 and/or be large enough to couple to more than one vehicle 10. In such an embodiment, the controller 6032 is configured to determine a priority of the vehicles 10 and engage or disengage from the charging station 6037 accordingly. For example, the controller 6032 is configured to engage the highest priority vehicle 10 before engaging vehicles 10 having lower priority. In some embodiments, the controller 6032 is configured to sequentially engage or disengage the vehicles 10 from the charging station 6037. In such an embodiment, the controller 6032 may sequentially engage or disengage the vehicles 10 based on their priorities. Additionally or alternatively, the controller 6032 may engage or disengage the vehicles 10 based on an alternate criteria.

Inter-Vehicle Wireless Charging

Figure 58:
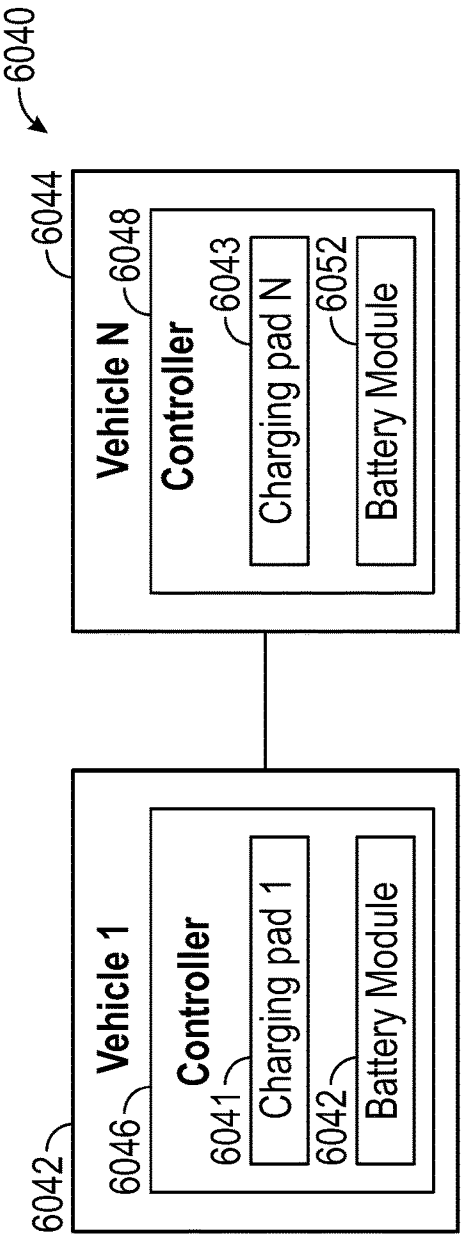
FIG. 58 is a schematic block diagram of a wireless charging system for use in the vehicle of FIG. 1, according to an exemplary embodiment.
Figure 59:
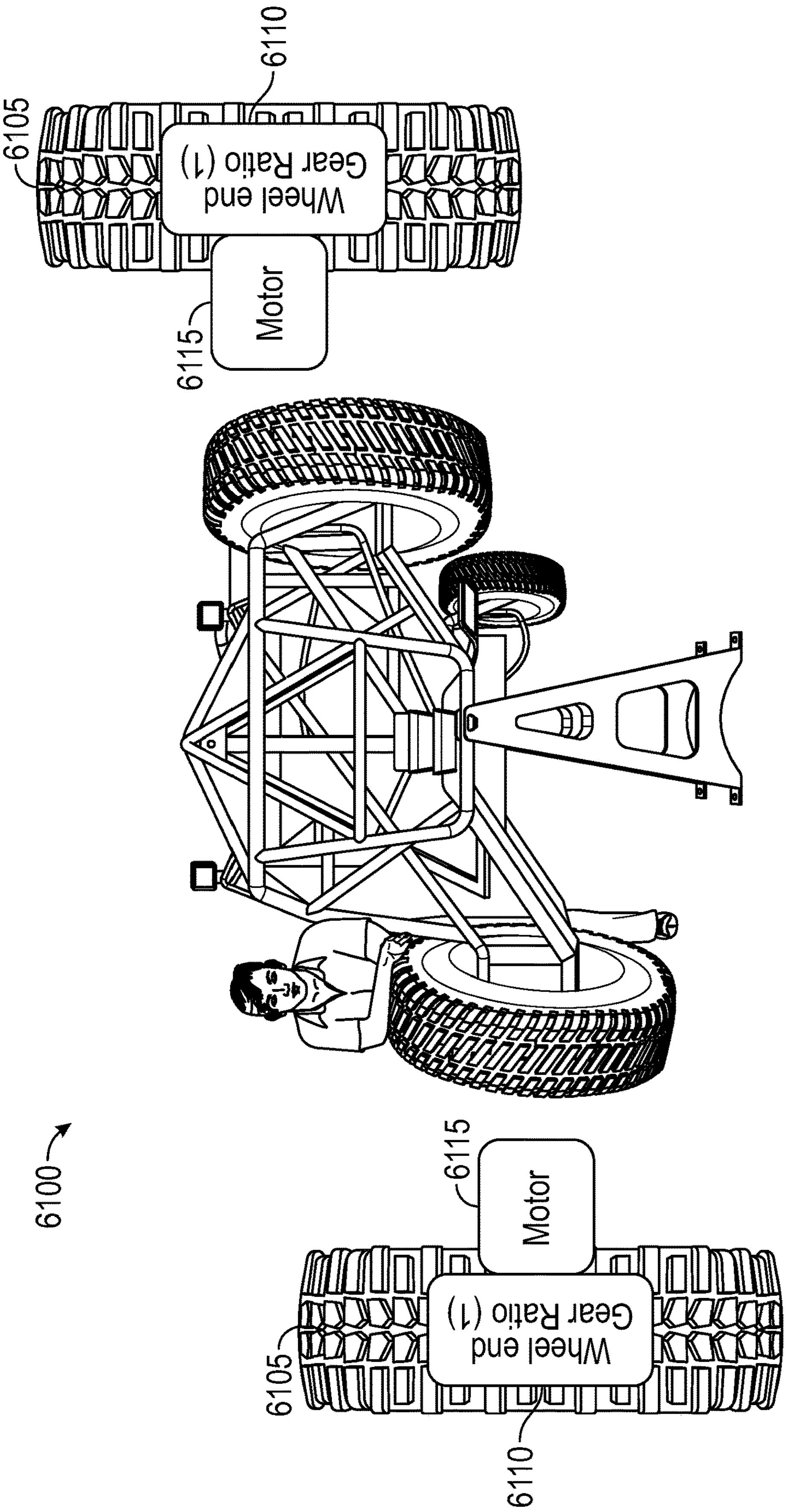
FIG. 59 is a detailed front view of an e-axle system for the vehicle of FIG. 1, according to an exemplary embodiment.

Referring now to FIG. 58, an inter-vehicle wireless charging schematic, shown as charging system 6040 is shown. The charging system 6040 includes a first vehicle 6042 and a second vehicle, shown as vehicle N 6044. The first vehicle 6042 is operably coupled to the vehicle N 6044. By way of example, there is more than one vehicle N 6044, where each additional vehicle is operably coupled to at least one of the first vehicle 6042 or the other vehicle N 6044. The vehicles 6042, 6044 is independent of one another and have their own control systems. In other embodiments, the first vehicle 6042 is the master vehicle, and the other vehicle N 6044 is the slave vehicles.

Each vehicle 6042, 6044 is include a substantially similar subsystem (e.g., controller, charging pad, battery module, etc.). The first vehicle 6042 may include at least a controller 6046, a charging pad 6041 and a battery module 6050; and the vehicle N 6044 may include a controller 6048, a charging pad N 6043, and a battery module 6052. The charging pads 6041, 6043 is located proximate at least one of a front module and a rear module of the vehicles 6042, 6044. In some embodiments, the vehicles 6042, 6044 may include two charging pads 6041, 6043 positioned proximate the front module and the rear module. As can be appreciated, each of the charging pads 6041, 6043 are operably coupled to the associated battery modules 6050, 6052, where the charging pads 6041 supply power to the battery module 6050, 6052.

According to an exemplary embodiment, the vehicles 6042, 6044 are selectively coupled to one another such that the charging pad 6041 can supply power to the charging pad 6043, and vice versa. For example, if the first vehicle 6042 needs power, the charging pad 6041 may operably couple to the charging pad 6043 to draw power from the vehicle N 6044. The charging pads 6041, 6043 may automatically couple to one another or be manually coupled to the one another. By way of example, in fleet transport where there are more than two vehicles, inter-vehicle charging ensures that the vehicles maintain sufficient power and has fleet management benefits (e.g., fleet stays together, etc.). The vehicle 6042, 6044 that is in need of power needs to drive up to a location proximate the associated charging pad 6041, 6043 location to operably couple. The location could be at least one of the front and rear of the vehicles 6041, 6043. In other embodiments, charging pads 6041, 6043 could be integrated into sides of the vehicles 6042, 6044, where vehicles 6042, 6044 may pull up next to one another.

Water Filtration and Desalination Kit

The vehicle 10 may include a system for filtration and/or desalination of water, referred to herein as a filtration kit. The filtration kit may be configured to provide clean, potable drinking water to a user. The filtration kit may include a water source. The water source may be positioned within the vehicle 10, where the water source delivers a flow of water through via one or more water supply lines. The water supply lines may include one or more filters coupled to the water supply like and configured to filter out any number of contaminates or bacteria. Coupled to the water supply line, at an end of the vehicle 10, may be a water outlet. The water outlet may include a valve configured to selectively open and close to permit a flow of fluid therethrough. The valve may be a mechanical valve, where the user manually opens and closes the valve. Additionally or alternatively, the valve may be an automatic valve where a controller automatically opens and closes the valve.

The filtration kit may be include a pump. The pump may be configured to output pressurized water from the water source. The pump may be coupled to a battery module, where the battery module supplies power to actuate the pump. The water source may further include a heating system. The heating system may receive heat from the vehicle 10 (e.g., engine, etc.) or include an auxiliary heater configured to provide heat to the water source. Additionally or alternatively, the auxiliary heater may provide heat to the water supply lines. The auxiliary heater may provide heat to the water to boil and desalinate the water. According to an exemplary embodiment, the filtration kit may be operably coupled to a control system. The control system may receive a command and actuate the filtration kit to pump clean water out of the water source.

E-Axle and Integrated Motor System

Referring now to FIGS. 59-67, an e-axle system 6100 is shown. The e-axle system 6100 includes one or more tractive elements 6105, wheel ends 6110, and one or more motors 6115. The wheel ends 6110 may be coupled to the tractive elements 6105 and the motors 6115, where the motors 6115 are defined to be wheel end motors 6115. Advantageously, eliminating halfshaft joints and/or having motors 6115 positioned proximate the tractive elements 6105 permits increased tractive element travel range.

Figure 60:
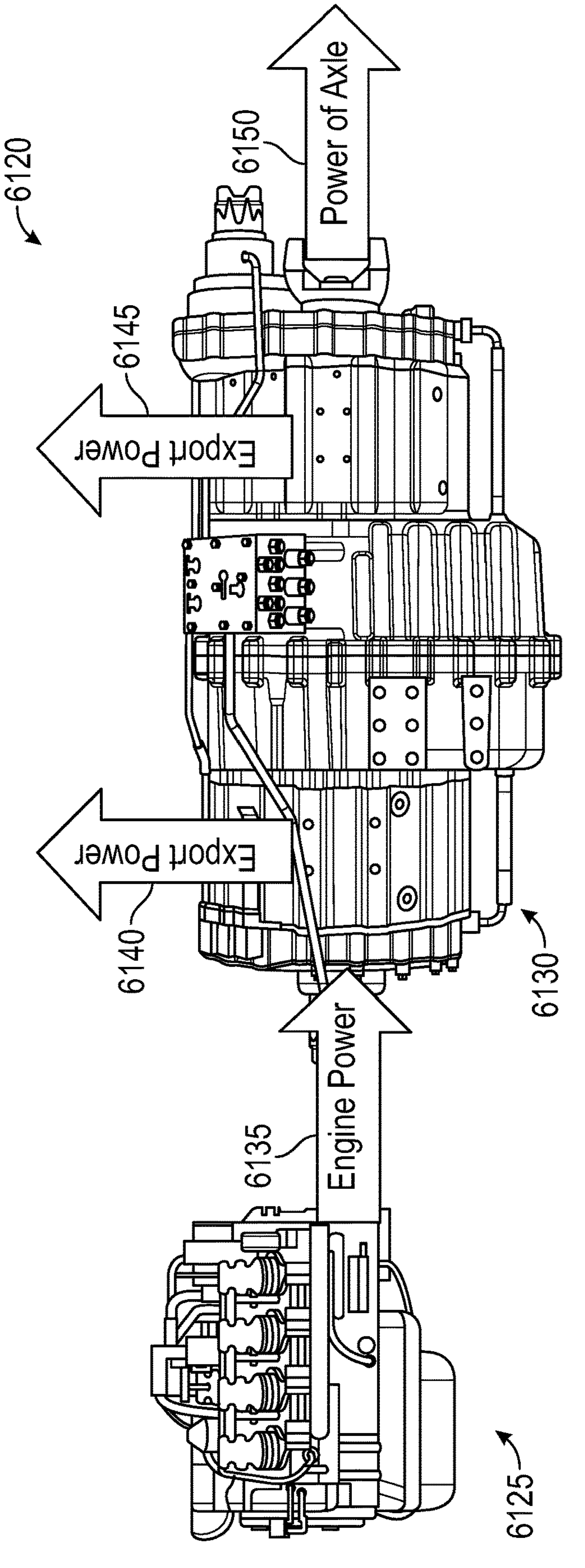
FIG. 60 is a detailed view of a powertrain system for use in the e-axle system of FIG. 59, according to an exemplary embodiment.

Referring now to FIG. 60, the e-axle system 6100 includes a drivetrain system 6120. The drivetrain system 6120 includes a motor 6125 and a transmission 6130, where the transmission is operably coupled to the motor 6125. That is, the drivetrain system 6120 is a series electric system where the motor 6125 provides power 6135 to the transmission 6130. The transmission 6130 may be configured to generate rotational power within and transfer that rotational port to an axle 6150. The transmission 6135 further outputs export power 6140, 6145 to other vehicle systems to provide power thereto.

Figure 63:
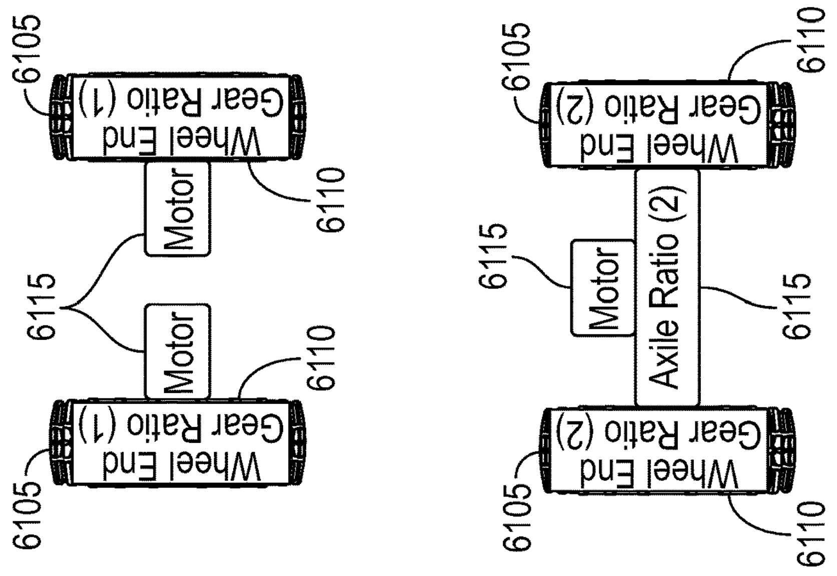
FIGS. 61-66 are various schematic views of the e-axle system of FIG. 59, according to an exemplary embodiment.
Figure 62:
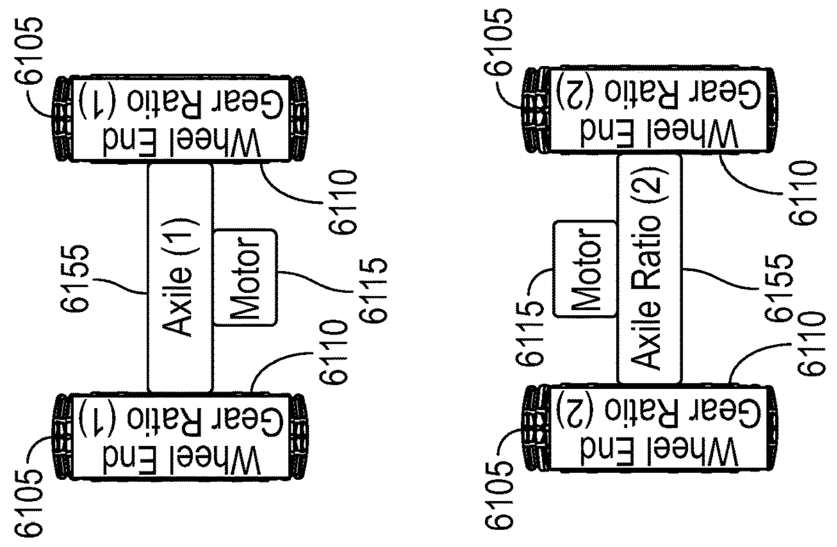
Figure 61:
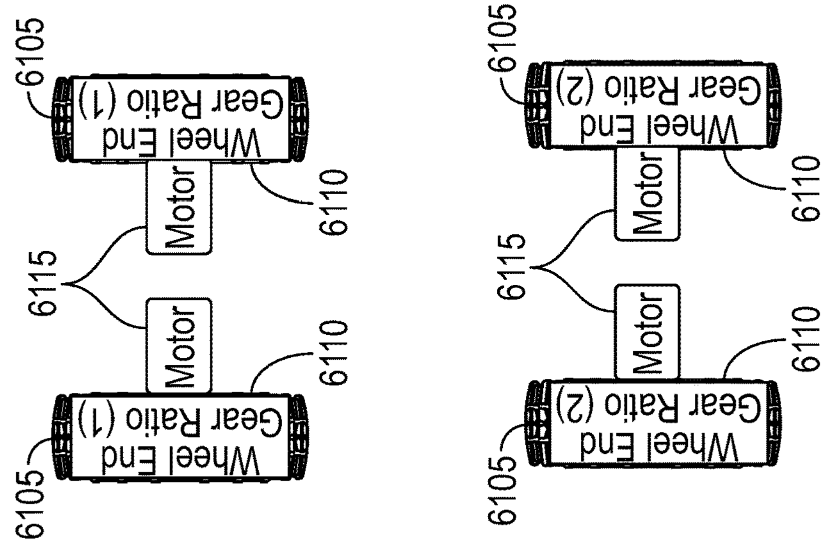

Referring now to FIG. 61-63, different configurations of e-axle systems 6100 are shown. As shown, the e-axle systems 6100 may include different combinations of wheel ends 6110 and motors 6115. For example, in FIGS. 62 and 63, the e-axle systems 6100 may include an axle ratio 6155 coupled to between the tractive elements 6105. The axle ratio 6155 may be coupled to a motor 6115 and wheel ends 6110, where the motor 6115 provides power to the tractive elements 6105 coupled to the wheel ends 6110. The wheel ends 6110 may include varying gear ratios. For example, in FIGS. 61-63, the front tractive elements 6105 include wheel ends 6110 having a first gear ratio and the rear tractive elements 6105 include wheel ends 6110 having a second gear ratio. In yet another example, both the front tractive elements 6110 and the rear tractive elements 6105 include wheel ends 6110 having the same gear ratio. In yet another example, the left tractive elements 6105 include wheel ends 6110 having a different gear ratio than wheel ends 6110 on the right tractive elements 6105. As can be appreciated, having independent motors 6115 for each tractive element 6105 advantageously runs the motors 6115 at higher output levels and further improves motor efficiency.

According to an exemplary embodiment, the e-axle system 6100 may have a specific motor layout for associated drive modes. The vehicle 10 may be selectively repositionable between at least a front-wheel drive, a rear-wheel drive, and an all-wheel drive. For example, if the vehicle 10 goes into front-wheel drive, a controller may engage a front tractive system having a first gear ratio. In such an embodiment, a rear tractive system is disengaged where the motor does not supply power to the wheel ends 6110. According to an exemplary embodiment, when the vehicle 10 is in front-wheel drive, the rear tractive assembly may provide regeneration to a battery module. In another example, if the vehicle 10 goes into all-wheel drive, the controller may engage the rear tractive system having a second gear ratio. In such an embodiment, the front tractive system may be engaged or disengaged. The front tractive system is defined as the front-wheel drive system and the rear tractive system is defined as the all-wheel drive system. In other embodiments, the vehicle 10 is repositionable into a rear-wheel drive mode, where only the rear tractive system is engaged.

The e-axle system 6100 may include a controller operably coupled to the motors. The controller may include a control logic that determines the gear ratios based on vehicle variables (e.g., speed, terrain, payload, status, etc.). By way of example, the front tractive system and the rear tractive system receive different commands based on the vehicle variables. In other embodiments, the front tractive system and the rear tractive system receive the same command. The control logic may be operably coupled to a user interface, where the user manually inputs variables or selects gear ratios based on known ratios.

In some embodiments, the motors 6115 may selectively vary the gear ratios. More specifically, the motors 6115 vary the gear ratios based on a terrain. For example, if the vehicle 10 is driving on a high speed road (e.g., highway, etc.), the motors 6115 configure the wheel ends 6110 to have a first gear ratio. In another example, if the vehicle 10 is driving on a low speed road (e.g., off-road, etc.), the motors 6115 configured the wheel ends 6110 to have a second gear ratio.

Advantageously, the e-axle system 6100 has an increased benefit of having fewer components for the vehicle 10. This results in increased cost savings as less components are not needed to be manufactured or assembled into the vehicle 10, and decrease in vehicle weight providing more load for payload or other necessary components.

Figure 64:
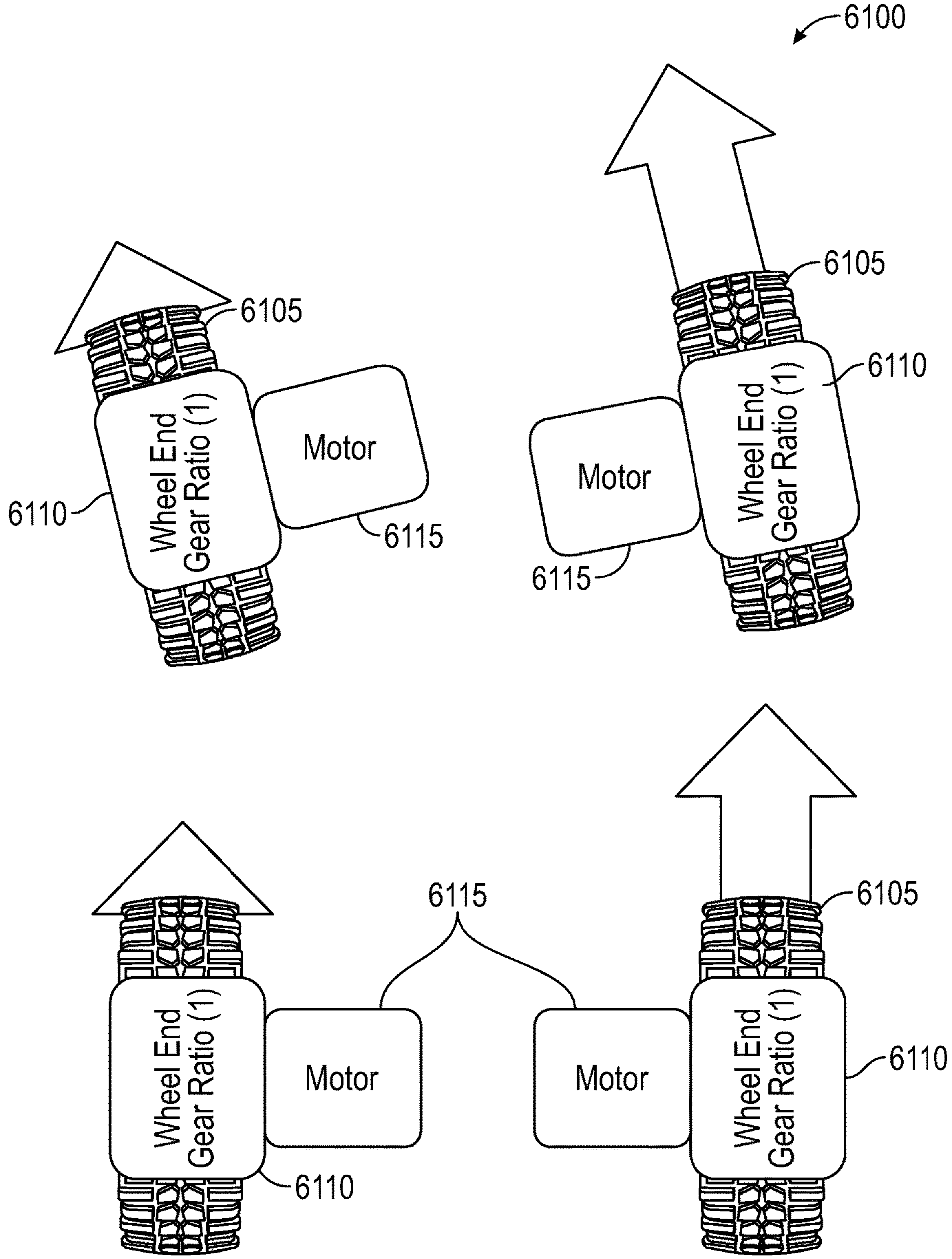
Figure 65:
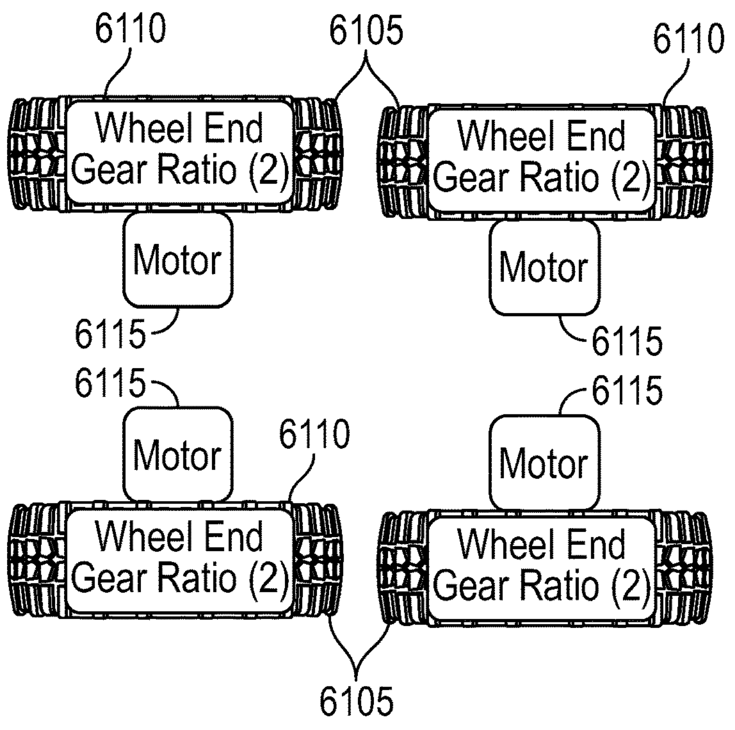
Figure 66:
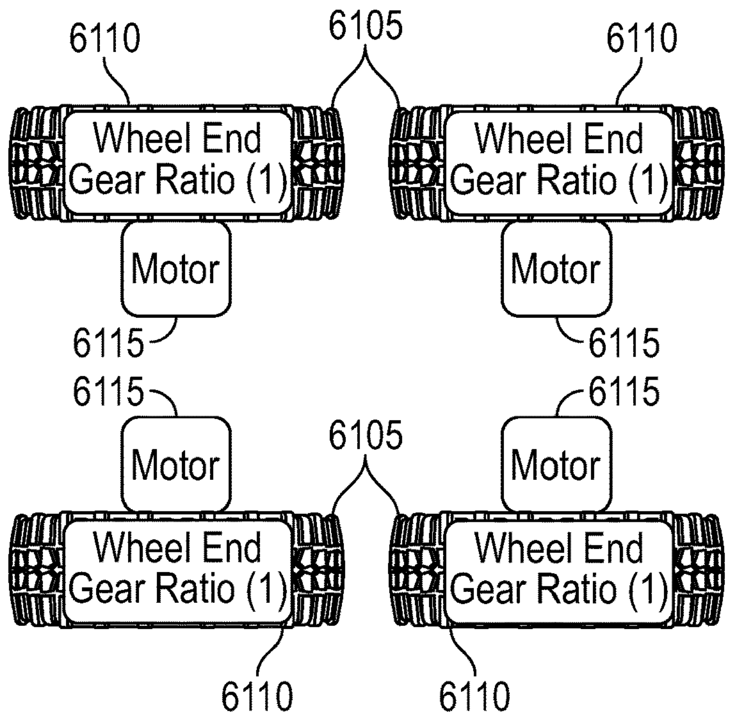

Referring now to FIG. 64, the e-axle system 6100 has independent wheel travel. As shown, the front tractive system is selectively repositionable about the wheel ends 6110. In other embodiments, the rear tractive system is selectively repositionable about the wheel ends 6110. The tractive elements 6105 also each include their own respective motors 6115. The motors 6115 are coupled to the tractive elements 6105 via wheel ends 6110. As such, the motors 6115 are independently controlled and configured to output different amounts of power. In one example, the tractive elements 6105 may be positioned at 45 degree angles about the respective wheel ends to turn the vehicle about a radius of 0 degrees. In another example, the tractive elements 6105 positioned on an outside of a turn are configured to spin faster by the motor 6115 generating more power, and the tractive elements 6105 positioned on an inside of the turn are configured to spin slower by the motor 6115 generating less power. Accordingly, the more power generated from the motors 6115 creates more torque on the tractive elements 6105. According to an exemplary embodiment, the controller is configured to perform torque vectoring. Torque vectoring controls an amount of torque delivered to the wheel ends 6110 via the motors 6105. Furthermore, torque vectoring assists in steering the vehicle 10 by controlling the torque delivered to each wheel end 6110 for a given surface condition. For example, if the surface is slippery, the torque vectoring may limit the amount of torque delivered to the wheel end 6110. The controller may be operably coupled to one or more speed sensors. The speed sensors may be coupled to any component of the vehicle (e.g., tractive elements, etc.). The speed sensors may send a speed data to the controller, where the controller compares the speed data to a speed threshold. The speed threshold may be a maximum speed threshold, where the controller sends a command to the motor 6115 to engage a first axle based on the speed being below the speed threshold. Accordingly, the controller sends a command to the motor 6115 to engage a second axle based on the speed being above the speed threshold.

Additionally or alternatively, the controller may be operably coupled to one or more terrain sensors. The terrain sensors may be coupled to any component of the vehicle (e.g., tractive elements, etc.). The terrain sensors may send a terrain data to the controller, where the controller determines which motor 6115 to engage based on the terrain data. For example, the controller may determine, based on the terrain data, that the vehicle is in an off-road terrain, and, in response, send a command to the motor 6115 to engage the first axle. Accordingly, the controller may determine, based on the terrain data, that the vehicle is in an on-road terrain, and, in response, send a command to the motor 6115 to engage the second axle. The vehicle may further be configurable into an intermediate mode. In the intermediate mode both the first axle and second axle may be engaged, but a gear of the second axle may slip due to the variance between the axle ratios. The intermediate mode may be a mode where the speed of the military vehicle is at the speed threshold.

Figure 67:
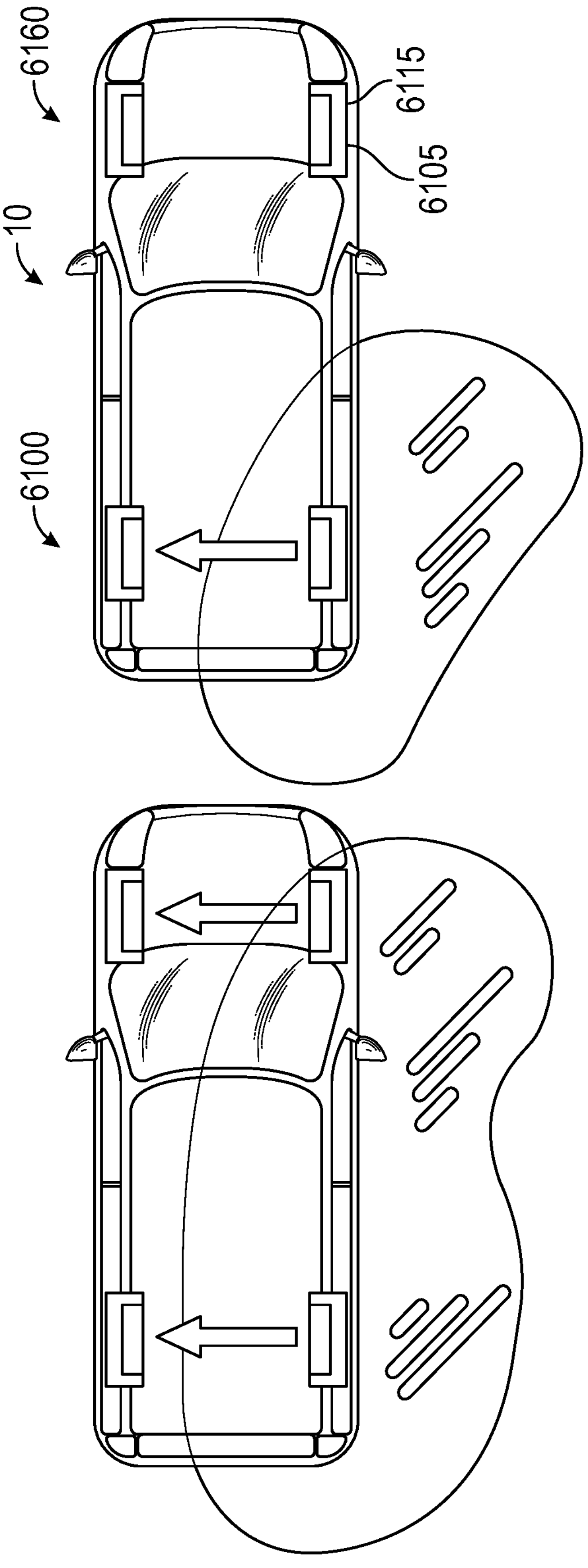
FIG. 67 is an illustration of an anti-lock brake system for the vehicle of FIG. 1, according to an exemplary embodiment.

Referring now to FIG. 67, the e-axle system 6100 includes an anti-lock brake system (ABS) 6160. The ABS 6160 is configured to provide increased regeneration to the tractive systems on varying road conditions. For example, if the back right tractive element 6105 slips, the e-axle system 6100 commands the motor 6115 to prohibit torque generation, such that the other motors 6115 and/or tractive elements 6015 continue to deliver torque and power the vehicle. Accordingly, in such an example, the brake system of the associated tractive element 6105 is prohibited from providing braking capabilities. Thus, the torque needed to stop the vehicle 10 is maximized to a particular traction limit to maintain braking capabilities for the vehicle 10. Although the ABS 6160 was described in the event of a single tractive element 6105, multiple tractive elements 6105 may experience slipping, where the other tractive elements 6105 perform vehicle regeneration.

Although each of the accessory systems have been individually explained and individually implemented into the vehicle 10. It should be noted that the vehicle 10 can include any combination of the accessory systems shown and described above. For example, the vehicle 10 can include any combination of the (i) tunnel-less feature, (ii) exhaust-less feature, (iii) space optimization, (iii) weight reduction, (iv) liquid cooled motor, (v) electrified vehicle battery placement, (vi) one or more modular motors, (vii) one or more electric accessories, (viii) shoreline charging, (ix) regeneration system, (x) battery ejection, (xi) autonomous drive system, (xii) one-pedal operation, (xiii) external data port, (xiv) battery heater, (xv) cabin heater for EV mode, (xvi) climate controlled seats, (xvii) elimination of high-voltage, (xviii) waterproof feature, (xix) suspension feature, (xx) wireless charging, and (xxi) integrated motor system.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the hull and frame assembly 100, the driveline 600, IMG 700, the FEAD 800, the ESS 1000, the control system 1600, etc.) as shown in the various exemplary embodiments is illustrative only. Additionally, any element disclosed in one embodiment may be incorporated or utilized with any other embodiment disclosed herein.

The invention claimed is:

1. A military vehicle comprising:

a frame;

a tractive assembly coupled to the frame and comprising:

a first axle assembly comprising a first tractive element;

a first motor coupled to the first tractive element across a first gear ratio;

a second axle assembly comprising a second tractive element; and a second motor coupled to second tractive element across a second gear ratio; and a controller operably coupled to the tractive assembly and configured to shift the tractive assembly between a first mode and a second mode in response to a speed of the military vehicle exceeding a speed threshold, wherein when the speed of the military vehicle is at the speed threshold, the tractive assembly is in an intermediate mode, the intermediate mode engaging both the first motor and the second motor, and wherein a gear of the second axle slips when the tractive assembly is in the intermediate mode;

wherein the controller is configured to engage the first motor in the first mode and thereafter engage the second motor in the second mode such that the tractive assembly is configured to drive the military vehicle in one of the first gear ratio and the second gear ratio based on the speed of the military vehicle.

2. The military vehicle of claim 1, wherein the first tractive element is a front tractive element and the second tractive element is a rear tractive element, and wherein the first gear ratio is a low speed gear ratio and the second gear ratio is a high speed gear ratio.

3. The military vehicle of claim 2, wherein the controller is operably coupled to a speed sensor, the speed sensor operably coupled to one of the first tractive element and the second tractive element and configured to detect the speed of the military vehicle, and wherein the controller compares the speed of the military vehicle to the speed threshold.

4. The military vehicle of claim 3, wherein the speed threshold is a maximum speed threshold, wherein the first mode is an off-road mode and the second mode is an on-road mode, and wherein the tractive assembly is in the off-road drive mode when the speed of the military vehicle is below the speed threshold and in the on-road drive mode when the speed of the military vehicle is above the speed threshold.

5. The military vehicle of claim 4, wherein both the first axle and the second axle are engaged when the speed of the military vehicle is at the speed threshold, and wherein a second gear set of the high speed gear ratio slips when both the first axle and the second axle are engaged.

6. The military vehicle of claim 1, wherein the controller configures the tractive assembly into the first mode and the second mode based on a terrain, and wherein the first axle is engaged when the tractive assembly is in the first mode and the second axle is engaged when the tractive assembly is in the second mode.

7. The military vehicle of claim 1, wherein the controller is configured to determine an amount of torque that the first motor can provide to the first axle and an amount of torque that the second motor can provide to the second axle in response to a sensor providing a direction of travel data of the military vehicle to the controller.

8. The military vehicle of claim 7, wherein the first tractive element is positioned on a first side of the military vehicle and the second tractive element is positioned on a second side of the military vehicle, the first side opposite the second side.

9. The military vehicle of claim 8, wherein, when turning the military vehicle, the first tractive element is positioned on an outside of a turn and the second tractive element is positioned on an inside of the turn, and wherein the controller sends a command to the first motor and the second motor for the first motor to provide a greater amount of torque than the second motor.

10. The military vehicle of claim 1, wherein, when the tractive assembly is in the first mode, the tractive assembly is in an all-wheel drive mode, and wherein, when the tractive assembly is in the second mode, the tractive assembly in a rear-wheel drive mode.

11. The military vehicle of claim 1, wherein the controller is operably coupled to a ground sensor, the ground sensor configured to determine a status of the ground on which the military vehicle is traveling, and wherein the controller sends a controls an amount of torque delivered to the first motor and the second motor.

12. The military vehicle of claim 11, wherein, when the ground sensor determines that the status is slippery and the first tractive element is slipping, the controller sends a command to the first motor to prohibit the first motor from delivering torque to the first axle.

13. The military vehicle of claim 1, wherein the controller is configured to determine an amount of torque that the first motor can provide to the first axle and the second motor can provide to the second axle in response to a terrain sensor providing a terrain data of the military vehicle to the controller.

14. The military vehicle of claim 13, wherein the controller sends a command to increase an amount of torque delivered by the first motor and the second motor when the tractive assembly is in the first mode, and wherein the controller sends a command to decrease an amount of torque delivered by the first motor and the second motor when the tractive assembly is in the second mode.

15. The military vehicle of claim 1, wherein the frame is a chassis including a passenger capsule, the passenger capsule including a front module coupled to a front end of the passenger capsule and a rear module coupled to a rear end of the passenger capsule.

16. The military vehicle of claim 1, wherein the first tractive element is a front tractive element and the second tractive element is a rear tractive element, and wherein the first tractive element and the second tractive element are angularly rotatable at 45 degrees to turn the military vehicle about a radius of 0 degrees.

17. The military vehicle of claim 16, wherein the front tractive element is angularly rotatable about a first wheel end in a first direction and the rear tractive element is angularly rotatable about a second wheel end in a second direction, the first direction being opposite the second direction.

18. A military vehicle comprising:

a frame;

a tractive assembly coupled to the frame and comprising:

a first axle assembly comprising a front tractive element;

a first motor coupled to the front tractive element across a low speed gear ratio;

a second axle assembly comprising a rear tractive element; and a second motor coupled to the rear tractive element across a high speed gear ratio; and a controller operably coupled to (i) the tractive assembly and (ii) a speed sensor operably coupled to one of the front tractive element and the rear tractive element and configured to detect a speed of the military vehicle, the controller configured to:

compare the speed of the military vehicle to a maximum speed threshold; and shift the tractive assembly between an off-road drive mode and an on-road drive mode in response to the speed of the military vehicle exceeding the maximum speed threshold, wherein the tractive assembly is in the off-road drive mode when the speed of the military vehicle is below the maximum speed threshold and in the on-road drive mode when the speed of the military vehicle is above the maximum speed threshold;

wherein the controller is configured to engage the first motor in the off-road drive mode and thereafter engage the second motor in the on-road drive mode such that the tractive assembly is configured to drive the military vehicle in one of the low speed gear ratio and the high speed gear ratio based on the speed of the military vehicle, and wherein both the first axle and the second axle are engaged when the speed of the military vehicle is at the maximum speed threshold, and wherein a second gear set of the high speed gear ratio slips when both the first axle and the second axle are engaged.

* * * * *